United States Patent
McCabe et al.

(10) Patent No.: US 11,474,382 B2
(45) Date of Patent: Oct. 18, 2022

(54) EYEWEAR WITH CHROMA ENHANCEMENT

(71) Applicant: Oakley, Inc., Foothill Ranch, CA (US)

(72) Inventors: Brock Scott McCabe, Laguna Nigel, CA (US); Ryan Saylor, Mission Viejo, CA (US); Carlos D. Reyes, Rancho Santa Margarita, CA (US)

(73) Assignee: Oakley, Inc., Foothill Ranch (CA)

( * ) Notice: Subject to any disclaimer, the term of this patent is extended or adjusted under 35 U.S.C. 154(b) by 406 days.

(21) Appl. No.: 16/504,143

(22) Filed: Jul. 5, 2019

(65) Prior Publication Data

US 2020/0081270 A1 Mar. 12, 2020

Related U.S. Application Data

(63) Continuation of application No. 14/852,235, filed on Sep. 11, 2015, now Pat. No. 10,345,623, which is a
(Continued)

(51) Int. Cl.
*G02C 7/10* (2006.01)
*G02B 5/22* (2006.01)
(Continued)

(52) U.S. Cl.
CPC ........ *G02C 7/104* (2013.01); *B29C 45/14778* (2013.01); *B29C 45/14819* (2013.01);
(Continued)

(58) Field of Classification Search
CPC .......... G02C 7/104; G02C 7/02; G02C 7/108; G02C 7/12; G02C 2202/16; G02C 7/10;
(Continued)

(56) References Cited

U.S. PATENT DOCUMENTS 2,219,122 A  10/1940 Weidert et al.
3,269,267 A   8/1966 Collins
(Continued)

FOREIGN PATENT DOCUMENTS

CN  1338622 A  3/2002
CN  2859575 Y  1/2007
(Continued)

OTHER PUBLICATIONS

Machine Translation of JP 2008304677 (Year: 2008).*
(Continued)

*Primary Examiner* — Darryl J Collins
*Assistant Examiner* — Matthew Y Lee
(74) *Attorney, Agent, or Firm* — Sterne, Kessler, Goldstein & Fox P.L.L.C.

(57) ABSTRACT

Some embodiments provide a lens including a lens body and an optical filter configured to attenuate visible light in certain spectral bands. At least some of the spectral bands can include spectral features that tend to substantially increase the colorfulness, clarity, and/or vividness of a scene. In certain embodiments, eyewear incorporates an optical filter that enhances chroma within one or more spectral bands. In some embodiments, a wearer of the eyewear can perceive the increase in chroma when viewing at least certain types of scenes.

20 Claims, 64 Drawing Sheets

Related U.S. Application Data continuation of application No. 13/656,114, filed on Oct. 19, 2012, now Pat. No. 9,134,547, said application No. 14/852,235 is a continuation-in-part of application No. 14/289,447, filed on May 28, 2014, now Pat. No. 9,383,594, which is a continuation of application No. 13/029,997, filed on Feb. 17, 2011, now Pat. No. 8,770,749.

(60) Provisional application No. 61/645,543, filed on May 10, 2012, provisional application No. 61/549,711, filed on Oct. 20, 2011, provisional application No. 61/425,707, filed on Dec. 21, 2010, provisional application No. 61/324,706, filed on Apr. 15, 2010.

(51) Int. Cl.
| | | |
|---|---|---|
| *B29C 45/14* | (2006.01) | |
| *B29D 11/00* | (2006.01) | |
| *G02C 7/12* | (2006.01) | |
| *G02C 7/02* | (2006.01) | |
| *G02B 5/28* | (2006.01) | |
| *B29L 11/00* | (2006.01) | |
| *B29L 12/00* | (2006.01) | |

(52) U.S. Cl.
CPC .... *B29D 11/0073* (2013.01); *B29D 11/00865* (2013.01); *G02B 5/223* (2013.01); *G02C 7/02* (2013.01); *G02C 7/108* (2013.01); *G02C 7/12* (2013.01); *B29L 2011/0016* (2013.01); *B29L 2012/005* (2013.01); *G02B 5/28* (2013.01); *G02C 2202/16* (2013.01)

(58) Field of Classification Search
CPC ........ B29C 45/14778; B29C 45/14819; B29D 11/0073; B29D 11/00865; G02B 5/223; G02B 5/28; B29L 2011/0016; B29L 2012/005
USPC ...................................................... 351/159.6
See application file for complete search history.

(56) References Cited

U.S. PATENT DOCUMENTS

| | | |
|---|---|---|
| 3,377,626 A | 4/1968 | Smith |
| 3,432,220 A | 3/1969 | Schreiner |
| 3,591,864 A | 7/1971 | Allsop |
| 3,701,590 A | 10/1972 | Zeltzer |
| 3,877,797 A | 4/1975 | Thornton, Jr. |
| 4,168,113 A | 9/1979 | Chang et al. |
| 4,176,299 A | 11/1979 | Thornton, Jr. |
| 4,268,134 A | 5/1981 | Gulati et al. |
| 4,288,250 A | 9/1981 | Yamashita |
| 4,300,819 A | 11/1981 | Taylor |
| 4,354,739 A | 10/1982 | Scanlon et al. |
| 4,376,829 A | 3/1983 | Daiku |
| 4,405,881 A | 9/1983 | Kobayashi |
| 4,521,524 A | 6/1985 | Yamashita |
| 4,537,612 A | 8/1985 | Borrelli et al. |
| 4,571,748 A | 2/1986 | Carroll et al. |
| 4,659,178 A | 4/1987 | Kyogoku |
| 4,663,562 A | 5/1987 | Miller et al. |
| 4,687,926 A | 8/1987 | Plummer |
| 4,765,729 A | 8/1988 | Taniguchi |
| 4,769,347 A | 9/1988 | Cook et al. |
| 4,777,090 A | 10/1988 | Ovshinsky et al. |
| 4,802,755 A | 2/1989 | Hensler |
| 4,826,286 A | 5/1989 | Thornton, Jr. |
| 4,838,673 A | 6/1989 | Richards et al. |
| 4,859,039 A | 8/1989 | Okumura et al. |
| 4,908,996 A | 3/1990 | Friedman et al. |
| 4,998,817 A | 3/1991 | Zeltzer |
| 5,039,631 A | 8/1991 | Krashkevich et al. |
| 5,051,309 A | 9/1991 | Kawaki et al. |
| RE33,729 E | 10/1991 | Perilloux |
| 5,054,902 A | 10/1991 | King |
| 5,061,659 A | 10/1991 | Ciolek et al. |
| 5,073,423 A | 12/1991 | Johnson et al. |
| 5,077,240 A | 12/1991 | Hayden et al. |
| 5,121,030 A | 6/1992 | Schott |
| 5,121,239 A | 6/1992 | Post |
| 5,135,298 A | 8/1992 | Feltman |
| 5,149,183 A | 9/1992 | Perrott et al. |
| 5,164,858 A | 11/1992 | Aguilera, Jr. et al. |
| 5,171,607 A | 12/1992 | Cumbo |
| 5,190,896 A | 3/1993 | Pucilowski et al. |
| 5,198,267 A | 3/1993 | Abaroni et al. |
| 5,218,386 A | 6/1993 | Levien |
| 5,306,746 A | 4/1994 | Ida et al. |
| 5,353,148 A | 10/1994 | Eid et al. |
| 5,364,498 A | 11/1994 | Chen |
| 5,408,278 A | 4/1995 | Christman |
| 5,434,707 A | 7/1995 | Dalzell et al. |
| 5,438,024 A | 8/1995 | Bolton et al. |
| 5,446,007 A | 8/1995 | Krashkevich et al. |
| 5,471,036 A | 11/1995 | Sperbeck |
| 5,513,038 A | 4/1996 | Abe |
| 5,550,599 A | 8/1996 | Jannard |
| 5,574,517 A | 11/1996 | Pang et al. |
| 5,592,245 A | 1/1997 | Moore et al. |
| 5,646,479 A | 7/1997 | Troxell |
| 5,646,781 A | 7/1997 | Johnson, Jr. |
| 5,658,502 A | 8/1997 | Hughes |
| 5,668,618 A | 9/1997 | Simioni |
| 5,694,240 A | 12/1997 | Sternbergh |
| 5,702,813 A | 12/1997 | Muarata et al. |
| 5,715,031 A | 2/1998 | Roffman et al. |
| 5,724,187 A | 3/1998 | Varaprasad et al. |
| 5,729,323 A | 3/1998 | Arden et al. |
| 5,731,898 A | 3/1998 | Orzi et al. |
| 5,751,481 A | 5/1998 | Dalzell et al. |
| 5,774,202 A | 6/1998 | Abraham et al. |
| 5,922,246 A | 7/1999 | Matsushita et al. |
| 5,925,438 A | 7/1999 | Ota et al. |
| 5,925,468 A | 7/1999 | Stewart |
| 5,928,718 A | 7/1999 | Dillon |
| 5,995,273 A | 11/1999 | Chandrasekhar |
| 6,040,053 A | 3/2000 | Scholz et al. |
| 6,045,224 A | 4/2000 | Kallenbach et al. |
| 6,102,539 A | 8/2000 | Tucker |
| 6,132,044 A | 10/2000 | Sternbergh |
| 6,135,595 A | 10/2000 | Takeshita et al. |
| 6,138,286 A | 10/2000 | Robrahn et al. |
| 6,142,626 A | 11/2000 | Lu et al. |
| 6,145,984 A | 11/2000 | Farwig |
| 6,166,848 A | 12/2000 | Cammenga et al. |
| 6,168,271 B1 | 1/2001 | Houston et al. |
| 6,175,450 B1 | 1/2001 | Andreani et al. |
| 6,178,034 B1 | 1/2001 | Allemand et al. |
| 6,210,858 B1 | 4/2001 | Yasuda et al. |
| 6,239,778 B1 | 5/2001 | Palffy-Muhoray et al. |
| 6,242,065 B1 | 6/2001 | Blomberg et al. |
| 6,256,152 B1 | 7/2001 | Coldrey et al. |
| 6,312,811 B1 | 11/2001 | Frigoli et al. |
| 6,313,577 B1 | 11/2001 | Kunisada et al. |
| 6,315,411 B1 | 11/2001 | Hatchiguian |
| 6,319,594 B1 | 11/2001 | Suzuki et al. |
| 6,334,680 B1 | 1/2002 | Larson |
| 6,355,124 B1 | 3/2002 | Blomberg et al. |
| 6,367,930 B1 | 4/2002 | Santelices |
| 6,382,788 B1 | 5/2002 | Stehager |
| 6,391,810 B1 | 5/2002 | Lenhart |
| 6,416,867 B1 | 7/2002 | Karpen |
| 6,420,290 B1 | 7/2002 | Brocheton et al. |
| 6,450,652 B1 | 9/2002 | Karpen |
| 6,460,994 B1 | 10/2002 | Nolan |
| 6,480,250 B1 | 11/2002 | Matsufuji et al. |
| 6,489,015 B1 | 12/2002 | Tsuchiya et al. |
| 6,491,851 B1 | 12/2002 | Keller et al. |
| 6,582,823 B1 | 6/2003 | Sakhrani et al. |
| 6,604,824 B2 | 8/2003 | Larson |
| 6,631,987 B2 | 10/2003 | Reichow et al. |

(56) References Cited

U.S. PATENT DOCUMENTS

| | | |
|---|---|---|
| 6,641,261 B2 | 11/2003 | Wang et al. |
| 6,650,473 B2 | 11/2003 | Nakagoshi |
| 6,659,608 B2 | 12/2003 | Yamamoto et al. |
| RE38,402 E | 1/2004 | Stephens et al. |
| 6,677,260 B2 | 1/2004 | Crane et al. |
| 6,696,140 B2 | 2/2004 | Suzuki |
| 6,733,543 B2 | 5/2004 | Pyles et al. |
| 6,770,352 B2 | 8/2004 | Suzuki et al. |
| 6,770,692 B1 | 8/2004 | Kobayashi et al. |
| 6,773,816 B2 | 8/2004 | Tsutsumi |
| 6,778,240 B2 | 8/2004 | Nakamura et al. |
| RE38,617 E | 10/2004 | Saito et al. |
| 6,801,360 B2 | 10/2004 | Phillips et al. |
| 6,807,006 B2 | 10/2004 | Nakagoshi |
| 6,811,258 B1 | 11/2004 | Grant |
| 6,811,727 B2 | 11/2004 | Havens et al. |
| 6,849,327 B1 | 2/2005 | Ikuhara et al. |
| 6,852,657 B2 | 2/2005 | Kolberg et al. |
| 6,854,844 B2 | 2/2005 | Kroll et al. |
| 6,863,397 B2 | 3/2005 | Nakano |
| 6,886,937 B2 | 5/2005 | Moravec et al. |
| 6,893,127 B2 | 5/2005 | Reichow et al. |
| 6,908,647 B2 | 6/2005 | Obayashi et al. |
| 6,908,698 B2 | 6/2005 | Yoshida et al. |
| 6,926,405 B2 | 8/2005 | Ambler et al. |
| 6,932,472 B2 | 8/2005 | Marason et al. |
| 6,955,430 B2 | 10/2005 | Pratt |
| 6,979,083 B2 | 12/2005 | Kerns, Jr. et al. |
| 6,984,038 B2 | 1/2006 | Ishak |
| 6,995,891 B2 | 2/2006 | Agrawal et al. |
| 7,029,118 B2 | 4/2006 | Ishak |
| 7,035,010 B2 | 4/2006 | Iori et al. |
| 7,036,932 B2 | 5/2006 | Boulineau et al. |
| 7,048,997 B2 | 5/2006 | Bhalakia et al. |
| 6,984,262 B2 | 6/2006 | King et al. |
| 7,106,509 B2 | 9/2006 | Sharp |
| 7,212,341 B2 | 5/2007 | Ikeyama |
| 7,226,162 B2 | 6/2007 | Mah |
| 7,229,686 B2 | 6/2007 | Yoshikawa et al. |
| 7,255,435 B2 | 8/2007 | Pratt |
| 7,256,921 B2 | 8/2007 | Kumar et al. |
| 7,276,544 B2 | 10/2007 | Lai et al. |
| 7,277,215 B2 | 10/2007 | Greer |
| 7,278,737 B2 | 10/2007 | Mainster et al. |
| 7,349,138 B2 | 3/2008 | Kumar et al. |
| 7,372,640 B2 | 5/2008 | Fung |
| 7,377,639 B2 | 5/2008 | Boulineau et al. |
| 7,393,100 B2 | 7/2008 | Mertz |
| 7,443,608 B2 | 10/2008 | Dillon |
| 7,506,976 B2 | 3/2009 | Baiocchi et al. |
| 7,506,977 B1 | 3/2009 | Aiiso |
| 7,520,608 B2 | 4/2009 | Ishak et al. |
| 7,537,828 B2 | 5/2009 | Coggio et al. |
| 7,556,376 B2 | 7/2009 | Ishak et al. |
| 7,572,513 B2 | 8/2009 | Kutsukake et al. |
| 7,597,441 B1 | 10/2009 | Farwig |
| 7,604,866 B2 | 10/2009 | Ohashi et al. |
| 7,656,581 B2 | 2/2010 | Giraudet |
| 7,717,557 B2 | 5/2010 | Kobayashi et al. |
| 7,732,006 B2 | 6/2010 | Alberto de Rojas |
| 7,794,831 B2 | 9/2010 | Faris |
| 7,808,692 B2 | 10/2010 | Karmhag et al. |
| 7,842,204 B2 | 11/2010 | Chiu |
| 7,901,074 B2 | 3/2011 | Yamamoto et al. |
| 7,906,047 B2 | 3/2011 | Chen et al. |
| 7,922,324 B2 | 4/2011 | Ishibashi et al. |
| 7,926,940 B2 | 4/2011 | Blum et al. |
| 7,936,496 B2 | 5/2011 | Kosa et al. |
| 7,964,121 B2 | 6/2011 | Hsu |
| 8,004,057 B2 | 8/2011 | Tian et al. |
| 8,012,386 B2 | 9/2011 | Clere |
| 8,029,705 B2 | 10/2011 | Bhalakia et al. |
| 8,057,716 B2 | 11/2011 | Hsu |
| 8,066,371 B2 | 11/2011 | Miyoshi |
| 8,092,726 B2 | 1/2012 | Hsu |
| 8,177,358 B2 | 5/2012 | Matera et al. |
| 8,210,678 B1 | 7/2012 | Farwig |
| 8,292,430 B2 | 10/2012 | Miyoshi |
| 8,367,211 B2 | 2/2013 | Qin et al. |
| 8,398,234 B2 | 3/2013 | Wang et al. |
| 8,562,130 B2 | 10/2013 | Kosa et al. |
| 8,687,261 B2 | 4/2014 | Gillaspie et al. |
| 8,703,296 B2 | 4/2014 | Fujinaka et al. |
| 8,733,929 B2 | 5/2014 | Chiou et al. |
| 8,746,879 B2 | 6/2014 | Jiang et al. |
| 8,770,749 B2 | 7/2014 | McCabe et al. |
| 9,134,547 B2 | 9/2015 | McCabe et al. |
| 9,146,336 B2 | 9/2015 | Matsumoto et al. |
| 9,383,594 B2 | 7/2016 | McCabe et al. |
| 2001/0005281 A1 | 6/2001 | Yu |
| 2001/0025948 A1 | 10/2001 | Walters et al. |
| 2001/0035935 A1 | 11/2001 | Bhalakia et al. |
| 2002/0034630 A1 | 3/2002 | Cano et al. |
| 2002/0090516 A1 | 7/2002 | Loshak et al. |
| 2002/0135734 A1 | 9/2002 | Reichow et al. |
| 2003/0001991 A1 | 1/2003 | Faris et al. |
| 2003/0020988 A1 | 1/2003 | Stone |
| 2003/0076474 A1 | 4/2003 | Wang et al. |
| 2003/0086159 A1 | 5/2003 | Suzuki et al. |
| 2003/0087087 A1 | 5/2003 | Onozawa et al. |
| 2003/0129422 A1 | 7/2003 | Shirakawa et al. |
| 2004/0005482 A1 | 1/2004 | Kobayashi et al. |
| 2004/0095645 A1 | 5/2004 | Pellicori et al. |
| 2004/0114242 A1 | 6/2004 | Sharp |
| 2004/0229056 A1 | 11/2004 | Hayashi |
| 2004/0246437 A1 | 12/2004 | Ambler et al. |
| 2005/0007548 A1 | 1/2005 | Ishak |
| 2005/0009964 A1 | 1/2005 | Sugimura et al. |
| 2005/0168690 A1 | 8/2005 | Kawai et al. |
| 2005/0175969 A1 | 8/2005 | Hayes |
| 2005/0201585 A1 | 9/2005 | Jannard et al. |
| 2005/0224703 A1 | 10/2005 | Harada et al. |
| 2005/0233131 A1 | 10/2005 | Nishida et al. |
| 2006/0023160 A1 | 2/2006 | Cartier et al. |
| 2006/0033851 A1 | 2/2006 | Iori et al. |
| 2006/0092374 A1 | 5/2006 | Ishak |
| 2006/0146275 A1 | 7/2006 | Mertz |
| 2006/0147177 A1 | 7/2006 | Jing et al. |
| 2006/0147614 A1 | 7/2006 | Mizuno |
| 2006/0147723 A1 | 7/2006 | Jing et al. |
| 2006/0147724 A1 | 7/2006 | Mizuno |
| 2006/0158881 A1 | 7/2006 | Dowling |
| 2006/0196413 A1 | 11/2006 | Sugimura |
| 2006/0269697 A1 | 11/2006 | Sharp |
| 2006/0269733 A1 | 11/2006 | Mizuno et al. |
| 2007/0097509 A1 | 5/2007 | Nevitt et al. |
| 2007/0122626 A1 | 5/2007 | Qin et al. |
| 2007/0126983 A1 | 6/2007 | Godeau et al. |
| 2007/0195422 A1 | 8/2007 | Begon et al. |
| 2007/0236809 A1 | 10/2007 | Lippey et al. |
| 2007/0285615 A1 | 12/2007 | Yamamoto et al. |
| 2007/0287093 A1 | 12/2007 | Jing et al. |
| 2008/0068555 A1 | 3/2008 | Lau et al. |
| 2008/0074613 A1 | 3/2008 | Phillips |
| 2008/0094566 A1 | 4/2008 | Ishak et al. |
| 2008/0187749 A1 | 8/2008 | Cael et al. |
| 2008/0221674 A1 | 9/2008 | Blum et al. |
| 2008/0278676 A1 | 11/2008 | Croft et al. |
| 2008/0291140 A1 | 11/2008 | Kent et al. |
| 2008/0297879 A1 | 12/2008 | Tonar et al. |
| 2009/0040564 A1 | 2/2009 | Granger |
| 2009/0040588 A1 | 2/2009 | Tonal et al. |
| 2009/0058250 A1 | 3/2009 | Sin et al. |
| 2009/0122261 A1 | 5/2009 | Chou et al. |
| 2009/0128895 A1 | 5/2009 | Seo et al. |
| 2009/0135462 A1* | 5/2009 | Kumar .................. C09B 57/00 359/243 |
| 2009/0141236 A1 | 6/2009 | Chen et al. |
| 2009/0141359 A1 | 6/2009 | Berni et al. |
| 2009/0152664 A1 | 6/2009 | Klem et al. |
| 2009/0268102 A1 | 10/2009 | Barazza |
| 2010/0003501 A1 | 1/2010 | Liu et al. |
| 2010/0054632 A1 | 3/2010 | McCormick et al. |
| 2010/0066974 A1 | 3/2010 | Croft et al. |

(56) References Cited

U.S. PATENT DOCUMENTS

| | | |
|---|---|---|
| 2010/0073765 A1 | 3/2010 | Brocheton |
| 2010/0102025 A1 | 4/2010 | Eagerton |
| 2010/0163165 A1 | 7/2010 | Jiang et al. |
| 2010/0182701 A1 | 7/2010 | Wu |
| 2010/0232003 A1 | 9/2010 | Baldy et al. |
| 2010/0232021 A1 | 9/2010 | Walker, Jr. et al. |
| 2010/0272990 A1 | 10/2010 | Bondesan et al. |
| 2010/0283956 A1 | 11/2010 | Jackson et al. |
| 2011/0043902 A1 | 2/2011 | Ishibashi et al. |
| 2011/0229660 A1 | 3/2011 | Reynolds |
| 2011/0126345 A1 | 6/2011 | Matsumoto et al. |
| 2011/0164215 A1 | 7/2011 | Coco Martin |
| 2011/0205627 A1 | 8/2011 | Kobuchi et al. |
| 2011/0211154 A1 | 9/2011 | Aoyama et al. |
| 2011/0255051 A1 | 10/2011 | McCabe et al. |
| 2012/0015111 A1 | 1/2012 | Mishina et al. |
| 2012/0044560 A9 | 2/2012 | Lam et al. |
| 2012/0137398 A1 | 6/2012 | Arnold |
| 2012/0137414 A1 | 6/2012 | Saylor |
| 2012/0217664 A1 | 8/2012 | Saitou et al. |
| 2012/0236249 A1 | 9/2012 | Miwa et al. |
| 2012/0236255 A1 | 9/2012 | Jiang et al. |
| 2012/0287395 A1 | 11/2012 | Tamura et al. |
| 2013/0107563 A1 | 5/2013 | McCabe et al. |
| 2013/0120821 A1 | 5/2013 | Chandrasekhar |
| 2013/0127078 A1 | 5/2013 | Qin et al. |
| 2013/0141693 A1 | 6/2013 | McCabe et al. |
| 2013/0161846 A1 | 6/2013 | Goodenough et al. |
| 2013/0235452 A1 | 9/2013 | You et al. |
| 2014/0036227 A1 | 2/2014 | Tamura et al. |
| 2014/0093661 A1 | 4/2014 | Trajkovska et al. |
| 2014/0232983 A1 | 8/2014 | Tokumaru et al. |
| 2014/0233105 A1 | 8/2014 | Schmeder |
| 2014/0334000 A1 | 11/2014 | Clerc et al. |
| 2015/0022777 A1 | 1/2015 | McCabe et al. |
| 2015/0109651 A1 | 4/2015 | Branda et al. |
| 2015/0131047 A1 | 5/2015 | Saylor et al. |
| 2015/0219931 A1 | 8/2015 | Grasso |
| 2016/0048037 A1 | 2/2016 | McCabe et al. |
| 2016/0070119 A1 | 3/2016 | McCabe et al. |
| 2017/0068113 A1 | 3/2017 | McCabe et al. |
| 2017/0102558 A1 | 4/2017 | Saylor et al. |
| 2017/0205639 A1 | 7/2017 | McCabe et al. |
| 2020/0081270 A1 | 3/2020 | McCabe et al. |
| 2020/0081271 A1 | 3/2020 | McCabe et al. |

FOREIGN PATENT DOCUMENTS

| | | | |
|---|---|---|---|
| CN | 101772723 A | | 7/2010 |
| CN | 102124394 A | | 7/2011 |
| DE | 3534575 A1 | | 4/1986 |
| EP | 0 127 821 B1 | | 12/1984 |
| EP | 0 519 660 A1 | | 12/1992 |
| EP | 1 460 473 B1 | | 8/2007 |
| EP | 1 986 024 A1 | | 10/2008 |
| EP | 2 492 723 A1 | | 8/2012 |
| EP | 2 799 514 A1 | | 11/2014 |
| FR | 2 812 629 A1 | | 2/2002 |
| GB | 1154500 A | | 6/1969 |
| JP | S62-123621 U | | 8/1987 |
| JP | 63-008703 A | | 1/1988 |
| JP | H02-132417 A | | 5/1990 |
| JP | H04-72347 A | | 3/1992 |
| JP | 05-202109 A | | 8/1993 |
| JP | H06-300992 A | | 10/1994 |
| JP | 2000-258625 A | | 9/2000 |
| JP | 2001-506012 A | | 5/2001 |
| JP | 2004-524558 A | | 8/2004 |
| JP | 2006-031030 A | | 2/2006 |
| JP | 2007-025609 A | | 2/2007 |
| JP | 2008-304677 A | | 12/2008 |
| JP | 2008304677 | * 12/2008 | ............... G02B 5/22 |
| JP | 2009-058959 A | | 3/2009 |
| JP | 2009-128912 A | | 6/2009 |
| JP | 2010-204383 A | | 9/2010 |
| JP | 2011-175176 A | | 9/2011 |
| JP | 2013-524300 A | | 6/2013 |
| JP | 2014-531058 A | | 11/2014 |
| WO | WO 88/02871 A1 | | 4/1988 |
| WO | WO 97/35215 A1 | | 9/1997 |
| WO | WO 99/67681 A1 | | 12/1999 |
| WO | WO 02/14930 A1 | | 2/2002 |
| WO | WO 02/042629 A1 | | 5/2002 |
| WO | WO 02/059684 A2 | | 8/2002 |
| WO | WO 02/076632 A1 | | 10/2002 |
| WO | WO 03/058294 A2 | | 7/2003 |
| WO | WO 2004/031813 A1 | | 4/2004 |
| WO | WO 2007/094338 A1 | | 8/2007 |
| WO | WO 2008/014225 A3 | | 1/2008 |
| WO | WO 2008/110045 A1 | | 9/2008 |
| WO | WO 2008/118967 A1 | | 10/2008 |
| WO | WO 2009/011439 A1 | | 1/2009 |
| WO | WO 2009/152381 A1 | | 12/2009 |
| WO | WO 2010/111499 A1 | | 9/2010 |
| WO | WO 2010/142019 A1 | | 12/2010 |
| WO | WO 2011/068051 A1 | | 6/2011 |
| WO | WO 2011/105211 A1 | | 9/2011 |
| WO | WO 2011/127015 A1 | | 10/2011 |
| WO | WO 2011/130314 A1 | | 10/2011 |
| WO | WO 2012/079160 A1 | | 6/2012 |
| WO | WO 2012/119158 A1 | | 9/2012 |
| WO | WO 2013/034557 A1 | | 3/2013 |
| WO | WO 2013/051489 A1 | | 4/2013 |
| WO | WO 2013/054656 A1 | | 4/2013 |
| WO | WO 2013/070417 A1 | | 5/2013 |
| WO | WO 2013/074269 A1 | | 5/2013 |
| WO | WO 2013/123592 A1 | | 8/2013 |
| WO | WO 2013/169987 A1 | | 11/2013 |
| WO | WO 2013/177676 A1 | | 12/2013 |
| WO | WO 2014/011581 A2 | | 1/2014 |
| WO | WO 2014/022049 A1 | | 2/2014 |
| WO | WO 2014/055513 A1 | | 4/2014 |

OTHER PUBLICATIONS

Golz and Macleod, "Colorimetry for CRT displays," J. Opt. Soci. Am. A, vol. 20, No. 5, May 2003, pp. 769-781.

Stockman and Sharpe, "The spectral sensitivities of the middle- and long-wavelength-sensitive cones derived from measurements in observers of known genotype," Vision Research 40, 2000, pp. 1711-1737.

International Search Report and Written Opinion dated Aug. 22, 2011, PCT Application No. US/2011/32172.

International Preliminary Report on Patentability and Written Opinion dated Oct. 16, 2012, International Application No. PCT/US11/32172, filed Apr. 12, 2011.

International Search Report and Written Opinion dated Feb. 5, 2013, International Application No. PCT/US2012/061060, filed Oct. 19, 2012.

Wilson, Carrie, "The How and Why of AR Coating," EyeCare Professional Magazine, Oct. 2010 Issue, retrieved on Oct. 9, 2013 from the Internet at www.ecpmag.com.

"Product description: Lagoon sunglasses," Maui Jim website, printed on Feb. 18, 2014, web address: http://www.mauijim.com/lagoon.html, information on the page was publicly available at least as early as Nov. 2009.

International Search Report and Written Opinion dated Sep. 16, 2013, International Application No. PCT/US2013/040284, filed May 9, 2013.

"ANSI Z80.3-2010 American National Standard for Ophthalmics-Nonprescription Sunglass and Fashion Eyewear Requirements," Jun. 7, 2010, pp. 1-25.

British Standard, "Personal Eye-Equipment—Sunglasses and Sunglare Filters for General Use and Filters for Direct Observation of the Sun," Technical Committee CEN/TC 85, Sep. 2007, 46 pages.

Drum, Bruce, "FDA Regulation of Labeling and Promotional Claims in Therapeutic Color Vision Devices: A Tutorial," Visual Neuroscience, May 2004, vol. 21, No. 3, pp. 461-463.

International Preliminary Report on Patentability and Written Opinion dated Sep. 3, 2013, in PCT/US2012/027790.

(56) References Cited

OTHER PUBLICATIONS

International Preliminary Report on Patentability and Written Opinion dated Apr. 22, 2014, in PCT Application No. PCT/US2012/061060.
International Preliminary Report on Patentability and Written Opinion dated Nov. 20, 2014, in PCT/US2013/040284.
Kirkpatrick et al., "Optimization by Simulated Annealing," Science, New Series, May 13, 1983, vol. 220, No. 4598, pp. 671-680.
Linear Programming, Feb. 28, 2011, http://en.wikipedia.org/w/index.php?title=Linear_programmming&oldid=416428507, 14 pages.
Moreland et al., "Quantitative Assessment of Commercial Filter Aids for Red-Green Colour Defectives," Ophthalmic and Physiological Optics, The Journal of the College of Optometrists, Sep. 2010, vol. 30, No. 5, pp. 685-692.
Rea et al., "Color Rendering: Beyond Pride and Prejudice," Color Research & Application, Dec. 2010, vol. 35, No. 6, pp. 401-409.
Sharp et al., "Retarder Stack Technology for Color Manipulation," SID Symposium Digest of Technical Papers, May 1999, vol. 30, No. 1, pp. 1072-1075.
Swillam et al., "The Design of Multilayer Optical Coatings Using Convex Optimization," Journal of Lightwave Technology, Apr. 2007, vol. 25, No. 4, pp. 1078-1085.
Tilsch et al., "Manufacturing of Precision Optical Coatings," Chinese Optics Letters, Apr. 30, 2010, vol. 8, Supplement, pp. 38-43.
Vorobyev et al., "Receptor Noise as a Determinant of Colour Thresholds," Proceedings of the Royal Society of London B, 1998, vol. 265, pp. 351-358.
Caswell, "Serious Shades: High style gives way to high tech as new performance sunglasses become sophisticated optical instruments," Popular Mechanics, Jul. 1988, vol. 165, No. 7, pp. 76-78.
Encyclopedia of Polymer Science and Technology—Plastics, Resins, Rubbers, Fibers, edited by Mark, H. et al., vol. 9, John Wiley & Sons, 1968, USA, pp. 50-53.
International Search Report and Written Opinion dated Jan. 13, 2016, in PCT Application No. PCT/US2015/053206.
International Preliminary Report on Patentability and Written Opinion dated Apr. 13, 2017, in PCT Application No. PCT/US2015/053206.
International Search Report and Written Opinion dated Oct. 7, 2015, in PCT Application No. PCT/US2015/031805.
International Preliminary Report on Patentability and Written Opinion dated Dec. 8, 2016, in PCT Application No. PCT/US2015/031805.
Nakamura et al., "Diffusion Coefficients of Disperse Dye to PE and PET Films in Supercritical Carbon Dioxide," School of Natural System, College of Science and Engineering, Kanazawa University, Japan, Proceedings of 9th International Symposium on Super Critical Fluids, May 18-20, 2009, Arachon, France, 6 pages.
International Search Report and Written Opinion dated Jul. 27, 2012, in PCT Application No. PCT/US2012/027790.
International Search Report and Written Opinion dated May 2, 2016 in PCT Application No. PCT/US2015/060103.
International Search Report and Written Opinion dated Jun. 1, 2016, in PCT Application No. PCT/US2015/065311.
X-Rite, A Guide to Understanding Color Communication, pp. 1-26, Mar. 2007, downloaded from http://www.xrite.com/learning/whitepapers/a-guide-to-understanding-color.
Exciton, "Product List," as archived Aug. 28, 2010 on archive.org in 2 pages.
Maui Jim, "All Sunglasses," as archived Mar. 30, 2009 on archive.org in 2 pages.
International Preliminary Report on Patentability and Written Opinion dated May 16, 2017, in PCT Application No. PCT/US2015/060103.
Maui Jim, "Terms of Use of This Website/Application," Oct. 22, 2018; 2 pgs.
A product page that describes the Maui Jim Lagoon 189-02 lens product as containing "PolarizedPlus®2," Sep. 21, 2012.
Sakamoto, Yasuo, "Light Shielding and Visual Function—Challenge to Light-Shielding Glasses with Clear Color Lens," Journal of the Japanese Society for Cataract Research, vol. 22, pp. 24-28 (2010), with attached English machine translation.
International Search Report and Written Opinion, dated Apr. 12, 2019 in related PCT Application No. PCT/IB2019/050824.
"Absorber Dyes." Selective Visible and Infrared Absorbers—Absorber Dyes, 2009, exciton.luxottica.com/selective-visible-and-infrared-absorbers.html.
Extended European Search Report issued in counterpart European Patent Application No. EP 17 18 6801, dated Feb. 7, 2018.
New dual layer cellulose acetate anti fog lens rimless fashionable snow goggles (http://hubosports.en.alibaba.com/product/60119246566-215413686/New_dual_layer_cellulose_acetate_anti_fog_lens_rimless_fashionable_snow_goggles.html).
International Search Report and Written Opinion, dated Jan. 18, 2019 in International Application No. PCT/IB2018/058172; 19 pages.

\* cited by examiner

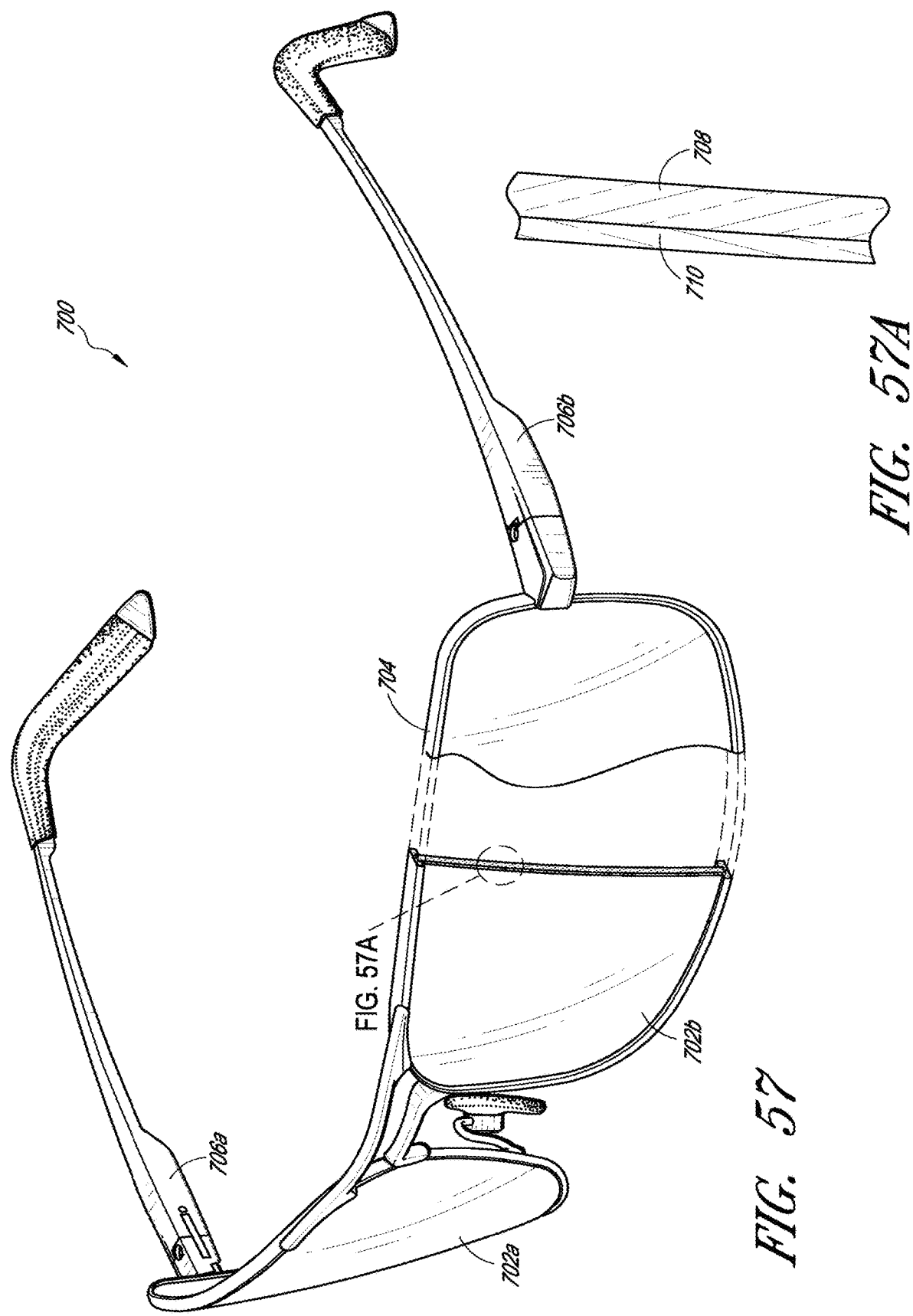

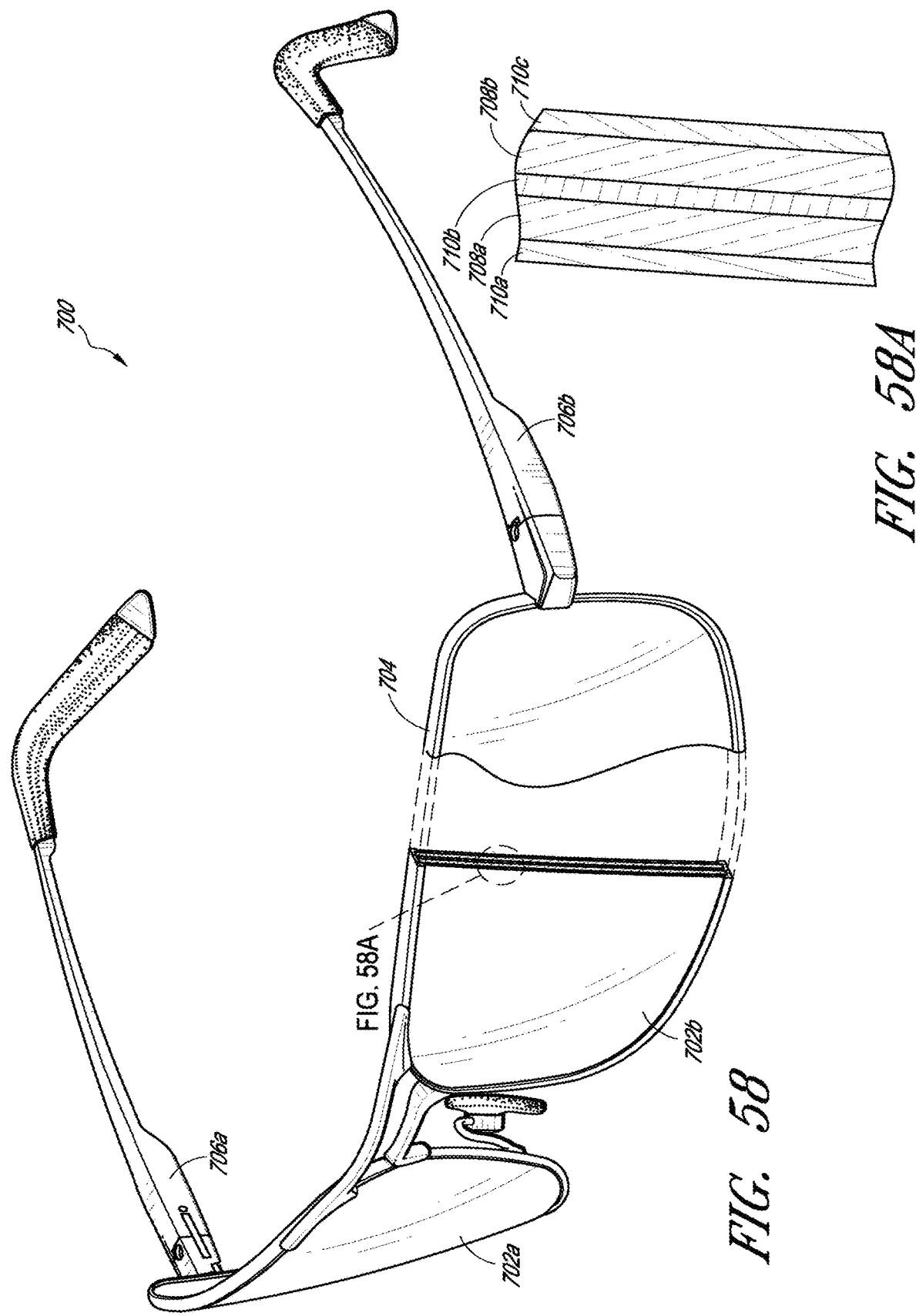

EYEWEAR WITH CHROMA ENHANCEMENT

RELATED APPLICATIONS

This application is a continuation of U.S. application Ser. No. 14/852,235, filed Sep. 11, 2015, titled EYEWEAR WITH CHROMA ENHANCEMENT, which is a continuation of U.S. application Ser. No. 13/656,114, filed Oct. 19, 2012, titled EYEWEAR WITH CHROMA ENHANCEMENT, now U.S. Pat. No. 9,134,547, which claims the benefit under 35 U.S.C. § 119(e) of U.S. Provisional Patent Application No. 61/549,711, filed Oct. 20, 2011, titled EYEWEAR WITH CHROMA ENHANCEMENT, and U.S. Provisional Patent Application No. 61/645,543, filed May 10, 2012, titled EYEWEAR WITH LAMINATED FUNCTIONAL LAYERS. U.S. application Ser. No. 14/852,235, filed Sep. 11, 2015, titled EYEWEAR WITH CHROMA ENHANCEMENT, is also a continuation-in-part of U.S. application Ser. No. 14/289,447, filed May 28, 2014, titled EYEWEAR WITH CHROMA ENHANCEMENT, now U.S. Pat. No. 9,383,594, which is a continuation of U.S. application Ser. No. 13/029,997, filed Feb. 17, 2011, titled EYEWEAR WITH CHROMA ENHANCEMENT, now U.S. Pat. No. 8,770,749, which claims the benefit under 35 U.S.C. § 119(e) of U.S. Provisional Patent Application No. 61/425,707, filed Dec. 21, 2010, titled EYEWEAR AND LENSES WITH CHROMA ENHANCING FILTER, and U.S. Provisional Patent Application No. 61/324,706, filed Apr. 15, 2010, titled EYEWEAR AND LENSES WITH CHROMA ENHANCING FILTER. The entire contents of each of these applications are incorporated by reference herein and made a part of this specification.

BACKGROUND

Field

This disclosure relates generally to eyewear and more particularly to lenses used in eyewear.

Description of Related Art

Eyewear can include optical elements that attenuate light in one or more wavelength bands. For example, sunglasses typically include a lens that absorbs a significant portion of light in the visible spectrum. A sunglass lens can have a dark film or coating that strongly absorbs visible light, thereby significantly decreasing the luminous transmittance of the lens. A lens can also be designed to have a spectral profile for another purpose, such as, for example, for indoor use, for use in sporting activities, for another particular use, or for a combination of uses.

SUMMARY

Example embodiments described herein have several features, no single one of which is indispensable or solely responsible for their desirable attributes. Without limiting the scope of the claims, some of the advantageous features will now be summarized.

Some embodiments provide a lens including a lens body and an optical filter within and/or outside of the lens body configured to attenuate visible light in a plurality of spectral bands. In some embodiments in which the optical filter is within the lens body, the optical filter can constitute the lens body, or the optical filter and additional components can constitute the lens body. The optical filter can be configured to substantially increase the colorfulness, clarity, and/or vividness of a scene. The optical filter can be particularly suited for use with eyewear and can allow the wearer of the eyewear to view a scene in high definition color (HD color). Each of the plurality of spectral bands can include an absorptance peak with a spectral bandwidth, a maximum absorptance, and an integrated absorptance peak area within the spectral bandwidth. The spectral bandwidth can be defined as the full width of the absorptance peak at 80% of the maximum absorptance of the absorptance peak, the full width of the absorptance peak at 90% of the maximum absorptance of the absorptance peak, or the full width of the absorptance peak at 95% of the maximum absorptance of the absorptance peak. Many other suitable definitions are possible. In some embodiments, an attenuation factor obtained by dividing the integrated absorptance peak area within the spectral bandwidth by the spectral bandwidth of the absorptance peak can be greater than or equal to about 0.8 for the absorptance peak in at least some of the plurality of spectral bands. In some embodiments, the spectral bandwidth of the absorptance peak in each of the plurality of spectral bands can be greater than or equal to about 20 nm.

In certain embodiments, the optical filter is at least partially incorporated into the lens body. The lens body can be impregnated with, loaded with, or otherwise comprise one or more organic dyes. Each of the one or more organic dyes can be configured to produce the absorptance peak in one of the plurality of spectral bands. In some embodiments, the optical filter is at least partially incorporated into a lens coating disposed over the lens body.

Some embodiments provide a method of manufacturing a lens. The method can include forming a lens having an optical filter configured to attenuate visible light in a plurality of spectral bands. Each of the plurality of spectral bands can include an absorptance peak with a spectral bandwidth, a maximum absorptance, and an integrated absorptance peak area within the spectral bandwidth. The spectral bandwidth can be defined as the full width of the absorptance peak at 80% of the maximum absorptance of the absorptance peak. An attenuation factor of the absorptance peak in each of the plurality of spectral bands can be greater than or equal to about 0.8 and less than 1. The attenuation factor of an absorptance peak can be obtained by dividing the integrated absorptance peak area within the spectral bandwidth by the spectral bandwidth of the absorptance peak.

In certain embodiments, a lens can be formed by forming a lens body and forming a lens coating over the lens body. At least a portion of the optical filter can be incorporated into the lens body. At least a portion of the optical filter can be incorporated into the lens coating. The lens coating can include an interference coating.

In some embodiments, a lens body can be formed by a method including forming a plurality of lens body elements and coupling the lens body elements to one another using one or more adhering layers. A polarizing film can be disposed between two of the plurality of lens body elements. In some embodiments, the polarizing film can be insert molded within the lens body.

Some embodiments provide a lens including a lens body and an optical filter characterized by a spectral absorptance profile including a plurality of absorptance peaks. Each of the plurality of absorptance peaks can have a maximum absorptance, a peak location at the wavelength at which the absorptance peak exhibits maximum absorptance, a spectral bandwidth defined as the full width of the absorptance peak at 80% of the maximum absorptance of the absorptance peak, and a center wavelength located at a midpoint of the spectral bandwidth of the absorptance peak. The plurality of absorptance peaks can include a first absorptance peak having a center wavelength and/or peak location between about 558 nm and about 580 nm and a second absorptance peak having a center wavelength and/or peak location between about 445 nm and about 480 nm. The spectral bandwidth of each of the plurality of absorptance peaks can be between about 20 nm and about 50 nm.

In some embodiments, the plurality of absorptance peaks can include a first absorptance peak having a center wavelength and/or peak location between about 560 nm and about 600 nm and a second absorptance peak having a center wavelength and/or peak location between about 450 nm and about 490 nm. The spectral bandwidth of each of the plurality of absorptance peaks can be between about 15 nm and about 50 nm.

Some embodiments provide a lens including a lens body and an optical filter characterized by a spectral absorbance profile including a plurality of absorbance peaks. Each of the plurality of absorbance peaks can have a maximum absorbance, a peak location at the wavelength at which the absorbance peak exhibits maximum absorbance, a spectral bandwidth defined as the full width of the absorbance peak at 80% of the maximum absorbance of the absorbance peak, and a center wavelength located at a midpoint of the spectral bandwidth of the absorbance peak. The plurality of absorbance peaks can include a first absorbance peak having a center wavelength and/or peak location between about 558 nm and about 580 nm and a second absorbance peak having a center wavelength and/or peak location between about 445 nm and about 480 nm. The spectral bandwidth of each of the plurality of absorbance peaks can be between about 20 nm and about 50 nm.

In some embodiments, the plurality of absorbance peaks can include a first absorbance peak having a center wavelength and/or peak location between about 560 nm and about 600 nm and a second absorbance peak having a center wavelength and/or peak location between about 450 nm and about 490 nm. The spectral bandwidth of each of the plurality of absorbance peaks can be between about 15 nm and about 50 nm.

In certain embodiments, each of the first absorptance peak and the second absorptance peak has an integrated absorptance peak area within the spectral bandwidth and an attenuation factor obtained by dividing the integrated absorptance peak area by the spectral bandwidth of the absorptance peak. The attenuation factor of each of the first absorptance peak and the second absorptance peak can be greater than or equal to about 0.8.

The plurality of absorptance peaks can include a third absorptance peak configured to substantially attenuate light at least between about 405 nm and about 425 nm and a fourth absorptance peak configured to substantially attenuate light at least between about 650 nm and about 670 nm, between about 705 nm and about 725 nm, or between about 700 nm and about 720 nm. In another embodiment, the third absorptance peak is configured to substantially attenuate light at least between about 400 nm and about 420 nm. Each of the third absorptance peak and the fourth absorptance peak can have an integrated absorptance peak area within the spectral bandwidth and an attenuation factor obtained by dividing the integrated absorptance peak area by the spectral bandwidth of the absorptance peak. The attenuation factor of each of the third absorptance peak and the fourth absorptance peak can be greater than or equal to about 0.8.

In certain embodiments, the plurality of absorptance peaks can include a third absorptance peak configured to substantially attenuate light at least between about 650 nm and about 670 nm. The third absorptance peak can have an integrated absorptance peak area within the spectral bandwidth and an attenuation factor obtained by dividing the integrated absorptance peak area by the spectral bandwidth of the absorptance peak. The attenuation factor of each of the third absorptance peak can be greater than or equal to about 0.8.

Some embodiments provide a lens that includes a lens body with an optical filter configured to increase the average chroma value of light transmitted through the lens within one or more portions of the visible spectrum. The chroma value is the C* attribute of the CIE L*C*h* color space. At least one portion of the visible spectrum can include a spectral range of about 630 nm to about 660 nm. The increase in average chroma value can include an increase that is perceivable by a human with substantially normal vision.

In certain embodiments, the optical filter is configured to increase the average chroma value of light transmitted through the lens within a spectral range of about 540 nm to about 600 nm by a relative magnitude of greater than or equal to about 3% compared to the average chroma value of light transmitted through a neutral filter within the same spectral range.

The optical filter can be configured to increase the average chroma value of light transmitted through the lens within a spectral range of about 440 nm to about 480 nm by a relative magnitude of greater than or equal to about 15% compared to the average chroma value of light transmitted through a neutral filter within the same spectral range.

In some embodiments, the optical filter does not substantially decrease the average chroma value of light transmitted through the lens within the one or more portions of the visible spectrum when compared to the average chroma value of light transmitted through a neutral filter. In certain embodiments, the optical filter does not substantially decrease the average chroma value of light transmitted through the lens within a spectral range of about 440 nm to about 660 nm when compared to the average chroma value of light transmitted through a neutral filter.

The optical filter can be configured to increase the average chroma value of light transmitted through the lens within a spectral range of about 630 to about 660 nm by a relative magnitude of greater than or equal to about 3% compared to the average chroma value of light transmitted through a neutral filter within the same spectral range.

The optical filter can be at least partially incorporated into the lens body. For example, the lens body can be loaded with a plurality of organic dyes, each of the plurality of organic dyes configured to increase the average chroma value of light transmitted through the lens within one or more portions of the visible spectrum.

In some embodiments, the optical filter is at least partially incorporated into a lens coating disposed over at least a portion of the lens body. For example, the optical filter can include an interference coating.

In some embodiments, the optical filter can be at least partially incorporated into an adhering layer, a polarizing layer, or a combination of the adhering layer and the polarizing layer.

Certain embodiments provide a method of manufacturing a lens, the method including forming a lens including an optical filter configured to increase the average chroma value of light transmitted through the lens within one or more portions of the visible spectrum. At least one portion of the visible spectrum can include a spectral range of about 630 nm to about 660 nm. The increase in average chroma value can include an increase that is perceivable by a human with substantially normal vision.

The step of forming a lens can include forming a lens body and forming a lens coating over the lens body. At least a portion of the optical filter can be incorporated into the lens body. At least a portion of the optical filter can be incorporated into the lens coating. For example, the lens coating can include an interference coating.

The step of forming a lens body can include forming a plurality of lens body elements and coupling the lens body elements to one another using one or more adhering layers. A polarizing film can be disposed between two of the plurality of lens body elements. The lens can include one or more components that substantially absorb ultraviolet radiation, including near ultraviolet radiation. In some embodiments, the polarizing film can be insert molded into the lens body.

Some embodiments provide a lens including a lens body and an optical filter configured to increase the average chroma value of light transmitted through the lens within one or more portions of the visible spectrum. One of the one or more portions of the visible spectrum can include a spectral range of about 540 nm to about 600 nm. The increase in average chroma value can include an increase that is perceivable by a human with substantially normal vision.

Certain embodiments provide a lens including a lens body and an optical filter configured to increase the average chroma value of light transmitted through the lens within one or more portions of the visible spectrum. Three of the one or more portions of the visible spectrum can include a spectral range of about 440 nm to about 510 nm, a spectral range of about 540 nm to about 600 nm, and a spectral range of about 630 nm to about 660 nm. The increase in average chroma value can include an increase that is perceivable by a human with substantially normal vision.

Some embodiments provide a lens for eyewear including a lens body and an optical filter including a plurality of organic dyes. Each of the plurality of organic dyes is configured to attenuate visible light in one or more spectral bands. Each of the one or more spectral bands includes an absorptance peak with a spectral bandwidth, a maximum absorptance, and an integrated absorptance peak area within the spectral bandwidth. The spectral bandwidth can be defined as the full width of the absorptance peak at 80% of the maximum absorptance of the absorptance peak. The attenuation factor of an absorptance peak can be obtained by dividing the integrated absorptance peak area within the spectral bandwidth by the spectral bandwidth of the absorptance peak. For one or more of the plurality of organic dyes, the attenuation factor of at least one absorptance peak is greater than or equal to about 0.8.

For example, one or more of the plurality of organic dyes can include an absorptance profile having a blue light absorptance peak with a center wavelength and/or peak location between about 470 nm and about 480 nm. In some embodiments, the spectral bandwidth of the blue light absorptance peak can be greater than or equal to about 20 nm, and the attenuation factor of the blue light absorptance peak can be greater than or equal to about 0.9.

One or more of the plurality of organic dyes can include an absorptance profile having a yellow light or yellow-green light absorptance peak with a center wavelength and/or peak location between about 560 nm and about 580 nm. In some embodiments, the spectral bandwidth of the yellow light or yellow-green light absorptance peak can be greater than or equal to about 20 nm, and the attenuation factor of the yellow light or yellow-green light absorptance peak can be greater than or equal to about 0.85.

One or more of the plurality of organic dyes can include an absorptance profile having a red light or orange-red light absorptance peak with a center wavelength and/or peak location between about 600 nm and about 680 nm. In some embodiments, the spectral bandwidth of the red light or orange-red light absorptance peak can be greater than or equal to about 20 nm, and the attenuation factor of the red light absorptance peak is greater than or equal to about 0.9.

Each of the plurality of organic dyes can be selected to increase the chroma value of light transmitted through the lens in one or more chroma enhancement windows. The one or more chroma enhancement windows can include a first spectral range of about 440 nm to about 510 nm, a second spectral range of about 540 nm to about 600 nm, a third spectral range of about 630 nm to about 660 nm, or any combination of the first, second, and third spectral ranges.

Certain embodiments provide a lens including a lens body and an optical filter configured to attenuate visible light in a plurality of spectral bands. Each of the plurality of spectral bands includes an absorptance peak with a spectral bandwidth, a maximum absorptance, lower and upper edge portions that are substantially below the maximum absorptance, and a middle portion positioned between the lower and upper edge portions and including the maximum absorptance and a region substantially near the maximum absorptance. In some embodiments, one of the lower or upper edge portions of at least one absorptance peak lies within an object spectral window including a spectral region in which the object emits or reflects a substantial visible stimulus.

The optical filter can be configured such that one of the lower or upper edge portions of at least one absorptance peak lies within a background spectral window. The background spectral window includes a spectral region in which the background emits or reflects a substantial visible stimulus.

The optical filter can be at least partially incorporated into the lens body. The lens body can be impregnated with a plurality of organic dyes, each of the plurality of organic dyes configured to produce the absorptance peak in one of the plurality of spectral bands.

The optical filter can be at least partially incorporated into a lens coating disposed over at least a portion of the lens body. For example, the optical filter can include an interference coating. The optical filter can also be at least partially incorporated into an adhering layer, a polarizing layer, or a combination of the adhering layer and the polarizing layer.

Some embodiments provide a method of manufacturing a lens, the method including forming an optical filter configured to attenuate visible light in a plurality of spectral bands. Each of the plurality of spectral bands including an absorptance peak with a spectral bandwidth, a maximum absorptance, lower and upper edge portions that are substantially below the maximum absorptance, and a middle portion positioned between the lower and upper edge portions and including the maximum absorptance and a region substantially near the maximum absorptance. One of the lower or upper edge portions of at least one absorptance peak can lie within an object spectral window including a spectral region in which the object emits or reflects a substantial visible stimulus.

BRIEF DESCRIPTION OF THE DRAWINGS

Various embodiments are depicted in the accompanying drawings for illustrative purposes, and should in no way be interpreted as limiting the scope of the inventions. In addition, various features of different disclosed embodiments can be combined to form additional embodiments, which are part of this disclosure. Any feature or structure can be removed or omitted. Throughout the drawings, reference numbers can be reused to indicate correspondence between reference elements.

FIGS. 57 and 57A show a perspective view of eyewear with a portion cut away to show an example configuration of lens elements.

FIGS. 58 and 58A show a perspective view of eyewear with a portion cut away to show another example configuration of lens elements.

DETAILED DESCRIPTION OF PREFERRED EMBODIMENTS

Figure 1A:
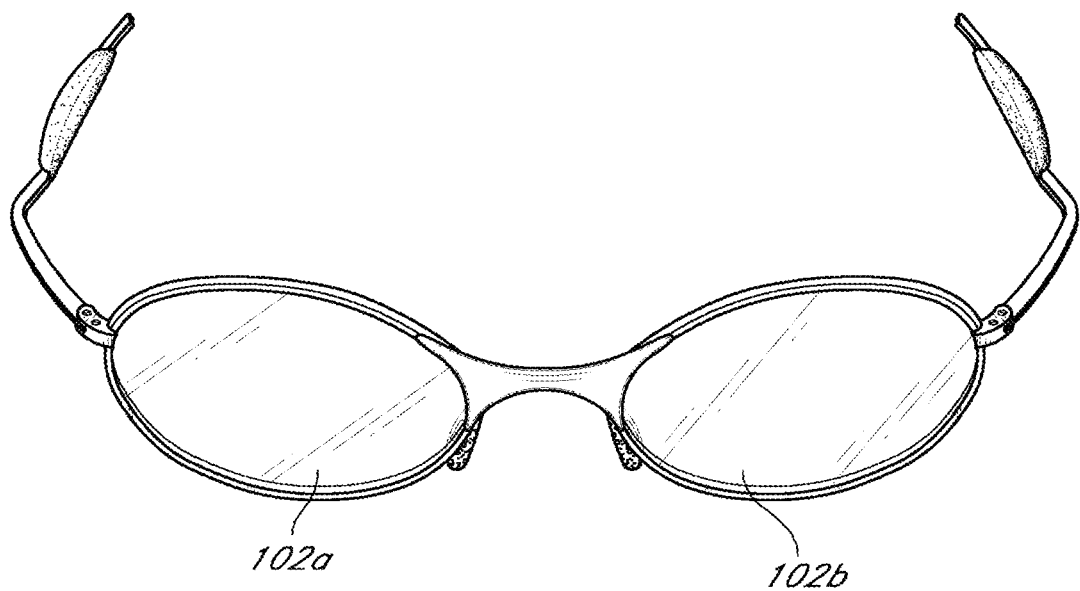
FIG. 1A is a perspective view of a pair of spectacles incorporating lenses with a chroma-enhancing optical filter.

Although certain preferred embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process can be performed in any suitable sequence and are not necessarily limited to any particular disclosed sequence. Various operations can be described as multiple discrete operations in turn, in a manner that can be helpful in understanding certain embodiments; however, the order of description should not be construed to imply that these operations are order dependent. Additionally, the structures described herein can be embodied as integrated components or as separate components. For purposes of comparing various embodiments, certain aspects and advantages of these embodiments are described. Not necessarily all such aspects or advantages are achieved by any particular embodiment. Thus, for example, various embodiments can be carried out in a manner that achieves or optimizes one advantage or group of advantages as taught herein without necessarily achieving other aspects or advantages as can also be taught or suggested herein.

Objects that humans can visually observe in the environment typically emit, reflect, or transmit visible light from one or more surfaces. The surfaces can be considered an array of points that the human eye is unable to resolve any more finely. Each point on the surfaces does not emit, reflect, or transmit a single wavelength of light; rather, it emits, reflects, or transmits a broad spectrum of wavelengths that are interpreted as a single color in human vision. Generally speaking, if one were to observe the corresponding "single wavelength" of light for that interpreted color (for example, a visual stimulus having a very narrow spectral bandwidth, such as 1 nm), it would appear extremely vivid when compared to a color interpreted from a broad spectrum of observed wavelengths.

An optical filter can be configured to remove the outer portions of a broad visual stimulus to make colors appear more vivid as perceived in human vision. The outer portions of a broad visual stimulus refer to wavelengths that, when substantially, nearly completely, or completely attenuated, decrease the bandwidth of the stimulus such that the vividness of the perceived color is increased. An optical filter for eyewear can be configured to substantially increase the colorfulness, clarity, and/or vividness of a scene. Such an optical filter for eyewear can allow the wearer to view the scene in high definition color (HD color). In some embodiments, portions of a visual stimulus that are not substantially attenuated include at least the wavelengths for which cone photoreceptor cells in the human eye have the greatest sensitivity. In certain embodiments, the bandwidth of the color stimulus when the optical filter is applied includes at least the wavelengths for which the cone photoreceptor cells have the greatest sensitivity. In some embodiments, a person wearing a lens incorporating an optical filter disclosed herein can perceive a substantial increase in the clarity of a scene. The increase in perceived clarity can result, for example, from increased contrast, increased chroma, or a combination of factors.

The vividness of interpreted colors is correlated with an attribute known as the chroma value of a color. The chroma value is one of the attributes or coordinates of the CIE L*C*h* color space. Together with attributes known as hue and lightness, the chroma can be used to define colors that are perceivable in human vision. It has been determined that visual acuity is positively correlated with the chroma values of colors in an image. In other words, the visual acuity of an observer is greater when viewing a scene with high chroma value colors than when viewing the same scene with lower chroma value colors.

An optical filter can be configured to enhance the chroma profile of a scene when the scene is viewed through a lens that incorporates the optical filter. The optical filter can be configured to increase or decrease chroma in one or more chroma enhancement windows in order to achieve any desired effect. The chroma-enhancing optical filter can be configured to preferentially transmit or attenuate light in any desired chroma enhancement windows. Any suitable process can be used to determine the desired chroma enhancement windows. For example, the colors predominantly reflected or emitted in a selected environment can be measured, and a filter can be adapted to provide chroma enhancement in one or more spectral regions corresponding to the colors that are predominantly reflected or emitted.

In the embodiment illustrated in FIG. 1A, eyewear 100 includes lenses 102a, 102b having a chroma-enhancing optical filter. The chroma-enhancing filter generally changes the colorfulness of a scene viewed through one or more lenses 102a, 102b, compared to a scene viewed through a lens with the same luminous transmittance but a different spectral transmittance profile. The eyewear can be of any type, including general-purpose eyewear, special-purpose eyewear, sunglasses, driving glasses, sporting glasses, indoor eyewear, outdoor eyewear, vision-correcting eyewear, contrast-enhancing eyewear, eyewear designed for another purpose, or eyewear designed for a combination of purposes.

Figure 1B:
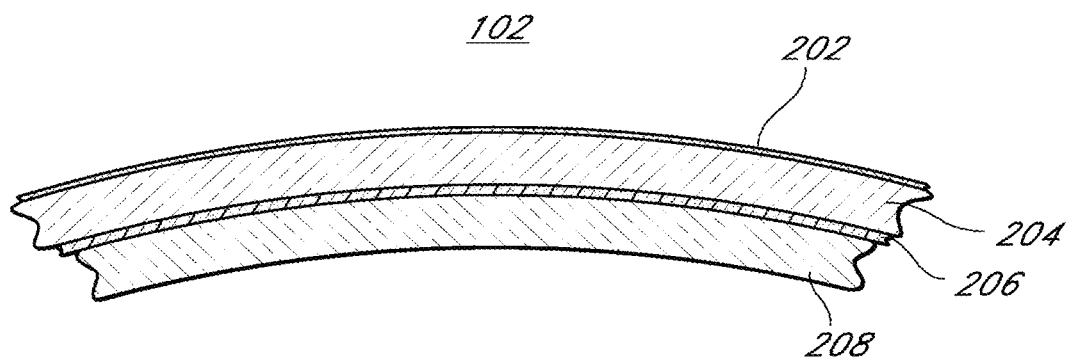
FIG. 1B is a cross-sectional view of one of the lenses shown in FIG. 1A.

In the embodiment illustrated in FIG. 1B, a lens 102 incorporates several lens elements. The lens elements include a lens coating 202, a first lens body element 204, a film layer 206, and a second lens body element 208. Many variations in the configuration of the lens 102 are possible. For example, the lens 102 can include a polarizing layer, one or more adhesive layers, a photochromic layer, an antireflection coating, a mirror coating, an interference coating, a scratch resistant coating, a hydrophobic coating, an antistatic coating, other lens elements, or a combination of lens components. If the lens 102 includes a photochromic layer, the photochromic material can include a neutral density photochromic or any other suitable photochromic. At least some of the lens components and/or materials can be selected such that they have a substantially neutral visible light spectral profile. Alternatively, the visible light spectral profiles can cooperate to achieve any desired lens chromaticity, a chroma-enhancing effect, another goal, or any combination of goals. The polarizing layer, the photochromic layer, and/or other functional layers can be incorporated into the film layer 206, the lens coating 202, one or more of the lens body elements 204, 208, or can be incorporated into additional lens elements. In some embodiments, a lens 102 incorporates fewer than all the lens elements shown in FIG. 1B.

The lens can include a UV absorption layer or a layer that includes UV absorption outside of the optical filter layer. Such a layer can decrease bleaching of the optical filter. In addition, UV absorbing agents can be disposed in any lens component or combination of lens components.

The lens body elements 204, 208 can be made from glass, a polymeric material, a co-polymer, a doped material, another material, or a combination of materials. In some embodiments, one or more portions of the optical filter can be incorporated into the lens coating 202, into one or more lens body elements 204, 208, into a film layer 206, into an adhesive layer, into a polarizing layer, into another lens element, or into a combination of elements.

The lens body elements 204, 208 can be manufactured by any suitable technique, such as, for example, casting or injection molding. Injection molding can expose a lens to temperatures that degrade or decompose certain dyes. Thus, when the optical filter is included in one or more lens body elements, a wider range of dyes can be selected for inclusion in the optical filter when the lens body elements are made by casting than when the lens body is made by injection molding. Further, a wider range of dyes or other optical filter structures can be available when the optical filter is implemented at least partially in a lens coating.

A sunglass lens substantially attenuates light in the visible spectral region. However, the light need not be attenuated uniformly or even generally evenly across the visible spectrum. Instead, the light that is attenuated can be tailored to achieve a specific chroma-enhancing profile or another goal. A sunglass lens can be configured to attenuate light in spectral bands that are selected such that the scene receives one or more of the improvements or characteristics disclosed herein. Such improvements or characteristics can be selected to benefit the wearer during one or more particular activities or in one or more specific environments.

Figure 2A:
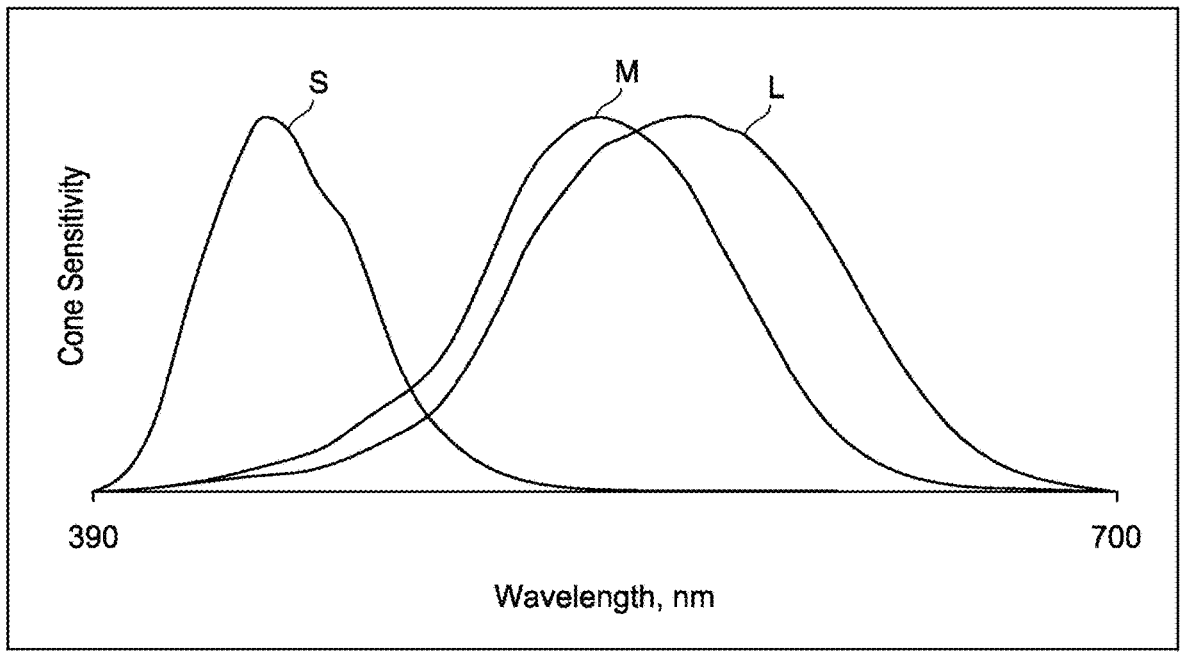
FIG. 2A is a graph showing sensitivity curves for cone photoreceptor cells in the human eye.

To design a filter that increases chroma for an array of colors, one can account for the mechanisms involved in the eye's perception of color. The photopically adapted eye (e.g., the human eye) shows peak sensitivities at 440, 545, and 565 nm. These peak sensitivities correspond to each of three optical sensors found in the eye's retina known as cones. The location and shape of the cone sensitivity profiles have recently been measured with substantial accuracy in Stockman and Sharpe, "The spectral sensitivities of the middle- and long-wavelength-sensitive cones derived from measurements in observers of known genotype," Vision Research 40 (2000), pp. 1711-1737, which is incorporated by reference herein and made a part of this specification. The sensitivity profiles S, M, L for cone photoreceptor cells in the human eye as measured by Stockman and Sharpe are shown in FIG. 2A.

Figure 2B:
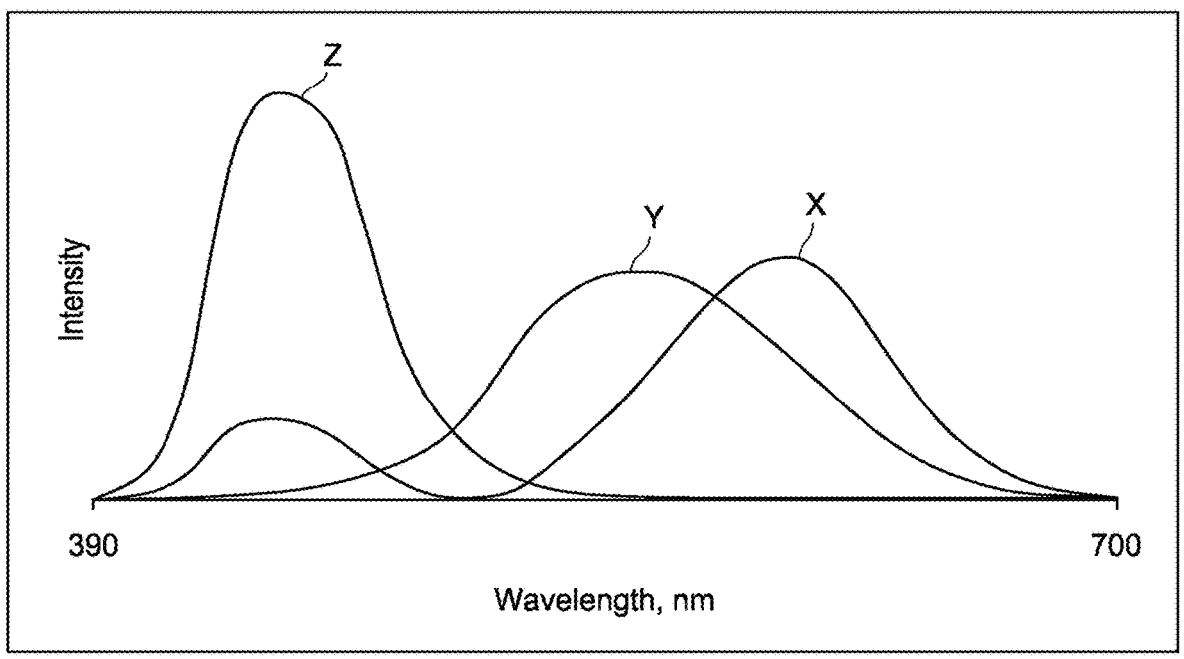
FIG. 2B is a graph showing the 1931 CIE XYZ tristimulus functions.

The cone sensitivity profiles can be converted from sensitivity data to quantities describing color such as, for example, the CIE tristimulus color values. The 1931 CIE XYZ tristimulus functions are shown in FIG. 2B. In some embodiments, the CIE tristimulus color values are used to design an optical filter. For example, the CIE color values can be used to calculate the effect of an optical filter on perceived color using values of chroma, C*, in the CIE L*C*h* color space.

The human cone sensitivities can be converted to the 1931 CIE XYZ color space using the linear transformation matrix M described in Golz and Macleod, "Colorimetry for CRT displays," J. Opt. Soc. Am. A vol. 20, no. 5 (May 2003), pp.

769-781, which is incorporated by reference herein and made a part of this specification. The linear transformation is shown in Eq. 1:

$$M = \begin{bmatrix} 0.17156 & 0.52901 & 0.02199 \\ 0.15955 & 0.48553 & 0.04298 \\ 0.01916 & 0.03989 & 1.03993 \end{bmatrix} \quad \text{(Eq. 1)}$$

$$\begin{bmatrix} L \\ M \\ S \end{bmatrix} = M \begin{bmatrix} X \\ Y \\ Z \end{bmatrix}$$

To solve for the 1931 CIE XYZ color space values (X Y Z), the Stockman and Sharpe 2000 data can be scaled by factors of 0.628, 0.42, and 1.868 for L, M, and S cone sensitivities, respectively, and multiplied by the inverse of the linear transformation matrix M in the manner shown in Eqs. 2-1 and 2-2:

$$\begin{bmatrix} X \\ Y \\ Z \end{bmatrix} = M^{-1} \begin{bmatrix} L \\ M \\ S \end{bmatrix} \quad \text{(Eq. 2-1)}$$

where:

$$M^{-1} = \begin{bmatrix} 2.89186 & -3.13517 & 0.19072 \\ 0.95178 & 1.02077 & -0.02206 \\ -0.01677 & 0.09691 & 0.95724 \end{bmatrix} \quad \text{(Eq. 2-2)}$$

The CIE tristimulus values, X Y Z, can be converted to the 1976 CIE L*a*b* color space coordinates using the nonlinear equations shown in Eqs. 3-1 through 3-7. Where $X_n=95.02$, $Y_n=100.00$, and $Z_n=108.82$ $$L^* = 116\sqrt[3]{Y/Y_n} - 16 \quad \text{(Eq. 3-1)}$$

$$a^* = 500\left(\sqrt[3]{X/X_n} - \sqrt[3]{Y/Y_n}\right) \quad \text{(Eq. 3-2)}$$

$$b^* = 200\left(\sqrt[3]{Y/Y_n} - \sqrt[3]{Z/Z_n}\right) \quad \text{(Eq. 3-3)}$$

if $X/X_n$, $Y/Y_n$, or $Z/Z_n < 0.008856$, then:

$$L^* = 903.3(Y/Y_n) \quad \text{(Eq. 3-4)}$$

$$a^* = 500[f(X/X_n) - f(Y/Y_n)] \quad \text{(Eq. 3-5)}$$

$$b^* = 200[f(Y/Y_n) - f(Z/Z_n)] \quad \text{(Eq. 3-6)}$$

For $\alpha > 0.008856$; $\alpha = X/X_n$, $Y/Y_n$, or $Z/Z_n$ $$f(\alpha) = \sqrt[3]{\alpha}$$

Otherwise:

$$f(\alpha) = 7.87\alpha + 16/116 \quad \text{(Eq. 3-7)}$$

Chroma or $C^*$ can be then be calculated by further conversion from CIE $L^*a^*b^*$ to CIE $L^*C^*h^*$ using Eq. 4:

$$C^* = \sqrt{a^{*2} + b^{*2}} \quad \text{(Eq. 4)}$$

As mentioned above, the colors observed in the physical world are stimulated by wide bands of wavelengths. To simulate this and then calculate the effects of an optical filter, filtered and non-filtered bands of light are used as input to the cone sensitivity space. The effect on chroma can then be predicted via the transformations listed above.

When inputting a spectrum of light to the cone sensitivity space, the mechanism of color recognition in the human eye can be accounted for. Color response by the eye is accomplished by comparing the relative signals of each of the three cones types: S, M, and L. To model this with broad band light, a sum of the intensities at each wavelength in the input spectrum is weighted according to the cone sensitivity at that wavelength. This is repeated for all three cone sensitivity profiles. An example of this calculation is shown in Table A:

TABLE A

| Wavelength λ (nm) | Input light intensity, arbitrary units | | L Cone Sensitivity | | L Weighted light intensity | |
|---|---|---|---|---|---|---|
| 500 | 0.12 | × | 0.27 | = | 0.032 | |
| 501 | 0.14 | × | 0.28 | = | 0.039 | |
| 502 | 0.16 | × | 0.31 | = | 0.05 | |
| 503 | 0.17 | × | 0.33 | = | 0.056 | |
| 504 | 0.25 | × | 0.36 | = | 0.09 | |
| 505 | 0.41 | × | 0.37 | = | 0.152 | |
| 506 | 0.55 | × | 0.39 | = | 0.215 | |
| 507 | 0.64 | × | 0.41 | = | 0.262 | |
| 508 | 0.75 | × | 0.42 | = | 0.315 | |
| 509 | 0.63 | × | 0.44 | = | 0.277 | |
| 510 | 0.54 | × | 0.46 | = | 0.248 | |
| 511 | 0.43 | × | 0.48 | = | 0.206 | |
| 512 | 0.25 | × | 0.49 | = | 0.123 | |
| 513 | 0.21 | × | 0.50 | = | 0.105 | |
| 514 | 0.18 | × | 0.51 | = | 0.092 | |
| 515 | 0.16 | × | 0.52 | = | 0.083 | |
| 516 | 0.15 | × | 0.54 | = | 0.081 | |
| 517 | 0.13 | × | 0.56 | = | 0.073 | |
| 518 | 0.11 | × | 0.57 | = | 0.063 | Total weighted |
| 519 | 0.09 | × | 0.59 | = | 0.053 | light intensity, |
| 520 | 0.08 | × | 0.61 | = | 0.049 | normalized |
| Sum | 6.15 | | | | 2.664 | 0.433 |

Normalized weighted light intensities for all three cone types can then be converted to the 1931 CIE XYZ color space via a linear transformation matrix, M. This conversion facilitates further conversion to the 1976 CIE L*a*b* color space and the subsequent conversion to the CIE L*C*h color space to yield chroma values.

To simulate the effect of a filter placed between the eye and the physical world, an input band of light can be modified according to a prospective filter's absorption characteristics. The weighted light intensity is then normalized according to the total sum of light that is transmitted through the filter.

In certain embodiments, to test the effect of a filter on various colors of light, the spectral profile, or at least the bandwidth, of an input is determined first. The appropriate bandwidth for the model's input is typically affected by the environment of use for the optical filter. A reasonable bandwidth for a sunglass lens can be about 30 nm, since this bandwidth represents the approximate bandwidth of many colors perceived in the natural environment. Additionally, 30 nm is a narrow enough bandwidth to permit transmitted light to fall within responsive portions of the cone sensitivity functions, which are approximately twice this bandwidth. A filter designed using a 30 nm input bandwidth will also improve the chroma of colors having other bandwidths, such as 20 nm or 80 nm. Thus, the effect of a filter on chroma can be determined using color inputs having a 30 nm bandwidth or another suitable bandwidth that is sensitive to a wide range of natural color bandwidths.

Other bandwidths are possible. The bandwidth can be significantly widened or narrowed from 30 nm while preserving the chroma-enhancing properties of many filter designs. The 30 nm bandwidth described above is representative of wider or narrower input bandwidths that can be used to produce desired features of an optical filter. The term "bandwidth" is used herein in its broad and ordinary sense. This disclosure sets forth several techniques for characterizing the bandwidth of a spectral feature. Unless otherwise specified, any suitable bandwidth characterization disclosed herein can be applied to define the spectral features identified in this specification. For example, in some embodiments, the bandwidth of a peak encompasses the full width of a peak at half of the peak's maximum value (FWHM value) and any other commonly used measurements of bandwidth.

A sample calculation of the normalized L weighted light intensity using the 30 nm bandwidth and an example filter is shown in Table B:

TABLE B

| Wavelength λ (nm) | Incoming light intensity arbitrary units | | Filter T % | | L Cone Sensitivity | | Filtered L weighted light intensity | |
|---|---|---|---|---|---|---|---|---|
| 499 | 0 | × | 0.12 | × | 0.25 | = | 0.00 | |
| 500 | 1 | × | 0.34 | × | 0.27 | = | 0.09 | |
| 501 | 1 | × | 0.41 | × | 0.28 | = | 0.11 | |
| 502 | 1 | × | 0.42 | × | 0.31 | = | 0.13 | |
| 503 | 1 | × | 0.44 | × | 0.33 | = | 0.15 | |
| 504 | 1 | × | 0.51 | × | 0.36 | = | 0.18 | |
| 505 | 1 | × | 0.55 | × | 0.37 | = | 0.20 | |
| 506 | 1 | × | 0.61 | × | 0.39 | = | 0.24 | |
| 507 | 1 | × | 0.78 | × | 0.41 | = | 0.32 | |
| 508 | 1 | × | 0.75 | × | 0.42 | = | 0.32 | |
| 509 | 1 | × | 0.85 | × | 0.44 | = | 0.37 | |
| 510 | 1 | × | 0.87 | × | 0.46 | = | 0.40 | |
| 511 | 1 | × | 0.91 | × | 0.48 | = | 0.44 | |
| 512 | 1 | × | 0.95 | × | 0.49 | = | 0.47 | |
| 513 | 1 | × | 0.96 | × | 0.50 | = | 0.48 | |
| 514 | 1 | × | 0.97 | × | 0.51 | = | 0.49 | |
| 515 | 1 | × | 0.96 | × | 0.52 | = | 0.50 | |
| 516 | 1 | × | 0.98 | × | 0.54 | = | 0.53 | |
| 517 | 1 | × | 0.76 | × | 0.56 | = | 0.43 | |
| 518 | 1 | × | 0.75 | × | 0.57 | = | 0.43 | |
| 519 | 1 | × | 0.61 | × | 0.59 | = | 0.36 | |
| 520 | 1 | × | 0.55 | × | 0.61 | = | 0.34 | |
| 521 | 1 | × | 0.48 | × | 0.72 | = | 0.35 | |
| 522 | 1 | × | 0.42 | × | 0.78 | = | 0.33 | |
| 523 | 1 | × | 0.41 | × | 0.81 | = | 0.33 | |
| 524 | 1 | × | 0.35 | × | 0.84 | = | 0.29 | |
| 525 | 1 | × | 0.33 | × | 0.85 | = | 0.28 | |
| 526 | 1 | × | 0.31 | × | 0.88 | = | 0.27 | |
| 527 | 1 | × | 0.28 | × | 0.87 | = | 0.24 | |
| 528 | 1 | × | 0.27 | × | 0.89 | = | 0.24 | Total Filtered |
| 529 | 1 | × | 0.22 | × | 0.91 | = | 0.20 | L Weighted |
| 530 | 0 | × | 0.18 | × | 0.92 | = | 0.00 | Light Intensity, |
| 531 | 0 | × | 0.15 | × | 0.93 | = | 0.00 | Normalized |
| Sum | 30 | | 18.4 | | | | 9.51 | 0.52 |

In some embodiments, an optical filter is designed by using spectral profiles of candidate filters to calculate the effect of the candidate filters on chroma. In this way, changes in the filter can be iteratively checked for their effectiveness in achieving a desired result. Alternatively, filters can be designed directly via numerical simulation. Examples and comparative examples of optical filters and the effects of those optical filters on chroma are described herein. In each case, the chroma of input light passing through each filter is compared to the chroma of the same input without filtering. Plots of "absorptance %" against visible spectrum wavelengths show the spectral absorptance profile of the example or comparative example optical filter. Each plot of "chroma, C*, relative" against visible spectrum wavelengths shows the relative chroma of a 30 nm wide light stimulus of uniform intensity after the stimulus passes through a wavelength-dependent optical filter as a thinner curve on the plot, with the center wavelength of each stimulus being represented by the values on the horizontal axis. Each plot of "chroma, C*, relative" also shows the relative chroma of the same 30 nm wide light stimulus passing through a neutral filter that attenuates the same average percentage of light within the bandwidth of the stimulus as the wavelength-dependent optical filter.

One goal of filter design can be to determine the overall color appearance of a lens. In some embodiments, the perceived color of overall light transmitted from the lens is bronze, amber, violet, gray, or another color. In some cases, the consumer has preferences that are difficult to account for quantitatively. In certain cases, lens color adjustments can be accomplished within the model described in this disclosure. The impact of overall color adjustments to the filter design can be calculated using a suitable model. In some cases, color adjustments can be made with some, little, or no sacrifice to the chroma characteristics being sought. In some embodiments, a lens has an overall color with a relatively low chroma value. For example, the lens can have a chroma value of less than 60. A chroma-increasing optical filter used in such a lens can provide increased colorfulness for at least some colors as compared to when the same optical filter is used in a lens with an overall color having a higher chroma value.

Figure 3:
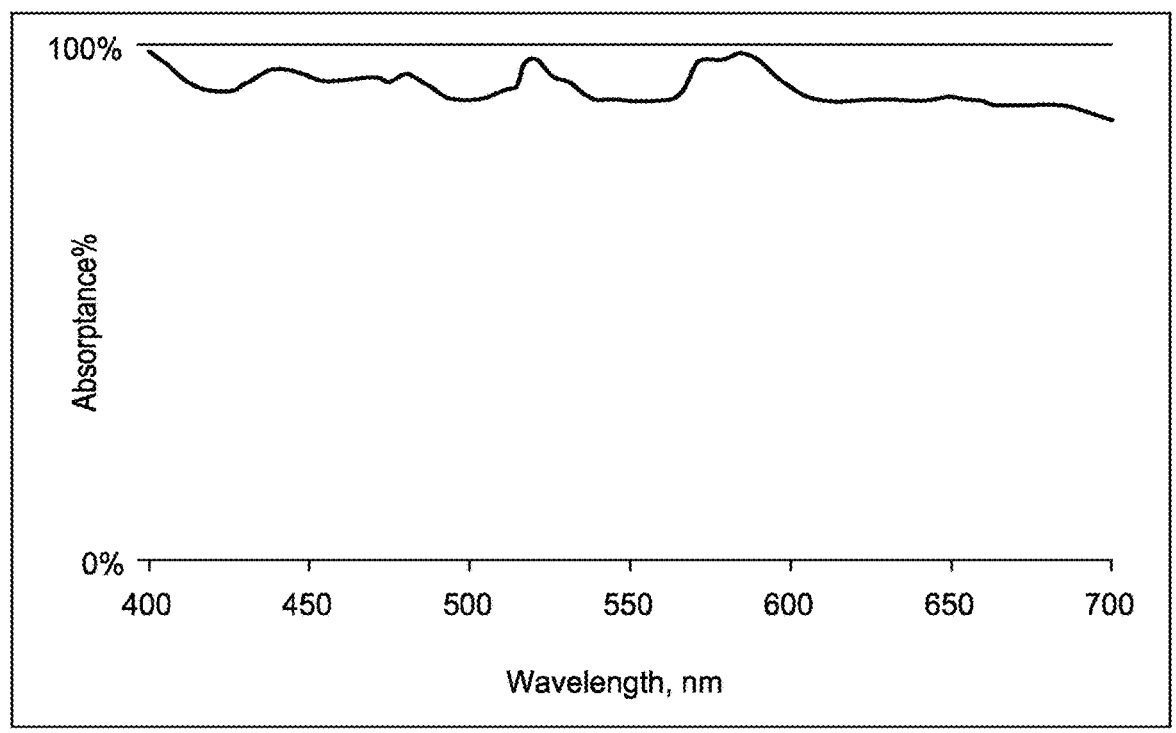
FIG. 3 is a graph showing the spectral absorptance profile of a sunglass lens with an optical filter.
Figure 4A:
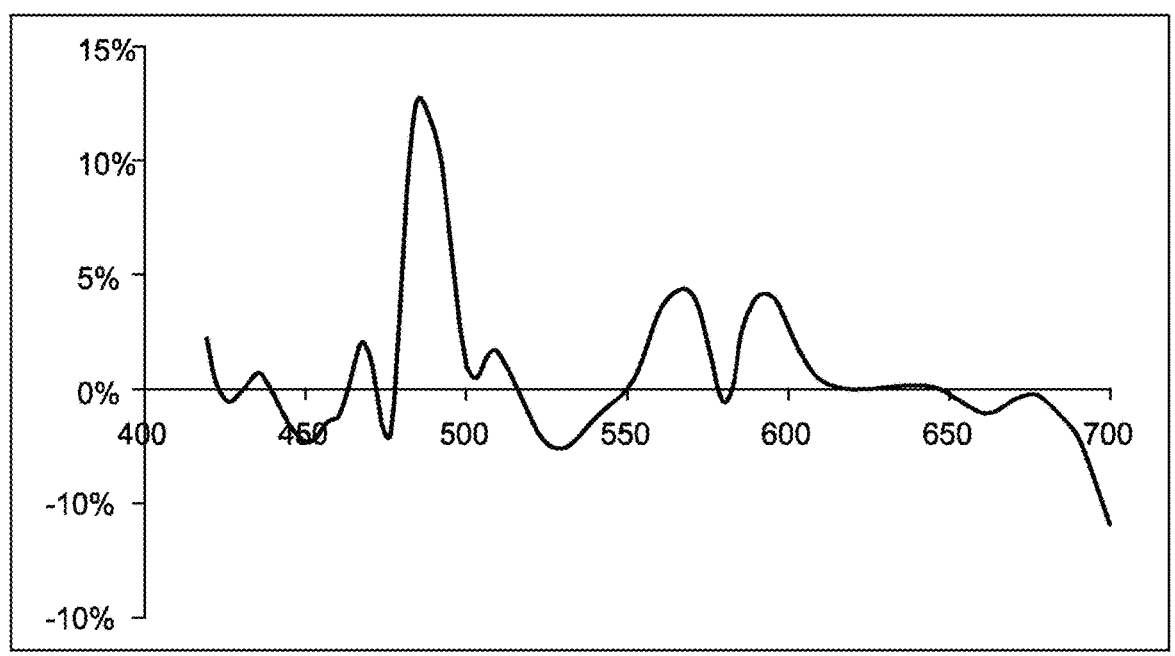
FIG. 4A is a graph showing the percentage difference in chroma of a lens with the absorptance profile shown in FIG. 3 compared to a neutral filter.
Figure 4B:
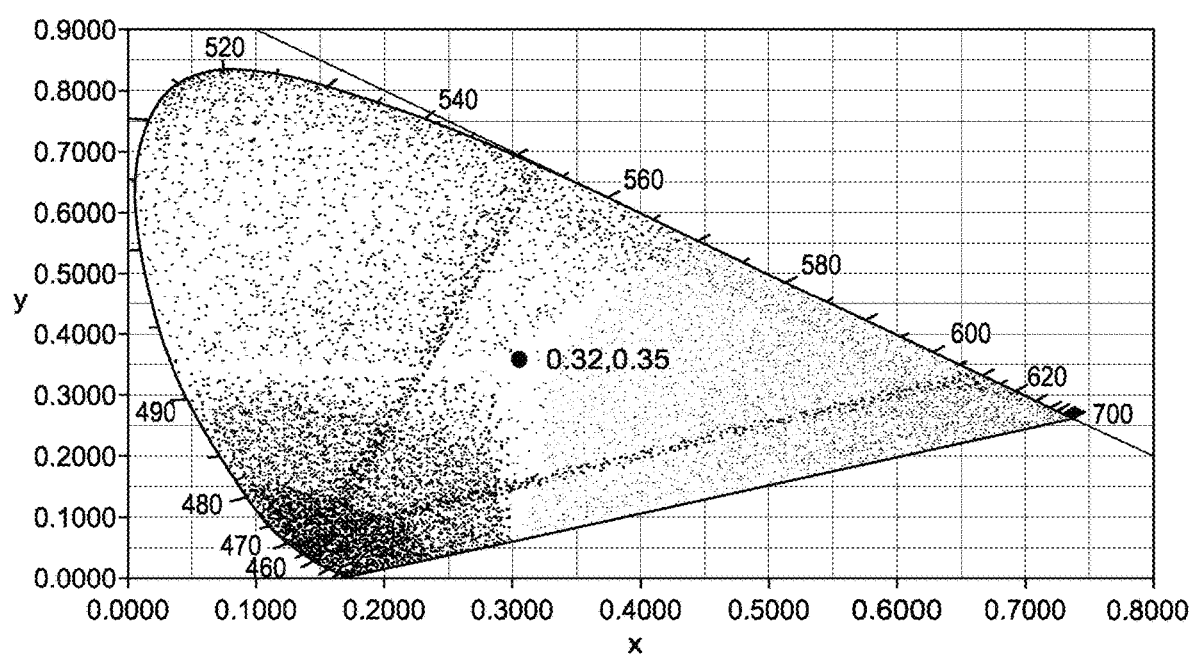
FIG. 4B is a chromaticity diagram for the lens having the absorptance profile shown in FIG. 3.

A comparative example of an optical filter has properties as shown in FIGS. 3, 4A, and 4B. FIG. 3 shows the absorptance profile of a comparative example lens with an optical filter, the LAGOON 189-02 grey lens available from Maui Jim, Inc. of Peoria, Ill. FIG. 4A shows a percentage difference in chroma between the output of a lens having the absorptance profile shown in FIG. 3 and the output of a filter that uniformly attenuates the same average percentage of light within each stimulus band as the lens of FIG. 3, wherein the input is a 30 nm uniform intensity stimulus and the horizontal axis indicates the center wavelength of each stimulus band. As can be seen in FIG. 4A, the comparative example lens characterized by the absorptance profile shown in FIG. 3 provides some increase in chroma in certain spectral regions and some decrease in chroma in other spectral regions, compared to a filter that provides neutral attenuation for each 30 nm stimulus. The average percentage attenuation provided by the neutral attenuation filter for each stimulus is the same as the average percentage attenuation provided by the comparative example filter. Specific bandwidths of light with uniform intensity were used to calculate the relative chroma profiles in this disclosure. In figures where the relative chroma profile of a filter is shown, the scale is maintained constant throughout this disclosure such that relative chroma shown in one figure can be compared to relative chroma shown in other figures, unless otherwise noted. In some figures, the chroma profile of a filter can be clipped in order to show detail and maintain consistent scale.

Figure 5:
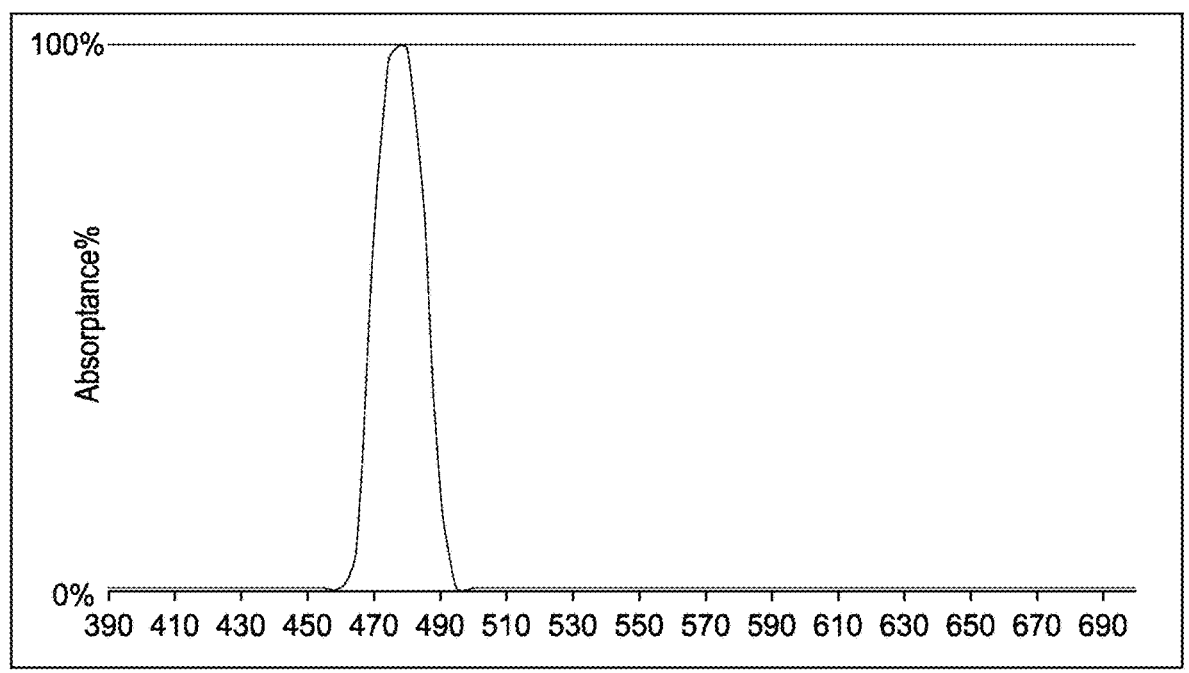
FIG. 5 is a graph showing the spectral absorptance profile of an optical filter.

In some embodiments, an optical filter is configured to increase or maximize chroma in the blue to blue-green region of the visible spectrum. A filter with such a configuration can have an absorptance peak centered at about 478 nm or at about 480 nm, as shown in FIG. 5. The full width at half maximum (FWHM) of the absorptance peak shown in FIG. 5 is about 20 nm. However, other absorptance peak widths can be used, including bandwidths greater than or equal to about 10 nm, greater than or equal to about 15 nm, greater than or equal to about 20 nm, less than or equal to about 60 nm, less than or equal to about 50 nm, less than or equal to about 40 nm, between about 10 nm and about 60 nm, or between any of the other foregoing values. The bandwidth of an absorptance peak can be measured in any suitable fashion in addition to or in place of FWHM. For example, the bandwidth of an absorptance peak can include the full width of a peak at 80% of the maximum, the full width of a peak at 90% of the maximum, the full width of a peak at 95% of the maximum, or the full width of a peak at 98% of the maximum.

The spectral features of an optical filter can also be evaluated by considering the transmittance profile of the filter and/or a lens incorporating the filter. In some embodiments, the bandwidth and/or attenuation factors of transmittance valleys can be measured. The bandwidth of a transmittance valley can be defined, for example, as the full width of the valley at a certain transmittance, such as 2%, 5%, 10%, or 20%. In certain embodiments, the bandwidth of a transmittance valley is defined as the full width of the valley at 1.5 times, two times, four times, ten times, or one hundred times the minimum transmittance. In some embodiments, the bandwidth of a transmittance valley is defined as the full width of the valley at a certain offset from the minimum transmittance, such as, for example, the minimum transmittance plus 1% transmittance, plus 2% transmittance, plus 5% transmittance, plus 10% transmittance, or plus 20% transmittance. The attenuation factor of a transmittance valley can be calculated by dividing the area between 100% and the transmittance profile curve by the bandwidth, within the spectral bandwidth of the transmittance valley. Alternatively, the attenuation factor of a transmittance valley can be calculating by finding the absorptance within the bandwidth by subtracting the area under the transmittance curve from 1 and dividing the result by the bandwidth.

The spectral features of an optical filter can also be evaluated by considering the absorbance profile of the filter and/or a lens incorporating the filter. In some embodiments, an optical filter is configured to increase or maximize chroma in the blue to blue-green region of the visible spectrum. A filter with such a configuration can have an absorbance peak centered at about 478 nm or at about 480 nm, as shown in FIG. 5. The full width at half maximum (FWHM) of the absorbance peak shown in FIG. 5 is about 20 nm. However, other absorbance peak widths can be used, including bandwidths greater than or equal to about 10 nm, greater than or equal to about 15 nm, greater than or equal to about 20 nm, less than or equal to about 60 nm, less than or equal to about 50 nm, less than or equal to about 40 nm, between about 10 nm and about 60 nm, or between any of the other foregoing values. The bandwidth of an absorbance peak can be measured in any suitable fashion in addition to or in place of FWHM. For example, the bandwidth of an absorbance peak can include the full width of a peak at 80% of the maximum, the full width of a peak at 90% of the maximum, the full width of a peak at 95% of the maximum, or the full width of a peak at 98% of the maximum.

Figure 6A:
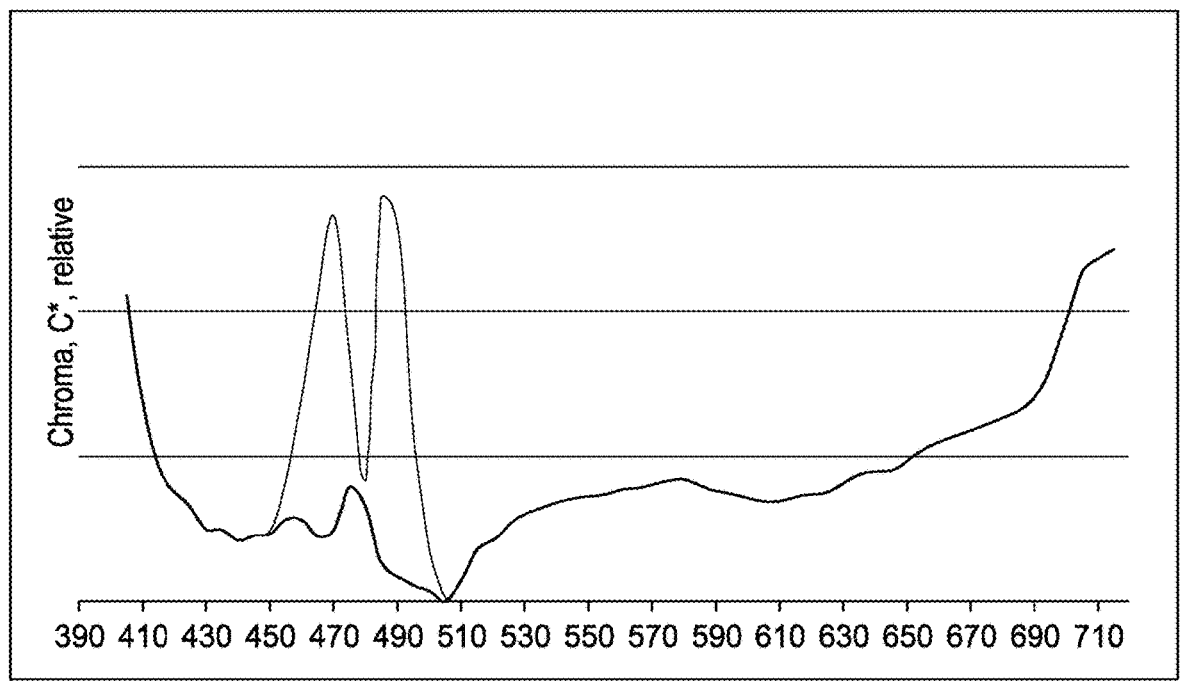
FIG. 6A is a graph showing the chroma profile of a filter with the absorptance profile shown in FIG. 5 and of neutral filter.
Figure 6B:
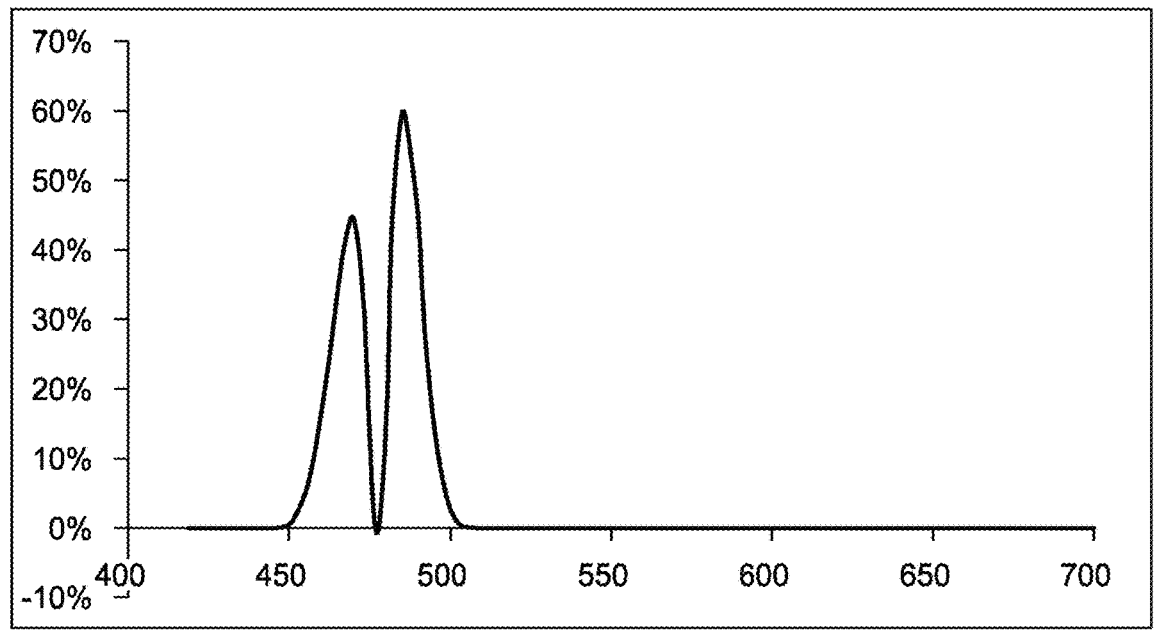
FIG. 6B is a graph showing the percentage difference in chroma of a filter with the absorptance profile shown in FIG. 5 compared to a neutral filter.

FIG. 6A shows the relative chroma, as a function of wavelength, of a filter having the absorptance profile shown in FIG. 5. Once again, the thicker black line corresponds to the chroma profile of a neutral filter having the same integrated light transmittance within each 30 nm stimulus band as within each corresponding band of the optical filter shown in FIG. 5. FIG. 6B shows a percentage difference in chroma between the output of the optical filter of FIG. 5 and the output of a filter that uniformly attenuates the same average percentage of light within each stimulus band as the optical filter of FIG. 5, wherein the input is a 30 nm uniform intensity stimulus and the horizontal axis indicates the center wavelength of each stimulus band.

Figure 7:
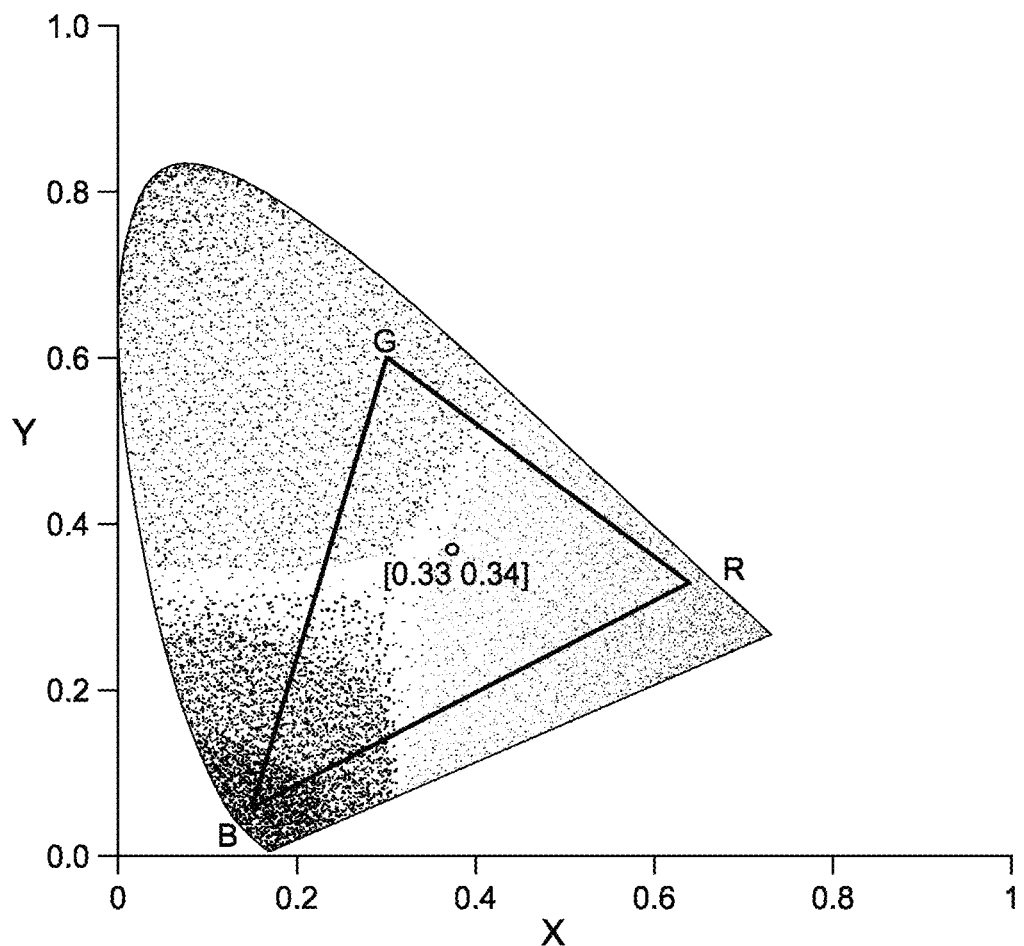
FIG. 7 is a chromaticity diagram for an optical filter having the absorptance profile shown in FIG. 5.

A CIE xy chromaticity diagram for the optical filter having an absorptance profile as shown in FIG. 5 is provided in FIG. 7. The chromaticity diagram shows the chromaticity of the filter as well as the gamut of an RGB color space. Each of the chromaticity diagrams provided in this disclosure shows the chromaticity of the associated filter or lens, where the chromaticity is calculated using CIE illuminant D65.

In certain embodiments, an optical filter is configured to increase or maximize chroma in the blue region of the visible spectrum. A filter with such a configuration can provide an absorptance peak with a center wavelength and/or peak location at about 453 nm, at about 450 nm, or between about 445 nm and about 460 nm. The bandwidth of the absorptance peak can be greater than or equal to about 10 nm, greater than or equal to about 15 nm, greater than or equal to about 20 nm, or another suitable value.

Figure 8:
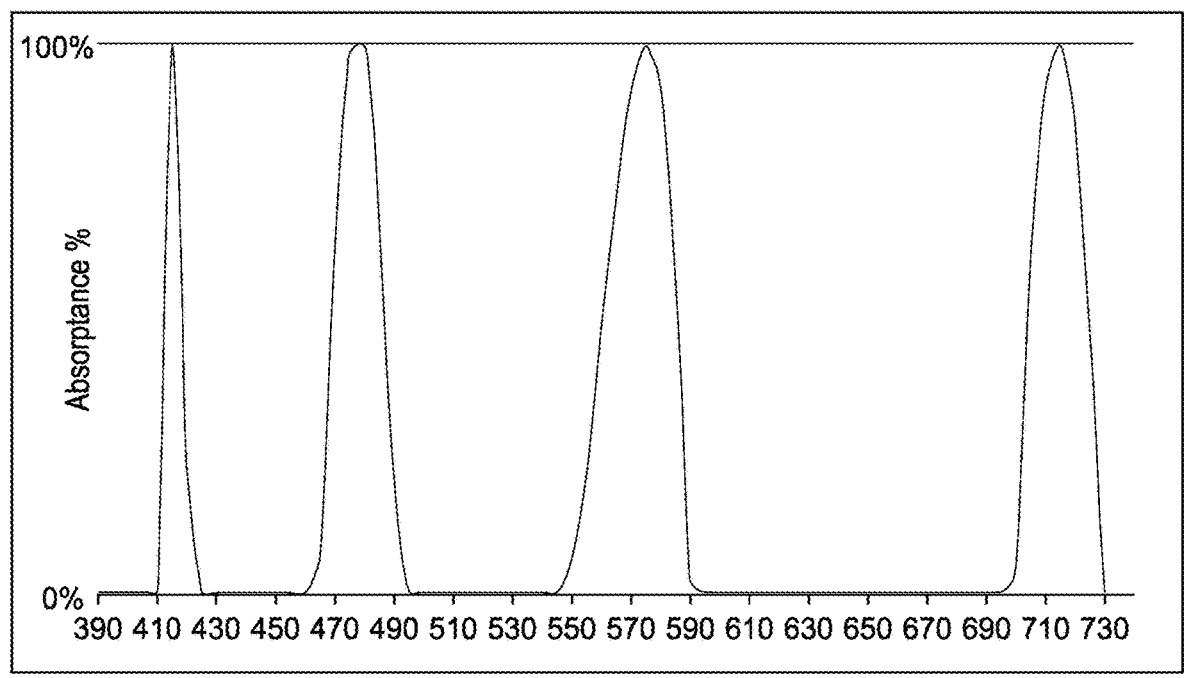
FIG. 8 is a graph showing the spectral absorptance profile of another optical filter.
Figure 9A:
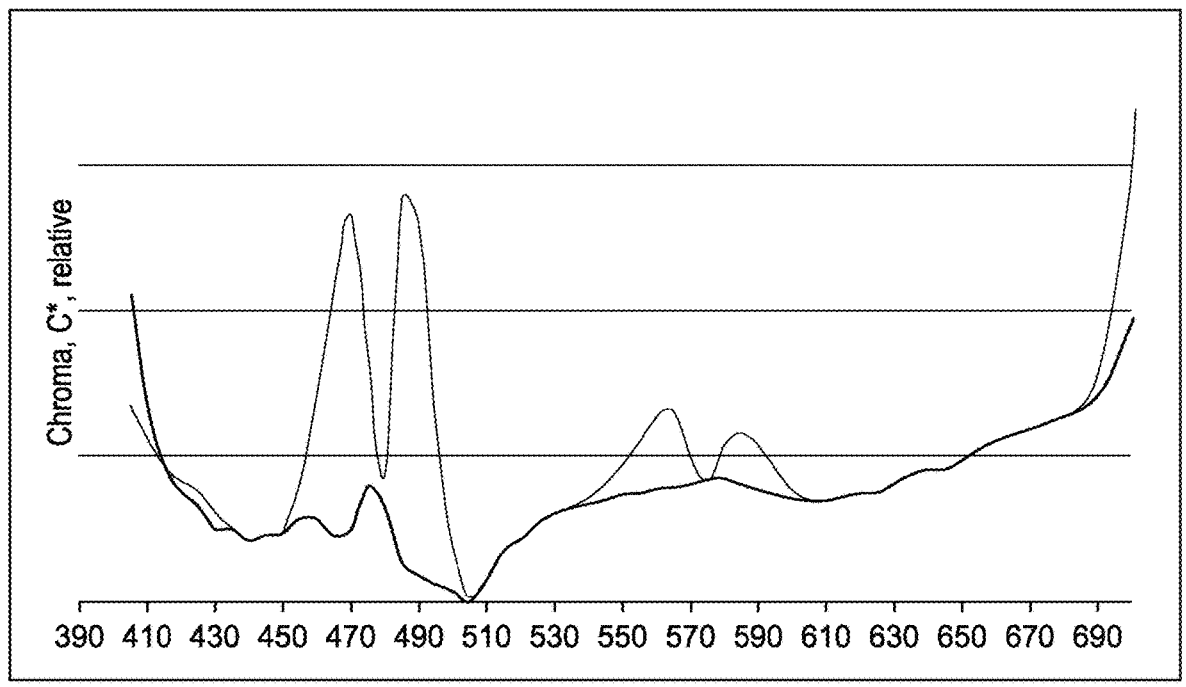
FIG. 9A is a graph showing the chroma profile of a filter with the absorptance profile shown in FIG. 8 and of a neutral filter.
Figure 9B:
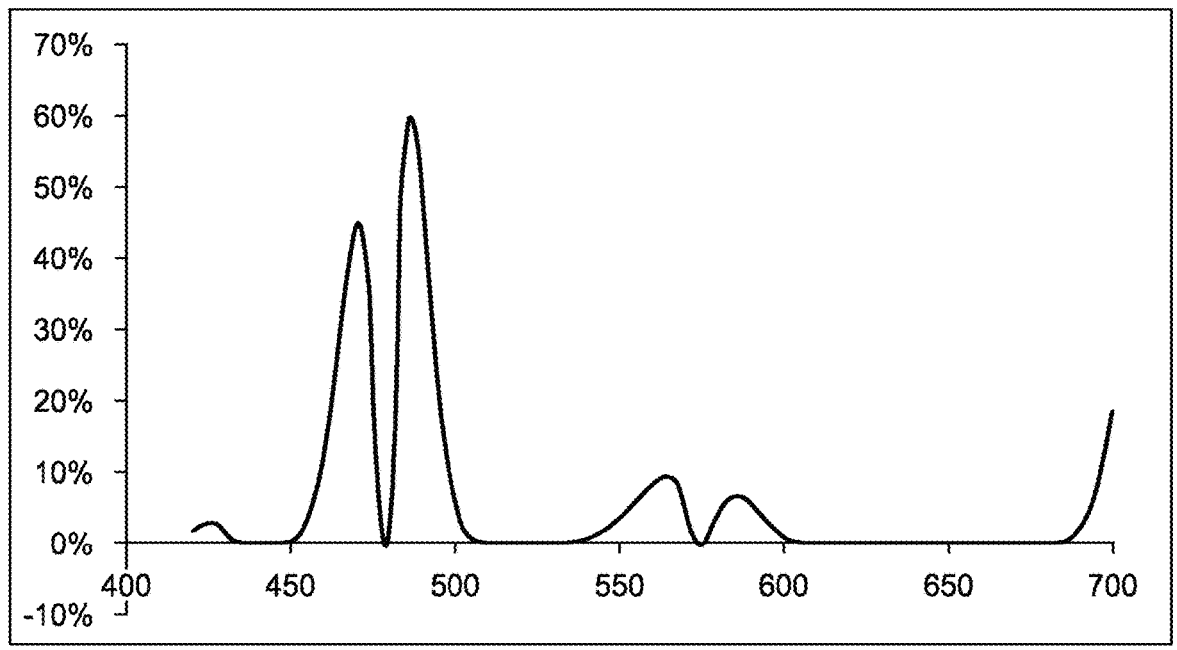
FIG. 9B is a graph showing the percentage difference in chroma of a filter with the absorptance profile shown in FIG. 8 compared to a neutral filter.
Figure 10:
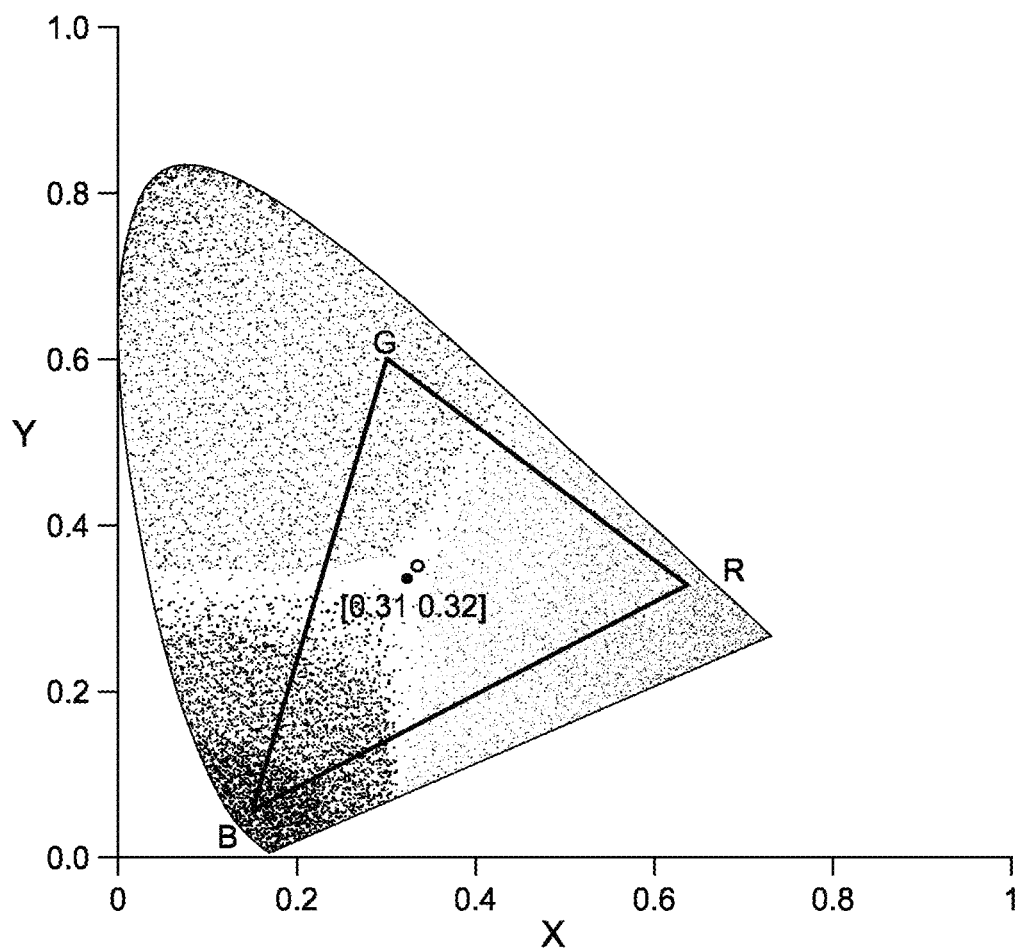
FIG. 10 is a chromaticity diagram for an optical filter having the absorptance profile shown in FIG. 8.

In some embodiments, an optical filter is configured to increase or maximize chroma across several, many, or most colors, or at least many colors that are commonly encountered in the environment of the wearer. Such an optical filter can include a plurality of absorptance peaks. For example, FIG. 8 shows a spectral absorptance profile of an embodiment of an optical filter including four absorptance peaks with center wavelengths at about 415 nm, about 478 nm, about 574 nm, and about 715 nm. Relative chroma profiles and a chromaticity diagram for the example filter are shown in FIGS. 9A, 9B and 10. The relative chroma profile shown in FIG. 9A shows that the optical filter of FIG. 8 provides a substantial increase in chroma in at least four spectral windows compared to a neutral filter having the same integrated light transmittance within each 30 nm stimulus band as within each corresponding band of the optical filter shown in FIG. 8. FIG. 9B shows a percentage difference in chroma between the output of the optical filter of FIG. 8 and the output of a filter that uniformly attenuates the same average percentage of light within each stimulus band as the optical filter of FIG. 8, wherein the input is a 30 nm uniform intensity stimulus and the horizontal axis indicates the center wavelength of each stimulus band.

Many other variations in the location and number of absorptance peaks are possible. For example, some embodiments significantly attenuate light between about 558 nm and about 580 nm by providing a peak at about 574 nm and adding an additional peak at about 561 nm. Such embodiments can provide substantially greater chroma in the green region, including at wavelengths near about 555 nm.

In certain embodiments, an optical filter increases chroma in the visible spectrum by increasing the degree to which light within the bandwidth of each absorptance peak is attenuated. The degree of light attenuation within the spectral bandwidth of an absorptance peak can be characterized by an "attenuation factor" defined as the integrated absorptance peak area within the spectral bandwidth of the absorptance peak divided by the spectral bandwidth of the absorptance peak. An example of an absorptance peak with an attenuation factor of 1 is a square wave. Such an absorptance peak attenuates substantially all light within its spectral bandwidth and substantially no light outside its spectral bandwidth. In contrast, an absorptance peak with an attenuation factor of less than 0.5 attenuates less than half of the light within its spectral bandwidth and can attenuate a significant amount of light outside its spectral bandwidth. It may not be possible to make an optical filter having an absorptance peak with an attenuation factor of exactly 1, although it is possible to design an optical filter having an absorptance peak with an attenuation factor that is close to 1.

In certain embodiments, an optical filter is configured to have one or more absorptance peaks with an attenuation factor close to 1. Many other configurations are possible. In some embodiments, an optical filter has one or more absorptance peaks (or transmittance valleys) with an attenuation factor greater than or equal to about 0.8, greater than or equal to about 0.9, greater than or equal to about 0.95, greater than or equal to about 0.98, between about 0.8 and about 0.99, greater than or equal to about 0.8 and less than 1, or between any of the other foregoing values. Any combination of one or more of the foregoing limitations on attenuation factor can be called "attenuation factor criteria." In certain embodiments, the attenuation factor of each absorptance peak in an optical filter meets one or more of the attenuation factor criteria. In some embodiments, the attenuation factor of each absorptance peak having a maximum absorptance over a certain absorptance threshold in an optical filter meets one or more of the attenuation factor criteria. The absorptance threshold can be about 0.5, about 0.7, about 0.9, about 1, between 0.5 and 1, or another value. It is understood that while certain spectral features are described herein with reference to an optical filter, each of the spectral features can equally apply to the spectral profile of a lens containing the optical filter, unless indicated otherwise.

Figure 11:
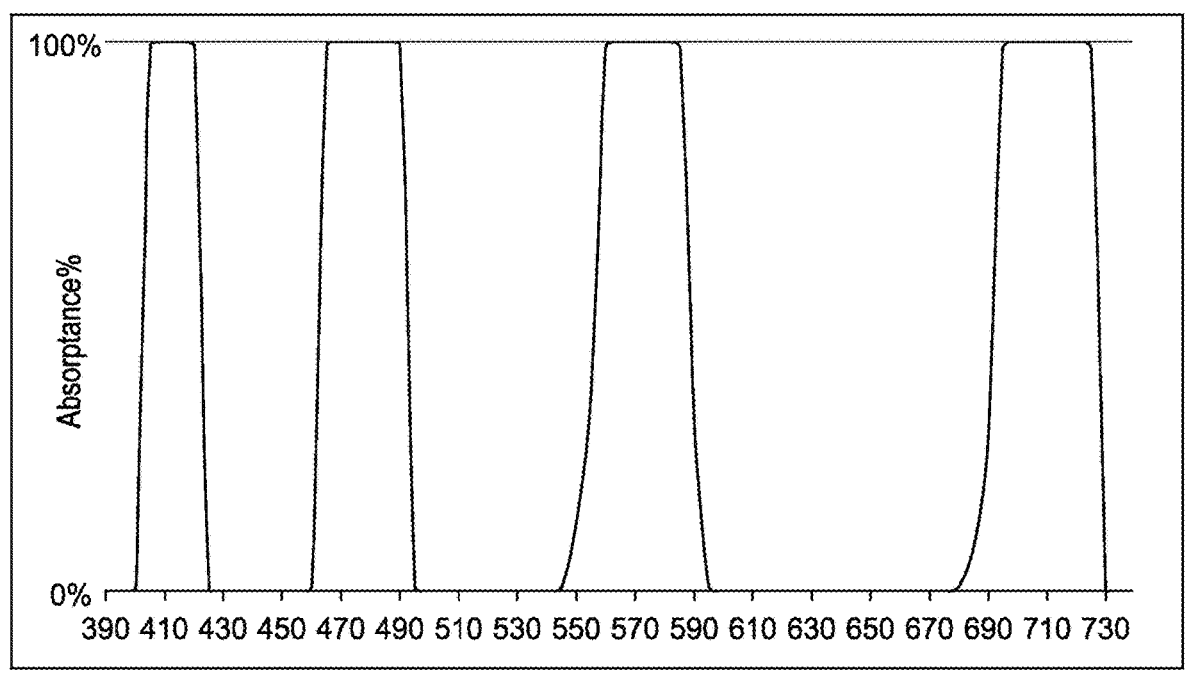
FIG. 11 is a graph showing the spectral absorptance profile of another optical filter.
Figure 12A:
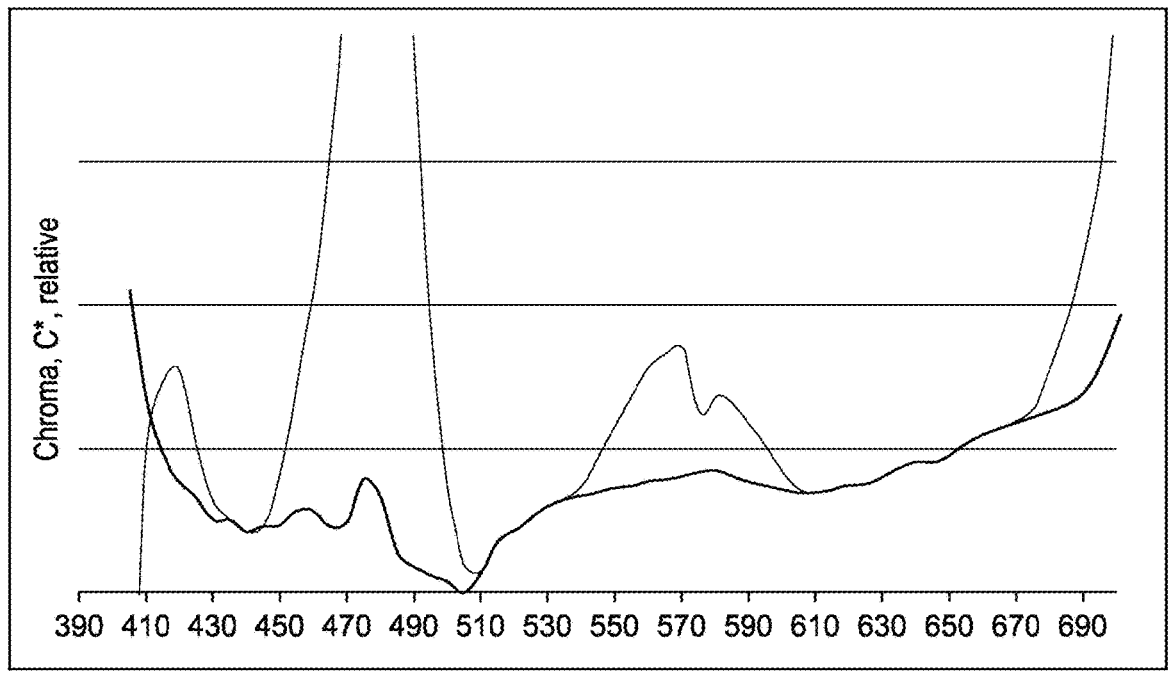
FIG. 12A is a graph showing the chroma profile of a filter with the absorptance profile shown in FIG. 11 and of a neutral filter.
Figure 12B:
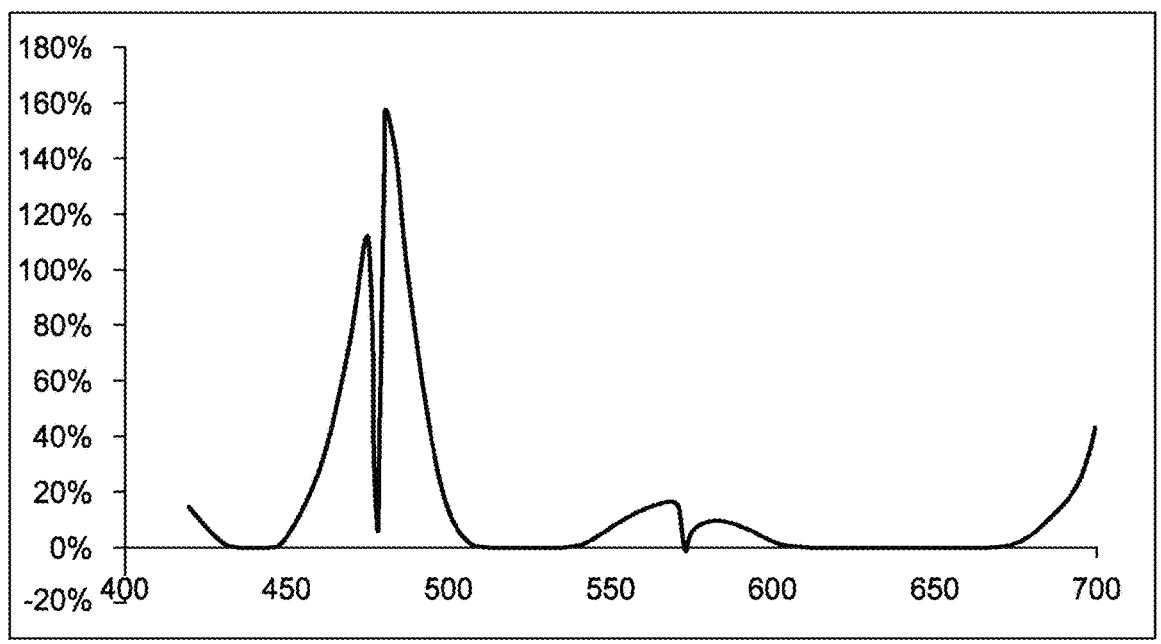
FIG. 12B is a graph showing the percentage difference in chroma of a filter with the absorptance profile shown in FIG. 11 compared to a neutral filter.
Figure 13:
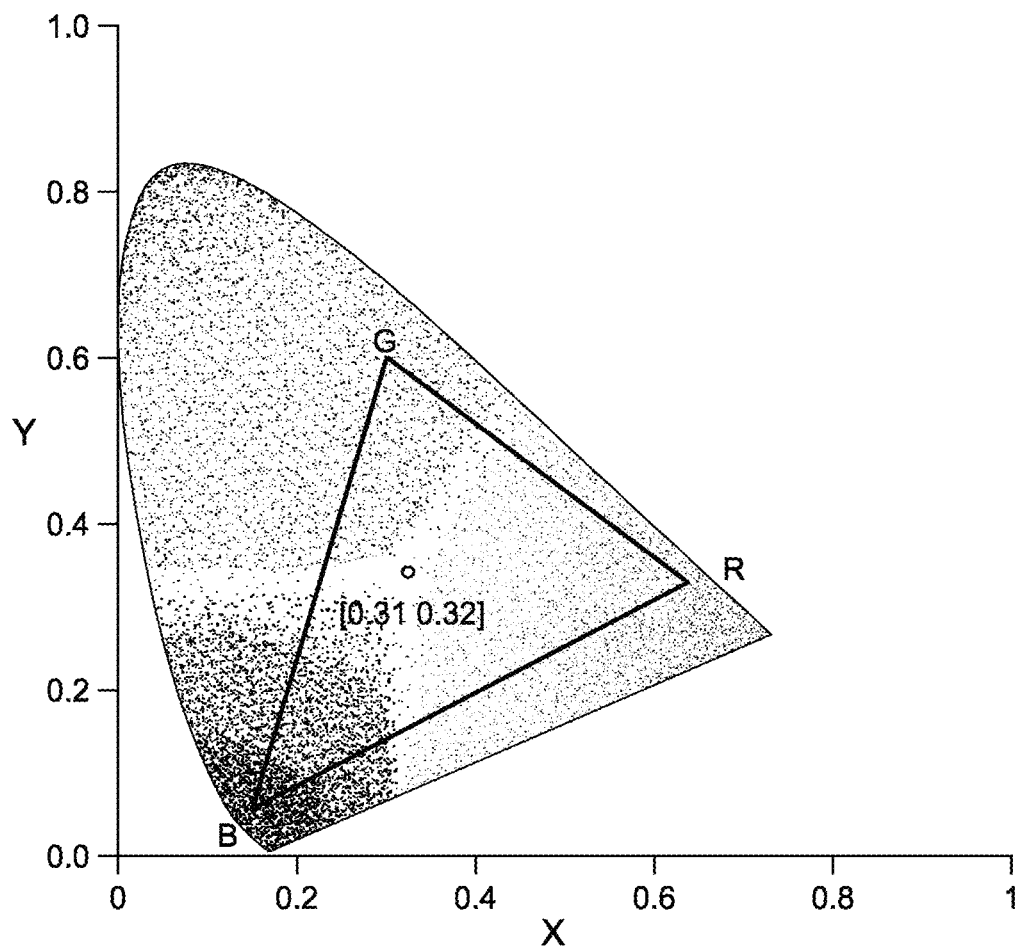
FIG. 13 is a chromaticity diagram for an optical filter having the absorptance profile shown in FIG. 11.

In some embodiments, an optical filter has absorptance peaks in each of four spectral bands, each of which has an attenuation factor greater than or equal to about 0.95. Because it is rare to observe monochromatic light in the physical world, some narrow bands of light can be nearly or completely blocked out without significant detriment to the overall variety of perceived spectral colors in the natural world. In other words, the optical filter can be employed in everyday vision without the loss of any substantial visual information. A spectral absorptance profile of an example optical filter having these attributes is shown in FIG. 11. Relative chroma profiles and a chromaticity diagram for the same optical filter are shown in FIGS. 12A, 12B, and 13. The relative chroma profiles shown in FIG. 12A include the chroma profile of a neutral filter having the same integrated light transmittance within each 30 nm stimulus band as within each corresponding band of the optical filter shown in FIG. 8, indicated by a thicker black line, and the chroma profile of the wavelength-dependent filter shown in FIG. 8, which is indicated by a thinner black line and is generally higher than the neutral filter profile. FIG. 12B shows a percentage difference in chroma between the output of the optical filter of FIG. 11 and the output of a filter that uniformly attenuates the same average percentage of light within each stimulus band as the optical filter of FIG. 11, wherein the input is a 30 nm uniform intensity stimulus and the horizontal axis indicates the center wavelength of each stimulus band.

In some embodiments, an optical filter has one or more absorptance peaks with a bandwidth that is at least partially within a chroma enhancement window. The width of the chroma enhancement window can be between about 22 nm and about 45 nm, between about 20 nm and about 50 nm, greater than or equal to about 20 nm, greater than or equal to about 15 nm, or another suitable bandwidth range. In certain embodiments, an optical filter is configured such that every absorptance peak with an attenuation factor greater than or equal to an absorptance threshold has a bandwidth within a chroma enhancement window. For example, the bandwidth of each of the absorptance peaks can be greater than or equal to about 10 nm, greater than or equal to about 15 nm, greater than or equal to about 20 nm, greater than or equal to about 22 nm, less than or equal to about 60 nm, less than or equal to about 50 nm, less than or equal to about 40 nm, between about 10 nm and about 60 nm, between about 20 nm and about 45 nm, or between any of the other foregoing values.

Figure 14:
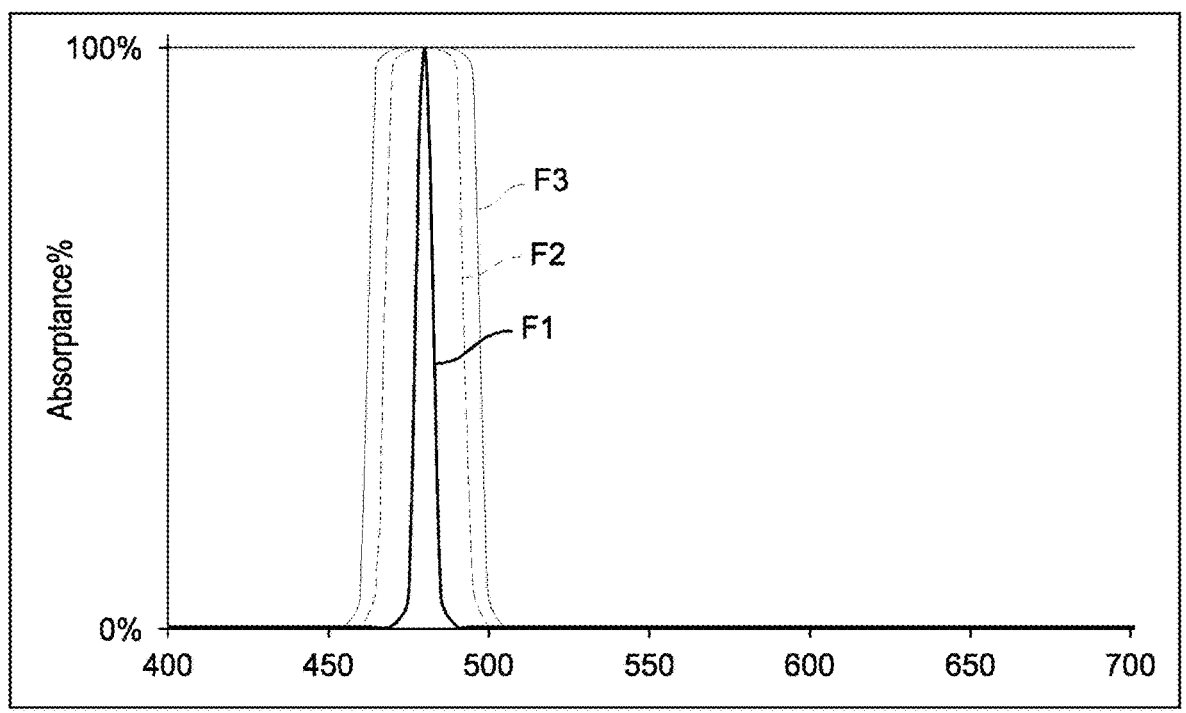
FIG. 14 is a graph showing the spectral absorptance profiles of three different optical filters.
Figure 15A:
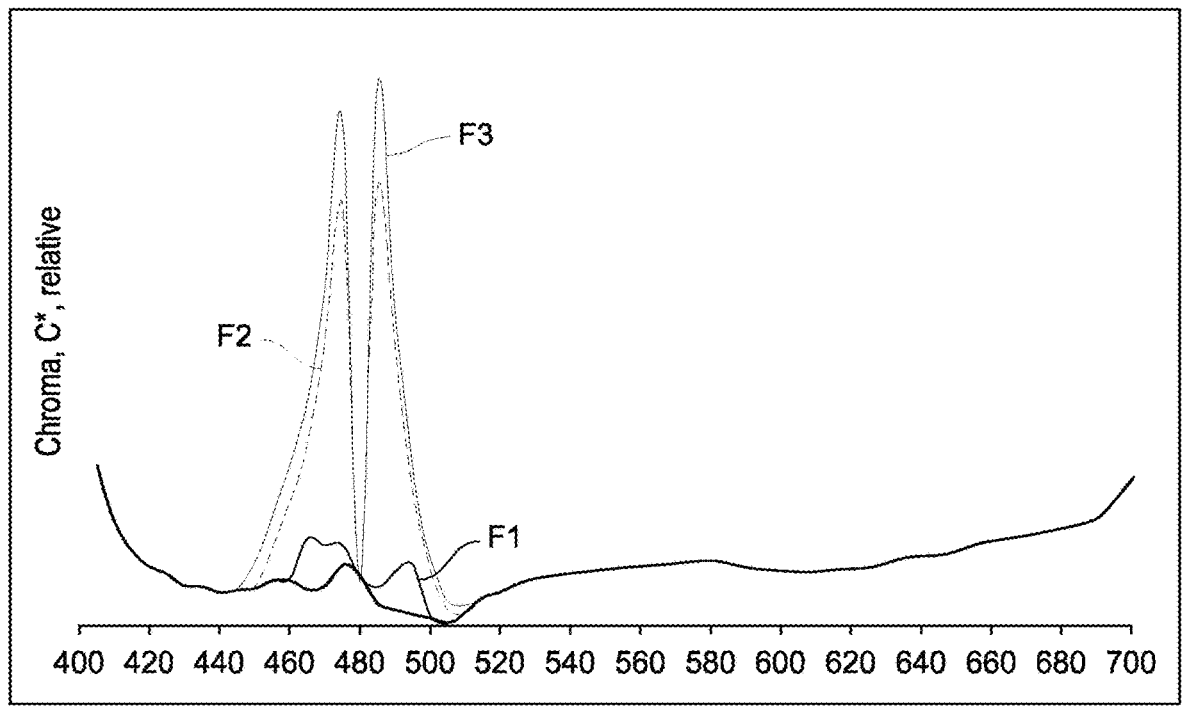
FIG. 15A is a graph showing the chroma profiles of three filters, each filter with one of the absorptance profiles shown in FIG. 14, and of a neutral filter.
Figure 15B:
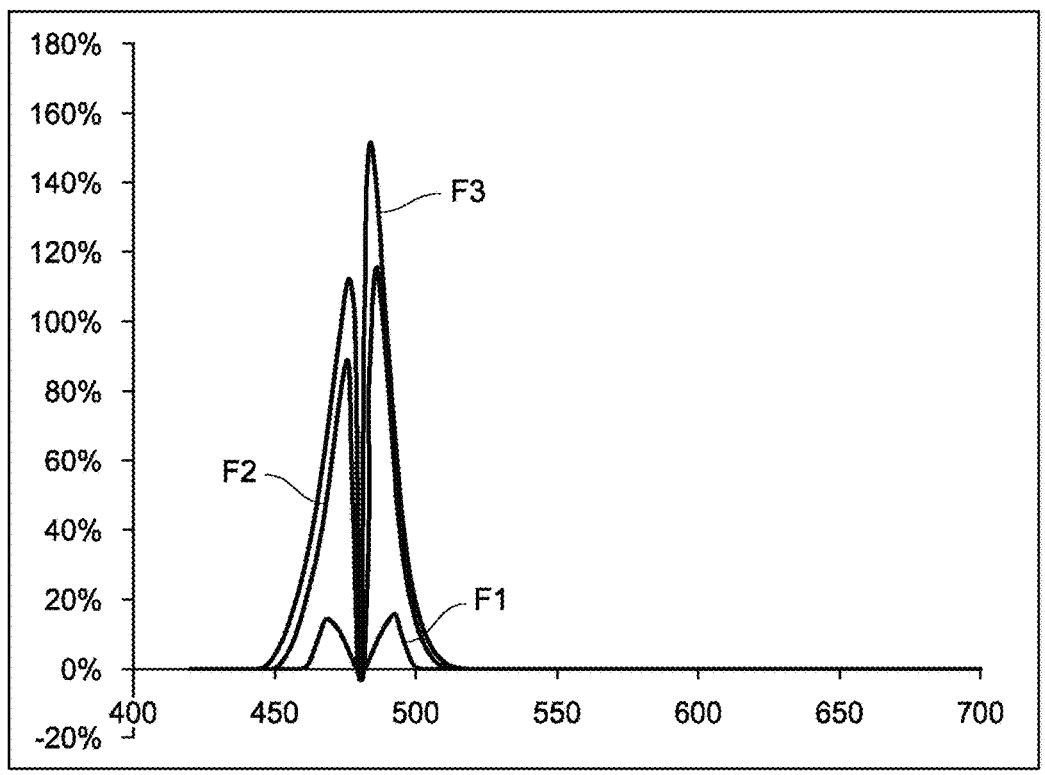
FIG. 15B is a graph showing the percentage differences in chroma of the three different filters with the absorptance profiles shown in FIG. 14 compared to a neutral filter.
Figure 16:
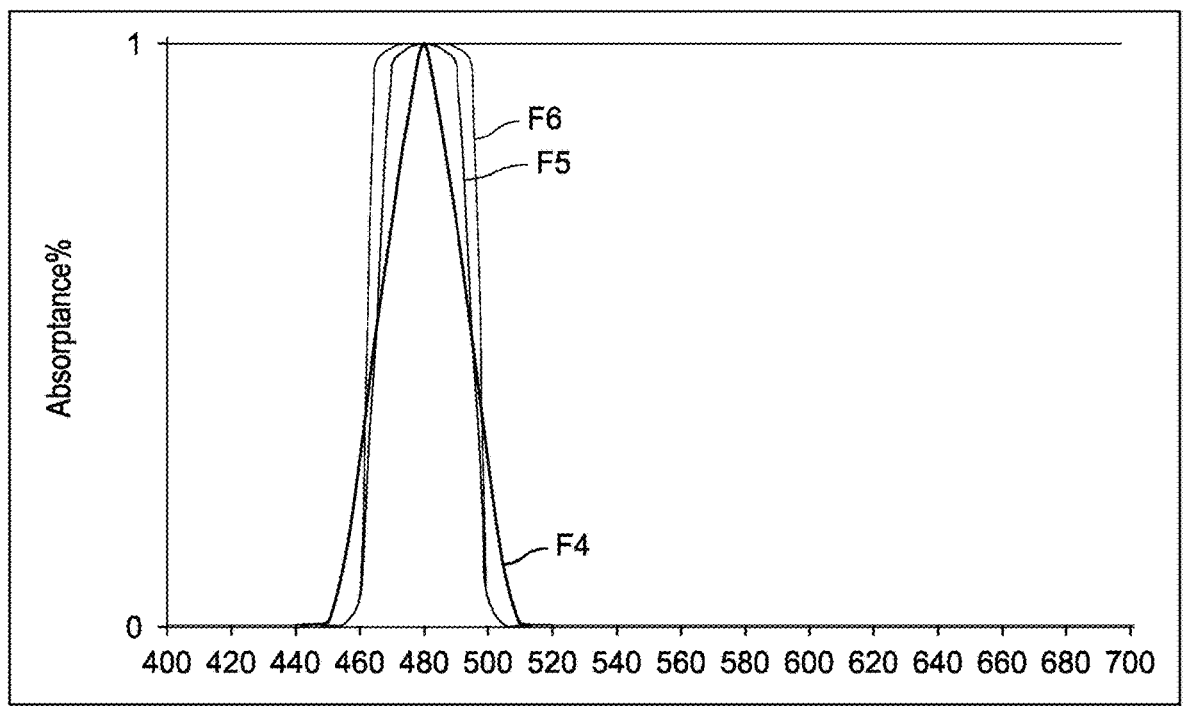
FIG. 16 is a graph showing the spectral absorptance profiles of three different optical filters.

Variations in the bandwidth (e.g., the FWHM value) and in the slopes of the sides of an absorptance peak can have marked effects on chroma. Generally, increases in the FWHM and/or slopes of the chroma-enhancing peaks are accompanied by increases in chroma and vice-versa, in the case of chroma-lowering peaks. In FIGS. 14 and 16, example optical filters are shown where the FWHM and slopes of an absorptance peak are separately varied. The effects of these variations on chroma are shown in the accompanying chroma profiles in FIGS. 15A-15B and 17A-17B. In FIG. 14, an overlay of absorptance peaks centered at 478 nm for three different filters F1, F2, and F3 is shown. The absorptance peaks have equal side slopes and varying FWHM values, with filter F1 having the lowest FWHM value and filter F3 having the highest FWHM value. The relative chroma profile in FIG. 15A shows the effect of the filters F1, F2, and F3 shown in FIG. 14 on chroma. The absorptance and chroma profiles of each of the filters F1, F2, and F3 are shown with the same corresponding line style in each graph, with a neutral filter included as a thick line in FIG. 15A. FIG. 15B shows a percentage difference in chroma between the output of the three optical filters F1, F2, and F3 of FIG. 14 and the output of a filter that uniformly attenuates the same average percentage of light within each stimulus band as the optical filters of FIG. 14, wherein the input in each case is the same 30 nm uniform intensity stimulus and the horizontal axis indicates the center wavelength of each stimulus band.

Figure 17A:
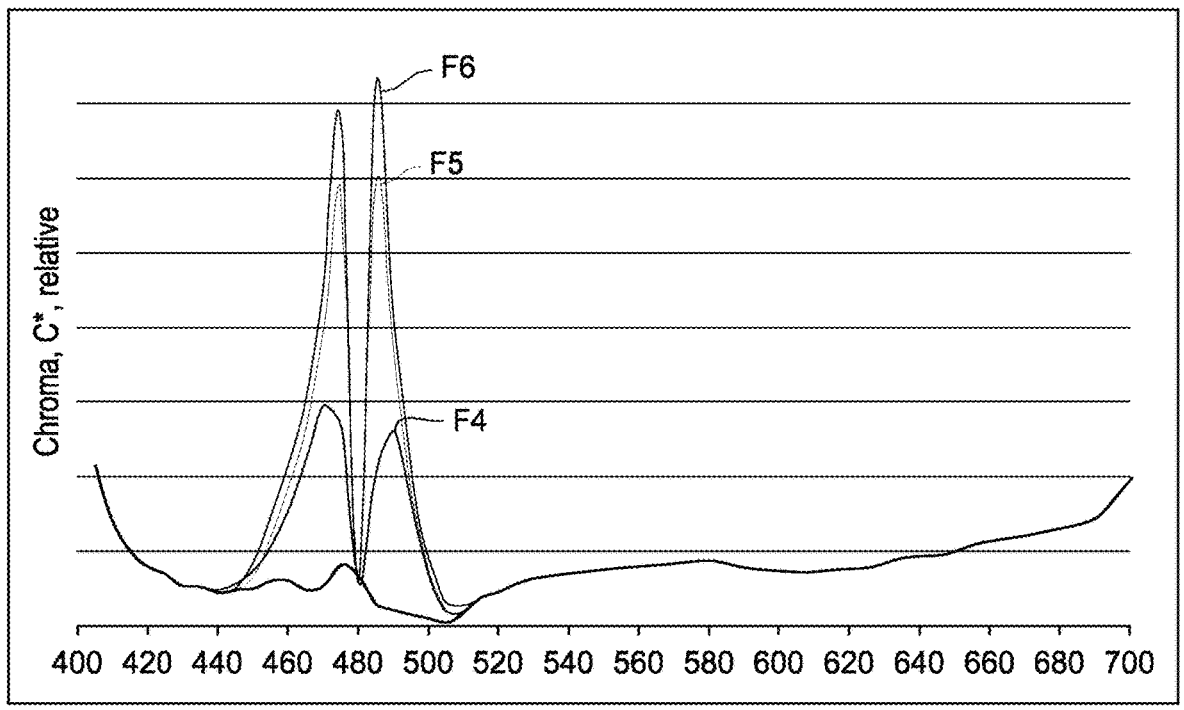
FIG. 17A is a graph showing the chroma profiles of three filters, each filter with one of the absorptance profiles shown in FIG. 16, and of a neutral filter.
Figure 17B:
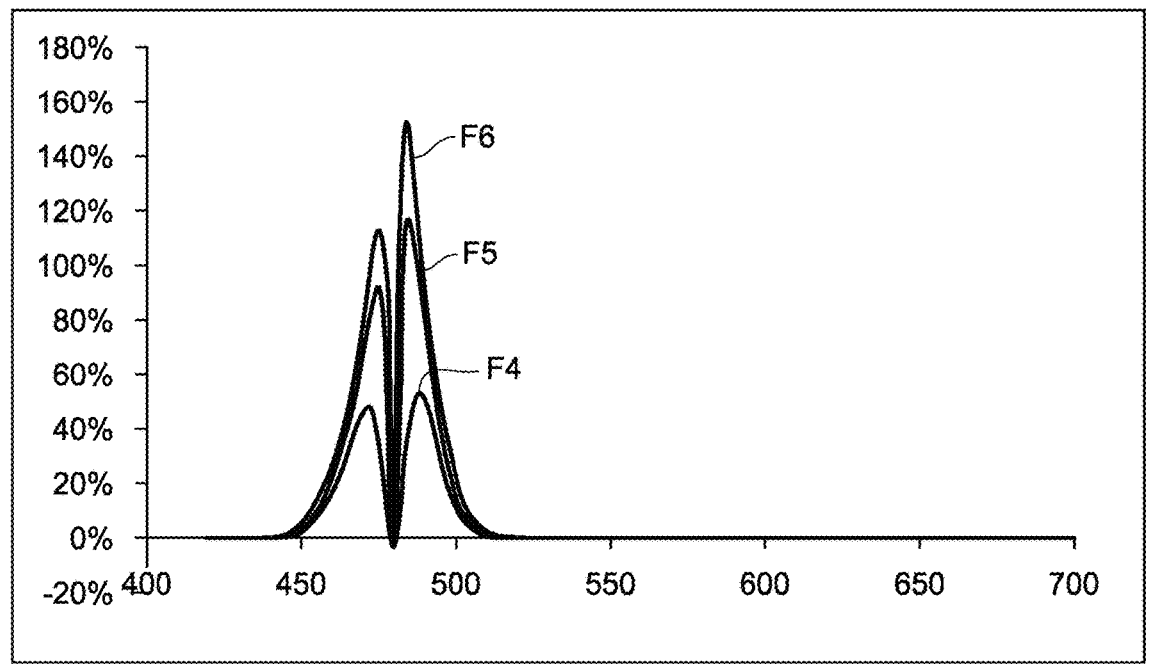
FIG. 17B graph showing the percentage differences in chroma of the three different filters with the absorptance profiles shown in FIG. 16 compared to a neutral filter.

FIG. 16 shows an overlay of three absorptance peaks centered at 478 nm, with equal FWHM and varying slopes. FIG. 17A shows the effect of the filters F4, F5, and F6 shown in FIG. 16 on chroma, with a neutral filter again included as a thick solid line. FIG. 17B shows a percentage difference in chroma between the output of the three optical filters F4, F5, and F6 of FIG. 16 and the output of a filter that uniformly attenuates the same average percentage of light within each stimulus band as the optical filters of FIG. 16, wherein the input in each case is the same 30 nm uniform intensity stimulus and the horizontal axis indicates the center wavelength of each stimulus band.

Figure 18:
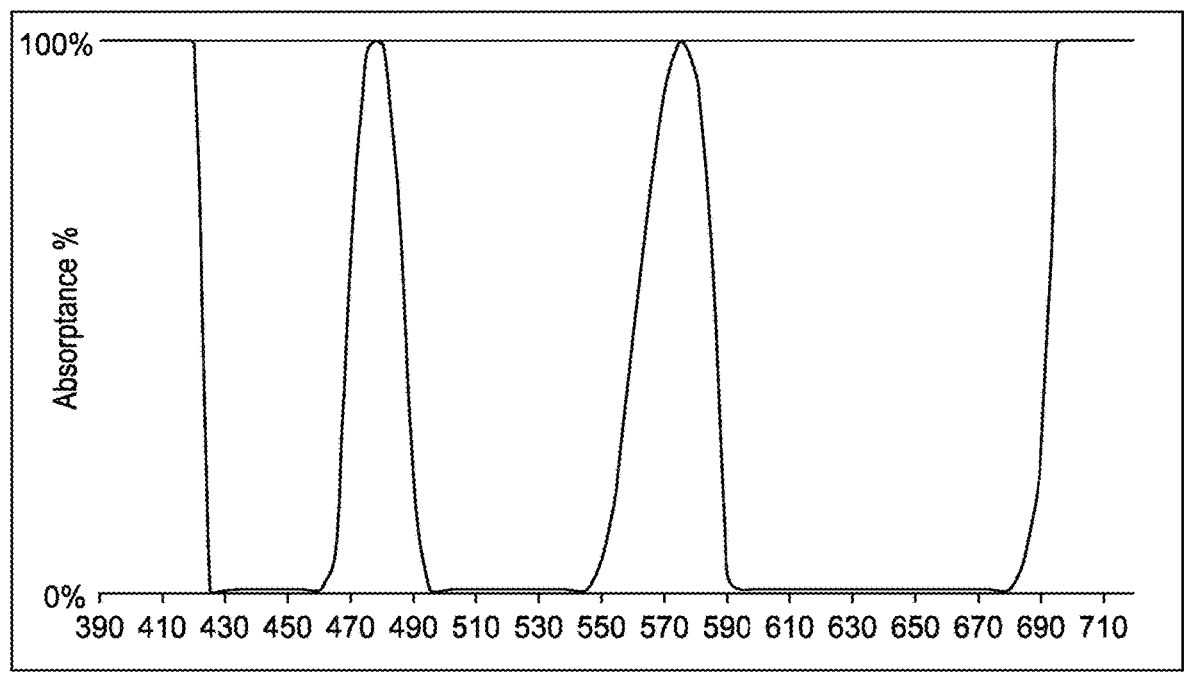
FIG. 18 is a graph showing the spectral absorptance profile of another optical filter.
Figure 19A:
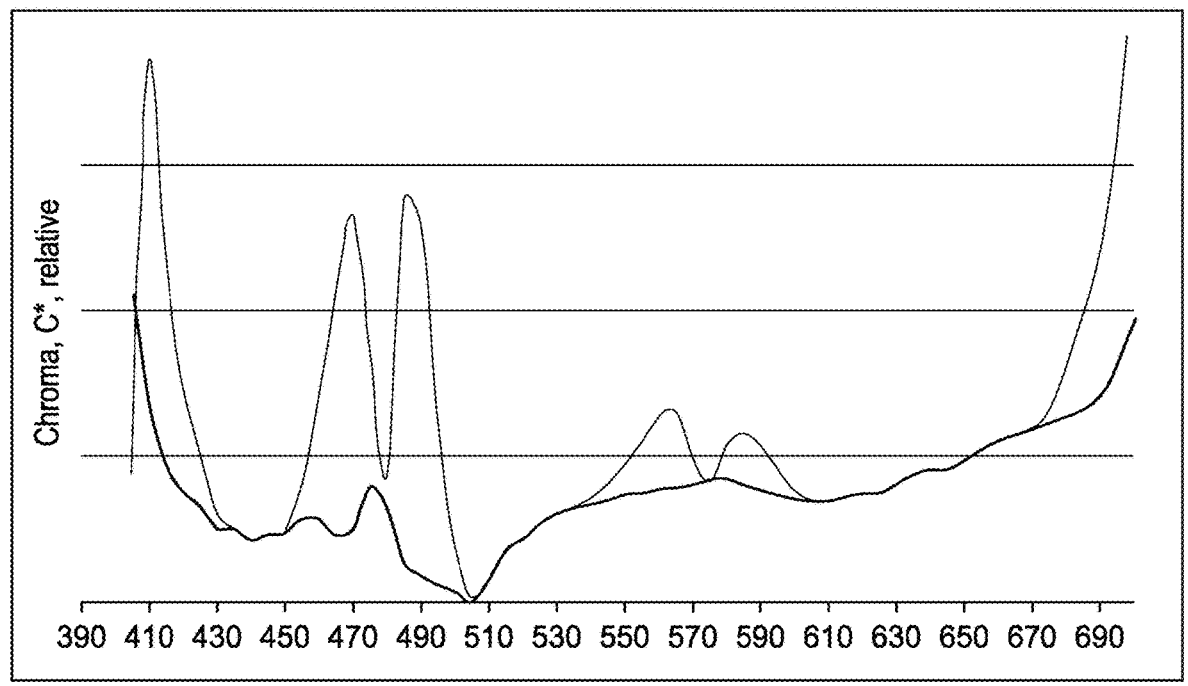
FIG. 19A is a graph showing the chroma profile of a filter with the absorptance profile shown in FIG. 18 and of a neutral filter.
Figure 19B:
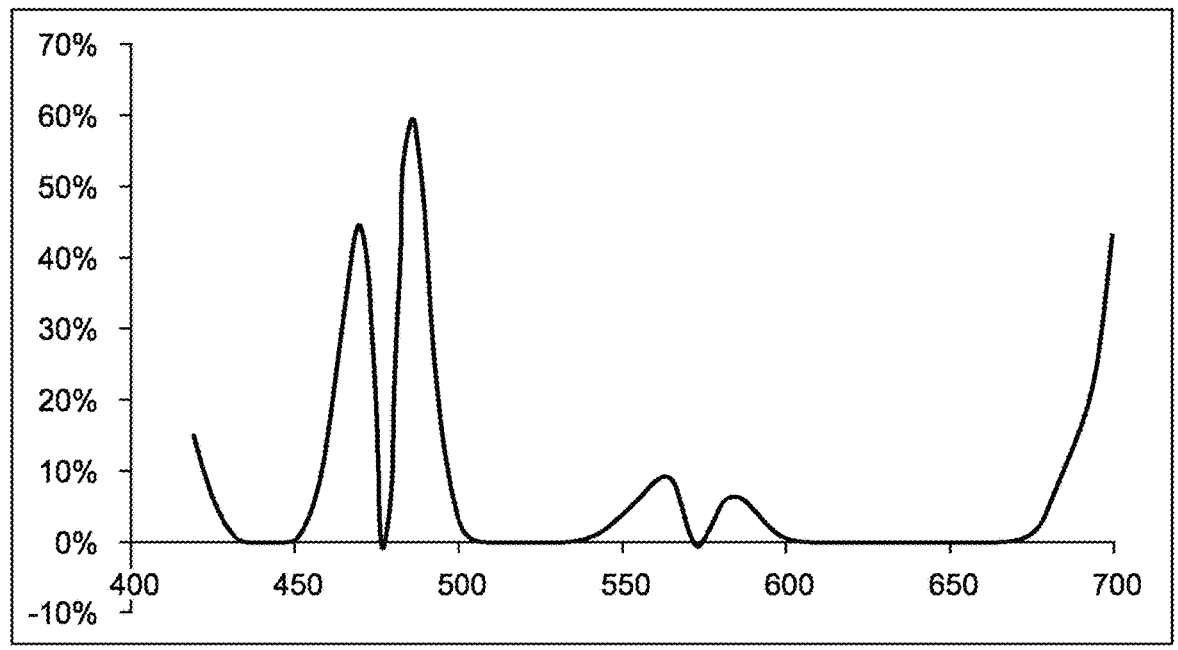
FIG. 19B is a graph showing the percentage difference in chroma of a filter with the absorptance profile shown in FIG. 18 compared to a neutral filter.
Figure 20:
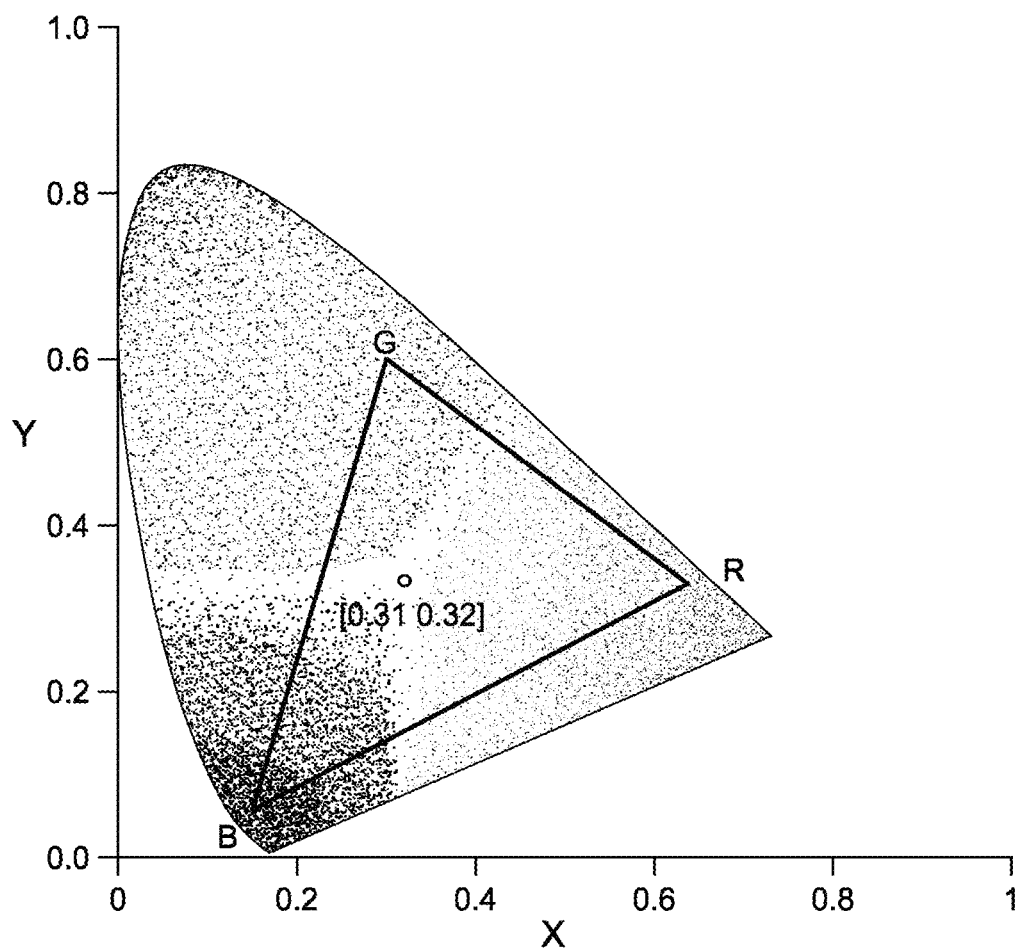
FIG. 20 is a chromaticity diagram for an optical filter having the absorptance profile shown in FIG. 18.

Returning to the optical filter shown in FIG. 11, the outer two absorptance peaks centered at 415 nm and 715 nm have outside slopes (i.e., at the lower limit of the 415 nm peak and at the upper limit of the 715 nm peak) that affect light wavelengths at generally the fringes of the visible spectrum. In some embodiments, the absorptance profiles of these peaks can be altered to significantly, mostly, or almost entirely attenuate light at wavelengths outside of about the 400 nm to 700 nm range, which can be regarded as the dominant portion of the visible range. The spectral absorptance profile of an example optical filter having these attributes is shown in FIG. 18. Relative chroma profiles and the chromaticity diagram for the same optical filter are shown in FIGS. 19A, 19B, and 20. FIG. 19B shows a percentage difference in chroma between the output of the optical filter of FIG. 18 and the output of a filter that uniformly attenuates the same average percentage of light within each stimulus band as the optical filter of FIG. 18, wherein the input is a 30 nm uniform intensity stimulus and the horizontal axis indicates the center wavelength of each stimulus band.

By controlling chroma according to the techniques disclosed herein, the chroma of one or more color bands can also be decreased in situations where less colorfulness in those color bands is desired. In some embodiments, an optical filter can be configured to decrease chroma in one or more color bands and increase chroma in other color bands. For example, eyewear designed for use while hunting ducks can include one or more lenses with an optical filter configured to lower the chroma of a blue background and increase the chroma for green and brown feathers of a duck in flight. More generally, an optical filter can be designed to be activity-specific by providing relatively lower chroma in one or more spectral regions associated with a specific background (e.g., the ground, the sky, an athletic field or court, a combination, etc.) and providing relatively high chroma in one or more spectral regions associated with a specific foreground or object (e.g., a ball). Alternatively, an optical filter can have an activity-specific configuration by providing increased chroma in both a background spectral region and an object spectral region.

Figure 21:
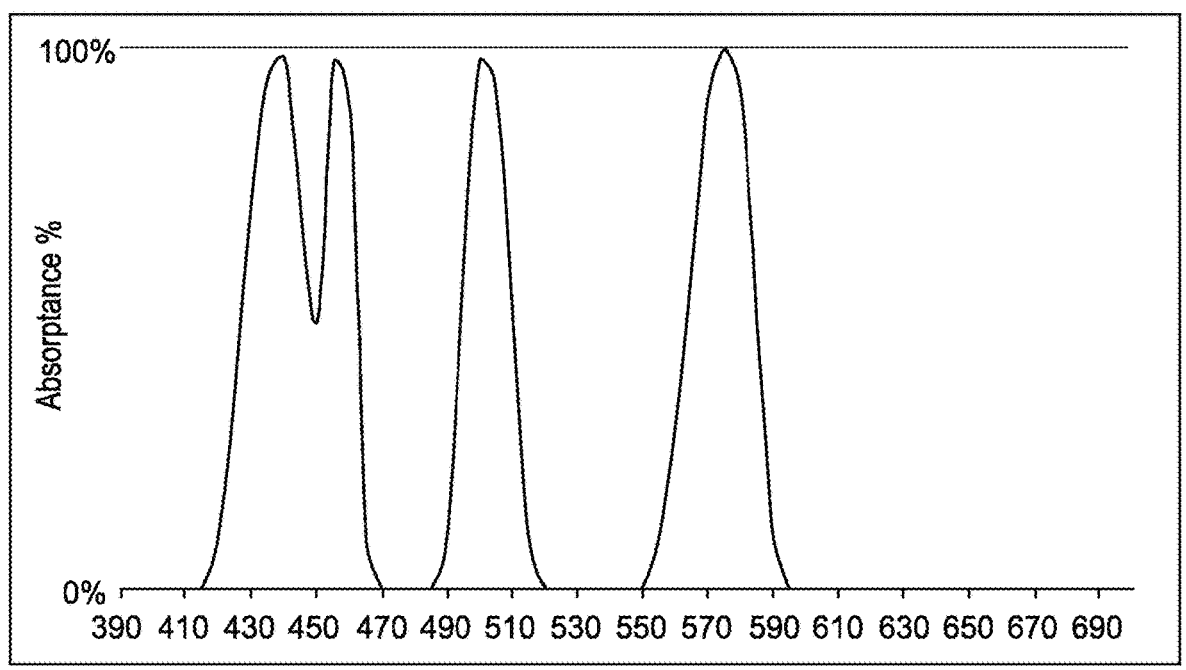
FIG. 21 is a graph showing the spectral absorptance profile of another optical filter.
Figure 22A:
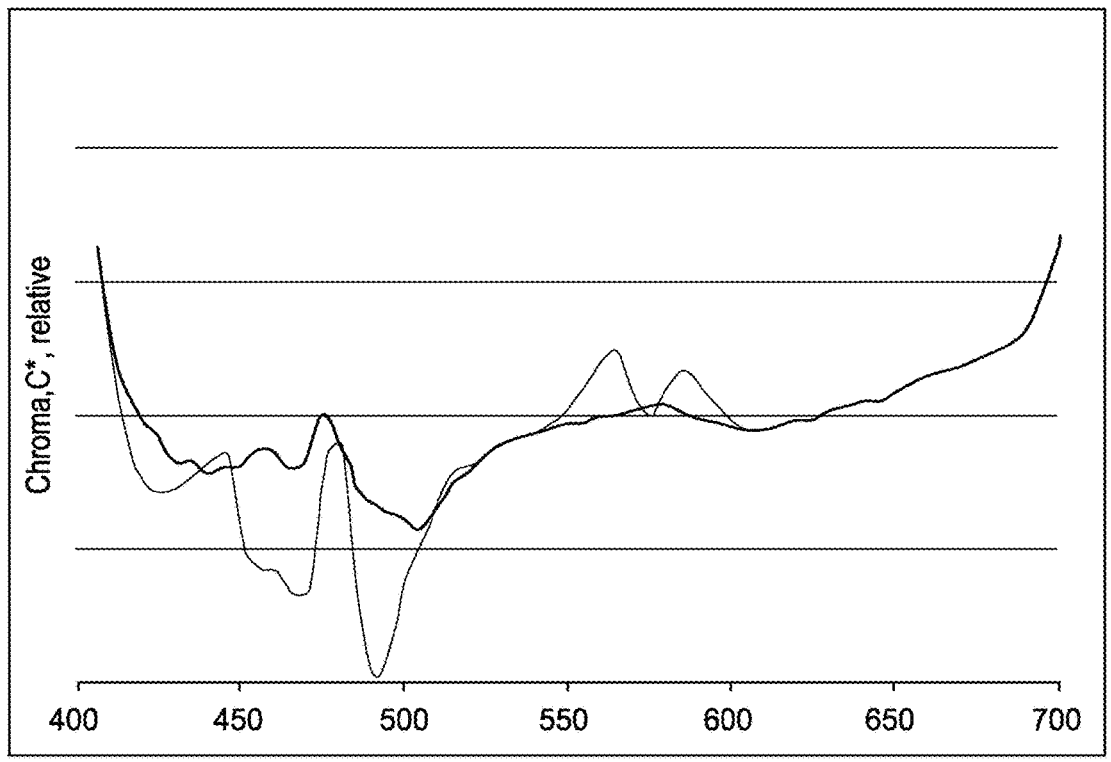
FIG. 22A is a graph showing the chroma profile of a filter with the absorptance profile shown in FIG. 21 and of a neutral filter.
Figure 22B:
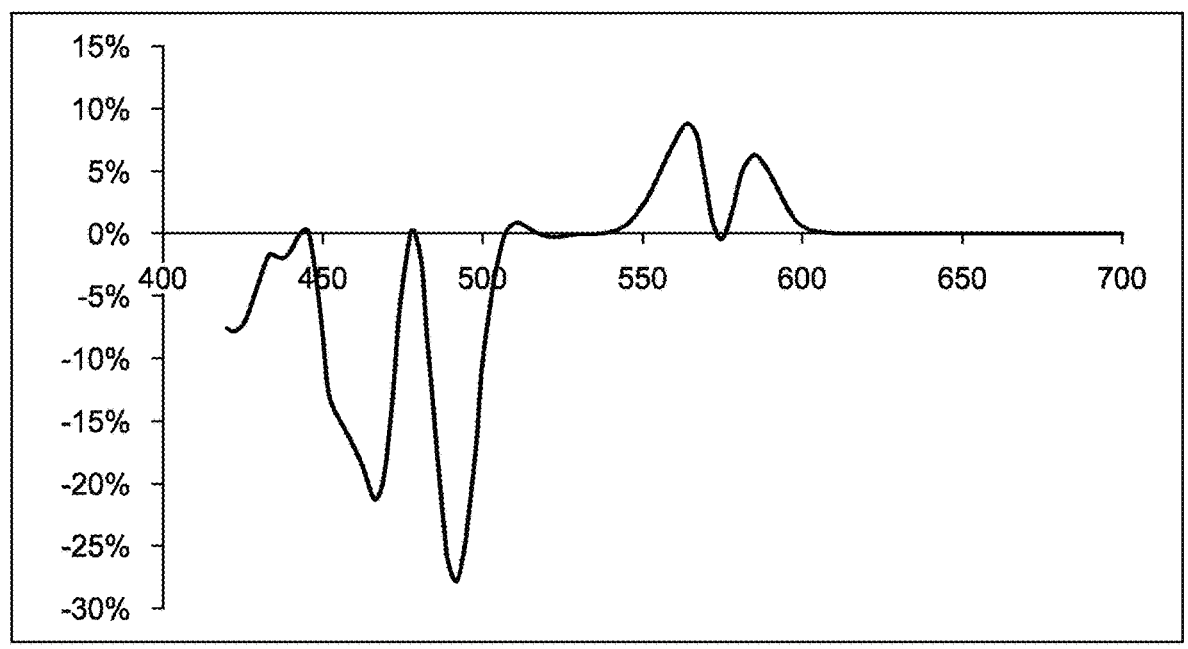
FIG. 22B is a graph showing the percentage difference in chroma of a filter with the absorptance profile shown in FIG. 21 compared to a neutral filter.
Figure 23:
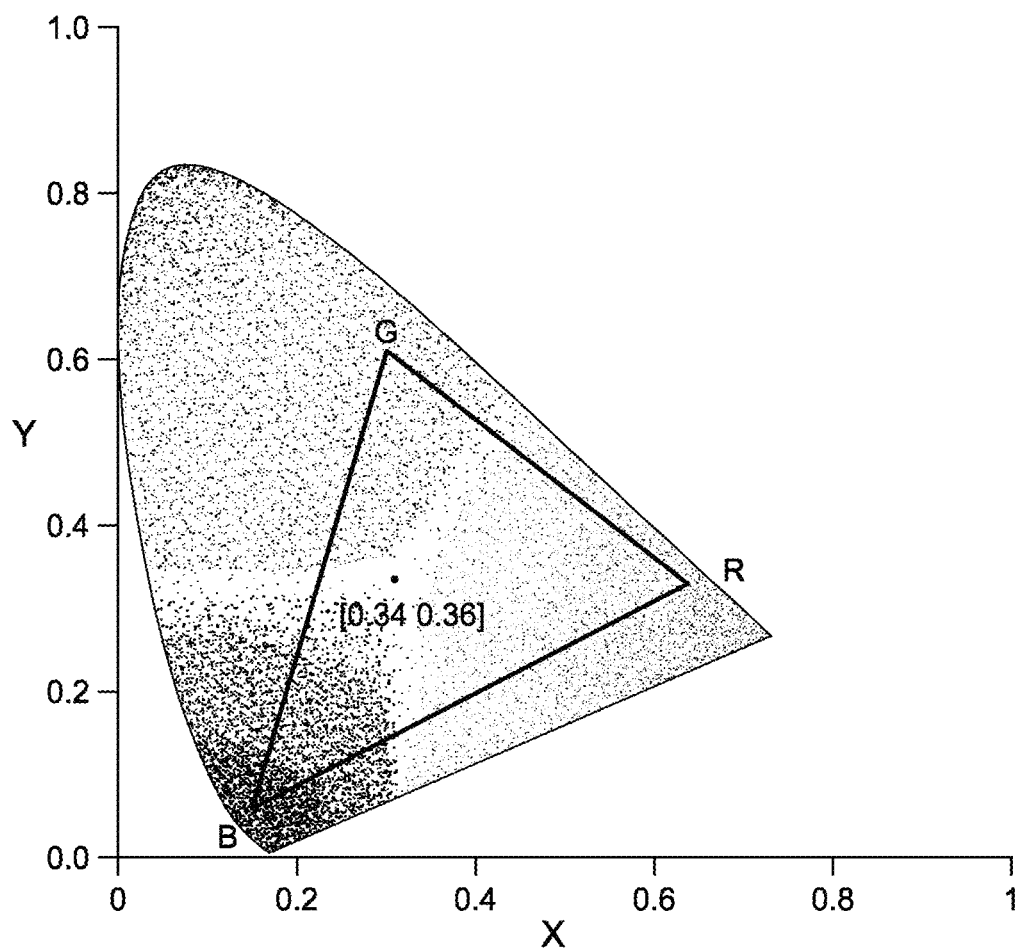
FIG. 23 is a chromaticity diagram for an optical filter having the absorptance profile shown in FIG. 21.

The ability to identify and discern moving objects is generally called "Dynamic Visual Acuity." An increase in chroma in the spectral region of the moving object is expected to improve this quality because increases in chroma are generally associated with higher color contrast. Furthermore, the emphasis and de-emphasis of specific colors can further improve Dynamic Visual Acuity. A spectral absorptance profile of an example optical filter configured to increase Dynamic Visual Acuity is shown in FIG. 21. The optical filter shown is configured to provide high chroma in the green to orange spectral region and relatively lower chroma in the blue spectral region. The relative chroma profiles and the chromaticity diagram of the same optical filter are shown in FIGS. 22A, 22B, and 23. FIG. 22B shows a percentage difference in chroma between the output of the optical filter of FIG. 21 and the output of a filter that uniformly attenuates the same average percentage of light within each stimulus band as the optical filter of FIG. 21, wherein the input is a 30 nm uniform intensity stimulus and the horizontal axis indicates the center wavelength of each stimulus band.

Figure 24:
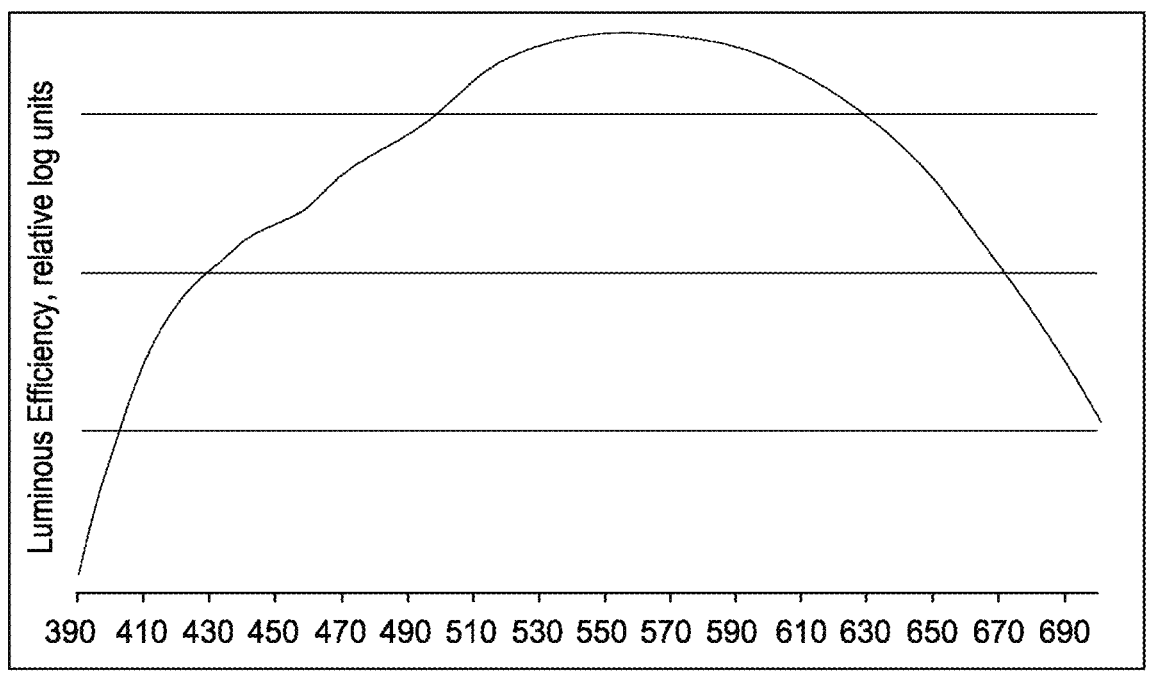
FIG. 24 is a graph showing the luminous efficiency profile of the human eye.

In some embodiments, an optical filter is configured to account for variation in luminous efficiency over the visible spectrum. By accounting for luminous efficiency, the filter can compensate for differences in relative sensitivities at different wavelengths of the human eye to various color bands can be compared. Luminous efficiency over the visible spectrum, consistent with the Stockman and Sharpe cone sensitivity data, is shown in FIG. 24.

Figure 25:
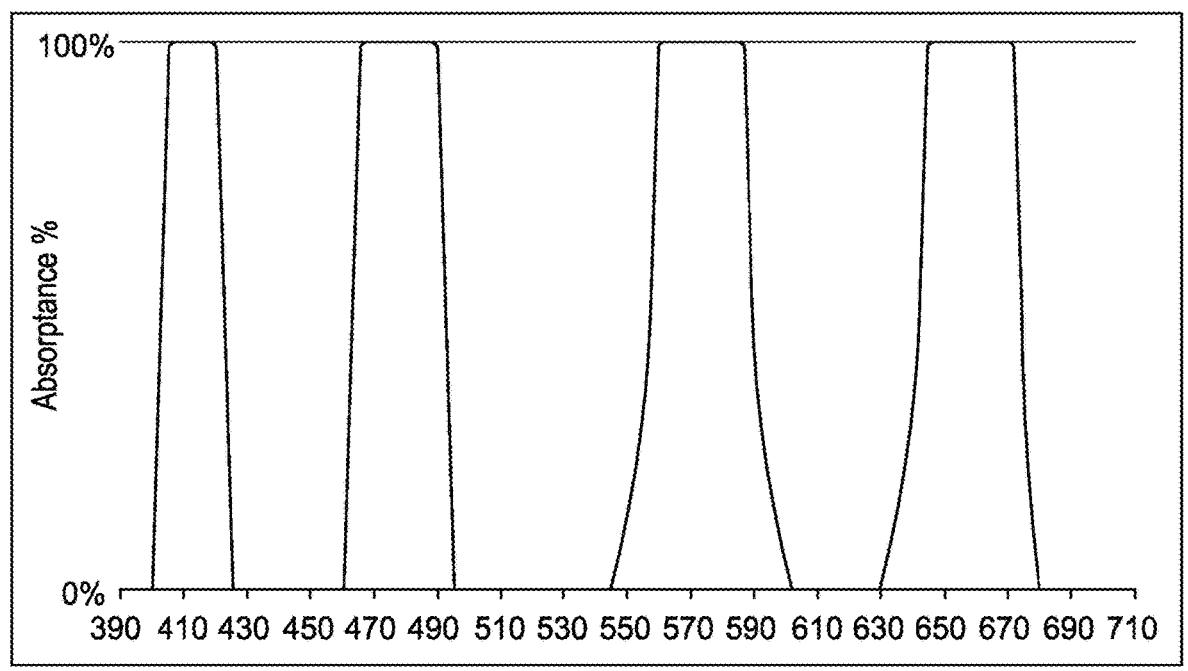
FIG. 25 is a graph showing the spectral absorptance profile of another optical filter.
Figure 26A:
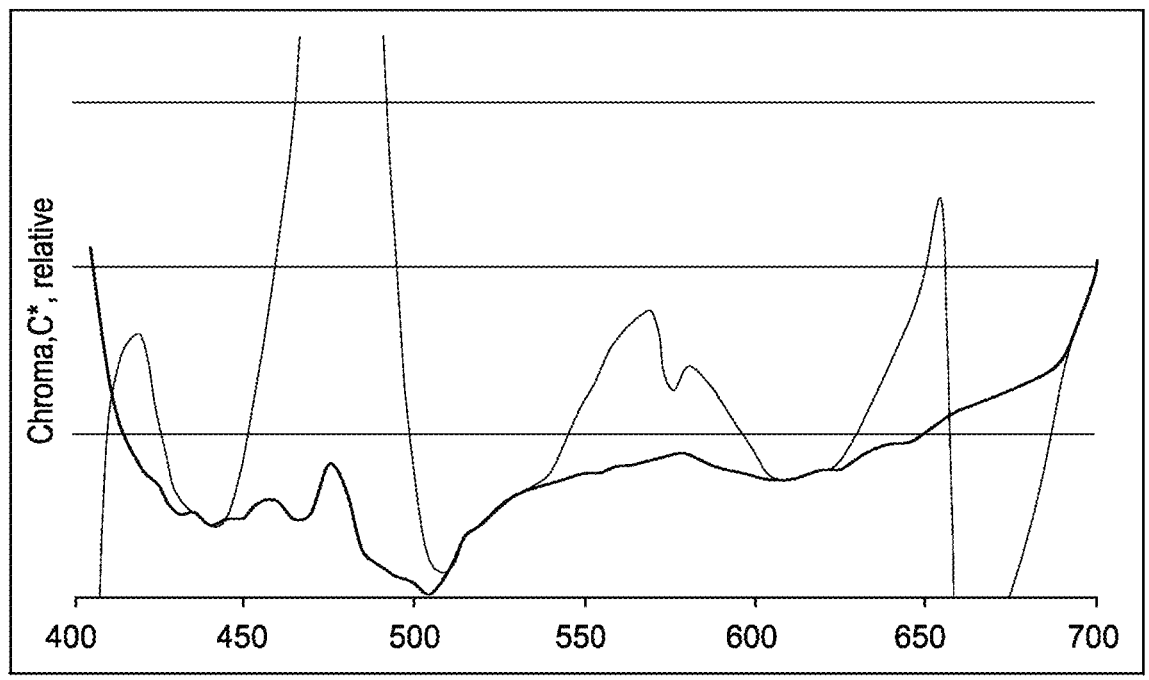
FIG. 26A is a graph showing the chroma profile of a filter with the absorptance profile shown in FIG. 25 and of a neutral filter.
Figure 26B:
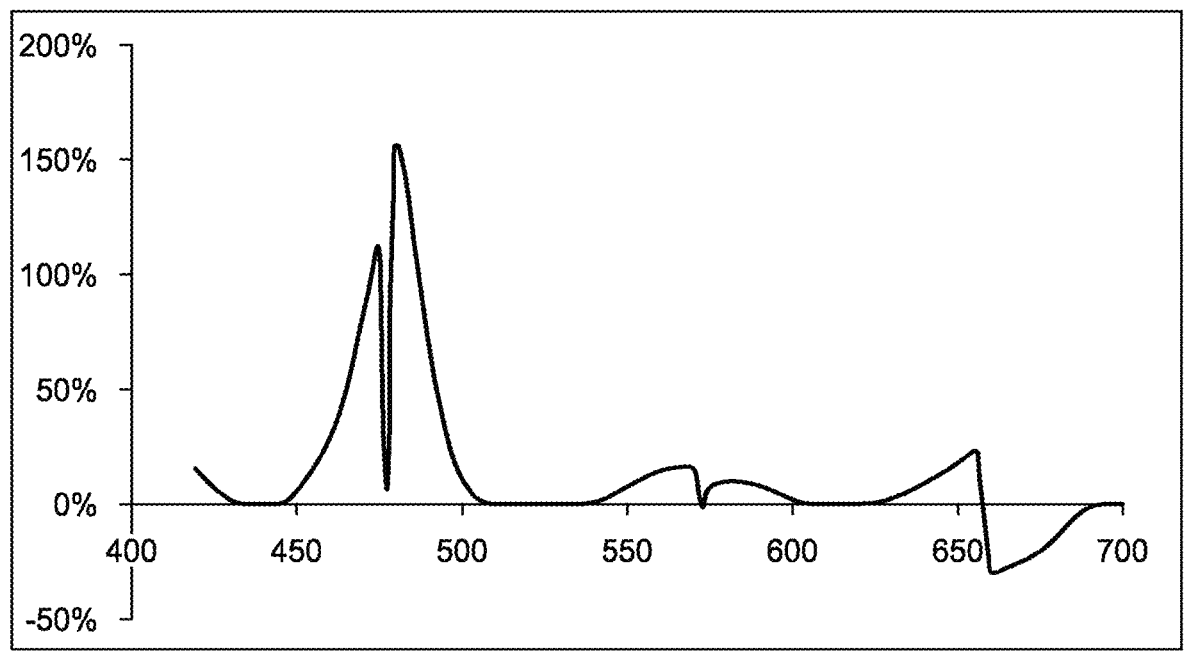
FIG. 26B is a graph showing the percentage difference in chroma of a filter with the absorptance profile shown in FIG. 25 compared to a neutral filter.
Figure 27:
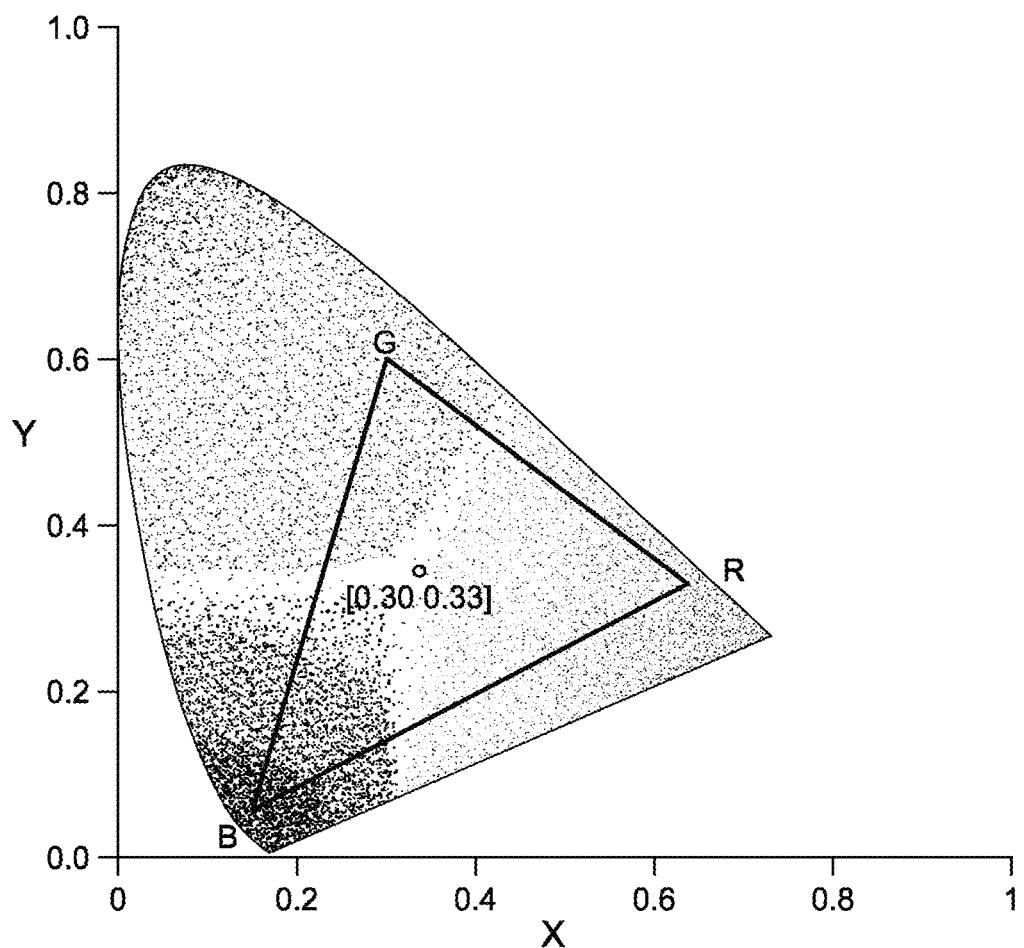
FIG. 27 is a chromaticity diagram for an optical filter having the absorptance profile shown in FIG. 25.

In certain embodiments, an optical filter is configured to selectively increase chroma in the red wavelengths at which the human eye is most sensitive. For example, the red color band can be described as the spectral range extending between about 625 nm and about 700 nm. When looking at the luminous efficiency function shown in FIG. 24, it is apparent that the eye is significantly more sensitive to red light between about 625 nm and 660 nm than at longer wavelengths. Accordingly, a spectral absorptance profile of an optical filter with this configuration is shown in FIG. 25. The optical filter has the same profile as the one shown in FIG. 11 except that it has an alternate peak in the red band centered at about 658 nm instead of a peak centered at about 715 nm. The result is increased chroma over the red band up to 655 nm with an accompanying decrease in chroma for red above 660 nm, where the eye is less sensitive. The relative chroma profiles and the chromaticity diagram for the same optical filter are shown in FIGS. 26A, 26B, and 27. FIG. 26B shows a percentage difference in chroma between the output of the optical filter of FIG. 25 and the output of a filter that uniformly attenuates the same average percentage of light within each stimulus band as the optical filter of FIG. 25, wherein the input is a 30 nm uniform intensity stimulus and the values along horizontal axis indicate the center wavelength of each stimulus band.

Figure 28:
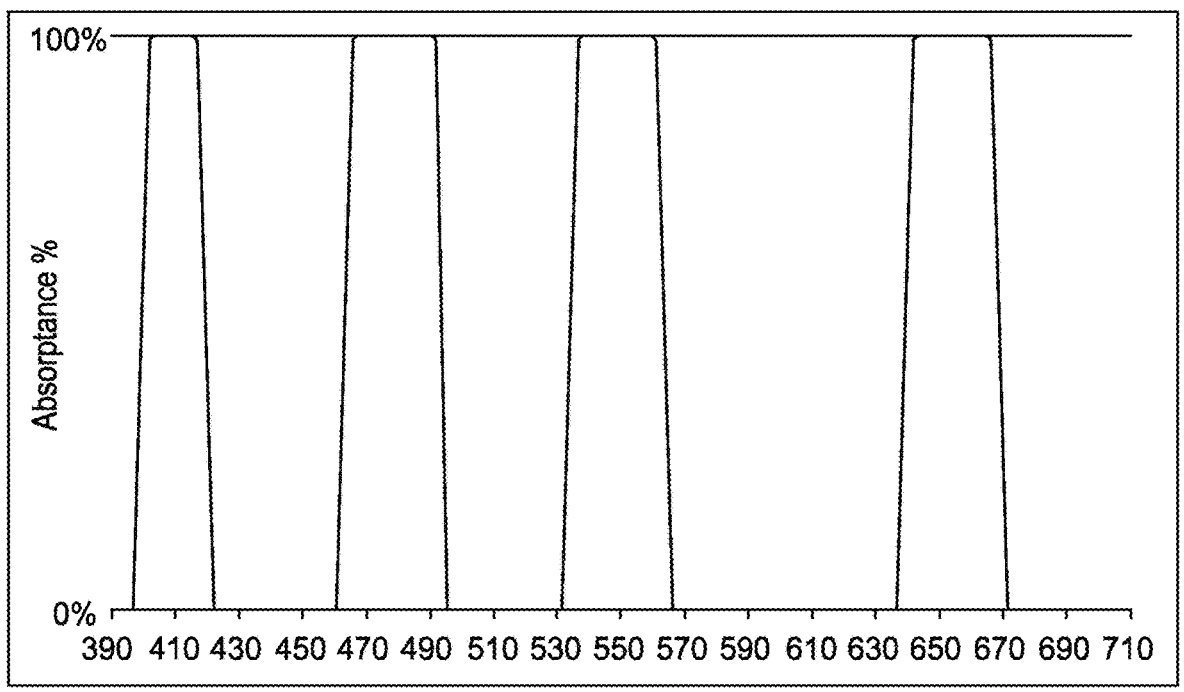
FIG. 28 is a graph showing the spectral absorptance profile of another optical filter.
Figure 29A:
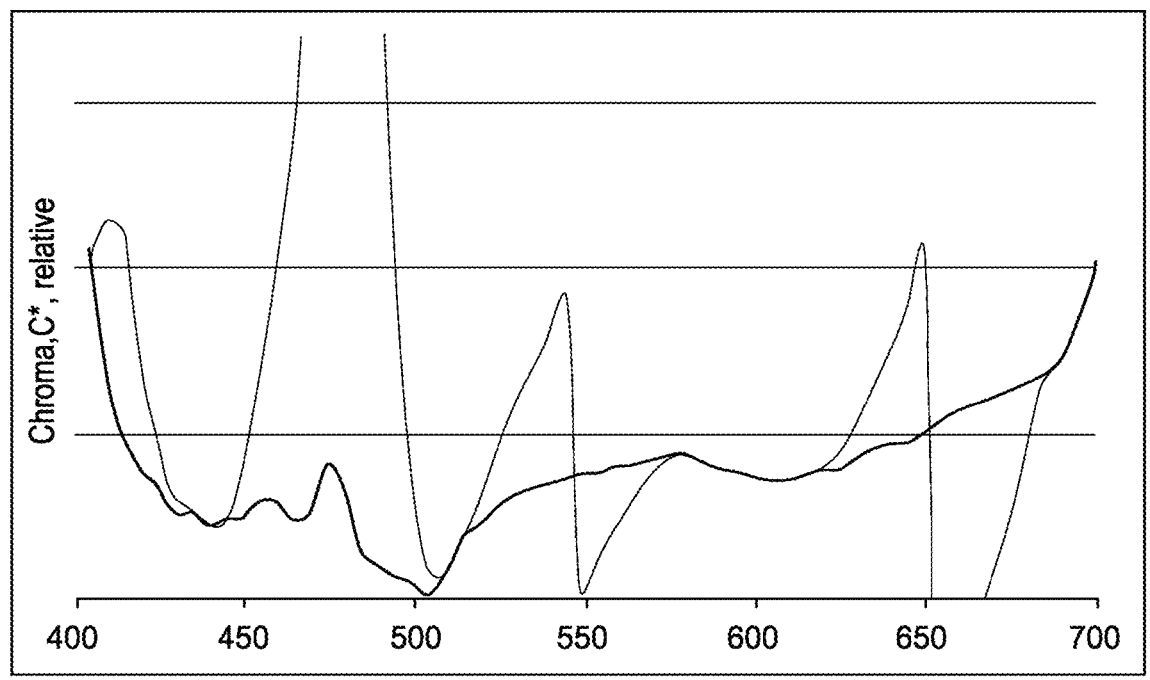
FIG. 29A is a graph showing the chroma profile of a filter with the absorptance profile shown in FIG. 28 and of a neutral filter.
Figure 29B:
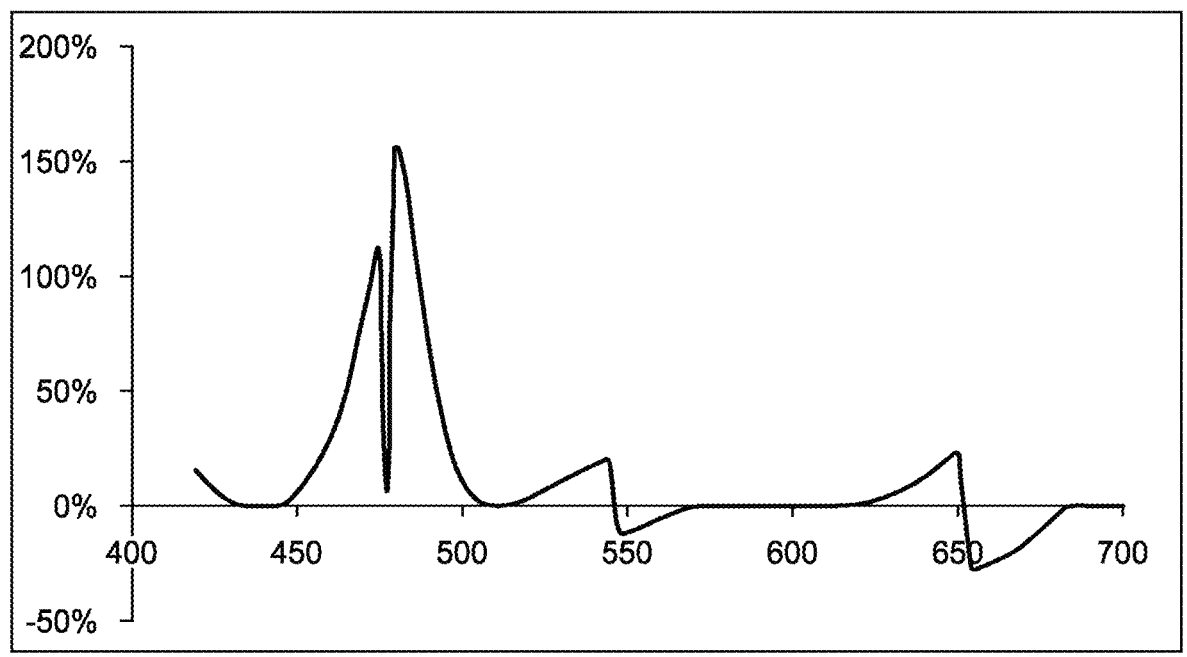
FIG. 29B is a graph showing the percentage difference in chroma of a filter with the absorptance profile shown in FIG. 28 compared to a neutral filter.
Figure 30:
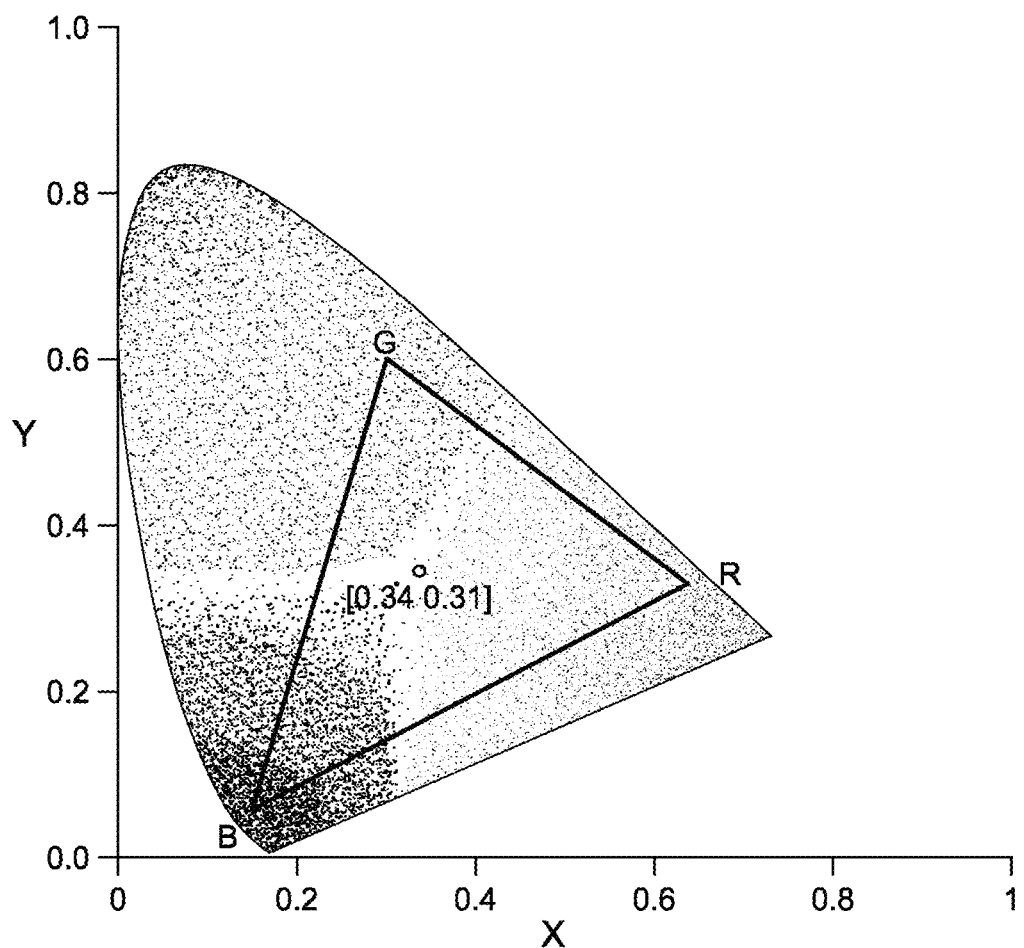
FIG. 30 is a chromaticity diagram for an optical filter having the absorptance profile shown in FIG. 28.

Additionally, chroma can be increased for wavelengths in the middle of the green range using an absorptance peak centered at about 553 nm, at about 561 nm, or at a wavelength between about 550 nm and about 570 nm. Such a filter can also decrease chroma of yellow colors, so it can be used in activities that benefit from identifying green objects that are viewed against a yellow background. A spectral absorptance profile for an optical filter that provides increased chroma for the middle of the green spectral range is shown in FIG. 28. The relative chroma profiles and the chromaticity diagram for the same optical filter are shown in FIGS. 29A, 29B, and 30, respectively. FIG. 29B shows a percentage difference in chroma between the output of the optical filter of FIG. 28 and the output of a filter that uniformly attenuates the same average percentage of light within each stimulus band as the optical filter of FIG. 28, wherein the input is a 30 nm uniform intensity stimulus and the horizontal axis indicates the center wavelength of each stimulus band.

In order to fabricate the filter profiles shown above, a variety of approaches can be applied, such as through the use of dielectric stacks, multilayer interference coatings, rare earth oxide additives, organic dyes, or a combination of multiple polarization filters as described in U.S. Pat. No. 5,054,902, the entire contents of which are incorporated by reference herein and made a part of this specification. Another suitable fabrication technique or a combination of techniques can also be used.

Figure 31:
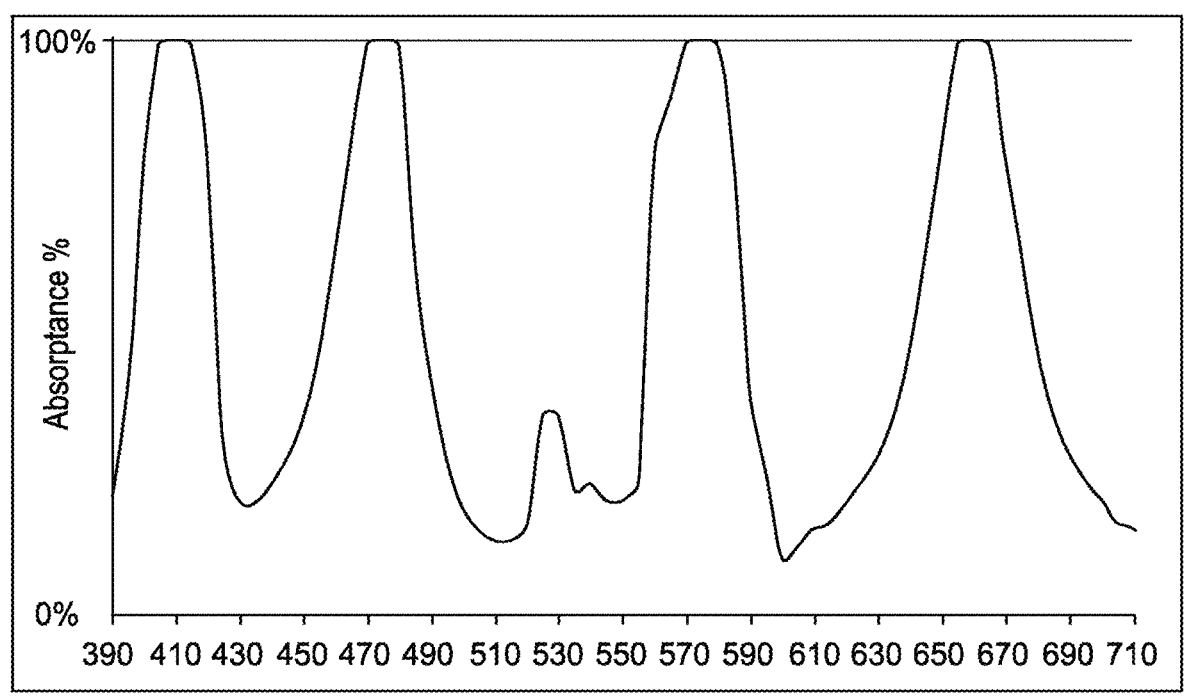
FIG. 31 is a graph showing the spectral absorptance profile of a non-polarized lens with an example optical filter.
Figure 32A:
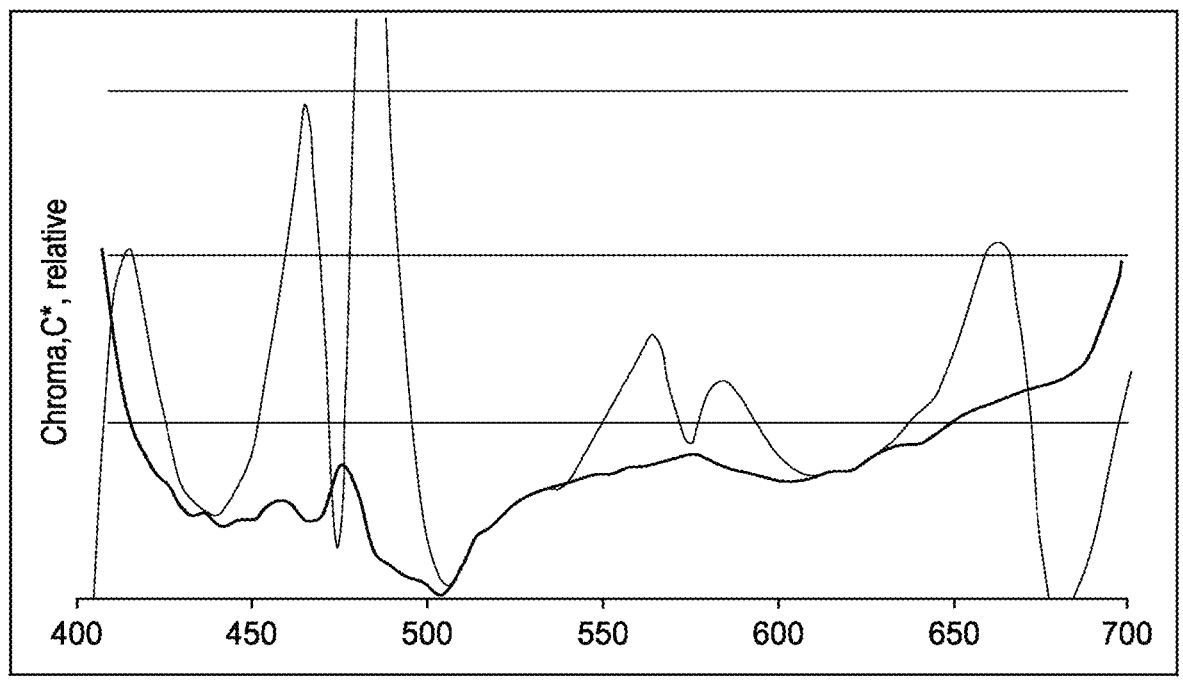
FIG. 32A is a graph showing the chroma profile of a non-polarized lens with the spectral absorptance profile shown in FIG. 31 and of a neutral filter.
Figure 32B:
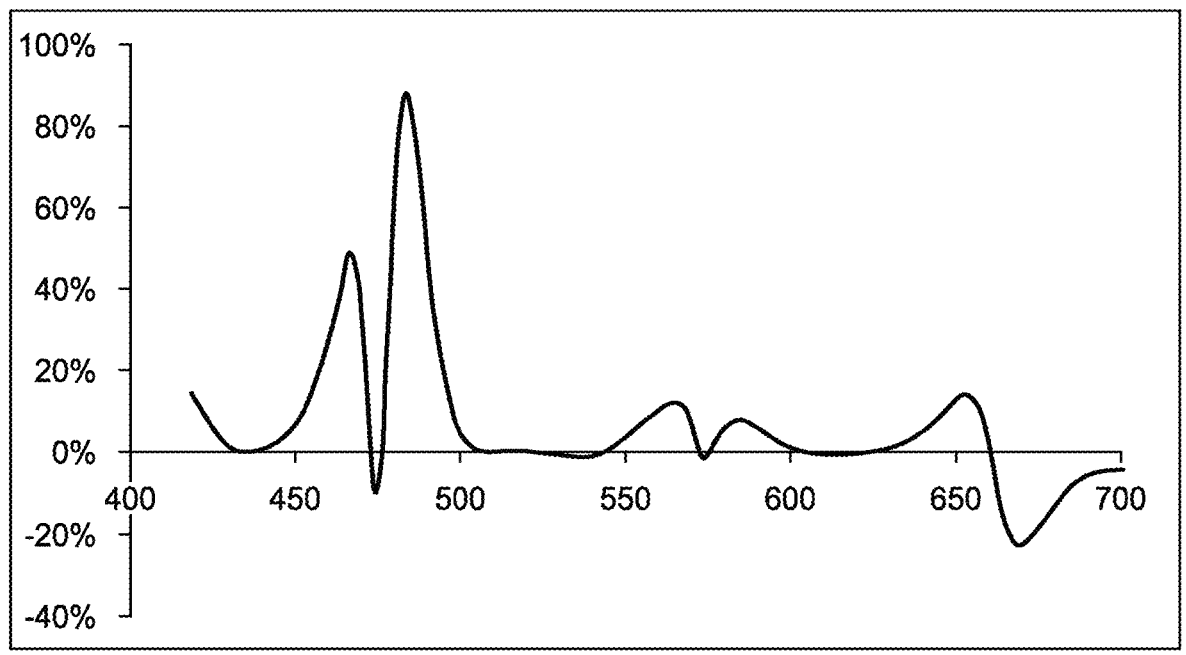
FIG. 32B is a graph showing the percentage difference in chroma of a lens with the absorptance profile shown in FIG. 31 compared to a neutral filter.
Figure 33:
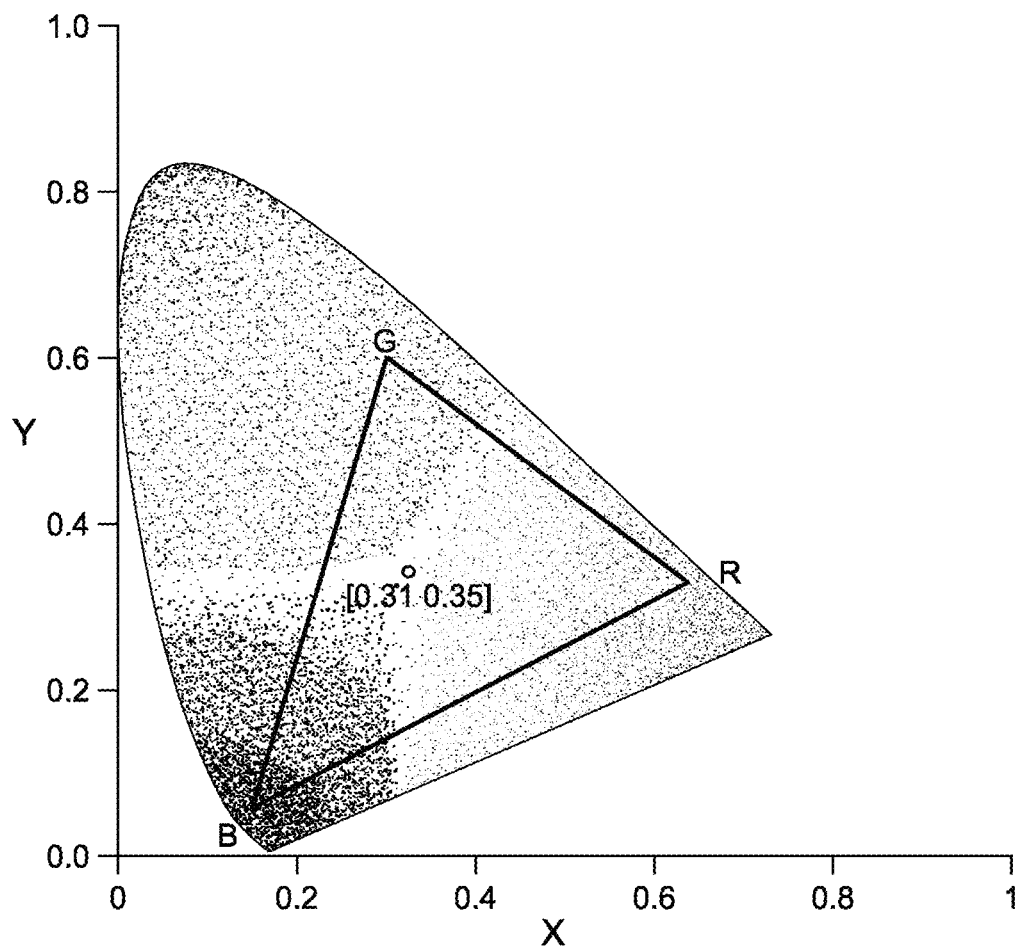
FIG. 33 is a chromaticity diagram for the lens with the spectral absorptance profile shown in FIG. 31.

In certain embodiments, an optical filter includes one or more organic dyes that provide absorptance peaks with a relatively high attenuation factor. For example, in some embodiments, a lens has an optical filter incorporating organic dyes supplied by Exciton of Dayton, Ohio. At least some organic dyes supplied by Exciton are named according to the approximate center wavelength and/or peak location of their absorptance peak. An approximated spectral absorptance profile of a non-polarized polycarbonate lens with an optical filter incorporating Exciton ABS 407, ABS 473, ABS 574, and ABS 659 dyes is shown in FIG. 31. The organic dye formulation of the optical filter provides absorptance peaks at about 407 nm, 473 nm, 574 nm, and 659 nm. The relative chroma profiles and the chromaticity diagram of the lens are shown in FIGS. 32A, 32B, and 33, respectively. FIG. 32B shows a percentage difference in chroma between the output of the optical filter of FIG. 31 and the output of a filter that uniformly attenuates the same average percentage of light within each stimulus band as the optical filter of FIG. 31, wherein the input is a 30 nm uniform intensity stimulus and the horizontal axis indicates the center wavelength of each stimulus band.

Figure 34:
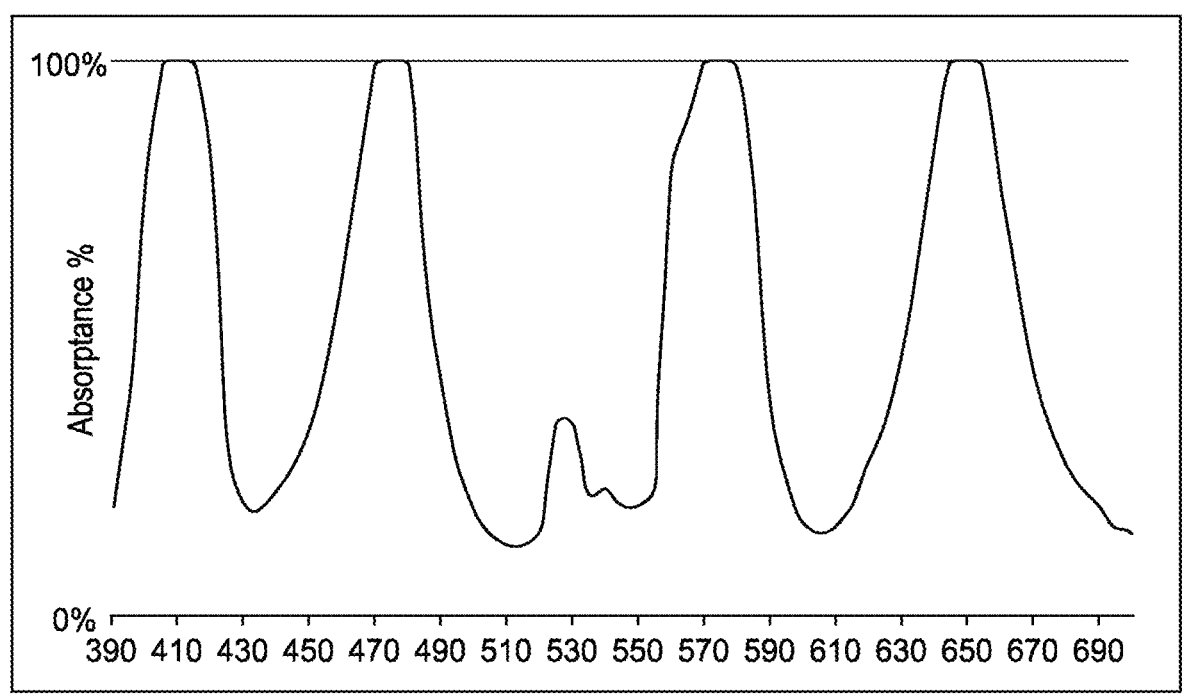
FIG. 34 is a graph showing the spectral absorptance profile of a non-polarized lens with another example optical filter.
Figure 35A:
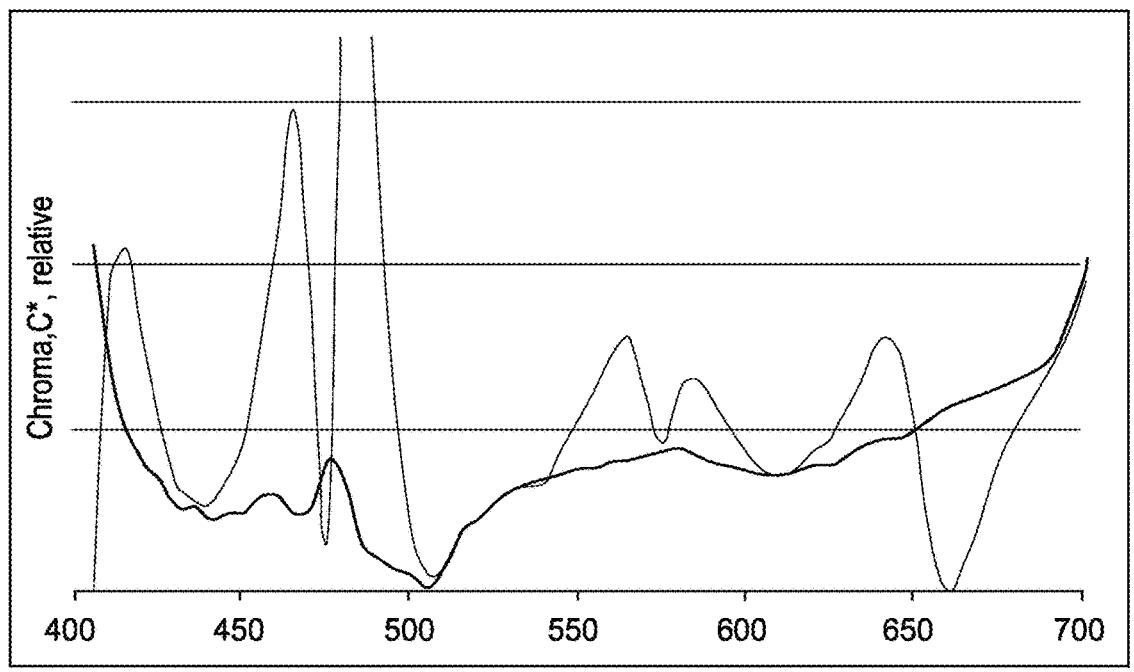
FIG. 35A is a graph showing the chroma profile of the lens with the spectral absorptance profile shown in FIG. 34 and of a neutral filter.
Figure 35B:
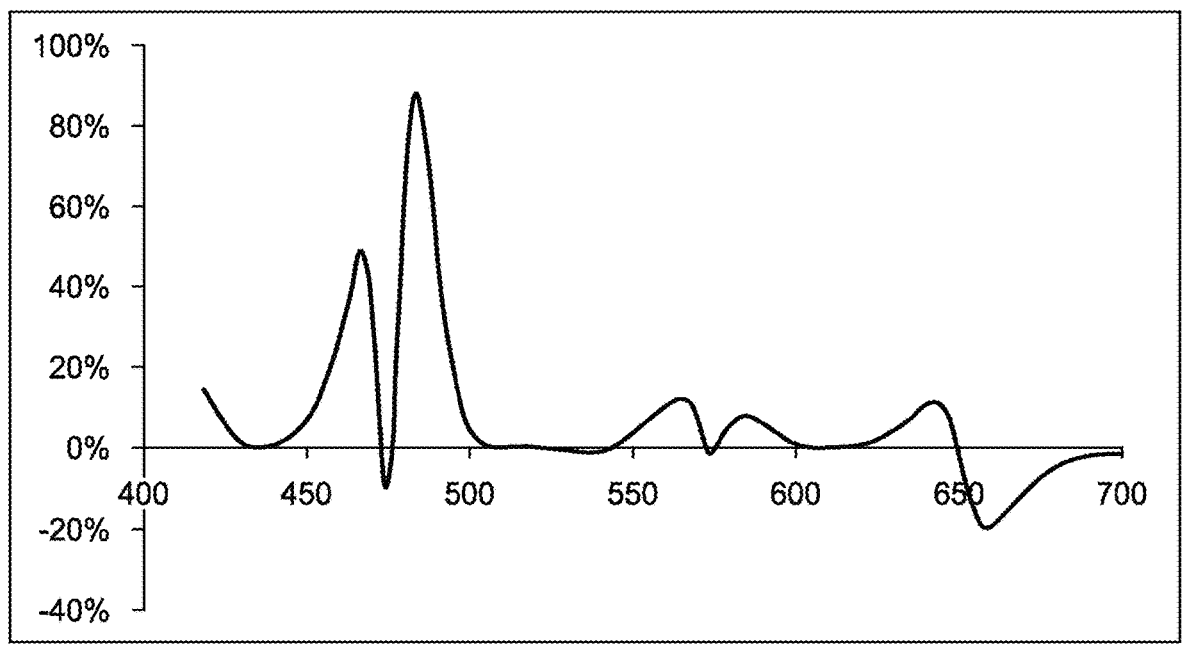
FIG. 35B is a graph showing the percentage difference in chroma of a lens with the absorptance profile shown in FIG. 34 compared to a neutral filter.
Figure 36:
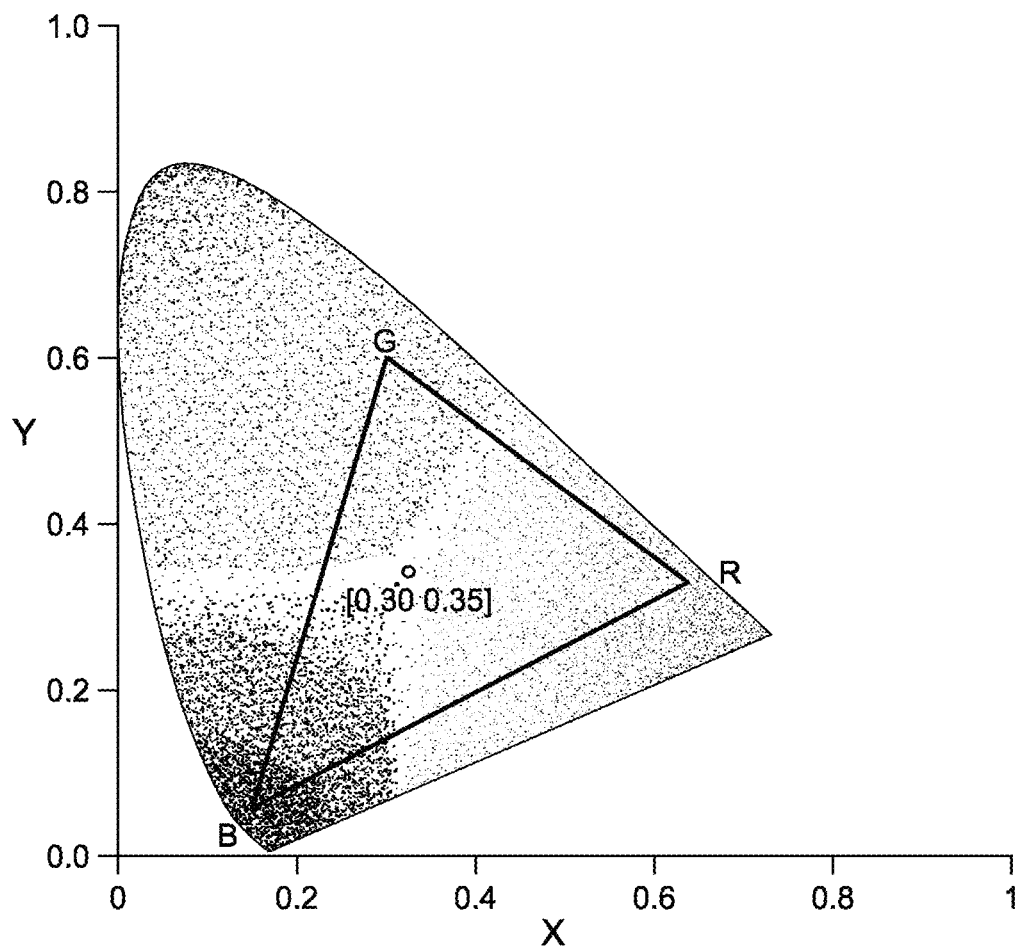
FIG. 36 is a chromaticity diagram for the lens with the spectral absorptance profile shown in FIG. 34.

Some embodiments are similar to the embodiments described in the previous paragraph, but include a red absorptance peak positioned at 647 nm using Exciton ABS 647 dye instead of Exciton ABS 659 dye. In such embodiments, the chroma for the higher luminous efficiency red hues located closer to the peak of the human eye's sensitivity is increased. The spectral absorptance profile of a non-polarized polycarbonate lens with an optical filter in this configuration is shown in FIG. 34. The profile includes absorptance peaks at 407 nm, 473 nm, 574 nm, and 647 nm. The relative chroma profiles and the chromaticity diagram of the lens are shown in FIGS. 35A, 35B, and 36, respectively. FIG. 35B shows a percentage difference in chroma between the output of the optical filter of FIG. 34 and the output of a filter that uniformly attenuates the same average percentage of light within each stimulus band as the optical filter of FIG. 34, wherein the input is a 30 nm uniform intensity stimulus and the horizontal axis indicates the center wavelength of each stimulus band.

Figure 37:
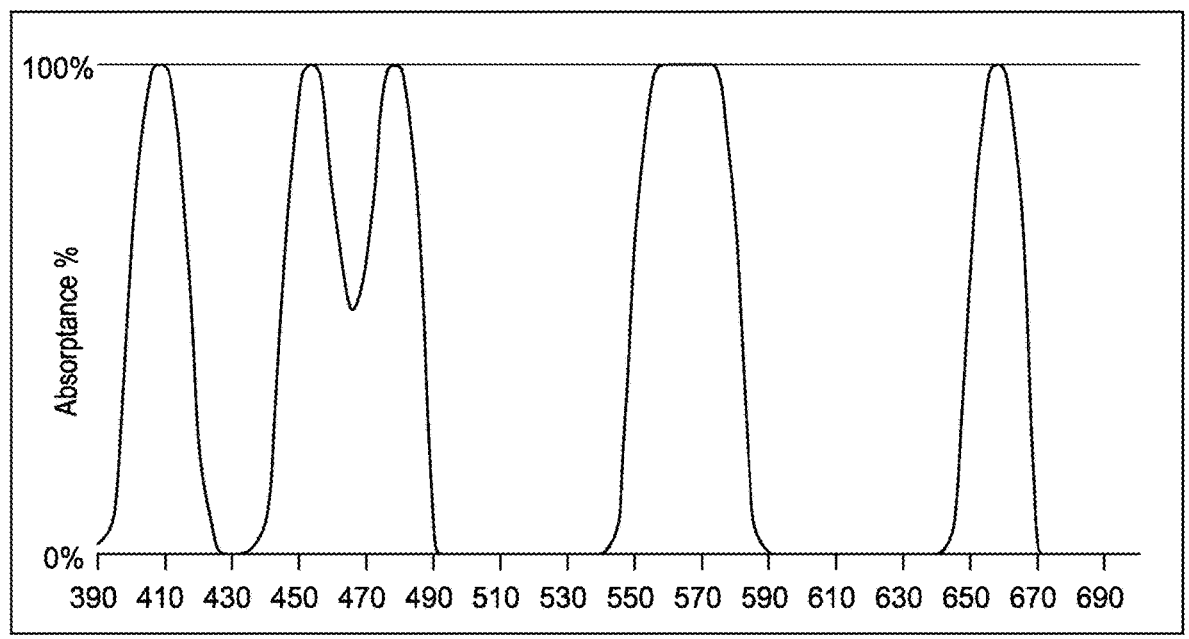
FIG. 37 is a graph showing the spectral absorptance profile of another optical filter.

In some embodiments, another optical filter is configured to increase or maximize chroma across several, many, or most colors, or at least many colors that are commonly encountered in the environment of the wearer. Such an optical filter can include a plurality of absorptance peaks. The plurality of absorptance peaks can include an absorptance peak having a center wavelength and/or peak location between about 415 nm and about 455 nm, at about 478 nm, and between about 555 nm and 580 nm, and at about 660 nm. The FWHM values of the plurality of absorptance peaks can be between about 20 nm and about 50 nm, greater than about 20 nm, about 22 nm, about 45 nm, another suitable value, or a combination of values. In some embodiments, the FWHM value of the absorptance peak with a center wavelength and/or peak location between about 555 nm and about 580 nm is about twice the FWHM value of at least some of the other absorptance peaks in the spectral profile. An approximated spectral absorptance profile of an example filter having absorptance peaks reflected by the embodiments described in this paragraph is shown in FIG. 37. The example filter has a sharp drop in absorptance at about 490 nm that permits substantial transmission of light at 491 nm and through a wide band (for example, through a spectral band greater than or equal to about 20 nm in bandwidth) in the neighborhood of 491 nm (for example, through a band of wavelengths near 491 nm and greater than or equal to about 491 nm).

Figure 38A:
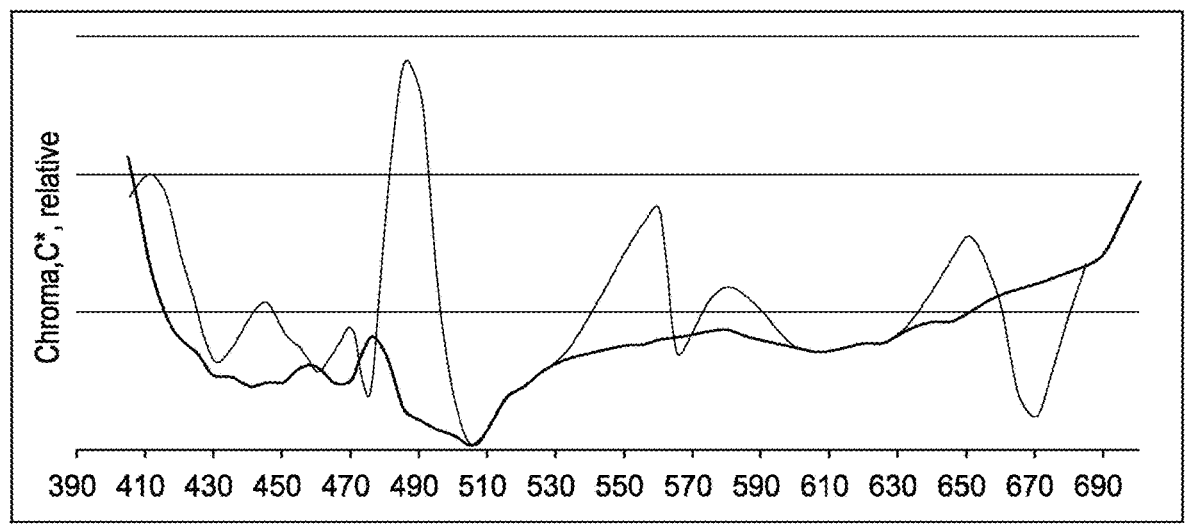
FIG. 38A is a graph showing the chroma profile of a filter with absorptance profile shown in FIG. 37 and of a neutral filter.
Figure 38B:
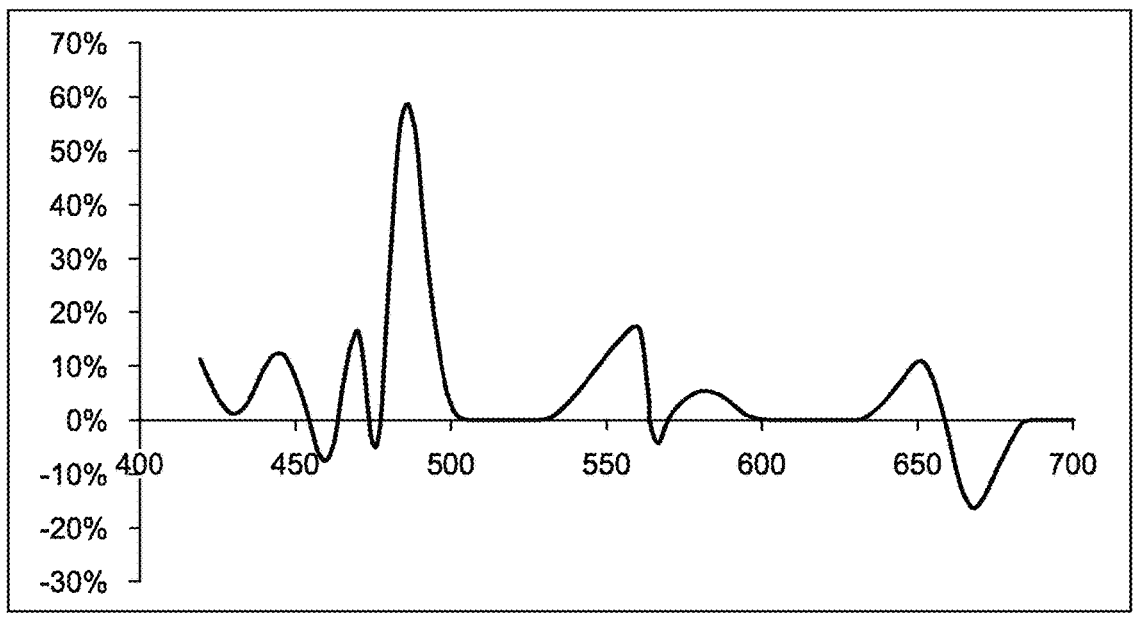
FIG. 38B is a graph showing the percentage difference in chroma of a filter with the absorptance profile shown in FIG. 37 compared to a neutral filter.
Figure 39:
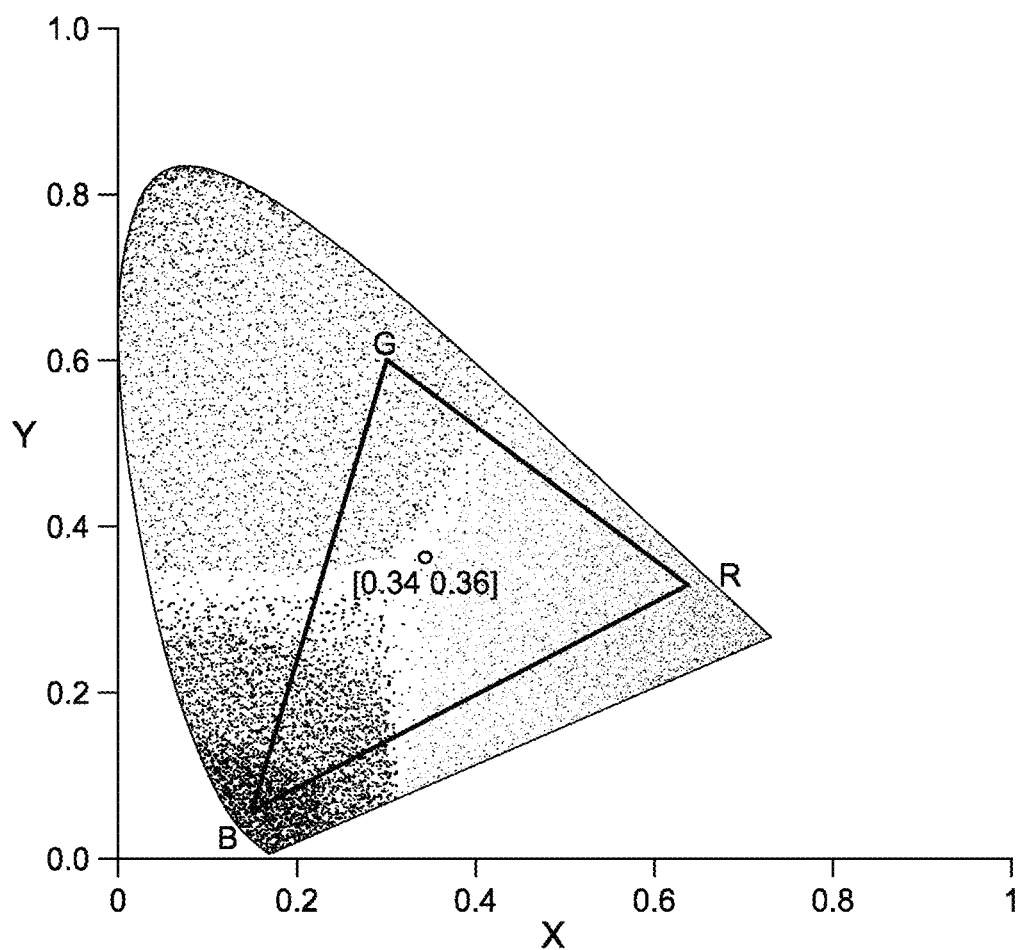
FIG. 39 is a chromaticity diagram for the filter with the spectral absorptance profile shown in FIG. 37.

A relative chroma profile for a filter having the absorptance profile of FIG. 37 is shown in FIG. 38A. The chroma profile of FIG. 38A is shown with a vertical scale different from other chroma profiles in this disclosure in order to show larger variation in chroma. The example filter produces substantial increases in relative chroma over the unfiltered case in multiple spectral bands, including in spectral bands between about 410 nm and about 460 nm, between about 465 nm and about 475 nm, between about 480 nm and about 500 nm, between about 540 nm and about 565 nm, between about 570 nm and 600 nm, and between about 630 nm and about 660 nm. FIG. 38B shows a percentage difference in chroma between the output of the optical filter of FIG. 37 and the output of a filter that uniformly attenuates the same average percentage of light within each stimulus band as the optical filter of FIG. 37, wherein the input is a 30 nm uniform intensity stimulus and the horizontal axis indicates the center wavelength of each stimulus band. A chromaticity diagram for this example filter is shown in FIG. 39.

In some embodiments, two or more dyes can be used to create a single absorptance peak or a plurality of absorptance peaks in close proximity to one another. For example, an absorptance peak with a center wavelength and/or peak location positioned between about 555 nm and about 580 nm can be creating using two dyes having center wavelengths and/or peak locations at about 561 nm and 574 nm. In another embodiment, an absorptance peak with a center wavelength and/or peak location positioned between about 555 nm and about 580 nm can be creating using two dyes having center wavelengths and/or peak locations at about 556 nm and 574 nm. While each dye can individually produce an absorptance peak having a FWHM value of less than about 30 nm, when the dyes are used together in an optical filter, the absorptance peaks can combine to form a single absorptance peak with a bandwidth of about 45 nm or greater than or equal to about 40 nm.

Filters incorporating organic dyes can be fabricated using any suitable technique. In some embodiments, a sufficient quantity of one or more organic dyes is used to lower transmittance in one or more spectral regions to less than or equal to about 1%. To achieve peak transmittances under 1% in 1.75 mm thick polycarbonate lenses, dyes can be mixed into a batch of polycarbonate resin. If the mixture includes 5 lbs of polycarbonate resin, the following loadings of Exciton dyes can be used for the optical filter associated with the absorptance profile shown in FIG. 31: 44 mg of ABS 407, 122 mg of ABS 473, 117 mg of ABS 574, and 63 mg of ABS 659. In the foregoing example, the ratios of dye loadings in polycarbonate can be generalized as follows: out of 1000 total units of dye, the filter could include about 130 units of violet-absorbing dye, about 350 units of blue-absorbing dye, about 340 units of green-absorbing dye, and about 180 units of deep red-absorbing dye.

In the same quantity of polycarbonate resin, the following loadings of Exciton dyes can be used for the optical filter associated with the absorptance profile shown in FIG. 34: 44 mg of ABS 407, 122 mg of ABS 473, 117 mg of ABS 574, and 41 mg of ABS 647. In the foregoing example, the ratios of dye loadings in polycarbonate can be generalized as follows: out of 995 total units of dye, the filter could include about 135 units of violet-absorbing dye, about 375 units of blue-absorbing dye, about 360 units of green-absorbing dye, and about 125 units of red-absorbing dye. In certain embodiments, a lens can be created from the resin and dye mixture by a casting process, a molding process, or any other suitable process.

Other dyes for plastic exist that can also provide substantial increases in chroma. For example, Crysta-Lyn Chemical Company of Binghamton, N.Y. offers DLS 402A dye, with an absorptance peak at 402 nm. In some embodiments, the DLS 402A dye can be used in place of the Exciton ABS 407 dye in the formulations described above. Crysta-Lyn also offers DLS 461B dye that provides an absorptance peak at 461 nm. DLS 461B dye can be used in place of the Exciton ABS 473 dye in the formulations described above. Crysta-Lyn DLS 564B dye can be used in place of the Exciton ABS 574 dye in those formulations, while Crysta-Lyn DLS 654B dye can be used in place of Exciton ABS 659 dye. In some embodiments, the dye can be incorporated into one or more lens components, and the decision regarding which lens components include the dye can be based on properties, such as stability or performance factors, of each specific dye.

In another example, an optical filter is designed with relative amounts of certain dyes. The magnitude of absorptance peaks can be selected by adjusting the absolute mass loading of the dyes while maintaining the relative relationships between loadings of different dyes. For example, in a particular embodiment, an organic dye optical filter includes: 70 mg of Exciton ABS 473 dye, 108 mg of Exciton ABS 561 dye, 27 mg of Exciton ABS 574 dye, and 41 mg of Exciton ABS 659. The ratios of dye loadings in polyurethane can be generalized as follows: out of 1000 total units of dye, the filter could include about 280 units of blue-absorbing dye, about 440 units of yellow-green-absorbing dye, about 110 units of green-absorbing dye, and about 170 units of deep red-absorbing dye. A lens was cast using the foregoing dye loadings in 251 g of polyurethane. The resulting lens had a thickness of 1.9 mm. Loading levels can be adjusted to account for the characteristics of the particular base material used. For example, the loading levels can be somewhat or slightly higher when using a material with a lower density, such as certain types of polycarbonate. Likewise, the loading levels can be somewhat or slightly lower when a higher density material is used.

Figure 40:
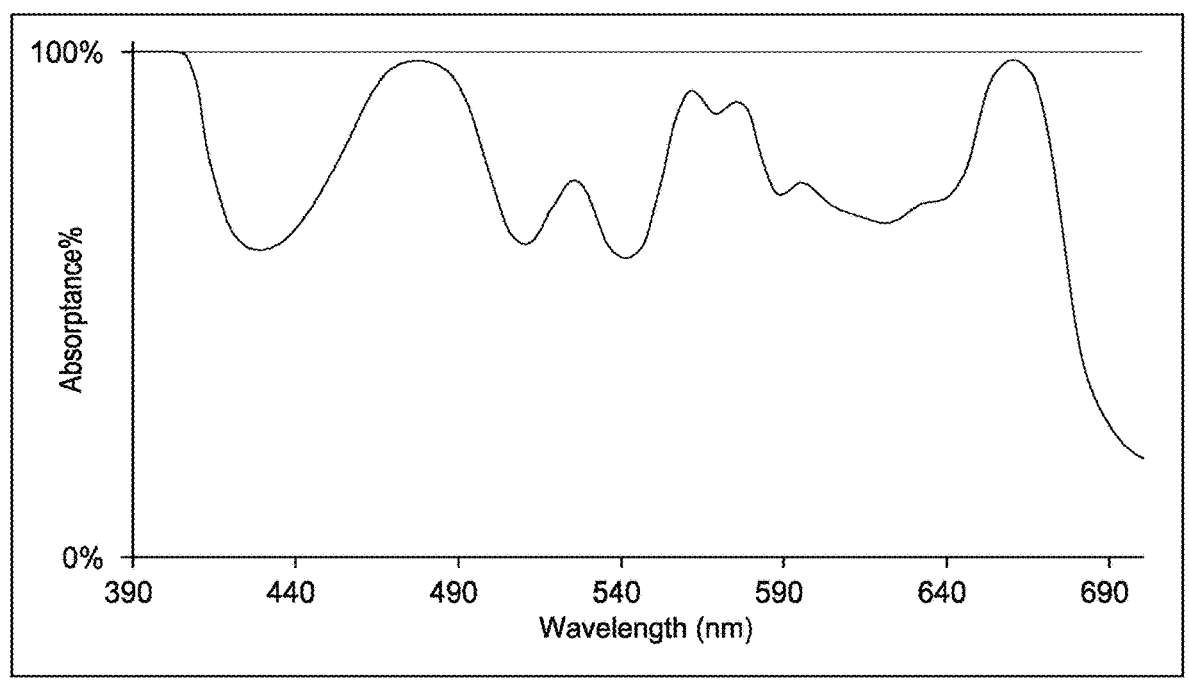
FIG. 40 is a graph showing the spectral absorptance profile of a cast lens with an optical filter.
Figure 41A:
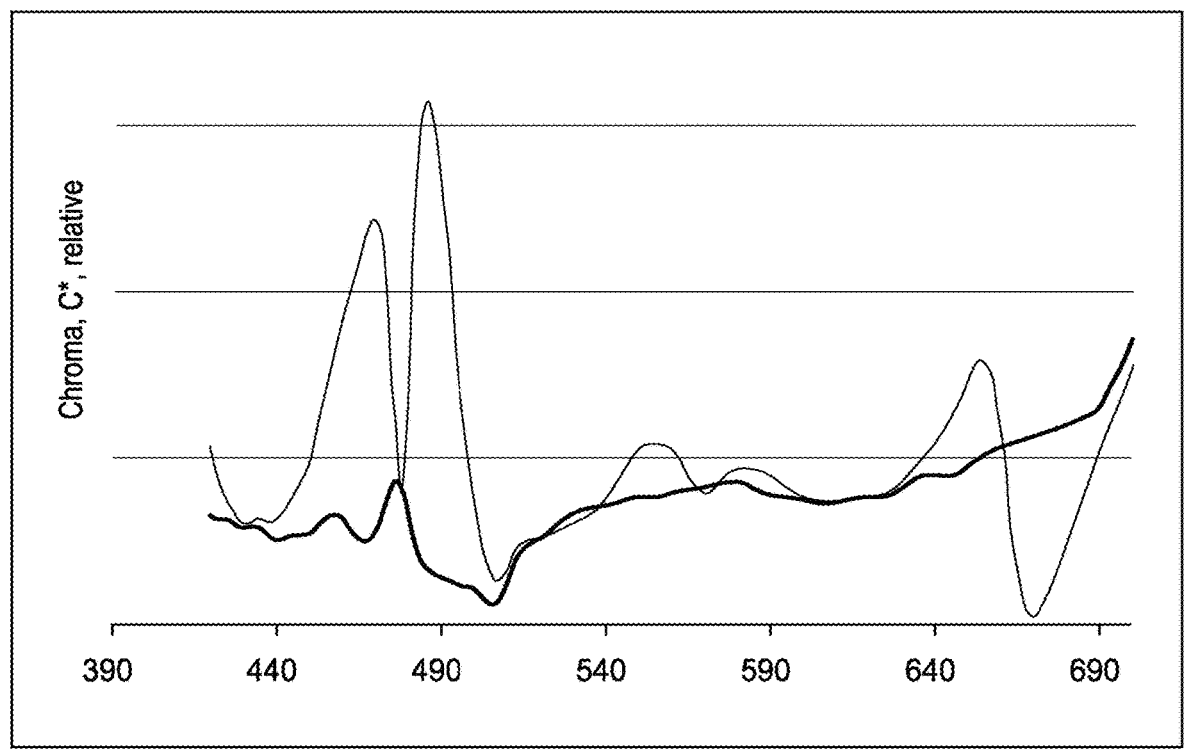
FIG. 41A is a graph showing the chroma profile of a lens with the absorptance profile shown in FIG. 40 and of a neutral filter.
Figure 41B:
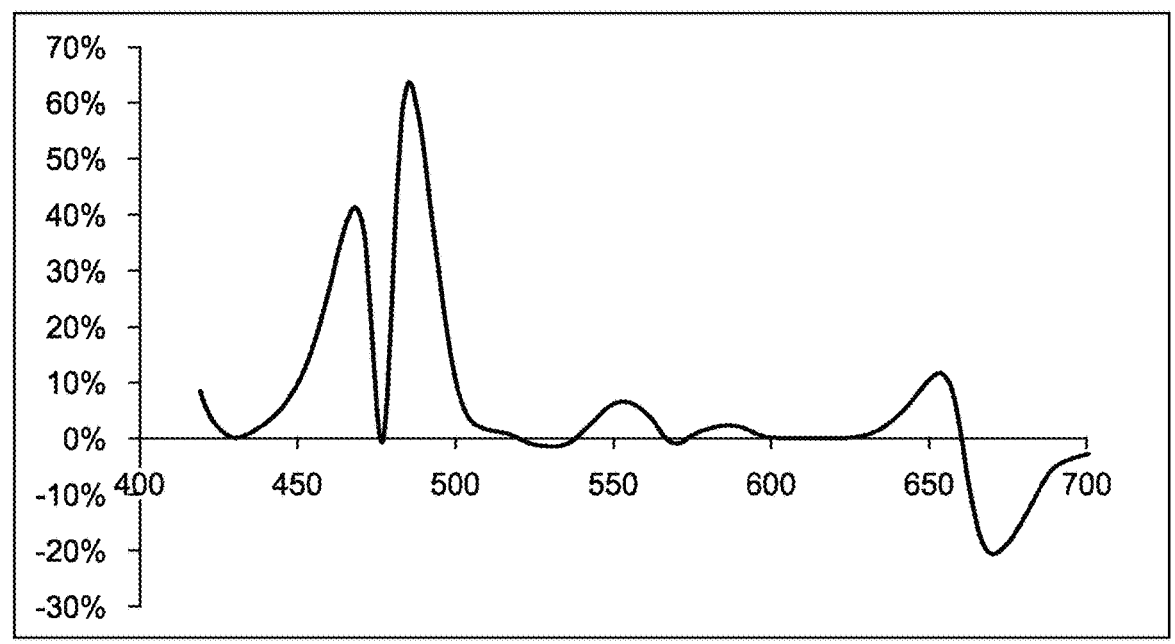
FIG. 41B is a graph showing the percentage difference in chroma of a lens with the absorptance profile shown in FIG. 40 compared to a neutral filter.
Figure 42:
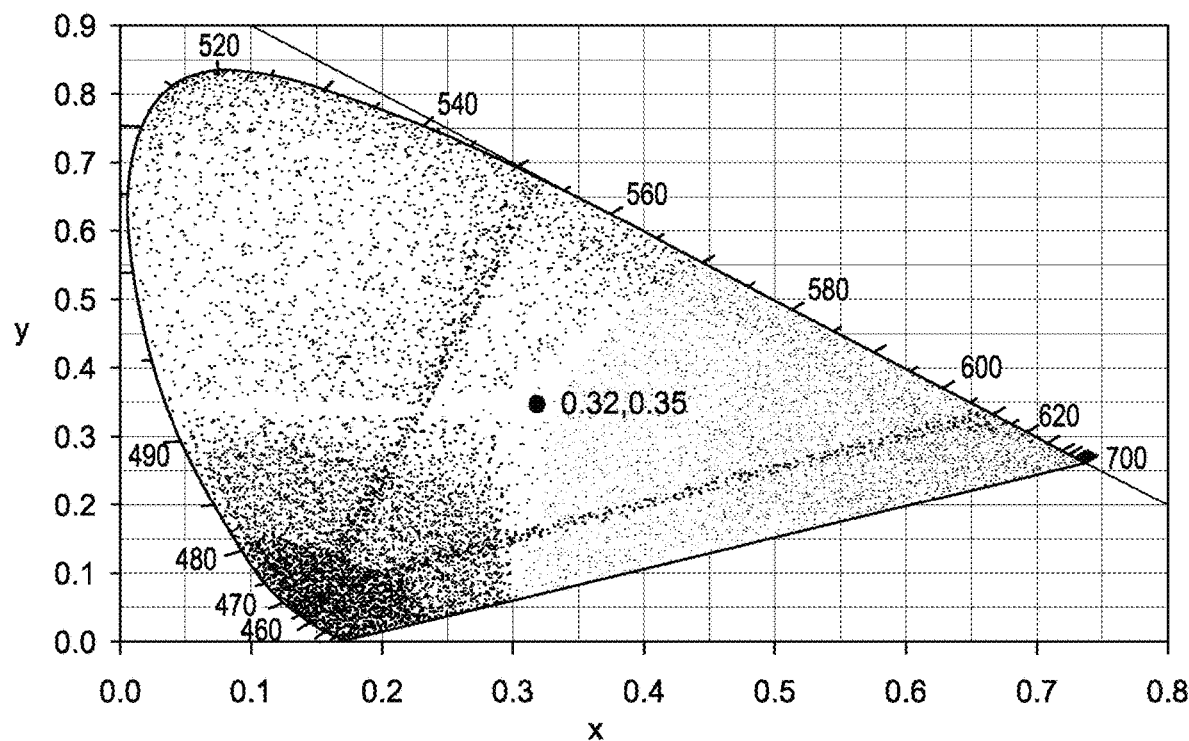
FIG. 42 is a chromaticity diagram for the lens with the spectral absorptance profile shown in FIG. 40.

The absorptance profile of the cast lens is shown in FIG. 40. In the absorptance profile shown in FIG. 40, the absorptance peak centered at about 477 nm has a full width at 80% of the maximum absorptance of the absorptance peak of about 46 nm and an attenuation factor of about 0.92. The absorptance peak centered at about 569 nm has a full width at 80% of the maximum absorptance of the absorptance peak of about 35 nm and an attenuation factor of about 0.86. The absorptance peak centered at about 660 nm has a full width at 80% of the maximum absorptance of the absorptance peak of about 27 nm and an attenuation factor of about 0.91. The cast lens provided an increase in chroma in multiple spectral regions, as shown in FIGS. 41A and 41B. The chroma profile of FIG. 41A is shown at a scale different from other chroma profiles in this disclosure. FIG. 41B shows a percentage difference in chroma between the output of the optical filter of FIG. 40 and the output of a filter that uniformly attenuates the same average percentage of light within each stimulus band as the optical filter of FIG. 40, wherein the input is a 30 nm uniform intensity stimulus and the horizontal axis indicates the center wavelength of each stimulus band. A chromaticity diagram for the cast lens is shown in FIG. 42.

Figure 50:
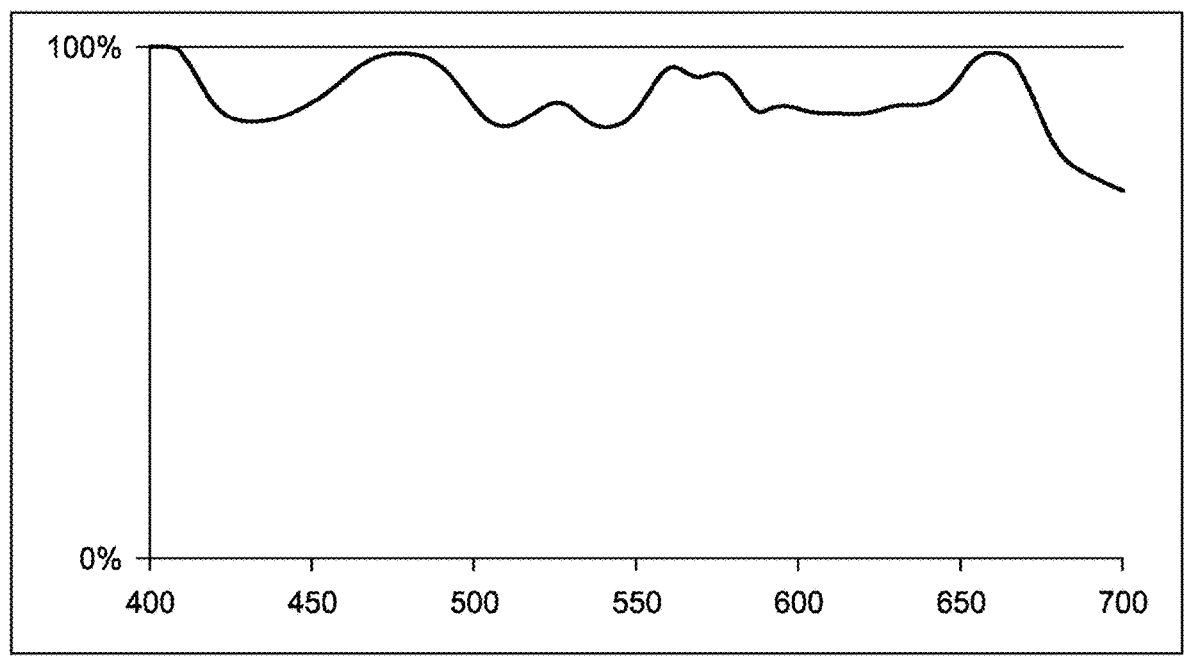
FIG. 50 is a graph showing the absorptance profile of a cast lens having an optical filter with the absorptance profile of FIG. 40 and a polarizer having a substantially neutral gray tint.
Figure 51:
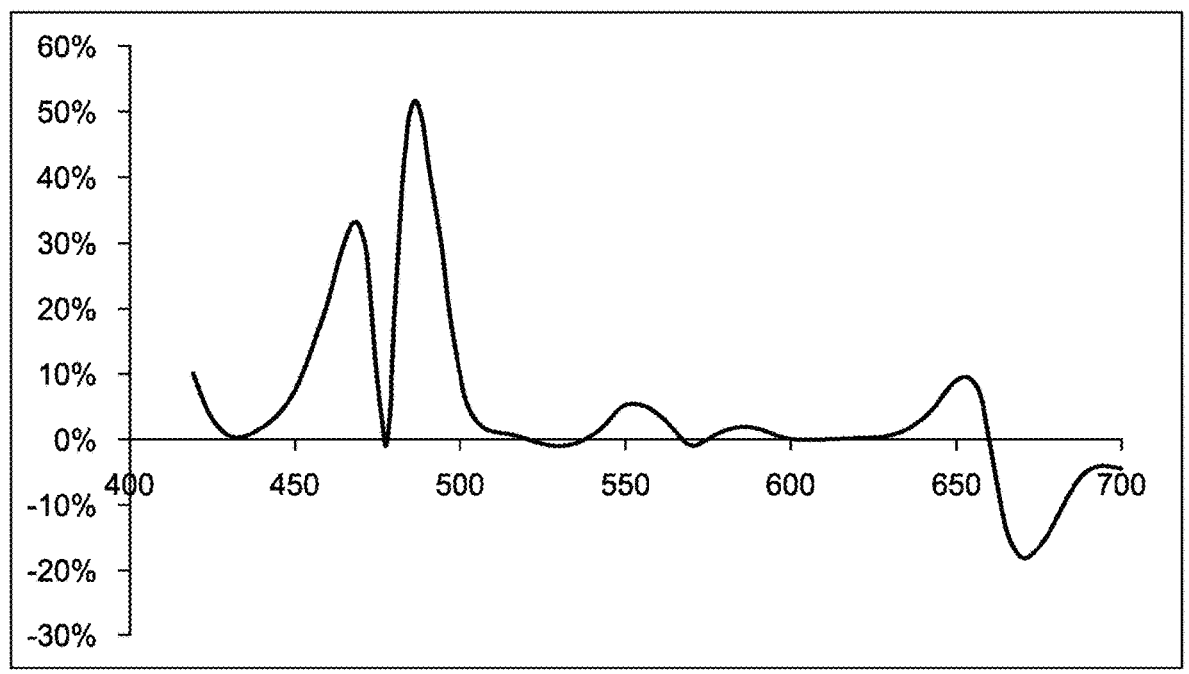
FIG. 51 is a graph showing the percentage difference in chroma of a lens with the absorptance profile shown in FIG. 50 compared to a neutral filter.
Figure 52:
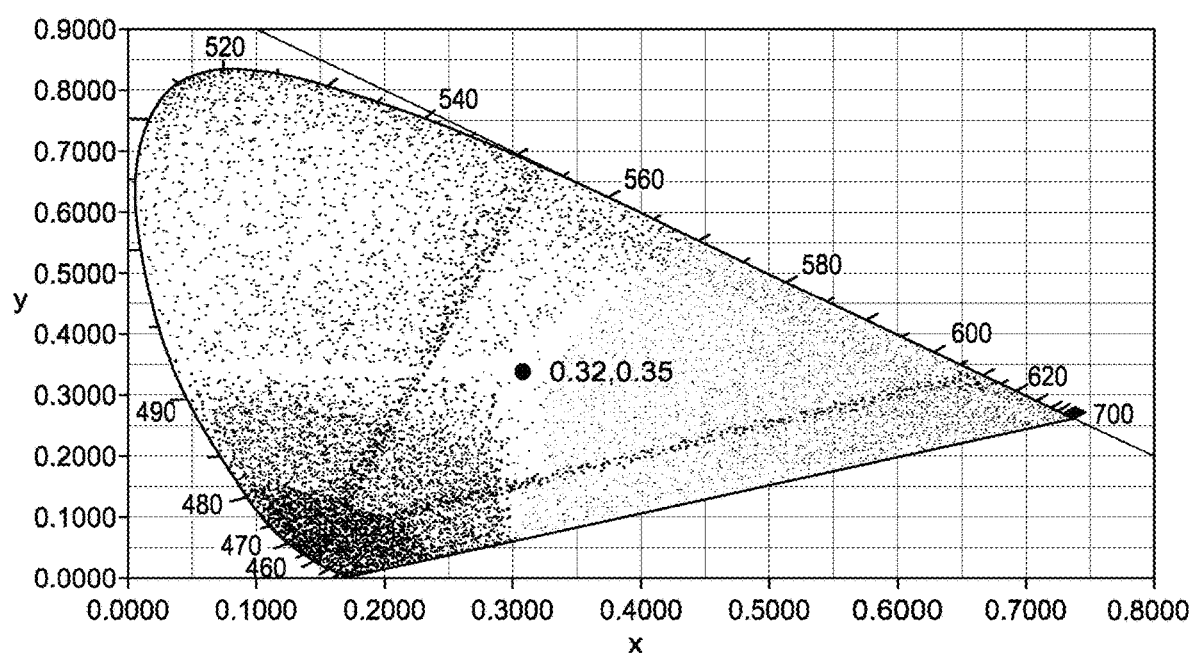
FIG. 52 is a chromaticity diagram for the lens with the optical filter shown in FIG. 50.

FIG. 50 illustrates the absorptance profile as a function of wavelength of an optical filter of FIG. 40 combined with a light-grey polarizer film where the luminous transmittance using CIE standard illuminant D65 is about 9.3%. Luminous transmittance can be measured with respect to any other suitable illuminant, such as, for example, CIE standard illuminant C. The luminous transmittance of a polarizing sunglass lens incorporating a chroma enhancement filter as disclosed herein can be less than or equal to about 15%, less than or equal to about 12%, less than or equal to about 10%, less than or equal to about 9%, greater than or equal to about 7%, greater than or equal to about 8%, between about 7%-15%, between about 7%-12%, between about 9%-12%, or another suitable value. Moreover, a lens can exhibit a heterogeneous transmittance profile having a combination of two or more transmittance regions having different transmittances. FIG. 51 shows a percentage difference in chroma between the output of a lens having the absorptance profile of FIG. 50 and the output of a filter that uniformly attenuates the same average percentage of light within each stimulus band as the lens with the absorptance profile of FIG. 50, wherein the input is a 30 nm uniform intensity stimulus and the horizontal axis indicates the center wavelength of each stimulus band. A chromaticity diagram for a lens with the absorptance profile of FIG. 50 is shown in FIG. 52.

In some embodiments, one or more of the dyes used in any filter composition disclosed herein can be replaced by one or more dyes having similar spectral attributes. For example, if a dye, such as the Exciton ABS 473 dye, is not sufficiently stable to endure the lens formation process, one or more substitute dyes with improved stability and a similar absorptance profile can be used, instead. Some lens formation processes, such as injection molding, can subject the lens and optical filter to high temperatures, high pressures, and/or chemically active materials. Replacement dyes can be selected to have similar absorptance profiles of the dyes disclosed herein but improved stability or performance. For example, a replacement dye can exhibit high stability during injection molding of the lens or high stability under sunlight. In one embodiment, at least one of two or more dyes can be used in place of Exciton ABS 473 dye. In one embodiment, Exciton ABS 473 dye was replaced with a dye that has an absorptance peak with a center wavelength and/or peak location of about 477 nm in polycarbonate. In some embodiments, the attenuation factor associated with the 477 nm absorptance peak is greater than or equal to about 0.8, greater than or equal to about 0.9, about 0.93, or another suitable value.

In some embodiments, a lens can include dyes or other materials that are selected or configured to increase the photostability of the chroma enhancing filter and other lens components. Any technique known in the art can be used to mitigate degradation of filter materials and/or other lens components.

The relative quantities of any dye formulations disclosed herein can be adjusted to achieve a desired objective, such as, for example, a desired overall lens color, a chroma-enhancing filter having particular properties, another objective, or a combination of objectives. An optical filter can be configured to have an absorptance profile with any combination of the absorptance peaks disclosed herein and/or any combination of other absorptance peaks in order to achieve desired chroma-enhancing properties. The overall lens color can be selected such that it is similar to or the same as the stimulus of an object of interest or a background stimulus for a specific activity. By matching the color of the lens to an activity-specific stimulus, the contrast (such as, for example, color contrast) of the object of interest for that activity can be increased.

As described above, FIG. 41 illustrates a chroma profile of a cast lens with an optical filter compared to the chroma profile of a neutral filter with the same average attenuation within each 30 nm stimulus band. The chroma profile of the cast lens is represented by the lighter line and is generally higher than the chroma profile of the neutral filter, which is represented by the thicker line. The cast lens is configured to provide multiple spectral regions of increased chroma compared to the neutral filter. In some embodiments, a lens includes an optical filter containing one or more organic dyes. The one or more organic dyes can increase or decrease chroma in one or more spectral regions. As shown in FIG. 41, an optical filter can be configured to increase chroma in five or more spectral ranges. The spectral ranges over which an optical filter increases or decreases chroma can be called chroma enhancement windows (CEWs).

In some embodiments, CEWs include portions of the visible spectrum in which an optical filter provides a substantial change in chroma compared to a neutral filter having the same average attenuation within each 30 nm stimulus band, as perceived by a person with normal vision. In certain cases, a substantial enhancement of chroma can be seen when a filter provides a chroma increase greater than or equal to about 2% compared to the neutral filter. In other cases, a chroma increase greater than or equal to about 3% or greater than or equal to about 5% compared to the neutral filter is considered a substantial increase. Whether a chroma change represents a substantial increase can depend on the spectral region in which the increase is provided. For example, a substantial chroma enhancement can include an increase in chroma greater than or equal to about 6% over a neutral filter when the visual stimulus is centered at about 560 nm. A substantial chroma enhancement can include an increase in chroma greater than or equal to about 3% over a neutral filter when the visual stimulus is centered at about 660 nm. A substantial chroma enhancement can include an increase in chroma greater than or equal to about 15% over a neutral filter when the visual stimulus is centered at about 570 nm. Accordingly, the amount of change in chroma relative to the neutral filter that is considered substantial can differ depending on the spectral range of the CEW.

In certain embodiments, a substantial chroma enhancement is provided by an optical filter configured to increase chroma in one or more CEWs over a neutral filter without any significant decrease in chroma compared to a neutral filter within the one or more CEWs. A substantial chroma enhancement can also be provided by an optical filter configured to increase chroma in one or more CEWs over a neutral filter without any significant decrease in chroma compared to a neutral filter within a particular spectral range, such as, for example, between about 420 nm and about 650 nm.

FIGS. 43 through 48 illustrate various CEW configurations for a variety of chroma-enhancing optical filters. The spectral ranges of the CEWs can correspond to the spectral regions where an optical filter exhibits substantially changed chroma compared to a neutral filter in one or more of FIGS. 6, 9, 12, 15, 17, 19, 22, 26, 29, 32, 35, 38, and 41. The particular CEW configurations disclosed here are non-limiting examples that illustrate the wide variety of lens or eyewear configurations that exist.

Figure 43:
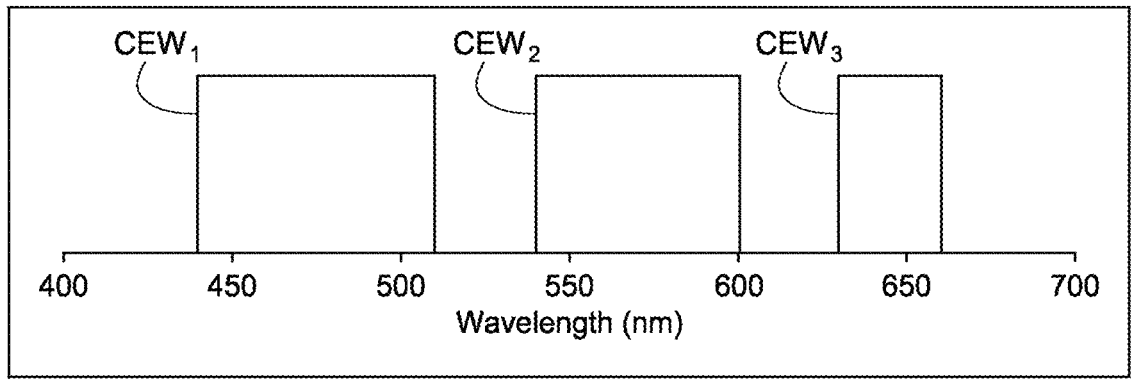
FIGS. 43-48 illustrate example chroma enhancement window configurations for optical filters.

One example of an optical filter CEW configuration is shown in FIG. 43. In this example, $CEW_1$ encompasses a spectral range of about 440 nm to about 510 nm. $CEW_2$ encompasses a spectral range of about 540 nm to about 600 nm. $CEW_3$ encompasses a spectral range of about 630 nm to about 660 nm. Each CEW can be defined as a spectral range within which a lens or eyewear is configured to provide chroma enhancement. Alternatively, the lower end of one or more CEWs can encompass a wavelength above which the lens or eyewear provides chroma enhancement. The upper end of one or more CEWs can encompass a wavelength below which the lens or eyewear provides chroma enhancement. In some embodiments, the average increase in chroma within $CEW_1$ compared to a neutral filter having the same average attenuation within each 30 nm stimulus band is greater than or equal to about 20%. The average increase in chroma within $CEW_2$ compared to the neutral filter can be greater than or equal to about 3%. The average increase in chroma within $CEW_3$ compared to a neutral filter can be greater than or equal to about 5%.

Figure 44:
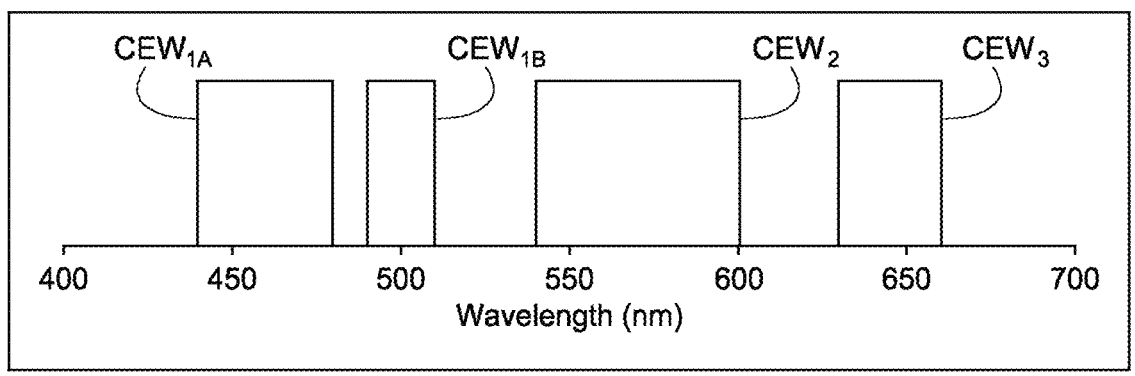

Another example of an optical filter CEW configuration is shown in FIG. 44. $CEW_{1A}$ encompasses a spectral range of about 440 nm to about 480 nm. $CEW_{1B}$ encompasses a spectral range of about 490 nm to about 510 nm. The average increase in chroma compared to a neutral filter can be greater than or equal to about 15% for the $CEW_{1A}$ region and greater than or equal to about 15% for the $CEW_{1B}$ region.

Figure 45:
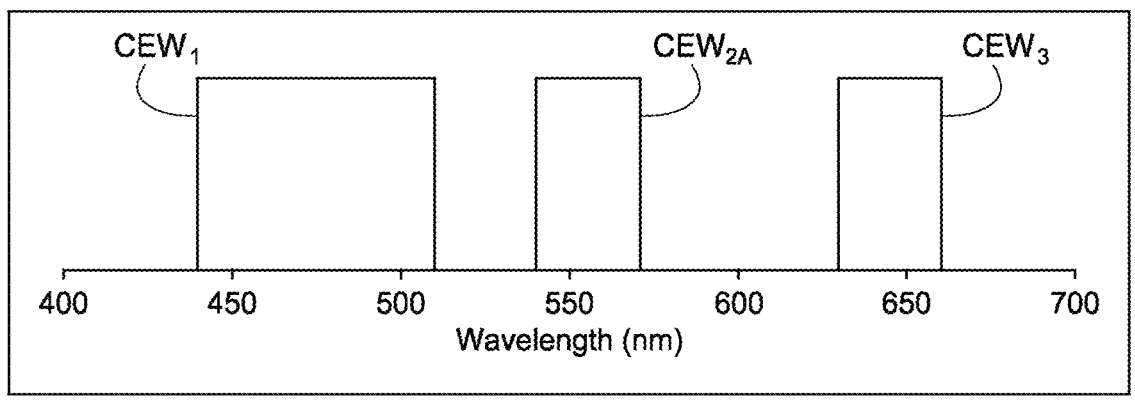
Figure 46:
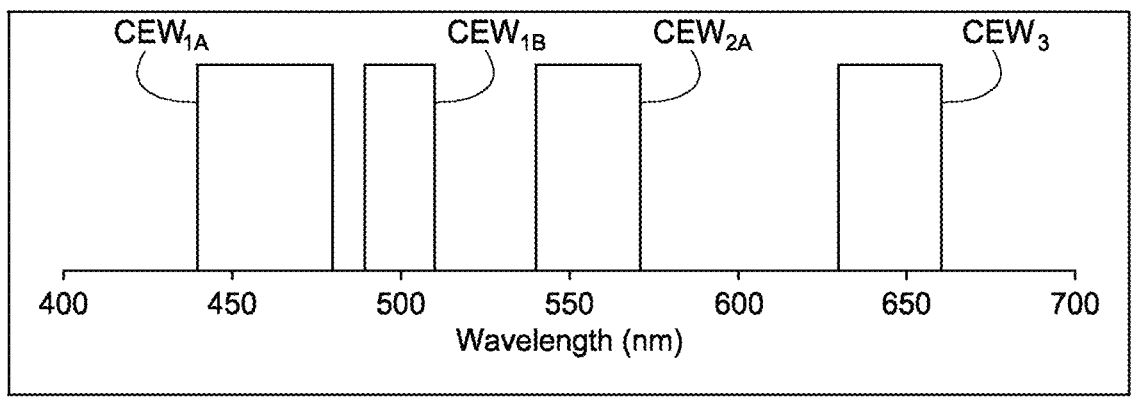

A further example of an optical filter CEW configuration is shown in FIG. 45, which is a configuration in which $CEW_{2A}$ encompasses a spectral range of about 540 nm to about 570 nm. FIG. 46 illustrates an additional embodiment in which an optical filter provides a CEW configuration including $CEW_{1A}$, $CEW_{1B}$, $CEW_{2A}$, and $CEW_3$. The average increase in chroma compared to a neutral filter can be greater than or equal to about 4% for the $CEW_{2A}$ spectral region, for example.

Figure 47:
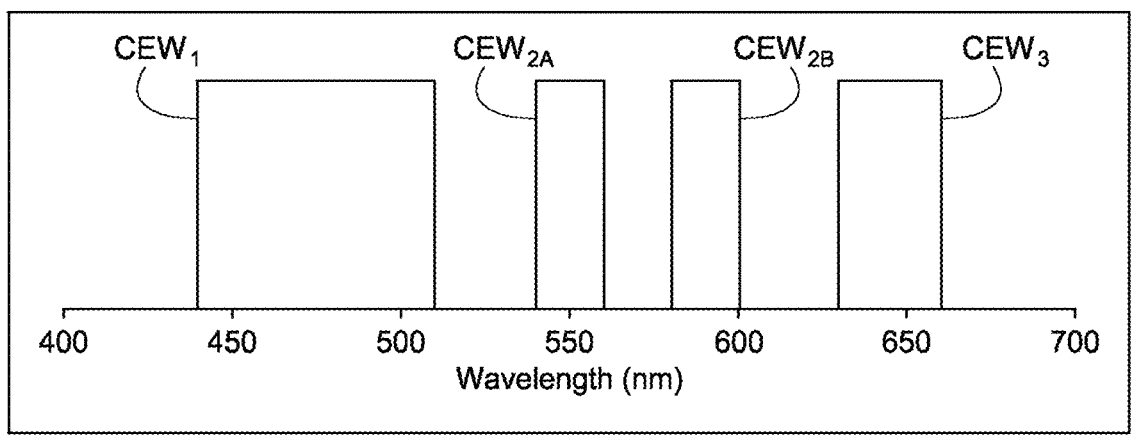
Figure 48:
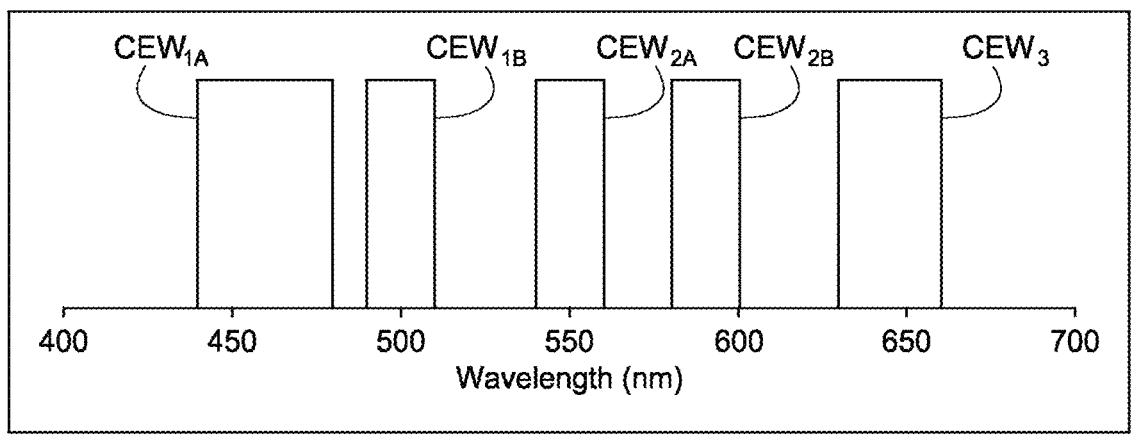

FIG. 47 illustrates an example of an optical filter CEW configuration with an additional enhancement window, $CEW_{2B}$. The $CEW_{2B}$ window encompasses a spectral range between about 580 nm and about 600 nm. The average increase in chroma compared to a neutral filter can be greater than or equal to about 2% for the $CEW_{2B}$ spectral region, for example. FIG. 48 illustrates the relative chroma enhancement of an optical filter configured to provide five or more chroma enhancement windows, including: $CEW_{2A}$, $CEW_{2B}$, $CEW_{1A}$, $CEW_{1B}$, and $CEW_3$. Each of FIGS. 43 through 48 illustrates a non-limiting example of an optical filter CEW configuration, and this disclosure should not be interpreted as limited to any specific configuration or combination of configurations.

In some embodiments, an optical filter is configured to enhance object visibility while preserving the natural appearance of viewed scenes. Such optical filters (and eyewear that include such filters) can be configured for a wide range of recreational, sporting, professional, and other activities. As a representative example, filters and eyewear can be configured to be worn while playing a game of golf.

In certain embodiments, eyewear and optical filters provide one or more CEWs corresponding to a specific activity. A filter can include one or more CEWs in a portion of the visible spectrum in which an object of interest, such as, for example, a golf ball, emits or reflects a substantial spectral stimulus. When referring to the spectral stimulus of an object of interest, a corresponding CEW can be referred to as the object spectral window. When referring to spectral stimulus of a background behind an object, a corresponding CEW can be referred to as the background spectral window. Moreover, when referring to the spectral stimulus of the general surroundings, the spectral window can be referred to as the surrounding spectral window. An optical filter can be configured such that one or more edges of an absorptance peak lie within at least one spectral window. In this way, an optical filter can enhance chroma in the spectral ranges corresponding to a given spectral stimulus (e.g. object, background, or surroundings).

Golf balls and corresponding eyewear can be provided in which a golf ball cover is configured to produce wavelength-converted light, and the eyewear includes lenses having an object chroma enhancement window corresponding to a spectral reflectance of the cover, a spectral transmittance of any transparent or translucent outer portion of the cover, and/or a spectrum of wavelength-converted light emitted by the cover.

Golf balls are provided that have a cover that is configured to wavelength-convert light that is incident at a first wavelength or in a first wavelength range. The wavelength-converted light can be emitted at longer wavelengths than the wavelength of the absorbed incident light. The wavelength-converted light has at least a portion corresponding to an object chroma enhancement window of corresponding eyewear. In representative examples, the golf balls have covers that include a fluorescent material that produces fluorescence in a spectral region corresponding to a spectral transmittance of a viewing filter. In additional embodiments, a portion of the object chroma enhancement window corresponds to a spectral region in which light is preferentially reflected by the cover.

Methods of enhancing object visibility with respect to a background include providing a filter that increases the chroma of the object to be viewed. A light spectrum produced by the filter can define an object chroma enhancement window. An optical filter is provided that includes a spectral window corresponding to the object chroma enhancement window, and a background chroma enhancement window corresponding to a reflected or emitted spectral profile of the background. An improved optical filter can provide for chroma enhancement within the spectral windows. In some embodiments, the contrast agent is a wavelength-conversion agent, a colorant, or both. In alternative examples, the optical filter includes a spectral-width window that broadens the transmission spectrum of the filter. In some particular examples, the object chroma enhancement window, the background chroma enhancement window, and the spectral-width window include wavelengths from about 440 nm to about 480 nm, about 510 nm to about 580 nm, and about 600 nm to about 660 nm, respectively. In additional examples, the windows include wavelengths between about 400 nm and about 700 nm. Lenses can include spectral windows that exhibit chroma enhancement within the same spectral ranges that define the spectral windows. In such embodiments, the lens can provide increased chroma or decreased chroma within one or more of the spectral windows discussed herein.

These and other features and aspects of certain embodiments are described below with reference to golf and other sporting and non-sporting applications. For convenience, several representative examples pertaining to golf are described, but it will be apparent that these examples can be modified in arrangement and detail for other leisure, recreational, sporting, industrial, professional, or other activities.

Viewing a golf ball's trajectory and determining its location are important to golfers of various skill levels. Trajectories of a golf ball hit by an inexperienced golfer are unpredictable and frequently place the ball in locations in which the ball is hard to find. Such failures to promptly find a golf ball can increase the time used to play a round and can reduce the number of rounds that can be played on a course in a day. Because time spent looking for errant golf balls contributes to slow play, many courses and many tournaments have rules concerning how long a golfer is permitted to search for a lost golf ball before putting a replacement ball into play. For more experienced or expert golfers, loss of a golf ball results in imposition of a penalty that adds strokes to the golfer's score. Such penalty strokes are annoying, especially when the loss of a ball results from an inability to find the ball due to poor viewing conditions and a limited time in which to search.

Figure 49:
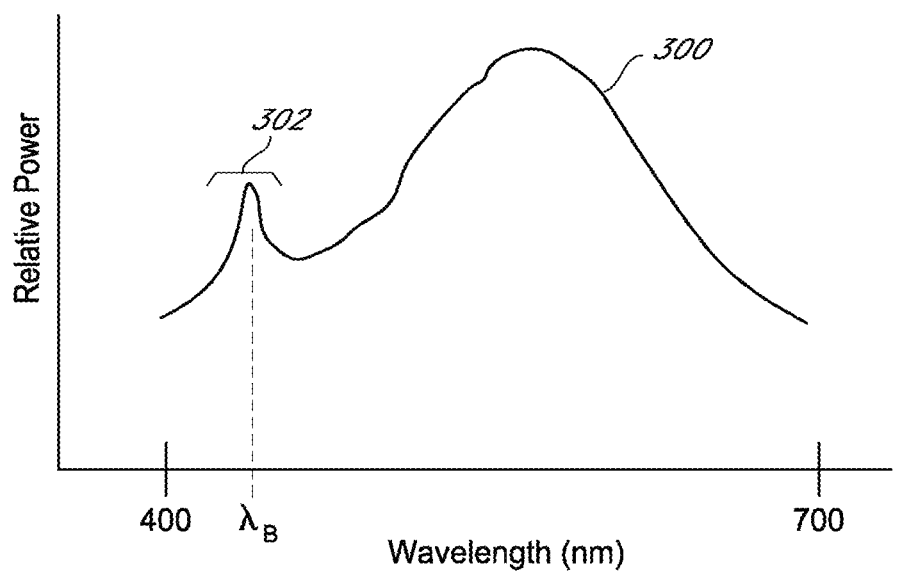
FIG. 49 illustrates a spectral power distribution representative of the light reflected or emitted from a golf ball under outdoor illumination conditions.

With reference to FIG. 49, a spectral power distribution 300 of radiation from a golf ball in outdoor illumination such as direct sunlight or other illumination conditions includes a blue-enhanced portion 302 located in a wavelength region near a wavelength $\lambda_B$. The blue-enhanced portion 302 can be produced by conversion of radiation within a range of wavelengths shorter than that of the portion 302 to radiation at wavelengths within the blue-enhanced portion 302. Such wavelength-conversion can result from fluorescence, phosphorescence, or other processes. As used herein, any process in which radiation at a shorter wavelength is converted into radiation at a longer wavelength is referred to as a wavelength-conversion process. As noted above, a typical example of such a process is fluorescence in which radiation at a first wavelength is absorbed to produce radiation at a longer wavelength. Because the human eye is less sensitive to radiation at wavelengths shorter than the wavelengths of the blue-enhanced portion 302 than to radiation within the blue-enhanced portion 302, conversion of radiation from the shorter wavelengths into longer wavelength radiation tends to make the golf ball appear whiter and brighter. The spectral power distribution of FIG. 49 corresponds to a golf ball that appears white and spectral power distributions for non-white golf balls can have additional spectral features characteristic of the golf ball's color.

Spectral power at wavelengths shorter than the suitable cutoff of human visual response at wavelengths of about 400 nm is not shown in FIG. 49. Radiation at these shorter wavelengths produces limited human visual response. Conversion of these shorter wavelengths into longer wavelengths by fluorescence or other wavelength-conversion process can produce radiation that makes an appreciable contribution to visual response. This conversion process can be enhanced by the selection of a golf ball cover that produces such wavelength-converted light or by incorporating suitable fluorescent, phosphorescent, or other wavelength-conversion agents into the golf ball cover. A typical wavelength-conversion agent produces a blue-enhanced region at a wavelength $\lambda_B$ that is typically in the range between about 440 nm to about 480 nm, but wavelength-conversion agents for other wavelength ranges can be used. If the golf ball (or other object of interest) need not appear white, colored wavelength-conversion agents can be used, such as colored fluorescent agents. In this example, $\lambda_B$ and more particularly the wavelength range in which $\lambda_B$ typically occurs (i.e. from about 440 nm to about 480 nm) represent an object spectral window.

The spectral power distribution 300 illustrated in FIG. 49 is representative of the optical radiation from a golf ball under outdoor illumination conditions. More accurate spectral power distribution values depend on the exact illumination conditions. Typical illumination conditions include illumination from direct sunlight and overcast skies as well as illumination produced in deep shadows. Under these different illumination conditions, different spectral power distributions are produced. For example, an overcast sky typically produces a spectral power distribution having less total energy as well as relatively less energy at shorter (more blue) wavelengths. Nevertheless, the spectral power distributions associated with these varying illumination conditions have corresponding blue-enhanced portions produced by wavelength-conversion processes.

Visual perception of a golf ball that produces the spectral power distribution of FIG. 49 is improved by enhancing the chroma of the blue portion 302 (the wavelength-converted portion) of the golf ball spectral power distribution. The blue-enhanced portion 302 has excess blue spectral power relative to the ambient illumination. Providing a blue light chroma enhancing filter therefore permits improved tracking and location of the golf ball. While enhancing the chroma of the blue portion 302 of the spectral power distribution of FIG. 49 permits increased golf ball visibility under many conditions, the extent of this increased visibility depends on the background in which the golf ball is viewed. For common backgrounds encountered in golf such as fairway or putting surface grasses, chroma enhancement of the blue portion 302 can increase golf ball visibility. Wearing eyewear that includes lenses that increase the chroma of the blue-enhanced portion 302 can permit the golfer to more readily follow the trajectory of a golf ball and to locate the golf ball after it has come to rest.

While such eyewear can increase golf ball visibility and permit easier tracking and location of a golf ball, altering the spectral power distribution of light passing to the golfer's eyes can produce scenes that appear unnatural or even disturbing to the golfer. During play of a typical round, the golfer encounters many different backgrounds including blue skies, overcast skies, rock, sand, dirt, and vegetation, including putting surfaces, fairways, sand traps, and rough. Eyewear that enhances the chroma of the blue portion can produce an unnatural or disturbing appearance to all or some of these surroundings, and impair the golfer's concentration or perception. Such unnatural appearances can offset any performance advantage associated with increased golf ball visibility.

More natural appearing viewing can be obtained with an embodiment of an optical filter having a spectral absorptance profile as illustrated in FIG. 40. Such an embodiment provides improved golf ball visibility while maintaining a natural appearance of scenes viewed through such a filter. As used herein, a spectral region in which an object emits or reflects a substantial spectral stimulus is referred to as a spectral window. A width of a spectral window can be defined as the full width at about 75%, 50%, 25%, 20%, 10%, or 5% of a maximum in the spectral power distribution. A golf ball can include a blue light stimulus at and around $\lambda_B$ and one or more additional spectral windows in the green and red portions of the spectrum.

A filter can include a chroma-enhancing window (CEW) that is configured to enhance the chroma within a portion, substantially all, or the entire spectral window of a visual stimulus. An optical filter can provide one or more edges of an absorptance peak within the spectral windows where a stimulus is located. For example, the spectral location of a blue light CEW can be selected to correspond to a particular fluorescent agent so that eyewear can be spectrally matched to a particular fluorescent agent. Thus, eyewear and golf balls can be spectrally matched to provide enhanced golf ball visibility. Light at wavelengths below about 440 nm can be attenuated so that potentially harmful short wavelength radiation does not enter the eye. For example, some of this short wavelength radiation can be converted by the fluorescent agent to radiation at wavelengths corresponding to a blue light CEW. The average visible light transmittance of a golf lens can be about 20%-30%. Filters for outdoor use typically have average transmittances between about 8%-80%, 10%-60%, or 10%-40%. Filters for indoor use (or use at illumination levels lower than normal daylight illumination) can have average transmittances between about 20%-90%, 25%-80%, or 40%-60%.

Green grass and vegetation typically provide a reflected or emitted spectral stimulus with a light intensity maximum at a wavelength of about 550 nm. As mentioned above, wavelengths from about 500 nm to about 600 nm can define a green or background spectral window. Without a green light CEW, light at wavelengths between 500 nm and 600 nm can have lower chroma than desired, and vegetation can appear relatively muted, drab, or dark. As a result, the golfer's surroundings would appear unnatural and the golfer's perception of vegetation would be impaired. This impairment is especially serious with respect to putting because the golfer generally tries to precisely determine various parameters of the putting surface, including height and thickness of the grass covering the putting surface, orientation of the blades of grass of the putting surface, and the surface topography. Because a golfer takes about one-half of her strokes at or near putting surfaces, any visual impairments at putting surfaces are serious performance disadvantages and are generally unacceptable. Misperception of vegetation is also a significant disadvantage when playing out of a fairway or rough. A green light CEW, in combination with a blue light CEW, permits enhanced golf ball visibility while permitting accurate assessment of background surfaces such as putting surfaces or other vegetation. An optical filter can enhance the chroma of a desired object and background by exhibiting at least one edge of an absorptance peak within one or both of the green light CEW and the blue light CEW. The concurrence of at least one edge of an absorptance peak within one or both of the green or blue spectral windows further aids the human eye in distinguishing a golf ball from its surroundings by enhancing the chroma of the ball, the chroma of the vegetation, or the chroma of both the ball and vegetation.

A red light CEW can extend over a wavelength range from about 610 nm to about 720 nm, but the transmission of radiation at wavelengths beyond about 700 nm provides only a small contribution to a viewed scene because of the low sensitivity of the human eye at these wavelengths. A red light CEW can enhance the natural appearance of scenery viewed with an embodiment of an improved optical filter by enhancing the chroma of at least some red light reflected by vegetation. For example, chroma enhancement can be seen in FIG. 40, where at least one edge of the red absorptance peak (e.g., the absorptance peak between about 630 nm and about 660 nm) falls within the red light CEW. The more polychromatic light produced by enhancing the chroma of red, green, and blue components of light permits improved focus. In addition, convergence (pointing of the eyes to a common point) and focusing (accommodation) are interdependent, so that improved focusing permits improved convergence and improved depth perception. Providing CEWs in the green and red portions of the visible spectrum can result in improved depth perception as well as improved focus. A filter having such CEWs can improve perception of vegetation (especially putting surfaces) and provide more natural looking scenery while retaining the enhanced golf ball visibility associated with the blue light CEW. An optical filter that provides at least one edge of an absorption peak within a CEW can enhance the quality of the light transmitted through the optical filter by increasing its chroma value.

Optical filters having CEWs covering one or more spectral ranges can provide enhanced visibility. Optical filters having such a spectral profile can be selected for a particular application based on ease of fabrication or a desire for the optical filter to appear neutral. For cosmetic reasons, it can be desirable to avoid eyewear that appears tinted to others.

Optical filters can be similarly configured for a variety of activities in which tracking and observation of an object against a background is facilitated by wavelength-conversion. Such filters can include a wavelength-conversion window, a background window, and a spectral-width window. These CEWs are selected to enhance the chroma of wavelength-converted light, light from activity-specific backgrounds, and light at additional wavelengths to further extend the total spectral width of chroma-enhanced light to improve focus, accommodation, or provide more natural viewing. For application to a white golf ball as described above, an optical filter is provided with a blue light CEW corresponding to wavelength-conversion spectral components, a green light CEW to facilitate viewing of a background, and a red light CEW to improve accommodation and the natural appearance of scenes. Such an optical filter can have a substantially neutral color density. For other activities, particular CEWs can be chosen based on expected or measured background colors and wavelengths produced by a wavelength-conversion process. For example, tennis is often played on a green playing surface with a yellow ball. Such a ball typically has a wavelength conversion region that produces wavelength-converted light at wavelengths between about 460 nm and 540 nm. An example filter for such an application has a wavelength-conversion window at between about 460 nm and 540 nm, and a background window centered at about 550 nm. The wavelength-conversion window and the background window can have some overlap. To provide more natural contrast and better focus, additional transmission windows can be provided in wavelength ranges of about 440 nm to about 460 nm, from about 620 nm to about 700 nm, or in other ranges.

In alternative embodiments, an optical filter having an object-specific spectral window in addition to or instead of a wavelength-conversion window is provided. For example, for viewing of a golf ball that appears red, the optical filter can include a red light CEW that enhances the chroma of red light to improve golf ball visibility. For natural, accurate viewing of backgrounds (such as putting surfaces), a green light CEW is also provided. If the golf ball also emits wavelength converted light, an additional wavelength-conversion window can be provided, if desired. The filter can also include a spectral-width window.

In some embodiments, an optical filter is configured to change the chroma values of a scene in one or more spectral regions in which an object and/or a background reflect or emit light. An optical filter can be configured to account for spectral regions where an object of interest and the background reflect or emit light. Absorptance peaks can be positioned such that chroma is increased or decreased in one or more spectral regions where the object of interest is reflecting or emitting light and where the background is reflecting or emitting light. For example, chroma enhancement within an object or a background spectral window can be obtained by configuring an optical filter such that at least one edge of an absorptance peak is positioned within the spectral window.

An optical filter can increase contrast between the object and the background by providing chroma enhancement in one or both of the object spectral window and the background spectral window. Color contrast improves when chroma is increased. For example, when a white golf ball is viewed against a background of green grass or foliage at a distance, chroma enhancement technology can cause the green visual stimulus to be more narrowband. A narrowed spectral stimulus causes the green background to appear less washed out, resulting in greater color contrast between the golf ball and the background.

With reference to FIGS. 1A and 1B, eyewear can include a frame and lenses 102a and 102b. The lenses 102a and 102b have a filter that enhances chroma in a wavelength-conversion window, a background-window, a spectral-width window, another CEW, or any combination of CEWs. For some applications, the spectral-width window can be omitted. For other applications, an object-specific spectral window is provided that can include the wavelength-conversion window. The lenses 102a and 102b can be corrective lenses or non-corrective lenses and can be made of any of a variety of optical materials including glasses or plastics such as acrylics or polycarbonates. The lenses can have various shapes, including plano-plano and meniscus shapes. In alternative eyewear, a frame is configured to retain a unitary lens that is placed in front of both eyes when the eyewear is worn. Goggles can also be provided that include a unitary lens that is placed in front of both eyes when the goggles are worn.

The spectral transmittance profile and chroma enhancement of the lenses of FIGS. 1A and 1B can be obtained in several ways. A coating can be provided to one or more surfaces of the lenses. Such coatings typically include one or more layers of coating materials configured to achieve a desired spectral transmittance and chroma enhancement. The layers can be absorptive so that radiation from spectral regions that are to be attenuated is absorbed in the coating, or the coating can be reflective so that radiation at such wavelengths is reflected. In yet another example, one or more dyes or other chromophores can be incorporated within the lens material by a dyeing process or another process. Two or more of the above methods can be combined to produce the desired spectral and chroma characteristics.

While embodiments are described above with reference to particular activities, additional examples can be provided for other activities. For example, a chroma-enhancing, enhanced-visibility filter can be provided for sports such as baseball, tennis, badminton, basketball, racquetball, handball, archery, target shooting, trap shooting, cricket, lacrosse, football, ice hockey, field hockey, hunting, soccer, squash, or volleyball. For such sports, such a filter can include an object chroma enhancement window selected to increase the chroma of natural reflected light or wavelength-converted light produced by a fluorescent agent in a baseball, tennis ball, badminton birdie, or volleyball or light that is preferentially reflected by these objects. Background windows and spectral-width windows can be provided so that backgrounds are apparent, scenes appear natural, and the wearer's focus and depth perception are improved. For sports played on various surfaces, or in different settings such as tennis or volleyball, different background windows can be provided for play on different surfaces. For example, tennis is commonly played on grass courts or clay courts, and filters can be configured for each surface, if desired. As another example, ice hockey can be played on an ice surface that is provided with a wavelength-conversion agent or colorant, and lenses can be configured for viewing a hockey puck with respect to such ice. Outdoor volleyball benefits from accurate viewing of a volleyball against a blue sky, and the background filter can be selected to permit accurate background viewing while enhancing chroma in outdoor lighting. A different configuration can be provided for indoor volleyball. Eyewear that includes such filters can be activity-specific, surface-specific, or setting-specific. In addition, tinted eyewear can be provided for activities other than sports in which it is desirable to identify, locate, or track an object against backgrounds associated with the activity. Some representative activities include dentistry, surgery, bird watching, fishing, or search and rescue operations. Such filters can also be provided in additional configurations such as filters for still and video cameras, or as viewing screens that are placed for the use of spectators or other observers. Filters can be provided as lenses, unitary lenses, or as face shields. For example, a filter for hockey can be included in a face shield.

In certain embodiments, an optical filter includes one or more chroma enhancement dyes that provide absorptance peaks with a relatively high attenuation factor. As used herein, the term "chroma enhancement dyes" includes dyes that, when loaded in a lens in sufficient quantity, produces a discernable and/or substantial chroma-enhancing effect in at least certain types of scenes viewed by a wearer of eyewear incorporating the lens. Chroma enhancement dyes include dyes that feature an absorptance or absorbance peak with a high attenuation factor (e.g., greater than or equal to about 0.8, greater than or equal to about 0.9, or greater than or equal to about 0.95) and a center wavelength and/or peak position located within at least one chroma enhancement window. In some embodiments, an optical filter for chroma enhancing eyewear includes two or more of the following: violet chroma enhancement dye, blue chroma enhancement dye, green chroma enhancement dye, yellow chroma enhancement dye, and red chroma enhancement dye. In some embodiments, a chroma-enhancing lens includes an optical filter incorporating one or more dyes that are thermally unstable at typical lens body molding temperatures.

Violet chroma enhancement dyes include dyes that have a relatively sharp absorptance peak with a wavelength between about 390 nm and about 440 nm, between about 405 nm and about 455 nm, between about 400 nm and about 420 nm, or between about 405 nm and 425 nm. Examples of such dyes include the Exciton ABS 407 dye, the Crysta-Lyn DLS 402A dye, and a dye that has one or more relatively sharp absorptance peaks within the violet portion of the spectrum. When incorporated into a chroma enhancing filter, chroma enhancement dyes can provide one or more absorptance peaks having any of the characteristics described herein, such as, for example, a bandwidth of greater than or equal to about 15 nm or greater than or equal to about 20 nm. Absorptance peaks that are relatively sharp can include absorptance peaks with a relatively high attenuation factor. Examples of relatively sharp absorptance peaks include peaks with an attenuation factor greater than or equal to about 0.8, greater than or equal to about 0.85, greater than or equal to about 0.9, or greater than or equal to about 0.95. Dyes that have relatively sharp absorptance peaks include dyes that can be used to create one or more spectral features of at least some of the chroma enhancing filters disclosed herein.

Blue chroma enhancement dyes include dyes that have a relatively sharp absorptance peak with a wavelength between about 440 nm and about 490 nm, between about 445 nm and about 480 nm, between about 460 nm and about 480 nm, or between about 450 nm and 475 nm. In some embodiments, a blue chroma enhancement dye, when incorporated into an optical filter, is configured to produce an absorptance peak with a bandwidth of greater than or equal to about 15 nm or greater than or equal to about 20 nm. Examples of such dyes include the Exciton ABS 473 dye, the Crysta-Lyn DLS 461B dye, and a dye that has one or more relatively sharp absorptance peaks within the blue portion of the spectrum. In some embodiments, a blue chroma enhancement dye is a dye that has a relatively sharp absorptance peak within one or more of the chroma enhancement windows $CEW_1$, $CEW_{1A}$, or $CEW_{1B}$.

Green chroma enhancement dyes include dyes that have a relatively sharp absorptance peak with a wavelength between about 520 nm and about 570 nm, between about 558 nm and about 580 nm, between about 540 nm and about 580 nm, or between about 540 nm and 565 nm. In some embodiments, a green chroma enhancement dye, when incorporated into an optical filter, is configured to produce an absorptance peak with a bandwidth of greater than or equal to about 15 nm or greater than or equal to about 20 nm. Examples of such dyes include the Exciton ABS 561 dye, the Crysta-Lyn DLS 564B dye, and a dye that has one or more relatively sharp absorptance peaks within the green portion of the spectrum. In some embodiments, a green chroma enhancement dye is a dye that has a relatively sharp absorptance peak within one or more of the chroma enhancement windows $CEW_2$ or $CEW_{2A}$.

Yellow chroma enhancement dyes include dyes that have a relatively sharp absorptance peak with a wavelength between about 570 nm and about 590 nm, between about 580 nm and about 600 nm, or between about 570 nm and about 580 nm. In some embodiments, a yellow chroma enhancement dye, when incorporated into an optical filter, is configured to produce an absorptance peak with a bandwidth of greater than or equal to about 15 nm or greater than or equal to about 20 nm. Examples of such dyes include the Exciton ABS 574 dye, and a dye that has one or more relatively sharp absorptance peaks within the yellow portion of the spectrum. In some embodiments, a yellow chroma enhancement dye is a dye that has a relatively sharp absorptance peak within one of the chroma enhancement windows $CEW_2$ or $CEW_{2B}$.

Red chroma enhancement dyes include dyes that have a relatively sharp absorptance peak with a wavelength between about 600 nm and about 680 nm, between about 630 nm and about 660 nm, between about 640 nm and about 670 nm, or between about 600 nm and 660 nm. In some embodiments, a red chroma enhancement dye, when incorporated into an optical filter, is configured to produce an absorptance peak with a bandwidth of greater than or equal to about 15 nm or greater than or equal to about 20 nm. Examples of such dyes include the Exciton ABS 659 dye, the Crysta-Lyn DLS 654B dye, and a dye that has one or more relatively sharp absorptance peaks within the red portion of the spectrum. In some embodiments, a red chroma enhancement dye is a dye that has a relatively sharp absorptance peak within the chroma enhancement window $CEW_3$.

Information related to certain example chroma enhancement dyes from Exciton is shown in Table C. Information related to certain example chroma enhancement dyes from the Crysta-Lyn Chemical Company is shown in Table D.

Figure 53:
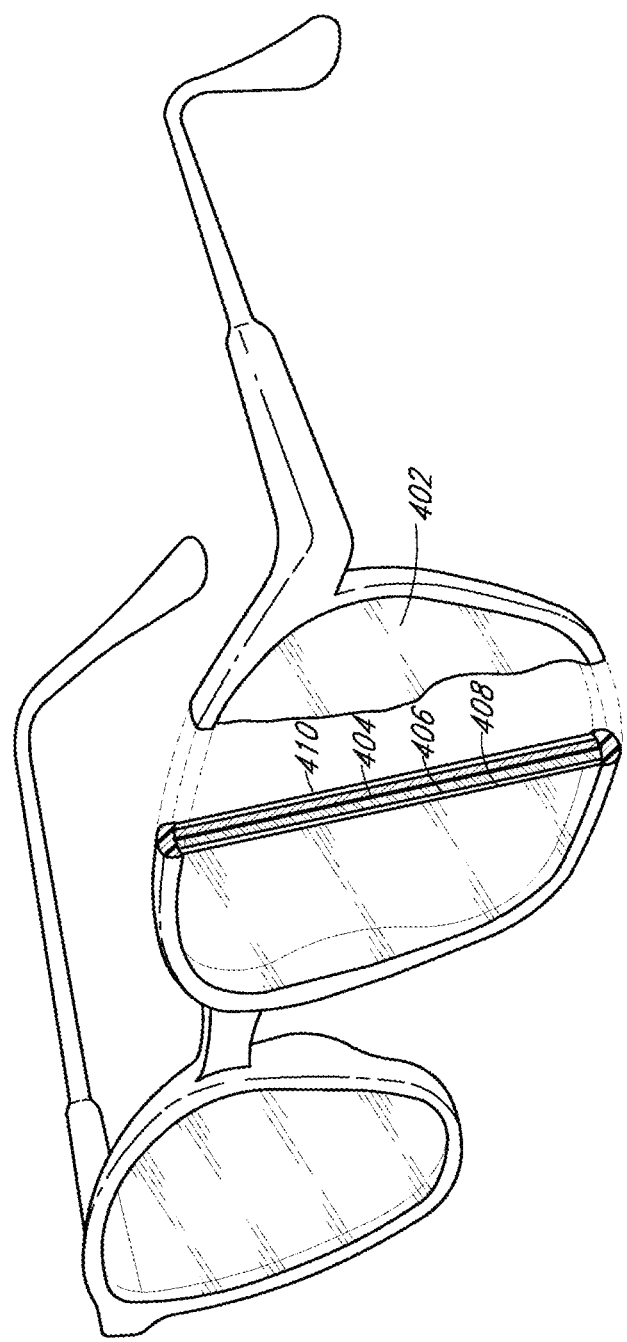
FIG. 53 is a perspective view of a pair of spectacles incorporating lenses with a chroma-enhancing optical filter with a cutaway view of one of the lenses.

FIG. 53 illustrates an example embodiment of a lens providing chroma enhancement. The lens 402 includes a lens body 404 and a laminate 406. The laminate 406 and the lens body 404 are bonded together. In some embodiments, the laminate 406 and the lens body 404 can be integrally connected to each other and can be adhesively bonded together. In some embodiments, the lens 402 includes a first lens coating 408 and not a second lens coating 410. In certain embodiments, the lens 402 includes both a first lens coating 408 and a second lens coating 410. In some embodiments, the lens 402 includes a second lens coating 410 and not a first lens coating 408. In certain embodiments, the lens 402 includes no lens coating.

The laminate 406 can comprise a single layer or multiple layers. The laminate 406 can have one or more layers in single or multiple layer form that can be coated with a hard coating or a primer. For example, the laminate can be a single layer of polycarbonate, PET, polyethylene, acrylic, nylon, polyurethane, polyimide, another film material, or a combination of materials. As another example, the laminate can comprise multiple layers of film, where each film layer

TABLE C

| Example dyes | Example center λ (nm) | Example melting pt. (° C.) | Example solubilities in solvents (gm/L) | Example strength (L/gm · cm) |
|---|---|---|---|---|
| Violet chroma enhancement dye | 407 ± 1 | >300 | 24 (chloroform)<br>3.5 (toluene)<br>4.8 (cyclohexanone) | >490 (methylene chloride at 407 nm peak) |
| Blue chroma enhancement dye | 473 ± 2 | >200 | 9 (cyclopentanone)<br>16 (methylene chloride)<br>25 (chloroform)<br>14 (toluene) | 175 (methylene chloride) |
| Green chroma enhancement dye | 561 ± 2 | >300 | 1.1 (methylene chloride)<br>0.6 (toluene)<br>2.6 (chloroform)<br>0.3 (cyclohexane)<br>0.15 (methyl ethyl ketone) | 44 (methylene chloride) |
| Yellow chroma enhancement dye | 574 ± 2 | >300 | 28 (methylene chloride)<br>7.5 (hexane)<br>2.8 (toluene)<br>0.467 (acetone) | 183 (methylene chloride) |
| Red chroma enhancement dye | 660 ± 2 | >300 | Highest in chlorinated solvents, e.g., chloroform | >320 (chloroform) |

TABLE D

| Example dyes | Peak λ (nm) | Melting Pt. (° C.) |
|---|---|---|
| Blue chroma enhancement dye | 461 | 257 |
| Green chroma enhancement dye | 564 | 242 |
| Red chroma enhancement dye | 654 | 223 |

In some embodiments, a lens comprises an injection molded, polymeric lens having a concave surface and a convex surface, and a laminate bonded to the injection molded, polymeric lens. The laminate can include a first polymeric layer, a base layer, and a second polymeric layer, the first polymeric layer being bonded to the convex surface of the injection molded, polymeric lens. The polymeric lens can include a copolymer resin. In some embodiments, the first polymeric layer is directly bonded to the polymeric lens. In certain embodiments, the first polymeric layer is adhesively bonded to the polymeric lens. The base layer can at least partially incorporate an optical filter layer. The lens can be corrective or non-corrective. The lens can have any suitable shape, including, for example, plano-plano, meniscus, cylindrical, spherical, another shape, or a combination of shapes.

comprises polycarbonate, PET, polyethylene, acrylic, nylon, polyurethane, polyimide, another film material, or a combination of materials.

The first lens coating 408 or second lens coating 410 can be a transition layer between the laminate 406 and the lens body 404. The transition layer can assist in matching the optical index of the laminate 406 and the lens body 404. In some embodiments, the transition layer can improve adhesion between the layers or improve other properties of the lens.

The lens 402 can be of any desired shape. For example, the lens 402 can have 1 axis of curvature or 2 axes of curvature, the lens can be cylindrical, parabolic, spherical, flat, or elliptical, or any other shape such as a meniscus or catenoid. The lens 402 can also be corrective or non-corrective.

In some embodiments of the lens 402 depicted in FIG. 53, the optical filter is partially incorporated into the lens body 404. In certain embodiments, the optical filter can be partially incorporated into the laminate 406. The laminate 406 includes one or more chroma enhancement dyes configured to attenuate visible light passing through the lens 402 in one or more spectral bands. In certain embodiments, the laminate 406 includes one or more blue chroma enhancement dyes. In some embodiments, the laminate 406 can incorporate one or more violet chroma enhancement dyes. In some embodiments, the laminate 406 can incorporate one or more yellow chroma enhancement dyes. In some embodiments, the laminate 406 can incorporate one or more red chroma enhancement dyes. In some embodiments, the laminate 406 can incorporate one or more green chroma enhancement dyes. It is to be understood that the laminate 406 can incorporate any permutation of violet, blue, green, yellow, and/or red chroma enhancement dyes to achieve one or more desired optical properties. In some embodiments, the lens body 404 can incorporate one or more violet, blue, green, yellow, and/or red chroma enhancement dyes.

Figure 54:
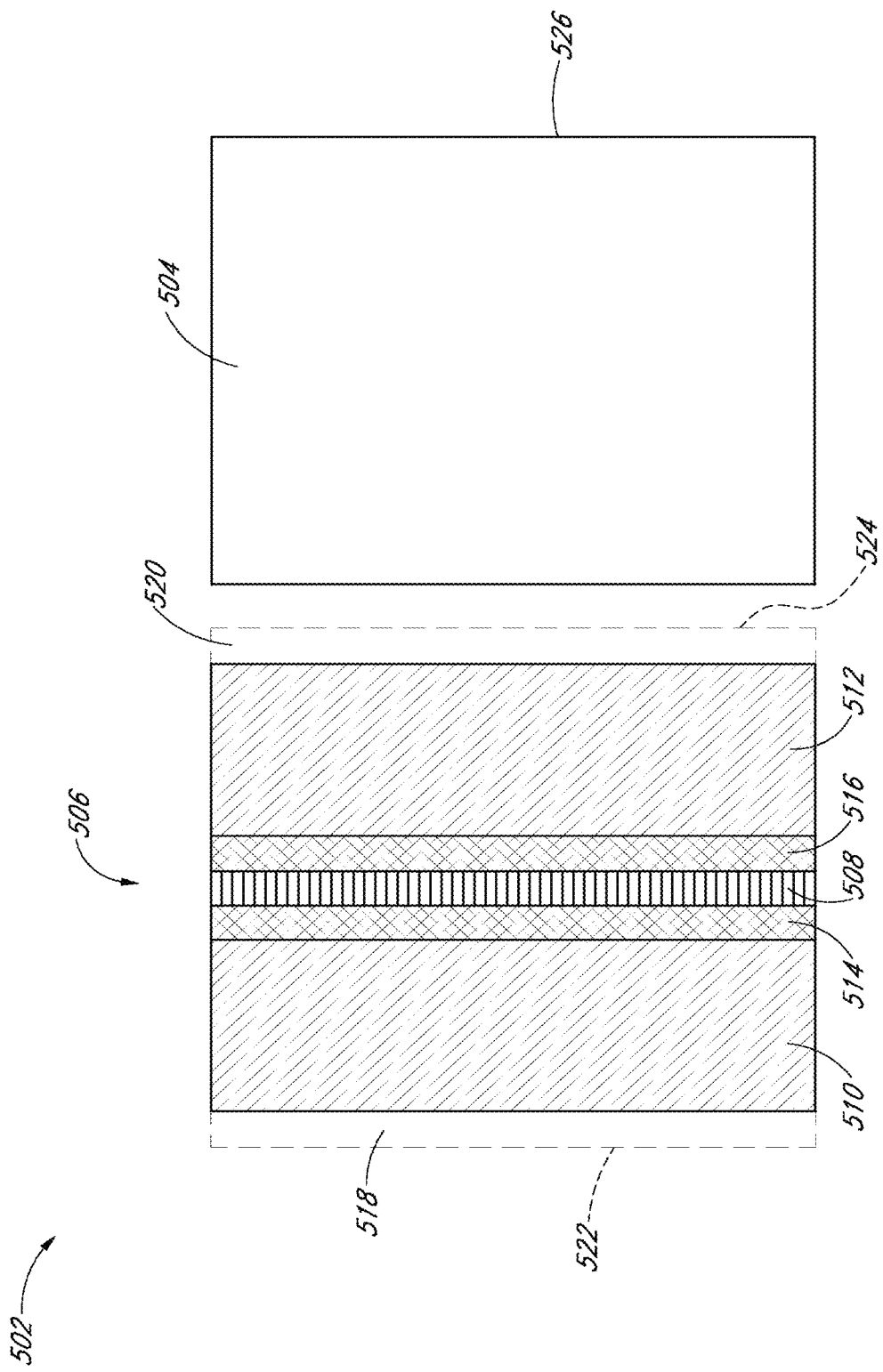
FIG. 54 is a sectional view of one embodiment of a lens having a lens body and a laminate.

As depicted in FIG. 54, a lens can include a laminate 506 and a lens body 504. The laminate 506 can include a base layer 508 that is attached to a first polymeric layer 510. The laminate 506 can include a second polymeric layer 512 such that the base layer 508 is sandwiched between the first polymeric layer 510 and the second polymeric layer 512. The laminate 506 can also include a first bonding layer 514 situated in between the first polymeric layer 510 and the base layer 508. The laminate 506 can also include a second bonding layer 516 situated between the second polymeric layer 512 and the base layer 508. The laminate 506 can also include a first lens coating 518 disposed on the first polymeric layer 510. The laminate 506 can also include a second lens coating 520 disposed on the second polymeric layer 512. In certain embodiments, the second lens coating can also be disposed on either side of the lens body 504.

The first or second polymeric layers 510, 512, if present, and the base layer 508, if present, can serve various functions within the lens 502. For example, one or more of the polymeric layers can serve to thermally insulate the base layer 508 such that the laminate 506 can be used in high temperature molding processes without subjecting the base layer 508 to temperatures sufficient to significantly degrade the optical performance of the base layer 508 or one or more materials within the base layer 508. In some embodiments, one or more layers in the laminate 506 can provide optical properties to the lens 502 such as optical filtering, polarization, or photochromism. In some embodiments, one or more polymeric layers 510, 512, one or more lens coatings 518, 520, or one or more bonding layers 514, 516 can provide mechanical protection to the lens 502 or other layers within the laminate 506, reduce stresses within the laminate 506, or improve bonding or adhesion among the layers in the laminate 506 and/or between the laminate 506 and the lens body 504. In some embodiments, one or more polymeric layers 510, 512, one or more lens coatings 518, 520, or one or more bonding layers 514, 516 can provide additional functionality such as anti-reflection functionality, anti-static functionality, anti-fog functionality, scratch resistance, mechanical durability, hydrophobic functionality, reflective functionality, darkening functionality, or aesthetic functionality including tinting.

The lens body 504 of the lens 502 can be contoured during initial formation to have an optical magnification characteristic that modifies the focal power of the lens 502. In some embodiments, the lens body 504 can be machined after initial formation to modify the focal power of the lens 502. The lens body 504 provides a substantial amount of the optical power and magnification characteristics to the lens 502. The base layer 508 inherently affects the optical power and magnification characteristics of the lens 502 since the laminate 506 contributes to the overall thickness of the lens 502. In some embodiments, the lens body 504 provides the majority of the lens 502 optical power and magnification characteristics. Apportioning the majority of optical power and magnification to the lens body 504 can permit selection of lens body 504 materials and lens body 504 formation techniques that provide improved lens 502 optical power and magnification characteristics, without adversely affecting selection of laminate 506 materials and formation techniques.

Though not depicted in FIG. 54, the base layer 508 can be structured in a variety of ways, such as in composite or multi-layer fashion. For example, the base layer 508 can be structured to include one or more chroma enhancement dyes (not shown) that increase the chroma of a scene as compared to the chroma of a substantially unfiltered scene. As another example, the base layer 508 can include multiple film portions (not shown) such as a chroma enhancing film portion, a polarizing film portion, and/or a photochromic film portion that are laminated together using a suitable technique.

An optical filter can be incorporated into the base layer 508. The laminate 506 that includes the optical filter can then be included in a mold, such as an injection mold, so that the film 508 with the optical filter is integrally molded as part of the lens 502. Furthermore, one or more additional elements such as photochromic, polarizing, abrasion-resistant, or tinting elements, can be incorporated into the base layer 508 and integrally molded as part of the lens 502. The elements can be made by many convenient manufacturing processes, including but not limited to lamination of the layers, adhesive securement of the individual layers, and extrusion of one or more layers (or all three layers) to form the three layer element (referred to as a laminate, but available for manufacture, as noted above, by processes in addition to lamination). In some embodiments, a method of making the laminate includes extruding layers in sequence or at the same time in the appropriate order of layers. The center layer of the three layers should be the film layer so that a layer furthest from the lens body acts as a scratch resistant or protective layer, and the layer closest to the lens body acts as a cushion or tying layer to the lens body. It is structurally possible to use a two layer laminate (with the topmost protective polymeric layer and the lens body) by using a dry film adhesive or liquid adhesive between the lens body and the film layer.

The base layer 508 can incorporate one or more chroma enhancement dyes. The base layer 508 operates to put the chroma enhancing properties of the optical filter in working relation with the lens body 504. Other properties of interest can be incorporated into the film layer, such as aesthetic properties like lens decor, indicia, tint and color. Still further examples of properties of interest can include durability features, such as hardness, abrasion resistance, and chemical resistance. In some embodiments, the base layer 508 includes one or more chroma enhancement dyes configured to significantly attenuate the light passing through the lens 502 within one or more chroma enhancement windows. Portions of the laminate 506 can provide optical properties to the lens 502 such as optical filtering, polarization, or photochromism.

The base layer 508 can include a base film (not shown) and one or more chroma enhancement dyes configured to enhance the chroma of a scene when compared to a substantially unfiltered scene (not shown) that are incorporated into or onto the base film. When the base layer 508 comprises more than a film that at least partially incorporates the optical filter, the base layer 508 can include more than one base film (not shown). In some embodiments, the base layer 508 can include one or more chroma enhancement dyes configured to increase the chroma within one or more chroma enhancing windows (not shown) and a base resin (not shown), with the one or more chroma enhancement dyes and the base resin being homogeneously blended together prior to formation of base layer 508 from the medium/resin mixture. Besides the base layer 508, the laminate 506 includes the first polymeric layer 510 and can include the second polymeric layer 512. If the second polymeric layer 512 is included, the first and second polymeric layers 510, 512 are located on opposing sides of the base layer 508.

In some embodiments, the base layer 508 includes one or more chroma enhancement dyes. In certain embodiments, the base film or resin can be a polycarbonate. In certain embodiments, the base film or resin is of the polyvinyl acetate-type. Specific examples of suitable resins of either the base film or the base resin include polycarbonate, polyvinyl acetate, polyimide, PET, nylon, polyvinyl alcohol, polyurethane, acrylic, polyvinyl, formal, polyvinyl acetal, and saponified (ethylene/vinyl acetate) copolymer film.

The amount of dye dissolved into the film or resinous material can be an amount sufficient such that the base layer 508 has the spectral profile that is configured to produce chroma-enhanced scenes as described in one or more embodiments described herein. The amount of dye dissolved in the material can be, for example, sufficient to provide significant attenuation within one or more chroma enhancement windows and less than or equal to the solubility limit of the dye in the film or resinous material.

One or more chroma enhancement dyes can be incorporated into the base film or resin to make the base layer 508 with the chroma-enhancing property. For example, the base film can be extruded from pellets that have been coated with one or more chroma enhancement dyes. In some embodiments, the pellets and a suitable amount of chroma enhancement dye(s) are loaded into an agitation or tumbling chamber. A suitable amount of chroma enhancement dye(s) can be approximately equal to an amount that results in a film layer with a desired level of absorptance. The amount can depend, for example, on the strength of the dyes, the thickness of the film layer, the solubility of the dyes, the desired concentration of the dyes, and the desired absorptance profile of the optical filter. The mixture is tumbled or agitated until the pellets are coated with a desired degree of uniformity. Then, the chroma enhancement dye-coated pellets are loaded into an extruder. The extruder is operated to create an optical grade film of substantially uniform thickness. In some embodiments, all or substantially all of the dyes incorporated into the film layer are dissolved into the film resin. Accordingly, the resulting film is substantially free of undissolved dyes, which can degrade the optical properties of the film.

The thickness of the base layer 508 depends at least partially on the solubility, strength, and/or concentration of the one or more chroma enhancement dyes that are incorporated into the film. Some embodiments incorporate a relatively thin film layer, such as, for example, the thinnest possible film that provides sufficient solubility of the dyes used in the optical filter to produce a desired optical filter spectral profile. Tables C and D provide example solubility characteristics of various example chroma enhancement dyes. For example, in some embodiments, the base layer 508 includes a blue chroma enhancement dye. The base layer 508 can have any suitable thickness, such as, for example a thickness between about 0.01 mm and about 1 mm, greater than or equal to about 0.01 mm, or greater than or equal to about 0.1 mm. In certain embodiments, the base layer 508 includes blue and yellow chroma enhancement dyes. In certain embodiments, the base layer 508 includes blue, yellow, and red chroma enhancement dyes. In certain embodiments, the base layer 508 includes blue, green, yellow, and red chroma enhancement dyes. The range of thicknesses of the base layer 508 when it incorporates one or more chroma enhancement dyes is about 0.01 mm to about 0.1 mm, with some embodiments having a thickness less than about 0.01 mm and some embodiments having a thickness greater than about 0.1 mm.

In some embodiments, the base layer 508 includes one or more blue chroma enhancement dyes. In some embodiments, the base layer 508 can incorporate one or more violet chroma enhancement dyes. In some embodiments, the base layer 508 can incorporate one or more yellow chroma enhancement dyes. In some embodiments, the base layer 508 can incorporate one or more red chroma enhancement dyes. In some embodiments, the base layer 508 can incorporate one or more green chroma enhancement dyes. It is to be understood that any permutation of violet, blue, green, yellow, and/or red chroma enhancement dyes can be loaded into the base layer 508 to achieve one or more desired optical properties. In some embodiments, other lens elements can incorporate one or more violet, blue, green, yellow, and/or red chroma enhancement dyes.

The first polymeric layer 510 can be attached to the base layer 508 by a first bonding layer 514, and the second polymeric layer 512, if included, can be attached to the base layer 508 by a second bonding layer 516. The first bonding layer is typically not included when the base layer 508 is the coating 518. In some embodiments, a first lens coating 518 is applied onto the first polymeric layer 510. In certain embodiments, a second lens coating 520 is applied onto the second polymeric layer 512, if the second polymeric layer 512 is included. The first and second lens coatings 518 and 520 are depicted with dashed lines in FIG. 54. The schematic diagram shown in FIG. 54 is not to scale, and the thicknesses of one or more lens elements can be exaggerated for schematic purposes.

In some embodiments, the laminate 506 includes a wafer (not shown) that has a first polymeric layer 510. In the wafer, the base layer 508 can comprise either the second polymeric layer 512, the second lens coating 520, or the second polymeric layer 512 that is coated with the second lens coating 520. If the wafer includes the second polymeric layer 510, the wafer can also include either the first bonding layer 514 or the second bonding layer 516 to attach the second polymeric layer 512 to the first polymeric layer 510. Also, the first polymeric layer 510 can include the first lens coating 518.

The laminate 506 can be attached to the lens body 504 with either the first polymeric layer 510, the second polymeric layer 512, the first lens coating 518, or the second lens coating 520 in contact with the lens body 504. In some embodiments, the laminate 506 is attached to the lens body 504 with either the first polymeric layer 510 or the second polymeric layer 512 in contact (not shown) with the lens body 504.

When the first polymeric layer 510 or the first lens coating 518 is in contact with the lens body 504, the second polymeric layer 512, if included, can form an outside surface 522 of the lens 502 that is open to atmosphere and that protects the base layer 508 from marring and abrasion. In some embodiments, the outside surface 522 is a convex surface. The second lens coating 520, if included, can substitute for the second polymeric layer 512 as the outside surface 522. In some embodiments, when the second polymeric layer 512 or the second lens coating 520 is in contact with the lens body 504, the first polymeric layer 510, if included, forms the outside surface 522 of the lens 502 that is open to atmosphere and that protects the base layer 508 from marring and abrasion. Also, the first lens coating 518, if included, can substitute for the first polymeric layer 510 as the outside surface 522. Furthermore, when the laminate 506 takes the form of the wafer (not shown), the second polymeric layer 512 or the second lens coating 520 can form the protective outside surface 522.

In certain embodiments, the first polymeric layer 510 and the second polymeric layer 512 should be compatible with the lens body 504, the laminate 506, the first and second bonding layers 514, 516, and, if included, the first and second lens coatings 518, 522. In this context, compatible layers can refer to layers that are capable of either strongly bonding with or strongly adhering to the material of the lens body 504. Compatible layers can also refer to one or more materials within the first polymeric layer 510 and/or the second polymeric layer 512 that are unlikely to undesirably react with other lens 502 components to degrade the lens body 504, the base layer 508, the first bonding layer 514, the second bonding layer 516, the first lens coating 518 (if included), the second lens coating 520 (if included), or organic dyes incorporated in any of the lens 502 elements.

Furthermore, the one of the first polymeric layer 510 and the second polymeric layer 512 that is attached to the lens body 504 can generally be made of polycarbonate, PET, polyehtylene, acrylic, nylon, polyurethane, polyimide, or polyester. Thus, the first polymeric layer 510 and the second polymeric layer 512 can each be made of different materials, such as different thermoplastic resins. Either or both of the polymeric layers 510, 512 can be made of a different material than the lens body 504. In certain embodiments, the lens body 504 and the one of the first polymeric layer 510 and the second polymeric layer 512 that is attached to the lens body 504 are each made of any of a variety thermoplastic resins, including homopolymers and copolymers of polycarbonate, amorphous polyolefin, polystyrene, and acrylic compounds to permit fusion of the lens body 504 to the first polymeric layer 510 or second polymeric layer 512. In some embodiments, the lens body 504 and the one of the first polymeric layer 510 and the second polymeric layer 512 that is attached to the lens body 504 are each made of the same thermoplastic resin to further enhance fusion of the lens body 504 to the first polymeric layer 510 or second polymeric layer 512.

One or more chroma enhancement dyes can be incorporated into the resinous material that comprises the first or second polymeric layers 510, 512. The amount of dye dissolved into the resinous material can be an amount sufficient such that at least the first or second polymeric layer 510, 512 has a spectral profile that is configured to produce chroma-enhanced scenes as described in one or more embodiments described herein. The amount of dye dissolved in the material can be, for example, sufficient to provide significant attenuation within one or more chroma enhancement windows and less than or equal to the solubility limit of the dye in the resinous material.

The thickness of a polymeric layer incorporating one or more chroma enhancement dyes depends at least partially on the solubility of the one or more chroma enhancement dyes. For example, in certain embodiments at least a first or second polymeric layer 510 or 512 includes a blue chroma enhancement dye resulting in a layer with a thickness of about 0.1 mm, greater than about 0.1 mm, between about 0.1 mm and about 1 mm, less than about 0.1 mm, or greater than about 1 mm. In certain embodiments, at least a first or second polymeric layer 510 or 512 includes blue and yellow chroma enhancement dyes. In certain embodiments, at least a first or second polymeric layer 510 or 512 includes blue, yellow, and red chroma enhancement dyes. In certain embodiments, at least a first or second polymeric layer 510 or 512 includes blue, yellow, red, and green chroma enhancement dyes. The range of thicknesses of at least a first or second polymeric layer 510 or 512 incorporating one or more chroma enhancement dyes can between about 0.1 mm and about 1 mm. In some embodiments, one or more polymeric layers 510, 512 have a thickness less than or equal to about 0.1 mm. In certain embodiments, one or more polymeric layers 510, 512 have a thickness greater than or equal to about 1 mm.

In certain embodiments, at least one of the first or second polymeric layers 510, 512 includes one or more blue chroma enhancement dyes. In some embodiments, at least one of the first or second polymeric layers 510, 512 can incorporate one or more violet chroma enhancement dyes. In some embodiments, at least one of the first or second polymeric layers 510, 512 can incorporate one or more yellow chroma enhancement dyes. In some embodiments, at least one of the first or second polymeric layers 510, 512 can incorporate one or more red chroma enhancement dyes. In some embodiments, at least one of the first or second polymeric layers 510, 512 can incorporate one or more green chroma enhancement dyes. It is to be understood that at least one of the first or second polymeric layers 510, 512 can incorporate any permutation of violet, blue, green, yellow, and/or red chroma enhancement dyes to achieve one or more desired optical properties. In some embodiments, other lens elements can incorporate one or more violet, blue, green, yellow, and/or red chroma enhancement dyes.

In some embodiments, the lens 506 includes a chroma enhancing filter that is configured to withstand temperatures that are typical of lens manufacturing techniques. In certain embodiments, the chroma enhancing filter can be at least partially incorporated into the lens using one or more chroma enhancement dyes that tend to degrade or decompose at temperatures at which resins are injected into a mold in some injection molding processes. In some such embodiments, one or more chroma enhancement dyes can be incorporated into the first polymeric layer 510 (for example, the polymeric layer on the convex side of the base layer 508). In some such embodiments, one or more chroma enhancement dyes can be incorporated into a bonding layer 514 or a coating 518 on a convex side of the base layer 508. By incorporating one or more chroma enhancement dyes into a layer near the convex or outer surface 522 of the lens 506, the one or more chroma enhancement dyes can be substantially insulated from high temperature resins during a molding process. Although the molding process may call for a resin to enter a lens mold at a temperature higher than a threshold temperature at which the one or more chroma enhancement dyes begin to substantially degrade or decompose, the second polymeric layer 512, one or more bonding layers 514, 516, and/or the base layer 508 can provide thermal insulation between the hot resin and the layer(s) that incorporate the one or more chroma enhancement dyes.

As shown in FIG. 2, a lens 102 can have a first lens body element 204, a second lens body element 208, and a laminate or film layer 206 disposed between the first and second lens body elements 204, 208. In some embodiments, the first lens body element 204 and the second lens body element 208 are located on opposite sides of the laminate or film layer 206. The lens can include a coating 202 on the first lens body element 204. In some embodiments, the coating 202 can also be located on the second lens body element 208. In certain embodiments, the coating 202 can be located in between the first lens body element 204 and the laminate or film layer 206. In certain embodiments, the coating 202 can be located between the second lens body element 208 and the laminate or film layer 206. The configuration depicted in FIG. 2 advantageously allows a lens body element to have a non-uniform thickness, such as in a corrective lens configuration, while maintaining the chroma-enhancing benefits provided by the optical filter when it is not incorporated in the lens body element.

Methods and materials suitable for bonding the first polymeric layer 510 to the base layer 508, for bonding the second polymeric layer 512 to the base layer 508, or for bonding the first and second polymeric layers 510, 512 to each other can be used to facilitate adhesion between two or more lens elements. Examples of bonding technologies that may be suitable include thermal welding, fusing, pressure sensitive adhesives, polyurethane adhesives, electrostatic attraction, thermoforming, other types of adhesives, materials curable by ultraviolet light, thermally curable materials, radiation-curable materials, other bonding methods, other bonding materials, and combinations of methods and/or materials. In some embodiments, any technique suitable for bonding the layers of the laminate 506 together can be used.

Materials suitable for use as the first bonding layer 514 and the second bonding layer 516 should have good optical properties, including high optical transparencies, no yellowing upon exposure to sunlight, an ability to flex during injection molding without becoming crazed, minimal shrinkage during curing, and should meet the aforementioned material compatibility requirement. Some examples of suitable materials for the first bonding layer 514 and the second bonding layer 516 include acrylic-type, epoxy-type and urethane-type adhesives, such as Loctite® FMD-207, Loctite® FMD-338, Loctite® FMD-436, and Loctite® 3311, each available from Loctite Corporation of Hartford, Conn.; Norland Optical Adhesive Type 68 available from Norland Products Inc. of New Brunswick, N.J.; and Summers Laboratories Type SK-9 available from Summers Laboratories, Inc. of Collegeville, Pa. The materials used for the first bonding layer 514 and the second bonding layer 516 can be curable by thermal treatment or by treatment with ultraviolet light.

In some embodiments, a lens includes one or more adhesion layers. The adhesion layer can be made from any suitable bonding material, such as, for example, adhesive, a material that enhances electrostatic attraction, a material curable by application of heat, ultraviolet radiation, or other radiation, another material that facilitates adhesion between two surfaces, or a combination of materials. In certain embodiments, the bonding material incorporates one or more chroma enhancement dyes. For example, the one or more chroma enhancement dyes can be added to a container of the bonding material, and the mixture can be stirred or otherwise agitated until the dyes are substantially, almost completely, or completely dissolved into the bonding material. The bonding material can then be applied between two or more lens components, thereby promoting adhesion between the components and adding at least a portion of a chroma enhancement filter to the composite lens structure.

The amount of dye dissolved into the bonding or adhesive material can be an amount sufficient such that at least a first and/or second bonding layer 514 or 516, combined with any other optical filtering components, produce a desired chroma-enhancement effect. For example, the optical filter can be similar to one or more of the chroma enhancement filters disclosed herein or could have a spectral profile somewhat different or substantially different from the filters disclosed herein. The amount of dye dissolved in the bonding or adhesive material can be, for example, sufficient to provide significant attenuation within a chroma enhancement window without exceeding the solubility limit of the dye in the material.

The thickness of a bonding layer incorporating one or more chroma enhancement dyes depends at least partially on factors such as the solubility, strength, and concentration of the one or more chroma enhancement dyes. For example, in certain embodiments at least a first or second bonding layer 514 or 516 includes a blue chroma enhancement dye resulting in a layer with a thickness of about 5 µm, greater than or equal to about 5 µm and/or less than or equal to about 50 µm, or greater than or equal to about 50 µm. In certain embodiments, at least a first or second bonding layer 514 or 516 includes blue and yellow chroma enhancement dyes. In certain embodiments, at least a first or second bonding layer 514 or 516 includes blue, yellow, and red chroma enhancement dyes. In certain embodiments, at least a first or second bonding layer 514 or 516 includes blue, green, yellow, and red chroma enhancement dyes. The thicknesses of a first bonding layer 514 or a second bonding layer 516 incorporating one or more chroma enhancement dyes can be greater than or equal to about 5 µm and/or less than or equal to about 50 µm, with some embodiments having a thickness less than about 5 µm and some embodiments having a thickness greater than about 50 µm.

The bonding layers can include one or more functional layer groups disposed on a substrate and/or between two or more other layers. The bonding layer can be made from a material system that can adhere the substrate and/or to one or more coatings. The material system for the bonding layer can include polyurethane adhesive, organic adhesive, thermoplastic adhesive, thermoset adhesive, another suitable material, or a combination of materials. The thickness of the bonding layer can be generally greater than or equal to about 5 µm and/or less than or equal to about 50 µm. Many other variations or alternative configurations for the bonding layer are possible.

In some embodiments, at least one of the first or second bonding layers 514, 516 includes one or more blue chroma enhancement dyes. In some embodiments, at least one of the first or second bonding layers 514, 516 can incorporate one or more violet chroma enhancement dyes. In some embodiments, at least one of the first or second bonding layers 514, 516 can incorporate one or more yellow chroma enhancement dyes. In some embodiments, at least one of the first or second bonding layers 514, 516 can incorporate one or more red chroma enhancement dyes. In some embodiments, at least one of the first or second bonding layers 514, 516 can incorporate one or more green chroma enhancement dyes. It is to be understood that at least one of the first or second bonding layers 514, 516 can incorporate any permutation of violet, blue, green, yellow, and/or red chroma enhancement dyes to achieve one or more desired optical properties. In some embodiments, other lens elements can incorporate one or more violet, blue, green, yellow, and/or red chroma enhancement dyes.

The first lens coating 518 and the second lens coating 520 can be formed of any material(s) suitable for providing hardness, abrasion resistance, and/or chemical resistance to the laminate 506, especially if the material compatibility requirement is met. Some examples of suitable coating materials include hard acrylic coatings and hard polysiloxane compounds. In some embodiments, the first lens coating 518 and the second lens coating 520 can be formed of any material(s) suitable for providing interference properties, anti-reflection properties, improved adhesion with other lens elements, and/or providing a desirable index of refraction between the air and the laminate 506 and/or the laminate 506 and the lens body 504. The first lens coating 518 and the second lens coating 520 can be situated in between any layer in the laminate 506 such as between the first polymeric layer 512 and the base layer 508. In some embodiments, the first lens coating 518 or the second lens coating 520 can be situated between the first and second polymeric layers 510 and 512.

In certain embodiments, the lens coating material incorporates one or more chroma enhancement dyes. For example, the one or more chroma enhancement dyes can be added to a container of the coating material, and the mixture can be stirred or otherwise agitated until the dyes are substantially, almost completely, or completely dissolved into the coating material. The coating material can then be applied to one or more lens components, thereby providing functionality such as a hard coating or primer to one or more lens elements and adding at least a portion of a chroma enhancement filter to the composite lens structure. In certain embodiments, a coating material can be applied to one or more lens elements. One or more chroma enhancement dyes can then be mixed with a polar solvent, such as water, until the dyes are substantially, almost completely, or completely dissolved into the polar solvent. The lens element(s) can then be dipped into the solution where the chromophores can then lodge into the microscopic structures of the substrate.

In certain embodiments, one or more chroma enhancement dyes can be incorporated into a lens coating material. The amount of dye dissolved into the lens coating material can be an amount sufficient such that at least the first or second lens coating 518 or 520 has the spectral profile that is configured to produce chroma-enhanced scenes as described in one or more embodiments described herein. The amount of dye dissolved in the material can be, for example, sufficient to provide significant attenuation within one or more chroma enhancement windows and less than or equal to the solubility limit of the dye in the material.

The thickness of a lens coating incorporating one or more chroma enhancement dyes depends at least partially on the solubility, strength, and concentration of the one or more chroma enhancement dyes. For example, in certain embodiments at least a first or second lens coating 518 or 520 includes one or more blue chroma enhancement dyes resulting in a coating with a thickness of about 0.5 µm, greater than about 0.5 µm, between about 0.5 µm and about 4 µm, less than about 0.5 µm, or greater than about 4 µm. In certain embodiments, at least a first or second lens coating 518 or 520 includes blue and yellow chroma enhancement dyes. In certain embodiments, at least a first or second lens coating 518 or 520 includes blue, yellow, and red chroma enhancement dyes. In certain embodiments, at least a first or second lens coating 518 or 520 includes blue, yellow, red, and green chroma enhancement dyes. The range of thicknesses of at least a first or second lens coating 518 or 520 incorporating one or more chroma enhancement dyes can be about 0.5 µm to about 4 µm. In some embodiments, the coating has a thickness less than or equal to about 0.5 µm or greater than or equal to about 4 µm.

In certain embodiments, at least one of the first or second lens coatings 518, 520 includes one or more blue chroma enhancement dyes. In some embodiments, at least one of the first or second lens coatings 518, 520 can incorporate one or more violet chroma enhancement dyes. In some embodiments, at least one of the first or second lens coatings 518, 520 can incorporate one or more yellow chroma enhancement dyes. In some embodiments, at least one of the first or second lens coatings 518, 520 can incorporate one or more red chroma enhancement dyes. In some embodiments, at least one of the first or second lens coatings 518, 520 can incorporate one or more green chroma enhancement dyes. It is to be understood that at least one of the first or second lens coatings 518, 520 can incorporate any permutation of violet, blue, green, yellow, and/or red chroma enhancement dyes to achieve one or more desired optical properties. In some embodiments, other lens elements can incorporate one or more violet, blue, green, yellow, and/or red chroma enhancement dyes.

As noted, when the laminate 506 takes the form of the wafer (not shown), the base layer 508 can consist of either the second polymeric layer 512, the second lens coating 520, or the second polymeric layer 512 that is coated with the second lens coating 520. Thus, when the laminate 506 takes the form of the wafer (not shown), it should be readily understood that consequent changes in the thickness of the base layer 508 will result.

In certain embodiments, the laminate of FIG. 54 is a polarizing wafer. The polarizing wafer can be similar in many respects to polarizing wafers available from, for example, Mitsubishi Gas Chemical Company, Inc. of Tokyo, Japan and Sumitomo Bakelite Co., Ltd. of Tokyo, Japan. The polarizing wafer can at least partially incorporate an optical filter designed to provide chroma enhancement in one or more portions of the visible spectrum. In some embodiments of the polarizing wafer at least partially incorporating an optical filter, the first polymeric layer 510 and the second polymeric layer 512 comprise clear, stretched polycarbonate sheets each having a thickness ranging from about 0.03 mm to about 4 mm, or a thickness ranging from about 0.05 mm to about 3 mm. In some embodiments, the first bonding layer 514 and the second bonding layer 516 comprise polyurethane adhesives. In certain embodiments, the base layer 508 can provide polarizing properties by incorporating one or more dichroic dyes, iodine, or other suitable dyes into a polyvinyl alcohol-type film having a thickness ranging from about 20 µm to about 120 µm, or ranging from about 30 µm to about 50 µm. Examples of a polyvinyl alcohol-type film are a polyvinyl alcohol (PVA) film, a polyvinylformal film, a polyvinylacetal film and a saponified (ethylene/vinyl acetate) copolymer film. In some embodiments, the polarizing properties of the wafer can be provided by a nano-wire grid which filters light through plasmon reflection. In certain embodiments, the polarizing wafer can be coated with a first coating 518. In some embodiments, the polarizing wafer in certain embodiments can be coated with a second coating 520.

In some embodiments, the PVA film of the polarizing wafer can be coated with polyurethane or other suitable adhesives. In certain embodiments, the adhesives can incorporate one or more chroma enhancement dyes. As an example, in certain embodiments the polyurethane adhesive of at least the first or second bonding layer 514 or 516 includes a blue chroma enhancement dye. In certain embodiments, at least the first or second bonding layer 514 or 516 includes blue and yellow chroma enhancement dyes. In certain embodiments, at least the first or second bonding layer 514 or 516 includes blue, yellow, and red chroma enhancement dyes. In some embodiments, at least the first or second bonding layer 514 or 516 includes the blue, green, yellow, and red chroma enhancement dyes.

Example techniques for preparing a polarizing film incorporating one or more chroma enhancement dyes will now be described. The example will refer to PVA film for purposes of illustration, but other types of polarizing films can also be used. In certain embodiments, the PVA film is immersed in an aqueous solution of the dichroic substance at room temperature to about 50° C. to adsorb a dichroic substance on the film. In some embodiments, one or more chroma enhancement dyes is incorporated into the solution. Then, the film is stretched at room temperature to about 80° C. to about 2.5 to about 8 times in one direction in water in which an additive such as a metal ion or boric acid is dissolved to thereby effect the adsorption and orientation. The film is then taken from the solution, and while it is maintained under tension, it is washed with water and dried, then heat-treated at about 110° C. to obtain a polarizing PVA film.

In some embodiments, the PVA film of the polarizing wafer can incorporate one or more chroma enhancement dyes. In some embodiments, the PVA base layer 508 includes a blue chroma enhancement dye. In certain embodiments, the PVA base layer 508 includes blue and yellow chroma enhancement dyes. In certain embodiments, the PVA base layer 508 includes blue, yellow, and red chroma enhancement dyes. In certain embodiments, the PVA base layer 508 includes blue, yellow, green, and red chroma enhancement dyes.

In some embodiments the PVA film 508 includes one or more chroma enhancement dyes and at least one of the polyurethane adhesive layers 514 or 516 includes one or more chroma enhancement dyes. For example, in certain embodiments a blue chroma enhancement dye can be incorporated into at least one of the polyurethane adhesive layers 514 or 516 and green, yellow, and red chroma enhancement dyes can be incorporated into the PVA film 508. As another example, in certain embodiments one or more blue and yellow chroma enhancement dyes can be incorporated into at least one of the polyurethane adhesive layers 514 or 516 and one or more green and red chroma enhancement dyes can be incorporated into the PVA film 508.

In some embodiments the optical filter is partially incorporated into the lens body 504 and partially incorporated into the polarizing wafer 506. For example, in certain embodiments the lens body 504 can incorporate a green chroma enhancement dye and at least one of the polyurethane adhesive layers 514 or 516 can incorporate blue, yellow, and red chroma enhancement dyes. As another example, in certain embodiments the lens body 504 can incorporate one or more green and yellow chroma enhancement dyes and at least one of the polyurethane adhesive layers 514 or 516 can incorporate one or more violet, blue, and red chroma enhancement dyes.

Some embodiments provide a method of making a lens 502 configured to provide chroma enhancement in one or more portions of the visible spectrum. First, the base layer 508 is prepared. Next, the laminate 506 is prepared. Finally, the lens 502 is made by attaching the laminate 506 to the lens body 504.

It is to be understood that properties in addition to chroma enhancement, such as polarization, photochromism, tint, color, hardness, abrasion resistance, and chemical resistance, decor, and indicia can be incorporated in the base layer 508. Any of the polymeric layers 510, 512 or the lens coatings 518, 520 can impart durability characteristics, such as hardness, abrasion resistance, and chemical resistance, to the lens 502 and to the outside surface 522 of the lens.

In some embodiments, after the base layer 508 is prepared, the laminate 506 can be made by bonding the first polymeric layer 510 and, if desired, the second polymeric layer 512 to the base layer 508 with a first adhesive as the first bonding layer 514 and a second adhesive as the second bonding layer 516, respectively. Any adhesive-based lamination technique, such as rolling to apply suitable pressure, can be used to laminate the polymeric layers 510, 512, to the base layer 508. The first lens coating 518, if included, can be applied to the first polymeric layer 510 either before or after lamination of the first polymeric layer 510 to the base layer 508. Similarly, if the second polymeric layer 512 is included, the second lens coating 520, if included, can be applied to the second polymeric layer 512 either before or after lamination of the second polymeric layer 512 to the base layer 508.

In certain embodiments, when the optical filter is at least partially incorporated into the first or second lens coating 518, 520 instead of the base layer 508, the laminate 506 can be prepared by applying the coating 518 onto the first polymeric layer 510 using any suitable procedure, such as spraying, brushing, or powder application. Examples of materials that are suitable for forming the coating include those materials that are suitable for providing properties such as hardness, abrasion resistance, and/or chemical resistance, to the laminate 506. Some examples of suitable materials for the coating include hard acrylic coatings and hard polysiloxane compounds.

In certain embodiments that incorporate the coating 518, the coating 518 can be applied directly onto the first polymeric layer 510. In certain embodiments where the optical filter is at least partially incorporated into the coating and not incorporated in the base layer 508, the coating 518 can be used to form the outside surface 522 of the lens 502. Furthermore, the coating 518 can be selected to provide the outside surface 522 with desirable properties such as hardness, abrasion resistance, and/or chemical resistance.

In some embodiments, when the laminate 506 takes the form of the wafer (not shown), the laminate 506 can be prepared by laminating the second polymeric layer 512 to the first polymeric layer 510 with a first adhesive as the first bonding layer 514 or with a second adhesive as the second bonding layer 516. Any adhesive-based lamination technique can be used to laminate the polymeric layers 510, 512, together. In certain embodiments where the laminate 506 takes the form of the wafer, the lens coatings 518, 520 are included, and the lens coatings 518, 520 can be applied to the first polymeric layer 510 and the second polymeric layer 512, respectively, either before or after lamination of the polymeric layers 510, 512. In certain embodiments where the laminate 506 takes the form of the wafer, the second polymeric layer 512 is not included, and the second lens coating 520 can be applied to the first polymeric layer 510 using any coating application technique.

In some embodiments, the lens body 504 and the laminate 506 can be combined to make the lens 502 using a technique such as, for example, laminate bonding, injection molding, compression molding, or injection-compression molding (e.g., coining). No matter the method used to join the lens body 504 and laminate 506, the laminate 506 should be configured to the size and pattern the laminate 506 will have when included in the lens 502. This can be accomplished using any suitable technique. In certain embodiments the laminate 506 can be pre-shaped before being incorporated into the lens 502 or, in some embodiments, the laminate 506 can be shaped while being incorporated into the lens 502.

The laminate 506 can be pre-shaped using any suitable laminate shaping process. In some embodiments, a suitable process entails thermoforming. In some embodiments, a suitable process entails heating the laminate 506 to a suitable temperature. Simultaneous with or subsequent to the heating, positive pressure is applied to the laminate 506 using a suitable device to shape the laminate 506 and match the shape of the surface of the lens body 504. Once the laminate 506 is appropriately shaped, the laminate 506 is cooled to room temperature and the positive pressure is released.

The lens 502 can be of any desired shape. For example, the lens 502 can have 1 axis of curvature or 2 axes of curvature, the lens can be cylindrical, parabolic, spherical, flat, or elliptical, or any other shape such as a meniscus or catenoid. The lens 502 can also be corrective or non-corrective.

In certain embodiments, at least one of the first or second bonding layers 514 or 516 includes a blue chroma enhancement dye and the lens body 504 includes green, yellow, and red chroma enhancement dyes. In certain embodiments, at least one of the first or second bonding layers 514 or 516 includes blue and yellow chroma enhancement dyes and the lens body 504 includes green and red chroma enhancement dyes. In certain embodiments, at least one of the first or second bonding layers 514 or 516 includes blue and red chroma enhancement dyes and the lens body 504 includes green and yellow chroma enhancement dyes. In certain embodiments, at least one of the first or second bonding layers 514 or 516 includes violet, blue, yellow, and red chroma enhancement dyes and the lens body 504 includes a green chroma enhancement dye.

In some embodiments, at least one of the first or second polymeric layers 510 or 512 includes blue chroma enhancement dye and the lens body 504 includes green, yellow, and red chroma enhancement dyes. In certain embodiments, at least one of the first or second polymeric layers 510 or 512 includes blue and yellow chroma enhancement dyes and the lens body 504 includes green and red chroma enhancement dyes. In certain embodiments, at least one of the first or second polymeric layers 510 or 512 includes blue and red chroma enhancement dyes and the lens body 504 includes green and yellow chroma enhancement dyes. In certain embodiments, at least one of the first or second polymeric layers 510 or 512 includes blue, yellow, and red chroma enhancement dyes and the lens body 504 includes green chroma enhancement dye.

In some embodiments, the base layer 508 includes blue chroma enhancement dye, and the lens body 504 includes green, yellow, and red dyes. In certain embodiments, the base layer 508 includes blue and yellow chroma enhancement dyes, and the lens body 504 includes green and red chroma enhancement dyes. In certain embodiments, the base layer 508 includes blue and red chroma enhancement dyes, and the lens body 504 includes green and yellow chroma enhancement dyes. In certain embodiments, the base layer 508 includes blue, yellow, and red chroma enhancement dyes, and the lens body 504 includes green chroma enhancement dye.

Figure 55:
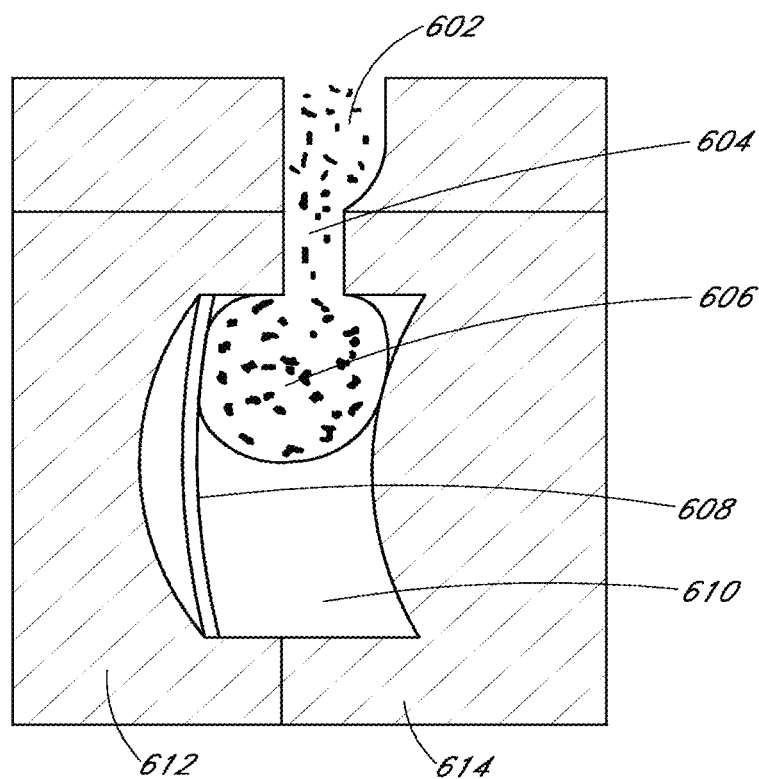
FIG. 55 is a cross-sectional view of a lens mold.

In some embodiments, a method for joining the lens body 504 and the laminate 506 to make the lens 502 includes using a molding machine. Referring to FIGS. 54 and 55, to mold a lens body 504 with a laminate 506 to form a lens 502, the laminate 506 is placed in the mold cavity 610 with the outside surface 522 facing the interior wall of the mold half 612. In certain embodiments, the laminate 506 is pre-formed to a desired curvature by punching the laminate against a heated mold before the laminate 506 is inserted into the mold cavity 610. In some embodiments, the laminate 506 can be formed to a desired curvature within the mold cavity 610.

Once the laminate 506 has been placed into the mold cavity 610, the two mold halves 612 and 614 close and molten resin material 606 is injected through the runner 602 and gate 604 into the mold cavity 610 to back-mold on the inside surface 524 of the laminate 506. In some embodiments, the inside surface 524 is a concave surface. The combined action of high temperature from the molten resin and high pressure from the injection screw can conform the laminate 506 to the surface of the interior wall of the mold half, and bonds the laminate and the injected resin material together at an interface 608 between the laminate 506 and the resin material 606. After the resin melt is hardened, the desired lens is obtained having an integrated laminate which at least partially incorporates an optical filter.

After being removed from the machine 600, each lens 502 can be coated with a suitable coating, such as an acrylic or a polysiloxane coating composition, to provide a hard surface on the lens 502. Coating can be accomplished using techniques such as dipping, spraying, or spin-coating. As already noted, if the lens 502 is finished after application of the coating, the coating can be applied to the outside surface 522 and the rear surface 526 of the lens 502. If the lens 502 is semi-finished, the coating can be applied to the outside surface 522 of the lens 502. In certain circumstances, the coating on the rear surface 526 can be damaged or removed during further processing of the semi-finished lens. In certain embodiments, the coating can be applied to more than one surface of the semi-finished lens, including the outside surface 522 and the rear surface 526 to simplify or reduce the cost of manufacturing the semi-finished lens.

Figure 56:
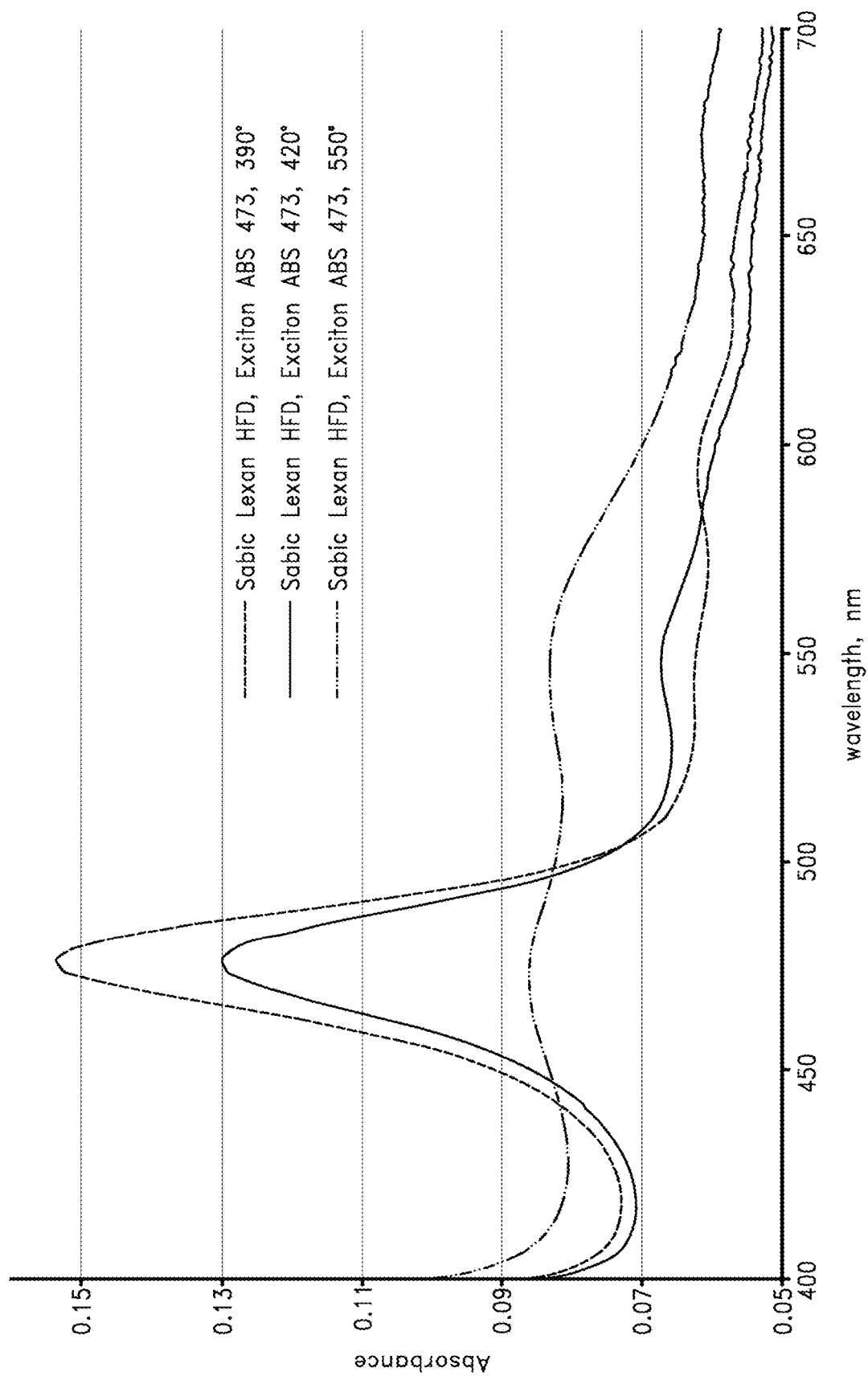
FIG. 56 is a graph showing the absorbance profile of three injection molded lenses that were molded at different temperatures.

A characterization of the thermal stability of an example blue chroma enhancement dye, Exciton ABS 473, is presented in FIG. 56. The dye is mixed into an example HFD copolymer resin, Sabic Lexan HFD 40 melt flow index, and the resin mixture is used to prepare three injection molded lens bodies. A different molding temperature is used for each of the three lens bodies: 390° F., 420° F., and 550° F. After the lens bodies are cured, the absorbance profile of each of the lens bodies is measured using a spectrophotometer for wavelengths ranging from 400 nm to 700 nm. For a lens body that is molded at 390° F. the absorbance at 473 nm is 0.150, for a lens body that is molded at 420° F., the absorbance at 473 nm is 0.128, and for a lens body that is molded at 550° F. the absorbance at 473 nm is 0.086. The peak absorbance decreases by about 15% when the molding temperature increases from 390° F. to 420° F., and the peak absorbance decreases by about 43% when the molding temperature increases from 390° F. to 550° F.

As discussed herein, organic dyes used in certain optical filters disclosed herein can degrade or decompose when exposed to high temperatures, including, for example, temperatures that are typical of certain injection molding processes. When a dye degrades or decomposes, the spectral profile of a dye changes. For example, as illustrated in FIG. 56, the primary absorbance peak of Exciton ABS 473 dye falls when the dye is exposed to temperatures above about 390° F. In some embodiments, a lens is formed without exposing one or more chroma enhancement dyes in a lens element to temperatures that significantly degrade their functionality in an optical filter. A significant degradation includes, for example, an amount of degradation that reduces the level of chroma enhancement below a threshold limit. As explained herein, the level of chroma enhancement can be expressed as a ratio between the chroma of a filtered visual stimulus and the chroma of a substantially unfiltered visual stimulus.

In certain embodiments, a method of forming a lens includes forming a laminate or wafer incorporating one or more chroma enhancement dyes. The laminate or wafer is placed in the mold during the injection molding process, as described herein, wherein the one or more chroma enhancement dyes loaded into the laminate are not subjected to temperatures sufficiently high to significantly degrade their optical performance properties during the mold process.

In certain embodiments, the method of forming a lens includes loading one or more chroma enhancement dyes into a laminate. The laminate is placed in the mold during the injection molding process, as described herein, wherein the one or more chroma enhancement dyes have thermal properties sufficient to withstand the temperatures they are exposed to during the molding process such that their optical performance properties do not significantly degrade.

In certain embodiments, the method of forming a lens includes loading one or more chroma enhancement dyes into a thermoplastic resin. The thermoplastic resin is injected into a mold to form a lens body, as described herein, wherein the one or more chroma enhancement dyes are not subjected to temperatures sufficiently high to significantly degrade their optical performance properties during the mold process.

In certain embodiments, the method of forming a lens includes loading one or more chroma enhancement dyes into a thermoplastic resin. The thermoplastic resin is injected into a mold to form a lens body, as described herein, wherein the one or more chroma enhancement dyes have thermal properties sufficient to withstand the temperatures they are exposed to during the molding process such that their optical performance properties do not significantly degrade.

In particular, certain embodiments include using a copolymer resin which requires lower temperatures, has higher ductility, and/or is less viscous than other thermoplastic resins. Examples of copolymer resins that may satisfy one or more of these criteria include high flow, high ductility (HFD) resins available from SABIC Innovative Plastics of Pittsfield, Mass. Examples of HFD copolymer resins include Lexan Resin HFD1014, HFD1034, HFD1212, HFD1232, HFD1413, HFD1433, HFD1711, HFD1731, HFD1810, HFD1830, and HFD1910. In some embodiments, a resin having the desired ductility, viscosity, and thermal characteristics includes one or more chroma enhancement dyes with thermal durability sufficient to endure high temperatures. The resin impregnated with the one or more chroma enhancement dyes can then used to form the lens body by an injection molding process as described herein. The one or more chroma enhancement dyes loaded into the resin have similar spectral properties to the dyes described herein but have higher temperature stability such that there is less degradation when exposed to sufficiently high temperatures that would degrade other organic dyes. In some embodiments where a resin having the desired ductility, viscosity, and thermal characteristics is includes one or more chroma enhancement dyes with thermal durability sufficient to endure high temperatures, the one or more chroma enhancement dyes do not significantly degrade when exposed to the temperatures necessary to form the lens body during injection molding according to embodiments described herein.

In some embodiments, one or more advantages can be realized in at least some circumstances when a lens function, such as, for example, chroma enhancement, is added to a lens body by a lamination process. For example, functional elements such as optical filters, minor elements, anti-fog layers, light polarizers, and photochromic layers can be incorporated into the lens 502 without using processes to coat the outside surface 522 of the lens. Coating processes sometimes incorporate steps that can substantially degrade or impair certain functional lens elements or layers. Certain coating processes create surfaces that are not entirely smooth or uniform. Thus, undesirable and unpredictable optical effects that would otherwise be expected to occur in the lens 502, if the outside surface 522 were coated, are reduced, minimized, or eliminated altogether when the lens 502 is manufactured according to certain techniques described herein.

In some embodiments, the lens 502 can be finished, as opposed to semi-finished, with the lens body 504 being contoured to modify the focal power of the lens 502. In some embodiments, the lens 502 can be semi-finished so that the lens body 502 is capable of being machined, at some time following manufacture, to modify the focal power of the lens 502.

In some embodiments, the laminate 506 can be attached to any surface of a new or existing lens (not shown) using any suitable technique, such as adhesive attachment or laminate bonding. In this way, functional properties such as optical filters, minor elements, anti-fog layers, light polarizers, and photochromic layers can be incorporated into existing lenses that, as originally manufactured, lack such properties. For example, desirable properties such as chroma enhancement can be imparted to existing lenses, instead of discarding the existing lenses and manufacturing new lenses that include the desirable properties. In some embodiments, a suitable solvent can be applied to remove the laminate 506 from the existing lens so that a laminate with different chroma enhancement characteristics can be applied to the existing lens. In certain embodiments, the laminate 506 can be removed by application of heat or separation force. At least some such embodiments facilitate changing the chroma enhancing properties of the existing lens when a new chroma enhancement filter is desired.

Some embodiments provide eyewear with chroma enhancement and methods for manufacturing eyewear with chroma enhancement using an injection molding process. In some embodiments, chroma enhancement eyewear includes one or more chroma enhancement dyes, as disclosed herein. In certain embodiments, a lens is injection molded using a process that permits some or all chroma enhancement dyes incorporated into a lens to withstand the molding process without substantially degrading or decomposing. Such a process can include using a molding material that has relatively low viscosity and high ductility. When such molding materials are used, the molding temperature of the injection molding process can be substantially lowered when compared to typical thermoplastic resins used in manufacturing lenses for eyewear. In some embodiments, the molding material can produce a lens that has high impact strength. Examples of suitable molding materials include certain high flow, high ductility (HFD) resins. In certain embodiments, the injection temperature of the resin is less than or equal to a temperature at which the chromophores of one or more chroma enhancement dyes begin to degrade or decompose.

In some embodiments, the thermoplastic resin is prepared before molding using a process that includes mixing one or more chroma enhancement dyes into the resin. The loadings of chroma enhancement dyes in the resin can be selected to generate a desired chroma enhancing filter in the finished lens. The loadings can depend on, for example, dye strength, concentration and solubility; lens body thickness; finished lens thickness and geometry; desired filter properties; aesthetic considerations; another factor; or a combination of factors. In certain embodiments, the temperature of the lens body is maintained below a threshold level while the lens body undergoes molding, curing, and cooling processes. The threshold level can be less than or equal to a temperature at which dyes loaded into the thermoset resin begin to degrade or decompose. For example, the threshold can be less than or equal to about 420° F., less than or equal to about 400° F., less than or equal to about 390° F., less than or equal to about 350° F., or less than or equal to another suitable threshold.

Certain embodiments provide a method of injection molding a lens that includes molding the lens in two or more injection steps. For example, certain embodiments, a first lens portion incorporating one or more chroma enhancement dyes is molded by injecting a first thermoplastic resin mixed with the one or more chroma enhancement dyes into a first mold having a first mold chamber volume. The thickness of the first lens portion can be selected to achieve any desired optical filtering effect. A suitable thickness can be, for example, less than or equal to about 1 mm. The first lens portion can be removed from the first mold and placed into a second mold having a larger mold chamber volume than the first mold. A second lens portion can be molded by injecting a second thermoplastic resin around the first lens portion. The first lens portion, on its own, may not be hard enough or strong enough to have suitable properties of a lens for eyewear. The second thermoplastic resin can be configured to produce a mechanically strong and durable injection molded lens.

In certain embodiments, a first lens portion incorporating one or more chroma enhancement dyes is molded by injecting a first thermoplastic resin mixed with the one or more chroma enhancement dyes into a mold having a first mold chamber volume. The thickness of the first lens portion can be selected to achieve any desired optical filtering effect. A suitable thickness can be, for example, less than or equal to about 1 mm. The mold can then be expanded by moving one or more portions of the mold until it reaches a second mold chamber volume substantially larger than the first mold chamber volume. A second lens portion can be molded by injecting a second thermoplastic resin around the first lens portion. The first lens portion, on its own, may not be hard enough or strong enough to have suitable properties of a lens for eyewear. The second thermoplastic resin can be configured to produce a mechanically strong and durable injection molded lens.

In some embodiments, a lens is manufactured using one or more chroma enhancement dyes that are able to withstand high molding temperature without substantial degradation or decomposition. In such embodiments, the lens can be produced from a thermoplastic resin that is configured to produce a high-strength and durable injection molded lens.

Certain embodiments provide a lens manufactured using one or more of the techniques described herein and incorporating one or more functional lens elements. For example, a lens can include an injection molded lens body and a polarizer. The polarizer can be combined with the injection molded lens body by positioning the polarizer, such as, for example, a polarizing wafer as described herein, into a mold and injecting thermoplastic resin into the mold. The polarizing wafer can include one or more insulating polymeric layers configured to insulate a functional base layer from high molding temperatures. Other functional lens elements, such as, for example, at least a portion of a chroma enhancing optical filter, a photochromic material, an interference stack, an anti-static material, a hydrophobic material, an anti-fog layer, a coating, an anti-scratch layer, another functional element, or a combination of elements can be incorporated into a lens with an injection-molded portion in a similar fashion.

Some embodiments provide eyewear with chroma enhancement and methods for manufacturing eyewear with chroma enhancement using a dyeing process. The dyeing process can be used to incorporate one or more functional or aesthetic features into the lens. In some embodiments, chroma enhancement eyewear includes one or more chroma enhancement dyes, as disclosed herein. In certain embodiments, a lens body is manufactured using an injection molding process, an extrusion process, a compression molding process, a casting process, another suitable process, or a combination of processes. The lens can include one or more lens bodies and can include one or more additional lens elements, such as, for example, one or more laminates. The one or more lens bodies and one or more laminates can undergo pretreatment before being bonded to one another. Pretreatment of a lens element can include coating, annealing, stretching, shaping, cutting, grinding, polishing, etching, curing, irradiating, doping, another process, or a combination of processes.

Before or after one or more pretreatment processes, one or more lens elements or combinations of lens elements can be dyed. Any suitable dyeing process can be use. In some embodiments, one or more dyes are dissolved into a solvent to produce a dyeing solution. The one or more dyes can include one or more chroma enhancement dyes. The one or more dyes are applied to the lens element or the combination of lens elements. For example, the dyes can be applied to the element by dipping the element in a dyeing solution, spraying a dyeing solution on the element, or placing the element in a dyeing chamber and directing the one or more dyes into the chamber.

In embodiments where the lens element or combination of lens elements is dyed in a dyeing chamber, a process fluid can be used to carry the one or more dyes into the chamber. The one or more dyes can be dissolved into the process fluid. In certain embodiments, the process fluid is a supercritical fluid, such as, for example, supercritical $CO_2$. The process fluid with dissolved dye is carried into the dyeing chamber, where it enters the workpiece via diffusion. In some embodiments, a lens includes a chroma enhancement filter, at least a portion of which is incorporated into the lens using supercritical $CO_2$ dyeing. Other suitable process fluids can also be used. In some embodiments, supercritical $CO_2$ fluid is used to deposit one or more nonpolar chroma enhancement dyes onto one or more lens elements or combinations of lens elements.

Some embodiments provide eyewear with chroma enhancement and methods for manufacturing eyewear with chroma enhancement using a casting process. In some embodiments, chroma enhancement eyewear includes one or more chroma enhancement dyes, as disclosed herein. In certain embodiments, a lens is cast using a process that permits some or all chroma enhancement dyes incorporated into a lens to withstand the casting process without substantially degrading or decomposing. One or more lens bodies of a lens can be cast using a thermoset resin that is configured to produce lens bodies with high strength and durability. In certain embodiments, the casting and curing temperatures of the thermoset resin is less than or equal to a temperature at which the chromophores of one or more chroma enhancement dyes begin to degrade or decompose.

In some embodiments, the thermoset resin is prepared before casting using a process that includes mixing one or more chroma enhancement dyes into the resin. The loadings of chroma enhancement dyes in the resin can be selected to generate a desired chroma enhancing filter in the finished lens. The loadings can depend on, for example, dye strength, concentration and solubility; lens body thickness; finished lens thickness and geometry; desired filter properties; aesthetic considerations; another factor; or a combination of factors. In certain embodiments, the temperature of the lens body is maintained below a threshold level while the lens body undergoes casting, curing, and cooling processes. The threshold level can be less than or equal to a temperature at which dyes loaded into the thermoset resin begin to degrade or decompose. For example, the threshold can be less than or equal to about 420° F., less than or equal to about 400° F., less than or equal to about 390° F., less than or equal to about 350° F., or less than or equal to another suitable threshold.

Certain embodiments provide a lens manufactured using one or more of the techniques described herein and incorporating one or more functional lens elements. For example, a lens can include a cast lens body and a polarizer. The polarizer can be combined with the cast lens body by positioning a polarizer, such as, for example, a PVA polarizing film, into a mold and flowing thermoset resin into the mold. In some embodiments, the polarizer does not include insulating polymeric layers configured to insulate the polarizer from high molding temperatures when the lens body is made using a casting process. Other functional lens elements, such as, for example, at least a portion of a chroma enhancing optical filter, a photochromic material, an interference stack, an anti-static material, a hydrophobic material, an anti-fog layer, a coating, an anti-scratch layer, another functional element, or a combination of elements can be incorporated into a lens with a lens portion made by casting.

Embodiments disclosed herein include eyewear that has one or more laminates applied to an outer surface of a lens body. In some embodiments, the lens body is constructed from a substantially rigid material having a curved shape. The lens body can have any desired curvature, including, for example, cylindrical, spherical or toroidal. A laminate can include a substantially flexible substrate and one or more functional layers or coatings applied to the substrate. In addition, one or more functional layers or coatings can be applied directly to the lens body. In certain embodiments, a bonding layer bonds a laminate to a convex and/or concave surface of the lens body. Examples of functional layers or coatings that can be applied to a laminate include anti-reflection coatings, interference stacks, hard coatings, flash mirrors, anti-static coatings, anti-fog coatings, other functional layers, or a combination of functional layers. At least a portion of a chroma-enhancing filter can be incorporated into a laminate and/or other functional layers of eyewear.

Referring to FIGS. 57, 57A, 58, and 58A, there are illustrated perspective views of some embodiments of eyewear 700 having first and second lenses 702*a* and 702*b*, frame 704, and earstems 706*a* and 706*b*. The embodiments shown in these figures illustrate one or more laminates affixed to one or more lens bodies incorporated into an example eyeglass design. It should be noted that the thicknesses and relative thicknesses of the various lens elements are not drawn to scale but are drawn to more easily illustrate certain aspects of the eyewear 700. The eyewear 700 can be of any type, including general-purpose eyewear, special-purpose eyewear, sunglasses, driving glasses, sporting glasses, goggles, indoor eyewear, outdoor eyewear, vision-correcting eyewear, contrast-enhancing eyewear, chroma-enhancing eyewear, color-enhancing eyewear, color-altering eyewear, eyewear designed for another purpose, or eyewear designed for a combination of purposes. Lenses and frames of many other shapes and configurations may be used, as will become apparent based upon the disclosure herein.

FIGS. 57, 57A, 58, and 58A illustrate eyewear 700 having lenses 702*a*, 702*b*. The lenses 702*a* and 702*b* can be corrective lenses or non-corrective lenses and can be made of any of a variety of optical materials including glasses or plastics such as acrylics or polycarbonates. The lenses can have various shapes. For example, the lenses 702*a*, 702*b* can be flat, have 1 axis of curvature, 2 axes of curvature, or more than 2 axes of curvature, the lenses 702*a*, 702*b* can be cylindrical, parabolic, spherical, flat, or elliptical, or any other shape such as a meniscus or catenoid. When worn, the lenses 702*a*, 702*b* can extend across the wearer's normal straight ahead line of sight, and can extend substantially across the wearer's peripheral zones of vision. As used herein, the wearer's normal line of sight shall refer to a line projecting straight ahead of the wearer's eye, with substantially no angular deviation in either the vertical or horizontal planes. In some embodiments, the lenses 702*a*, 702*b* extend across a portion of the wearer's normal straight ahead line of sight.

The outside surface of lenses 702*a* or 702*b* can conform to a shape having a smooth, continuous surface having a constant horizontal radius (sphere or cylinder) or progressive curve (ellipse, toroid or ovoid) or other aspheric shape in either the horizontal or vertical planes. The geometric shape of other embodiments can be generally cylindrical, having curvature in one axis and no curvature in a second axis. The lenses 702*a*, 702*b* can have a curvature in one or more dimensions. For example, the lenses 702*a*, 702*b* can be curved along a horizontal axis. As another example, lenses 702*a*, 702*b* can be characterized in a horizontal plane by a generally arcuate shape, extending from a medial edge throughout at least a portion of the wearer's range of vision to a lateral edge. In some embodiments, the lenses 702*a*, 702*b* are substantially linear (not curved) along a vertical axis. In some embodiments, the lenses 702*a*, 702*b* have a first radius of curvature in one region, a second radius of curvature in a second region, and transition sites disposed on either side of the first and second regions. The transition sites can be a coincidence point along the lenses 702*a*, 702*b* where the radius of curvature of the lenses 702*a*, 702*b* transitions from the first to the second radius of curvature, and vice versa. In some embodiments, lenses 702*a*, 702*b* can have a third radius of curvature in a parallel direction, a perpendicular direction, or some other direction. In some embodiments, the lenses 702*a*, 702*b* can lie on a common circle. The right and left lenses in a high-wrap eyeglass can be canted such that the medial edge of each lens will fall outside of the common circle and the lateral edges will fall inside of the common circle. Providing curvature in the lenses 702*a*, 702*b* can result in various advantageous optical qualities for the wearer, including reducing the prismatic shift of light rays passing through the lenses 702*a*, 702*b*, and providing an optical correction.

A variety of lens configurations in both horizontal and vertical planes are possible. Thus, for example, either the outer or the inner or both surfaces of the lens 702*a* or 702*b* of some embodiments can generally conform to a spherical shape or to a right circular cylinder. Alternatively either the outer or the inner or both surfaces of the lens may conform to a frusto-conical shape, a toroid, an elliptic cylinder, an ellipsoid, an ellipsoid of revolution, other asphere or any of a number of other three dimensional shapes. Regardless of the particular vertical or horizontal curvature of one surface, however, the other surface may be chosen such as to minimize one or more of power, prism, and astigmatism of the lens in the mounted and as-worn orientation.

The lenses 702a, 702b can be linear (not curved) along a vertical plane (e.g., cylindrical or frusto-conical lens geometry). In some embodiments, the lenses 702a, 702b can be aligned substantially parallel with the vertical axis such that the line of sight is substantially normal to the anterior surface and the posterior surface of the lenses 702a, 702b. In some embodiments, the lenses 702a, 702b are angled downward such that a line normal to the lens is offset from the straight ahead normal line of sight by an angle ϕ. The angle ϕ of offset can be greater than about 0° and/or less than about 30°, or greater than about 70° and/or less than about 20°, or about 15°, although other angles ϕ outside of these ranges may also be used. Various cylindrically shaped lenses may be used. The anterior surface and/or the posterior surface of the lenses 702a, 702b can conform to the surface of a right circular cylinder such that the radius of curvature along the horizontal axis is substantially uniform. An elliptical cylinder can be used to provide lenses that have non-uniform curvature in the horizontal direction. For example, a lens may be more curved near its lateral edge than its medial edge. In some embodiments, an oblique (non-right) cylinder can be used, for example, to provide a lens that is angled in the vertical direction.

In some embodiments, the eyewear 700 incorporates canted lenses 702a, 702b mounted in a position rotated laterally relative to conventional centrally oriented dual lens mountings. A canted lens may be conceived as having an orientation, relative to the wearer's head, which would be achieved by starting with conventional dual lens eyewear having centrally oriented lenses and bending the frame inwardly at the temples to wrap around the side of the head. When the eyewear 700 is worn, a lateral edge of the lens wraps significantly around and comes in close proximity to the wearer's temple to provide significant lateral eye coverage.

A degree of wrap may be desirable for aesthetic styling reasons, for lateral protection of the eyes from flying debris, or for interception of peripheral light. Wrap may be attained by utilizing lenses of tight horizontal curvature (high base), such as cylindrical or spherical lenses, and/or by mounting each lens in a position which is canted laterally and rearwardly relative to centrally oriented dual lenses. Similarly, a high degree of rake or vertical tilting may be desirable for aesthetic reasons and for intercepting light, wind, dust or other debris from below the wearer's eyes. In general, "rake" will be understood to describe the condition of a lens, in the as-worn orientation, for which the normal line of sight strikes a vertical tangent to the lens 702a or 702b at a non-perpendicular angle.

The lenses 702a, 702b can be provided with anterior and posterior surfaces and a thickness therebetween, which can be variable along the horizontal direction, vertical direction, or combination of directions. In some embodiments, the lenses 702a, 702b can have a varying thickness along the horizontal or vertical axis, or along some other direction. In some embodiments, the thickness of the lenses 702a, 702b tapers smoothly, though not necessarily linearly, from a maximum thickness proximate a medial edge to a relatively lesser thickness at a lateral edge. The lenses 702a, 702b can have a tapering thickness along the horizontal axis and can be decentered for optical correction. In some embodiments, the lenses 702a, 702b can have a thickness configured to provide an optical correction. For example, the thickness of the lenses 702a, 702b can taper from a thickest point at a central point of the lenses 702a, 702b approaching lateral segments of the lenses 702a, 702b. In some embodiments, the average thickness of the lenses 702a, 702b in the lateral segments can be less than the average thickness of the lenses 702a, 702b in the central zone. In some embodiments, the thickness of the lenses 702a, 702b in at least one point in the central zone can be greater than the thickness of the lenses 702a, 702b at any point within at least one of the lateral segments.

In some embodiments, the lenses 702a, 702b can be finished, as opposed to semi-finished, with the lenses 702a, 702b being contoured to modify the focal power. In some embodiments, the lenses 702a, 702b can be semi-finished so that the lenses 702a, 702b can be capable of being machined, at some time following manufacture, to modify their focal power. In some embodiments, the lenses 702a, 702b can have optical power and can be prescription lenses configured to correct for near-sighted or far-sighted vision. The lenses 702a, 702b can have cylindrical characteristics to correct for astigmatism.

The eyewear 700 can include a mounting frame 704 configured to support the lenses 702a, 702b. The mounting frame 704 can include orbitals that partially or completely surround the lenses 702a, 702b. Referring to FIGS. 57, 57A, 58, and 58A, it should be noted that the particular mounting frame 704 is not essential to the embodiments disclosed herein. The frame 704 can be of varying configurations and designs, and the illustrated embodiments shown in FIGS. 57, 57A, 58, and 58A are provided as examples only. As illustrated, the frame 704 may include a top frame portion and a pair of ear stems 706a, 706b that are pivotably connected to opposing ends of the top frame portion. Further, the lenses 702a, 702b may be mounted to the frame 704 with an upper edge of the lens 702a or 702b extending along or within a lens groove and being secured to the frame 704. For example, the upper edge of the lens 702a or 702b can be formed in a pattern, such as a jagged or non-linear edge, and apertures or other shapes around which the frame 704 can be injection molded or fastened in order to secure the lens 702a or 702b to the frame 704. Further, the lenses 702a, 702b can be removably attachable to the frame 704 by means of a slot with inter-fitting projections or other attachment structure formed in the lenses 702a, 702b and/or the frame 704.

It is also contemplated that the lenses 702a, 702b can be secured along a lower edge of the frame 704. Various other configurations can also be utilized. Such configurations can include the direct attachment of the ear stems 706a, 706b to the lenses 702a, 702b without any frame, or other configurations that can reduce the overall weight, size, or profile of the eyeglasses. In addition, various materials can be utilized in the manufacture of the frame 704, such as metals, composites, or relatively rigid, molded thermoplastic materials which are well known in the art, and which can be transparent or available in a variety of colors. Indeed, the mounting frame 704 can be fabricated according to various configurations and designs as desired. In some embodiments, the frame 704 is configured to retain a unitary lens that is placed in front of both eyes when the eyewear is worn. Goggles can also be provided that include a unitary lens that is placed in front of both eyes when the goggles are worn.

The eyewear 700 can include a pair of earstems 706a, 706b pivotably attached to the frame 704. In some embodiments, the earstems 706a, 706b attach directly to the lenses 702a, 702b. The earstems 706a, 706b can be configured to support the eyewear 700 when worn by a user. For example, the earstems 706a, 706b can be configured to rest on the ears of the user. In some embodiments, the eyewear 700 includes a flexible band used to secure the eyewear 700 in front of the user's eyes in place of earstems 706a, 706b.

The lenses 702a, 702b include a lens body 708 and a laminate 710. The laminate 710 can be substantially permanently affixed to the lens body 708, or the laminate 710 can be configured to be separable from the lens body 708. In some embodiments, the laminate 710 is configured to be removable such that a user, manufacturer, or retailer can apply, remove, or change the laminate 710 after manufacture of the eyewear 700. In this way, a variety of functional elements can be introduced into the eyewear 700 increasing the possible utility of the eyewear 700 because one pair of glasses or goggles can be altered to provide functionality suitable for different occasions.

Each of the laminate 710 and lens body 708 can include one or more layers that provide functional aspects to the lens. For example, the lens body 708 and laminate 710 can include a polarizing layer, one or more adhesive layers, a photochromic layer, electrochromic material, a hard coat, a flash mirror, a liquid-containing layer, an antireflection coating, a minor coating, an interference stack, chroma enhancing dyes, an index-matching layer, a scratch resistant coating, a hydrophobic coating, an anti-static coating, chroma enhancement dyes, color enhancement elements, trichoic filters, glass layers, hybrid glass-plastic layers, anti-reflective coatings, other lens elements, or a combination of lens components. If the lens 702 includes a photochromic layer, the photochromic material can include a neutral density photochromic or any other suitable photochromic. At least some of the lens components and/or materials can be selected such that they have a substantially neutral visible light spectral profile. In some embodiments, the visible light spectral profiles can cooperate to achieve any desired lens chromaticity, a chroma-enhancing effect, color enhancement, another goal, or any combination of goals. The polarizing layer, the photochromic layer, anti-reflection layer, hydrophobic coating, hard coat, and/or other functional layers can be incorporated into the lens body 708, the laminate 710, or both. In some embodiments, the lenses 702a, 702b include one or more lens coatings on the lens body 708, the laminate 710, or both.

In some embodiments, one or more advantages can be realized in at least some circumstances when a lens function, such as, for example, an anti-reflection film, is added to a lens body by a lamination process. For example, functional elements such as optical filters, minor elements, anti-fog layers, interference stacks, light polarizers, and photochromic layers can be incorporated into the lens 702a or 702b without using processes to coat the surface of the lens. As described herein, coating or deposition processes sometimes incorporate steps that can substantially degrade or impair certain functional lens elements or layers. Certain coating processes create surfaces that are not entirely smooth or uniform. Thus, undesirable and unpredictable optical effects that would otherwise be expected to occur in the lens 702a or 702b if the surface were coated, are reduced, minimized, or eliminated altogether when the lenses 702a, 702b are manufactured according to techniques described herein.

In some embodiments, a lens 702a or 702b includes an injection molded, polymeric lens body 708 having a concave surface and a convex surface. The lens body 708 can be formed of polycarbonate (or PC), allyl diglycol carbonate monomer (being sold under the brand name CR-39®), glass, nylon, polyurethane, polyethylene, polyimide, polyethylene terephthalate (or PET), biaxially-oriented polyethylene terephthalate polyester film (or BoPET, with one such polyester film sold under the brand name MYLAR®), acrylic (polymethyl methacrylate or PMMA), a polymeric material, a co-polymer, a doped material, any other suitable material, or any combination of materials. The lens body 708 can be rigid and other layers of the lens can conform to the shape of the lens body 708 such that the lens body 708 dictates the shape of the lens 702a or 702b. The lens body 708 can be symmetrical across a vertical axis of symmetry, symmetrical across a horizontal axis of symmetry, symmetrical across another axis, or asymmetrical. In some embodiments, the front and back surfaces of the lens body 708 can conform to the surfaces of respective cylinders that have a common center point and different radii. In some embodiments, the lens body can have a front and back surfaces that conform to the surfaces of respective cylinders that have center points offset from each other, such that the thickness of the lens body 708 tapers from a thicker central portion to thinner end portions. The surfaces of the lens body 708 can conform to other shapes, as discussed herein, such as a sphere, toroid, ellipsoid, asphere, plano, frusto-conical, and the like. In some embodiments, a thermoforming process can be used to conform the laminate 710 to the lens body 708 having a shape described herein.

The lens body 708 can be contoured during initial formation to have an optical magnification characteristic that modifies the focal power of the lens 702a or 702b. In some embodiments, the lens body 708 can be machined after initial formation to modify the focal power of the lens 702a or 702b. The lens body 708 can provide a substantial amount of the optical power and magnification characteristics to the lens 702a or 702b. In some embodiments, the lens body 708 provides the majority of the optical power and magnification characteristics. Apportioning the majority of optical power and magnification to the lens body 708 can permit selection of lens body 708 materials and lens body 708 formation techniques that provide improved lens 702a, 702b optical power and magnification characteristics, without adversely affecting selection of laminate 710 materials and formation techniques.

The lens body 708 can be injection molded, although other processes can be used to form the shape of the lens blank body, such as thermoforming or machining. In some embodiments, the lens body 708 is injection molded and includes a relatively rigid and optically acceptable material such as polycarbonate. The curvature of the lens body 708 would thus be incorporated into a molded lens blank. A lens blank can include the desired curvature and taper in its as-molded condition. One or two or more lens bodies of the desired shape may then be cut from the optically appropriate portion of the lens blank as is understood in the art. In some embodiments, the frame 704 is provided with a slot or other attachment structure that cooperates with the molded and cut shape of the lens body 708 and laminate 710 to minimize deviation from, and even improve retention of its as-molded shape. In some embodiments, the lens body 708 can be stamped or cut from flat sheet stock and then bent into the curved configuration using a process such as thermoforming. This curved configuration can then be maintained by the use of a relatively rigid, curved frame 704, or by heating the curved sheet to retain its curved configuration.

The laminate 710 can be attached to the lens body 708, for example, through a thermally-cured adhesive layer, a UV-cured adhesive layer, electrostatic adhesion, pressure sensitive adhesives, or any combination of these. Examples of bonding technologies that may be suitable for attaching the laminate 710 to the lens body 708 include thermal welding, fusing, pressure sensitive adhesives, polyurethane adhesives, electrostatic attraction, thermoforming, other types of adhesives, materials curable by ultraviolet light, thermally curable materials, radiation-curable materials, other bonding methods, other bonding materials, and combinations of methods and/or materials. In some embodiments, any technique suitable for affixing the laminate 710 to the lens body 708 can be used. Some embodiments of a lens 702a or 702b includes a lens body 708 and a laminate 710 that are bonded together. In some embodiments, the laminate 710 and the lens body 708 can be integrally connected to each other and can be adhesively bonded together.

The laminate 710 can include a single layer or multiple layers. The laminate 710 can have one or more layers in single or multiple layer form that can be coated with a hard coat or a primer. For example, the laminate 710 can be a single layer of polycarbonate, PET, polyethylene, acrylic, nylon, polyurethane, polyimide, BoPET, another film material, or a combination of materials. As another example, the laminate can include multiple layers of film, where each film layer includes polycarbonate, PET, polyethylene, acrylic, nylon, polyurethane, polyimide, BoPET, another film material, or a combination of materials.

The laminate 710 can include several layers that serve various functions within the lenses 702a, 702b. In some embodiments, one or more layers in the laminate 710 can provide optical properties to the lenses 702a, 702b such as optical filtering, polarization, photochromism, electrochromism, partial reflection of incoming visible light, chroma enhancement, color enhancement, color alteration, or any combination of these. In some embodiments, one or more layers within the laminate 710 can provide mechanical protection to the lenses 702a, 702b or other layers within the laminate 710, reduce stresses within the laminate 710, or improve bonding or adhesion among the layers in the laminate 710 and/or between the laminate 710 and the lens body 708. In some embodiments, the laminate 710 can include layers that provide additional functionality to the lenses 702a, 702b such as, for example, anti-reflection functionality, anti-static functionality, anti-fog functionality, scratch resistance, mechanical durability, hydrophobic functionality, reflective functionality, darkening functionality, aesthetic functionality including tinting, or any combination of these.

As an example, the laminate 710 can include one or more layers that can serve to thermally insulate the laminate 710 such that it can be used in high temperature molding processes without subjecting the certain functional layers to temperatures sufficient to significantly degrade their optical performance. In some embodiments, the laminate 710 can serve as a thermally isolating element or vehicle that can incorporate functional elements that may be degraded if subjected to high temperature manufacturing processes. As such, the laminate 710 can be used to incorporate these types of functional elements into lenses that otherwise are formed and/or manufactured using high temperature processes. As an example, the laminate 710 can include a substrate with one or more functional coatings deposited thereon. The functional coatings can include elements that would be degraded or whose performance would be altered if subjected to high temperatures, such as certain chroma enhancement dyes. The laminate 710 could then be bonded to the lens body 708 using a UV-cured adhesive, thus thermally isolating the laminate 710 and the included functional layers from the high temperature processes associated with the manufacture of the lens body 708.

As an example of incorporating functionality into a lens 702, the laminate 710 or the lens body 708 can include layers or elements that serve to tint the lens 702. Tinting can be added to a lens element in different ways. In some embodiments, color can be deposited on the lens element using a vapor or liquid source. The color can coat the lens element or it can penetrate into the element. In some embodiments, color can be added to a material used to make the lens element, such as adding powdered color or plastic pellets to material that is extruded, injection molded, or otherwise molded into a lens element. In some embodiments where liquids are used, the color can be added by a dip process. In such embodiments, a gradient tint or bi-gradient tint can be achieved through the dip process. In certain embodiments, a liquid coloring technique can be used to tint one or more lens elements. For example, liquid dye can be added to the polymer during an injection molding process.

By applying a tint to the laminate 710 or another layer that becomes a part of the laminate 710, a substantial increase in manufacturing capacity can be realized because of the nature of manufacturing a laminates. Another advantageous feature can be that undesired color transfer, e.g. to lens cloths of packaging, can be reduced or eliminated by not positioning the tinted layer on an exterior surface of the lens, e.g. putting the tinted layer between protective layers. Moreover, tinting can be applied to layers which do not experience high temperature processes during manufacture which can protect chromophores that may have poor heat stability. In some embodiments, tint is included in a layer, such as a functional layer or substrate layer. For example, a solution incorporating chromophores having desired chromatic properties can be applied to a functional hard coat layer that is porous. As a result, the hard coat layer can be impregnated with the chromophores. As another example, powdered dyes can be included with plastic pellets during the manufacture of the plastic. The compatible dyes can form a substantially uniform mixture with the plastic to form a tinted plastic material. In some embodiments, a tinted layer can be constructed such that chromophores can be a principal component of the layer or a smaller fraction of the tinted layer, according to the desired chromatic properties of the layer. The thickness of the layer can be adjusted to achieve a desired color profile of the lens.

Some embodiments provide for eyewear 700 having electrochromic functionality incorporated into the laminate 710. The eyewear 700 can include a power source, such as a battery, an electrical contact, and a conductor that conveys a voltage to an electrode in the electrochromic laminate. The eyewear 700 can include a user interface element integrated into the frame 704, the earstems 706, the lens 702, or any combination of these. The user interface element can be configured to allow the user to control activation and deactivation of the electrochromic layer. The user interface element can be a switch, button, toggle, slide, touch-interface element, knob, other mechanical feature, or other electrical feature. For example, the user interface element can include a touch-sensitive region where if a user contacts said region the electrochromic element changes state from dark to transparent. In some embodiments, a lens includes both photochromic and electrochromic layers, integrated into a single functional layer or implemented in separate functional layers.

An advantage of incorporating functional elements into the laminate 710 and/or lens body 708 is that it provides the ability to separately manufacture each functional lens element. Thus, elements can be made in parallel and assembled to make a lens 702 having desired functional qualities, thereby increasing manufacturing capabilities and/or lowering costs. In addition, multiple functional properties can be imparted to a lens using the techniques and lens elements described herein, providing flexibility and greater capacity for creating lenses 702 with varying characteristics.

The eyewear 700 can incorporate one or more lens bodies and one or more laminates in various configurations. Each lens body and each laminate can be configured to provide a variety of functions. Thus, a manufacturer, retailer, user, or the like can select functional layers in the lens bodies and laminates and/or the configuration of the lens bodies and laminates to provide desired functionality. Sample configurations of laminates and lens bodies are illustrated in FIGS. 57, 57A, 58, and 58A. Other variations and permutations of laminates and lens bodies are contemplated by the present disclosure as well.

FIGS. 57 and 57A illustrate an example embodiment of eyewear 700 having a laminate 710 attached to the convex side of a lens body 708. On the convex side of the lens body 708, the laminate can be configured to provide functionality suitable for that position. For example, it may be desirable that eyewear 700 have a chroma enhancement filter on the exterior side of the lenses 702a, 702b. This can be accomplished by attaching a laminate 710 that has a chroma enhancement filter at least partially incorporated therein. Where the laminate 710 is removable, positioning the laminate on the convex side of the lenses 702a, 702b may allow for easier application and removal of the laminate 710.

The laminate 710 positioned on the convex surface of the lens body 708 can provide the eyewear 700 with desirable attributes. For example, the laminate 710 can include a polarizing layer, anti-reflection coating, a photochromic layer, flash minor, hard coat, chroma enhancement dyes, color enhancement elements, an electrochromic layer, contrast enhancement elements, a trichoic filter, a glass layer, a hybrid glass-plastic layer, a liquid-containing layer, an refractive index matching layer, or any combination of these. By incorporating these and other functionalities into the laminate 710, the lens body 708 can have a coating applied or functional layer deposited using vapor deposition without substantially altering the desirable functional attributes of the laminate 710. For example, the lens body 708 can be immersion or dip coated with a hydrophobic layer. The laminate 710 can have an anti-reflection coating applied and the laminate 710 can be joined to the lens body 708 after the application of the hydrophobic layer such that the resulting lens includes both the hydrophobic functionality and the anti-reflection functionality without substantially altering the functionality of either coating. In another example, the laminate 710 can include a flash minor and one or more hard coats on either side of the laminate 710. The lens body 708 can include an anti-fog coating on the concave side of the lens body 708 and one or more hard coats on either side of the lens body 708. The flash mirror can be incorporated into the laminate 710 using vapor deposition techniques. The anti-fog coating can be incorporated into the lens body 708 using immersion process techniques. The laminate 710 can then be attached to the lens body 708 by way of an adhesion layer such that the flash mirror side of the laminate 710 forms the exterior side of the finished lens and the anti-fog coating of the lens body 708 forms the interior side of the finished lens. In some embodiments, the lens 702 can include a heated lens element that can provide anti-fog functionality. For example, an electrically conductive transparent film of indium tin oxide-based material, zinc oxide-based material, or another suitable conductive material with substantial transparency can be included in a lens element, and a voltage can be applied across it such that heat is generated. As another example, the lens element can include non-transparent filaments that heat when a voltage is applied across them, providing an anti-fog functionality.

FIGS. 58 and 58A illustrate an example embodiment of eyewear 700 having laminates 710a, 710b, 710c attached to lens bodies 708a, 708b. The laminate 710b, sandwiched between lens bodies 708a and 708b, can be used to incorporate functionality into unfinished lenses 702a, 702b. For example, laminate 710b can include functional aspects that are desirable to include in a finished lens, such as polarization, photochromism, electrochromism, color enhancement, contrast enhancement, tinting, or chroma enhancement. The lens bodies 708a, 708b can be attached to either side of the laminate 710b to form an unfinished lens. The lens can be then shaped, machined, coated, grinded, and/or processed without substantially altering the functional aspects of the laminate 710b. Laminates 710a and 710c can be attached after processing the lens bodies 708a, 708b to create a lens with the desired qualities.

Chroma-enhancing eyewear can include one or more lenses having any desired number of laminates, coatings, and other lens elements. One or more of the lens elements can incorporate functional layers that impart desired functionality to the eyewear, including, for example an interference stack, a flash mirror, photochromic layer(s), electrochromic layer(s), anti-reflective coating, anti-static coating, liquid containing layer, polarizing elements, chroma enhancing dyes, color enhancing elements, contrast enhancing elements, trichoic filters, or any combination of these. The functional layers can include sub-layers, which can individually or in combination incorporate one or more functions into the complete lens.

In some embodiments, a functional layer is configured to provide variable light attenuation. For example, a functional layer can include photochromic compositions that darken in bright light and fade in lower light environments. Such compositions can include, for example, but without limitation, silver, copper, and cadmium halides. Photochromic compounds for lenses are disclosed in U.S. Pat. Nos. 6,312, 811, 5,658,502, 4,537,612, each of which are hereby expressly incorporated in its entirety herein by reference. A lens 500 incorporating one or more photochromic functional layers would thus provide relatively little light attenuation when used in a lower light environment, but would automatically provide increased light attenuation when used in bright light, such as when worn outdoors. Thus, in some embodiments, the lens can be suitable for use in both indoor and outdoor environments. In certain embodiments, the photochromic compositions can selectively alter the chroma enhancing effect of a lens. For example, eyewear can be configured to transition from a neutral gray or clear chromaticity to an activity-specific non-neutral chromaticity upon substantial exposure to sunlight.

In some embodiments, chroma enhancing eyewear incorporates an electrochromic functional layer, which can include a dichroic dye guest-host device configured to provide variable light attenuation. For example, a functional layer can include spaced substrates coated with a conducting layer, an alignment layer, and preferably a passivation layer. Disposed between the substrates is a guest-host solution which includes a host material and a light-absorbing dichroic dye guest. A power circuit can be supplied to the functional layer through a battery in the host eyewear. The power circuit provides a supply of electrical power to the conducting layers. Adjustment of the power supply alters the orientation of the host material which in turn alters the orientation of the dichroic dye. Light is absorbed by the dichroic dye, depending upon its orientation, and thus provides variable light attenuation, that can be manually adjusted by the wearer. Such a dichroic dye guest-host device is disclosed in U.S. Pat. No. 6,239,778, the entire contents of which are expressly incorporated herein by reference and made a part of this specification.

In some embodiments, an electrochromic functional layer is produced by depositing a composition containing a crosslinkable polymer onto a suitable support followed by in situ crosslinking. For example, a polymerizable composition can be applied onto a glass plate coated with a layer of $WO_3$ and a tin oxide conductive sublayer, and photopolymerized by UV irradiation to obtain a membrane that is optically transparent in the visible range and adherent to the support. The membrane can then be assembled with a counterelectrode formed on a glass plate bearing a layer of hydrogenated iridium oxide $H_xIrO_2$ and a tin oxide sublayer. The polymerizable composition can be formed from the lithium salt of trifluoro-methanesulfonyl(1-acryloyl-2,2,2-tri-fluoroethanesulfonyl)imide, poly(theylene glycol) dimethacrylate, silica particles, and xanthone. In some embodiments, an electrochromic layer is formed by two electrochromic layers separated by a film of ion-conducting material. Each electrochromic layer can be borne by a substrate coated with a conductive oxide, an indium tin oxide-based material, a zinc oxide-based material, or another type of conductive layer. The ion-conducting material forms an ion-conducting polymer electrolyte and is formed by a proton-conducting polymer, for example a 2-acrylamido-2-methylpropanesulfonic acid homopolymer. The polymer film can be produced by depositing onto one of the electrodes a liquid reaction mixture containing the polymer precursor dissolved in a liquid solvent, for example a mixture of water and NMP. In some embodiments, an electrochromic layer includes an electrode and a counterelectrode separated by a solid polymer electrolyte, the electrode being formed by a transparent substrate bearing an electronically conductive film coated with a film of a cathode active material with electrochromic properties, the counterelectrode being formed by a transparent substrate bearing an electronically conductive film coated with a film of an anode active material with electrochromic properties, the electrolyte being formed by an ion-conducting material including a salt dissolved in a solvating solid polymer. The electrochromic layer can be characterized in that the electrolyte membrane is intercalated in the form of a composition of low viscosity free of volatile liquid solvent and including a polymer or a polymer precursor and a salt.

In some embodiments, a functional layer incorporates a filter that enhances chroma in a wavelength-conversion window, a background-window, a spectral-width window, another chroma enhancement window (CEW), or any combination of CEWs. The chroma-enhancing filter generally changes the colorfulness of a scene viewed through a lens compared to a scene viewed through a lens with the same luminous transmittance but a different spectral transmittance profile. An optical filter can be configured to enhance the chroma profile of a scene when the scene is viewed through a lens that incorporates the optical filter. The optical filter can be configured to increase or decrease chroma in one or more chroma enhancement windows in order to achieve any desired effect. The chroma-enhancing optical filter can be configured to preferentially transmit or attenuate light in any desired chroma enhancement windows. Any suitable process can be used to determine the desired chroma enhancement windows. For example, the colors predominantly reflected or emitted in a selected environment can be measured, and a filter can be adapted to provide chroma enhancement in one or more spectral regions corresponding to the colors that are predominantly reflected or emitted. In some embodiments, the optical filter is partially incorporated into a lens body. In certain embodiments, the optical filter can be partially incorporated into a laminate. A functional layer can include one or more chroma enhancement dyes configured to attenuate visible light passing through the lens in one or more spectral bands. In some embodiments, one or more portions of the optical filter can be incorporated into the functional layers, into the lens body substrate, into an interface layer, into an adhesive layer, into another lens element, or into a combination of elements. For example, a functional layer can incorporate one or more chroma enhancement dyes that increase the chroma of a scene, compared to the chroma of a substantially unfiltered scene.

Some embodiments of chroma-enhancing eyewear incorporate an optical filter having one or more filter elements that manage or attenuate light passing through the filter in a color channel located between chroma enhancement windows. Such filter elements can tailor the color channel in such a way that the hues of certain colors are increased. Filter elements that accomplish this effect can be organic dyes or other suitable visible light filtering structures (e.g., dielectric stacks, reflective filters, etc.).

Figure 59A:
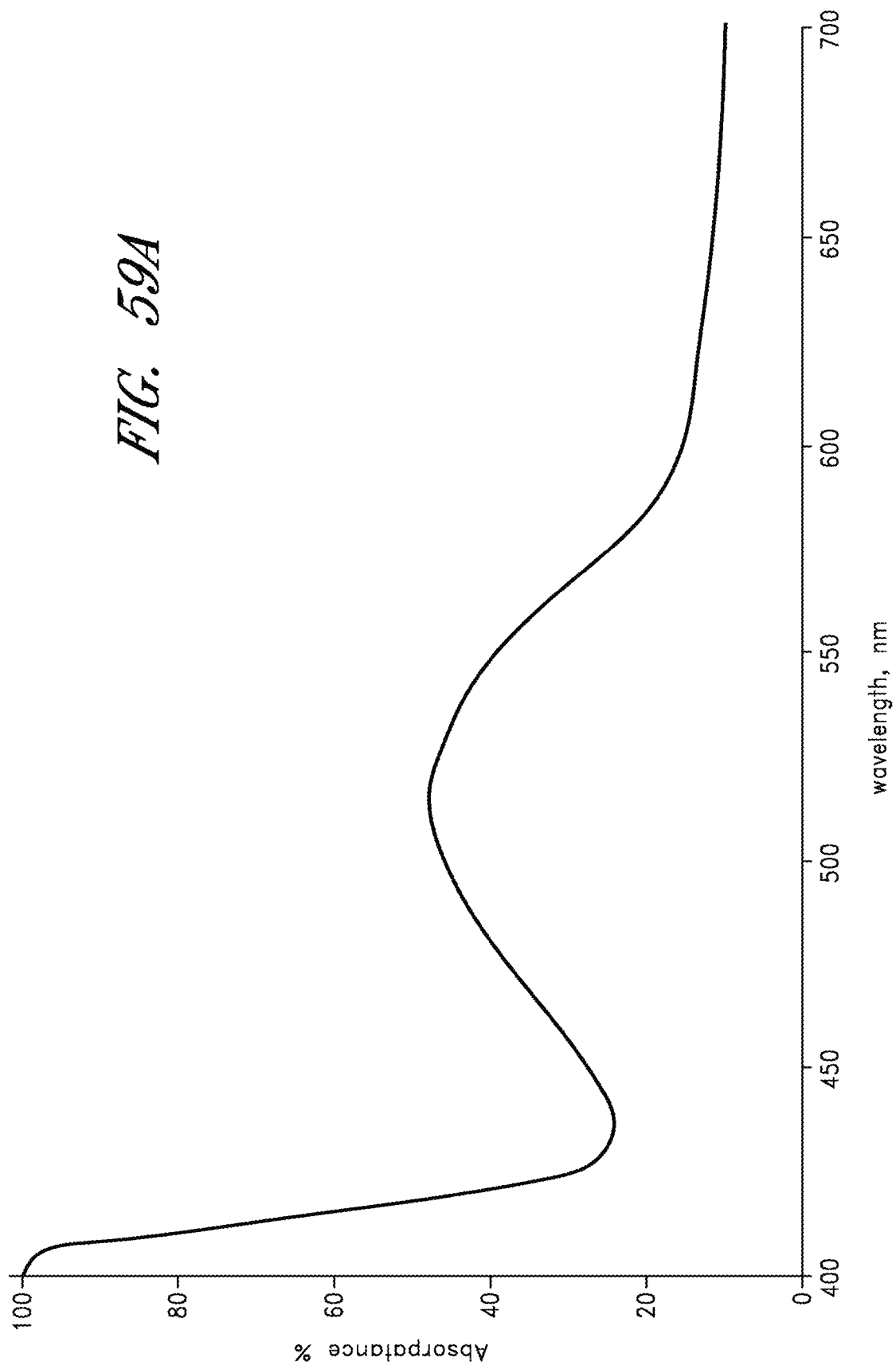
FIG. 59A is a graph showing the spectral absorptance profile of a dye loaded into polycarbonate.
Figure 59B:
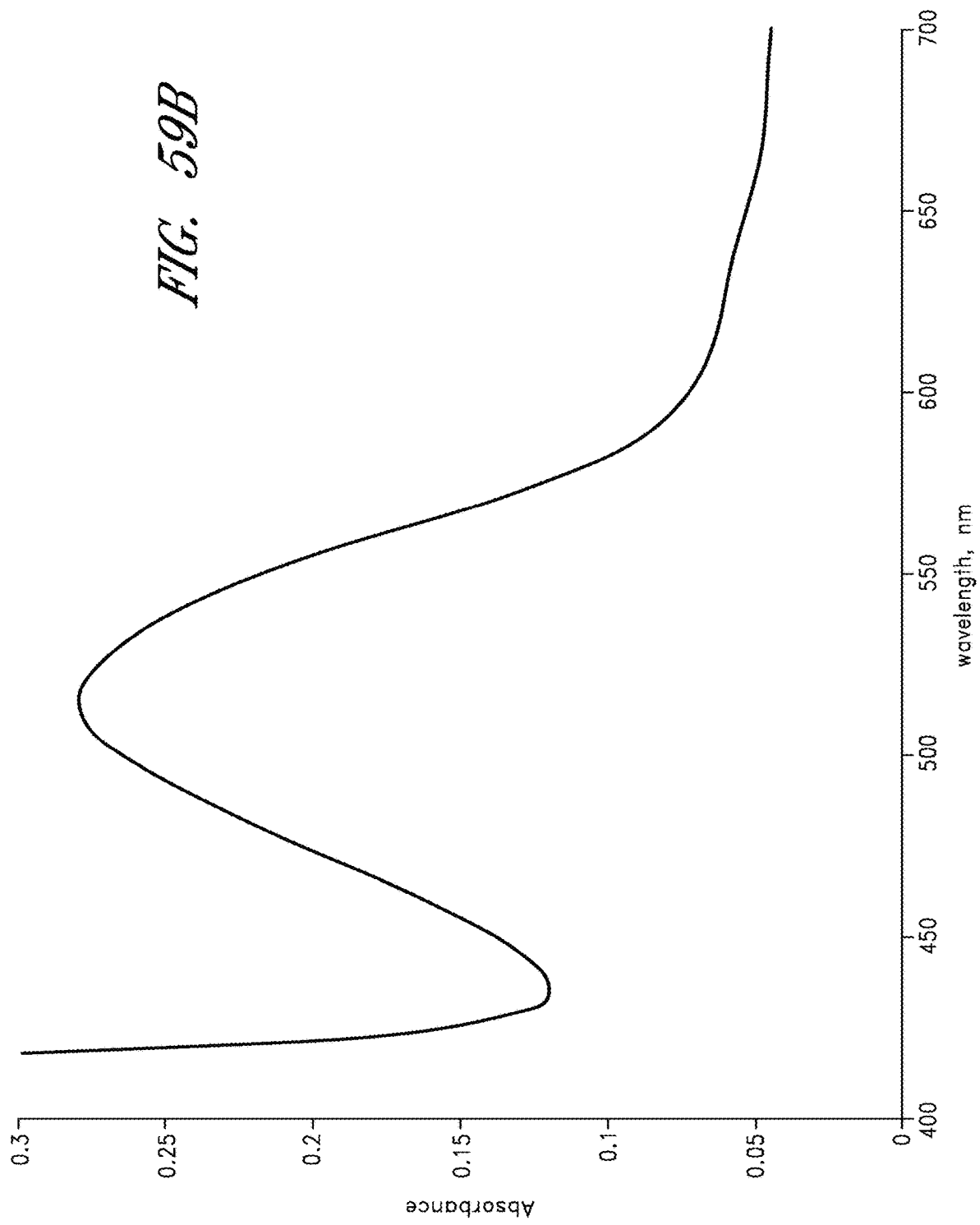
FIG. 59B is a graph showing an absorbance profile corresponding to the absorptance profile of FIG. 59A.

FIG. 59A is an absorptance profile of an example dye, Exciton ABS 515, that tailors the color channel in the 490 nm-560 nm wavelength band. FIG. 59B shows an absorbance profile of the same dye. As a logarithmic quantity, absorbance can ease identification of absorptance peaks, peak locations, peak bandwidths, and center wavelengths, particularly when absorptance peaks have very high attenuation factors. Filter elements with peak locations outside a chroma enhancement window can be used to tailor the overall lens color. The lens color can selected to correspond to an activity-specific setting. For example, the lens color can be selected to match a color of interest (e.g., the color of an object of interest or the color of an activity-specific background color). In shooting lens embodiments, a brown lens color can be selected so that the lens color is similar to a cardboard target. The lens color can also be selected to match a complement to the color of interest. Such filter elements can also be used to achieve a neutral color lens, a desired white point, or any other desired color balancing effect.

Figure 60A:
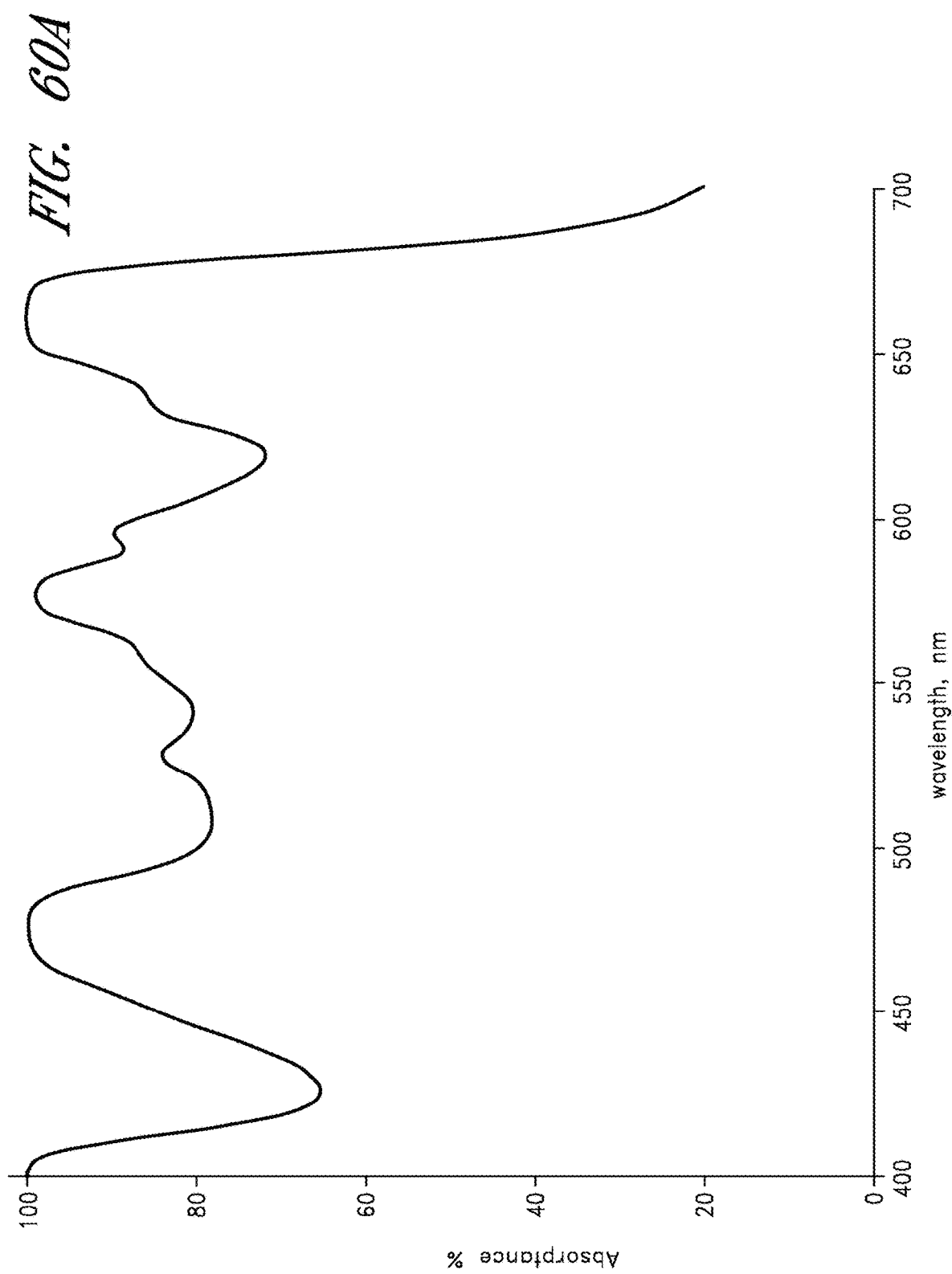
FIG. 60A is a graph showing the spectral absorptance profile of a lens incorporating a chroma enhancement filter.
Figure 60B:
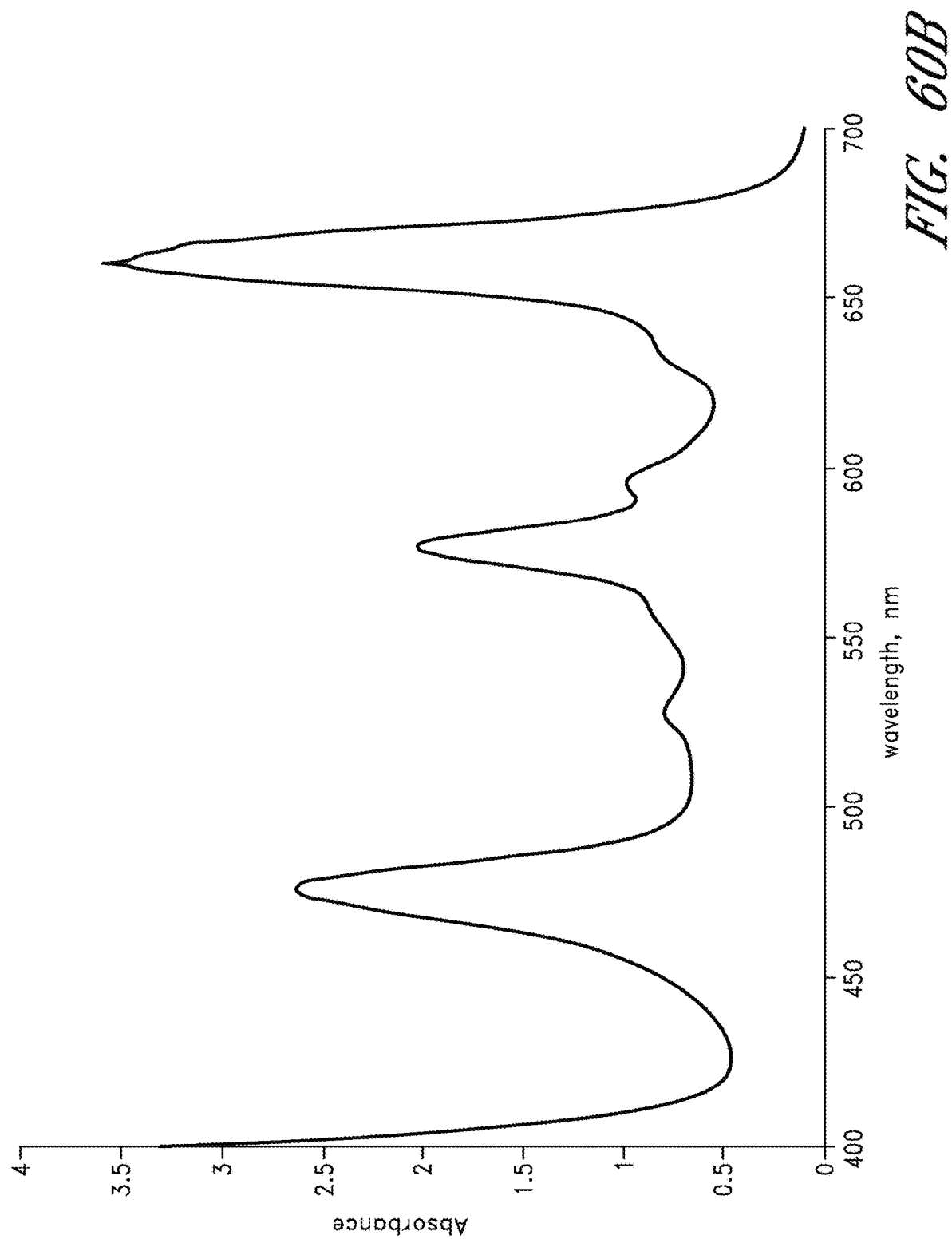
FIG. 60B is a graph showing an absorbance profile corresponding to the absorptance profile of FIG. 60A.

FIG. 60A is an absorptance profile of a lens having a substantially neutral-color optical filter incorporating chroma enhancement dyes and a color channel tailoring dye. FIG. 60B is an absorbance profile of the absorptance profile shown in FIG. 60A. The filter characterized by the profiles shown in FIGS. 60A and 60B includes a blue chroma enhancement dye, a yellow chroma enhancement dye, a red chroma enhancement dye, and a green color band tailoring dye. The filter provides chroma enhancement over a broad range of the visible spectrum. To achieve a filter having the general absorbance profile shown in FIG. 60B, dyes can be mixed into a batch of polycarbonate resin. If the mixture includes 1 lb. of polycarbonate resin, the following approximate loadings of chroma enhancement dyes can be used: 17 mg of blue chroma enhancement dye, 21 mg of yellow chroma enhancement dye, 25 mg of red chroma enhancement dye, and 35 mg of the green color band tailoring dye having the absorptance profile shown in FIG. 59A. A lens incorporating the optical filter could have a luminous transmittance of less than or equal to about 14%, as measured with respect to CIE Illuminant C. In some embodiments, chroma enhancing eyewear incorporates a filter with greater than or equal to the loading of each dye specified in this paragraph. In some embodiments, chroma enhancing eyewear incorporates a filter with greater than or equal to the loading of at least one of the dyes specified in this paragraph or any combination of the dyes specified in this paragraph.

Rebalancing the mixture of dyes in a chroma enhancement filter can result in a lens with a different overall color. For example, an optical filter similar to the one shown in FIGS. 60A and 60B can be tailored to be used in low light, dusk, or range shooting conditions by eliminating the red chroma enhancement dye and reducing the loading of yellow chroma enhancement dye. The resulting filter could have a brown overall color, thereby helping a wearer of eyewear incorporating the filter to have better dynamic visual acuity when viewing cardboard, dirt, etc.

Figure 61A:
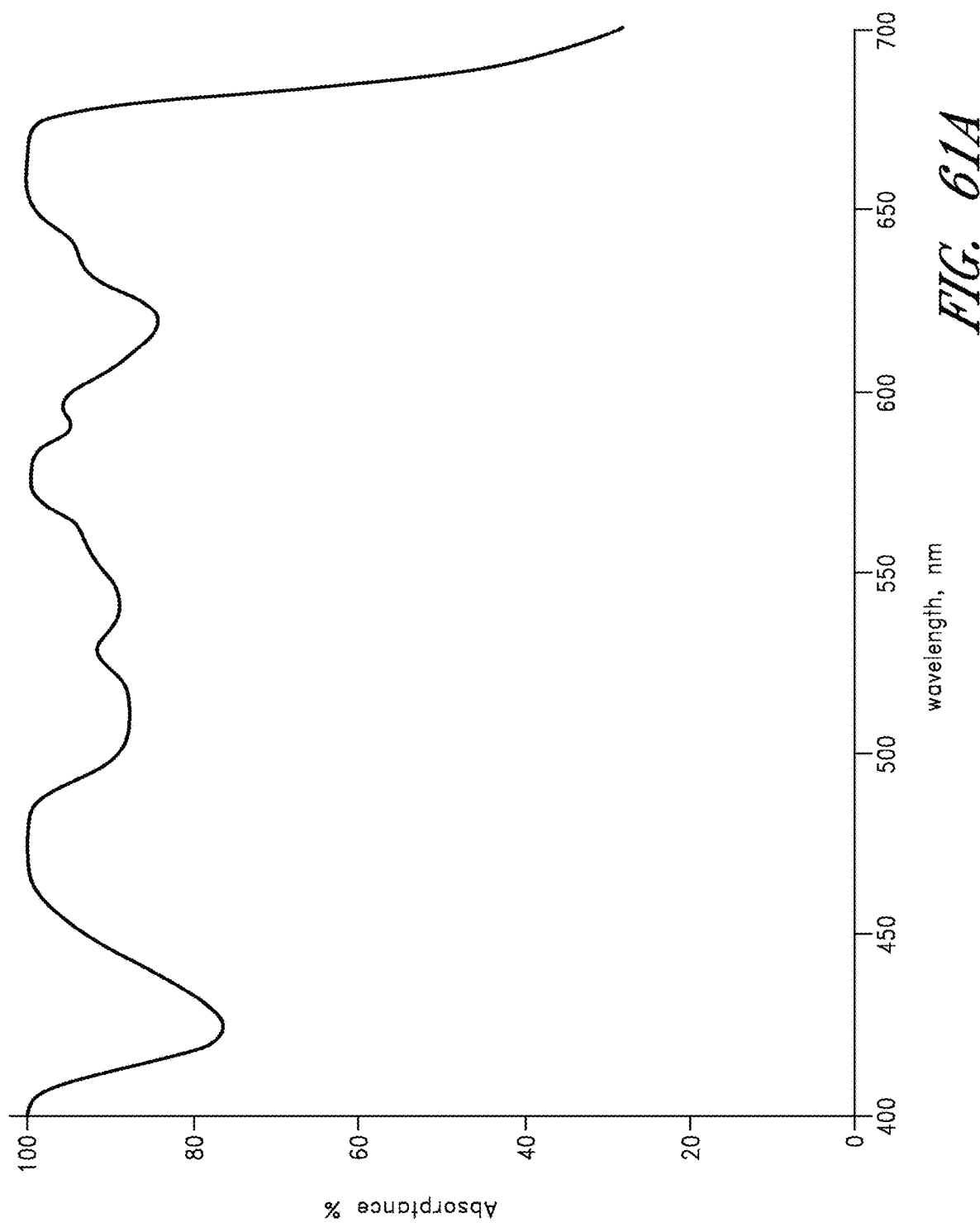
FIG. 61A is a graph showing the spectral absorptance profile of another lens incorporating a chroma enhancement filter.
Figure 61B:
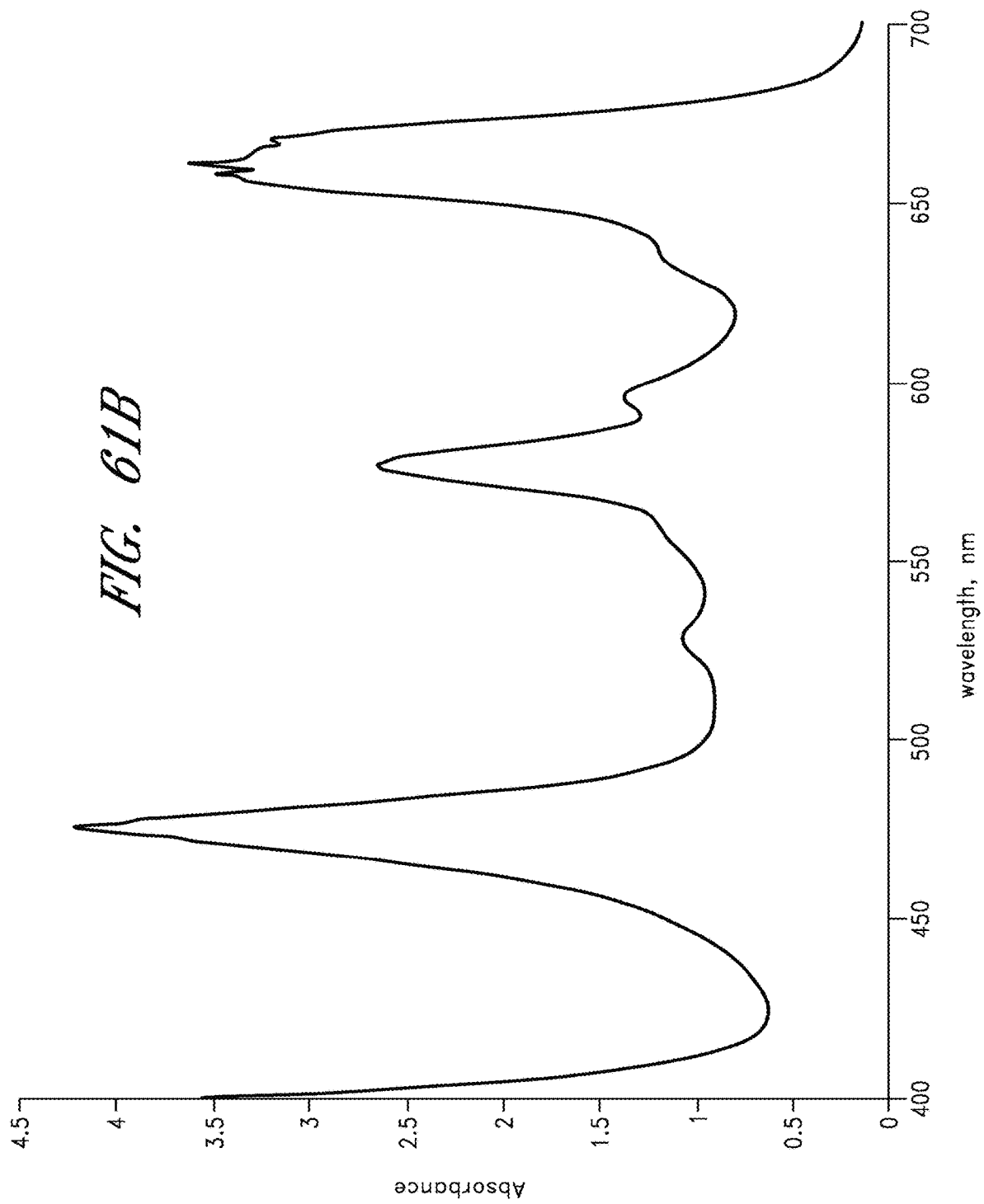
FIG. 61B is a graph showing an absorbance profile corresponding to the absorptance profile of FIG. 61A.

A darker lens can be produced by generally increasing the loading of dyes in an optical filter. FIG. 61A is an absorptance profile of a lens having a neutral-color optical filter incorporating the same dyes as the filter shown in FIG. 60A Like the filter shown in FIG. 60A, the filter illustrated in FIG. 61A provides chroma enhancement over a broad range of the visible spectrum. FIG. 61B is an absorbance profile of the absorptance profile shown in FIG. 61A. To achieve a filter having the general absorbance profile shown in FIG. 61B, dyes can be mixed into a batch of polycarbonate resin. If the mixture includes 1 lb. of polycarbonate resin, the following approximate loadings of chroma enhancement dyes can be used: 24 mg of blue chroma enhancement dye, 27 mg of yellow chroma enhancement dye, 36 mg of red chroma enhancement dye, and 44 mg of the green color band tailoring dye having the absorptance profile shown in FIG. 59A. A lens incorporating the optical filter could have a luminous transmittance of less than or equal to about 9%, as measured with respect to CIE Illuminant C.

Figure 62A:
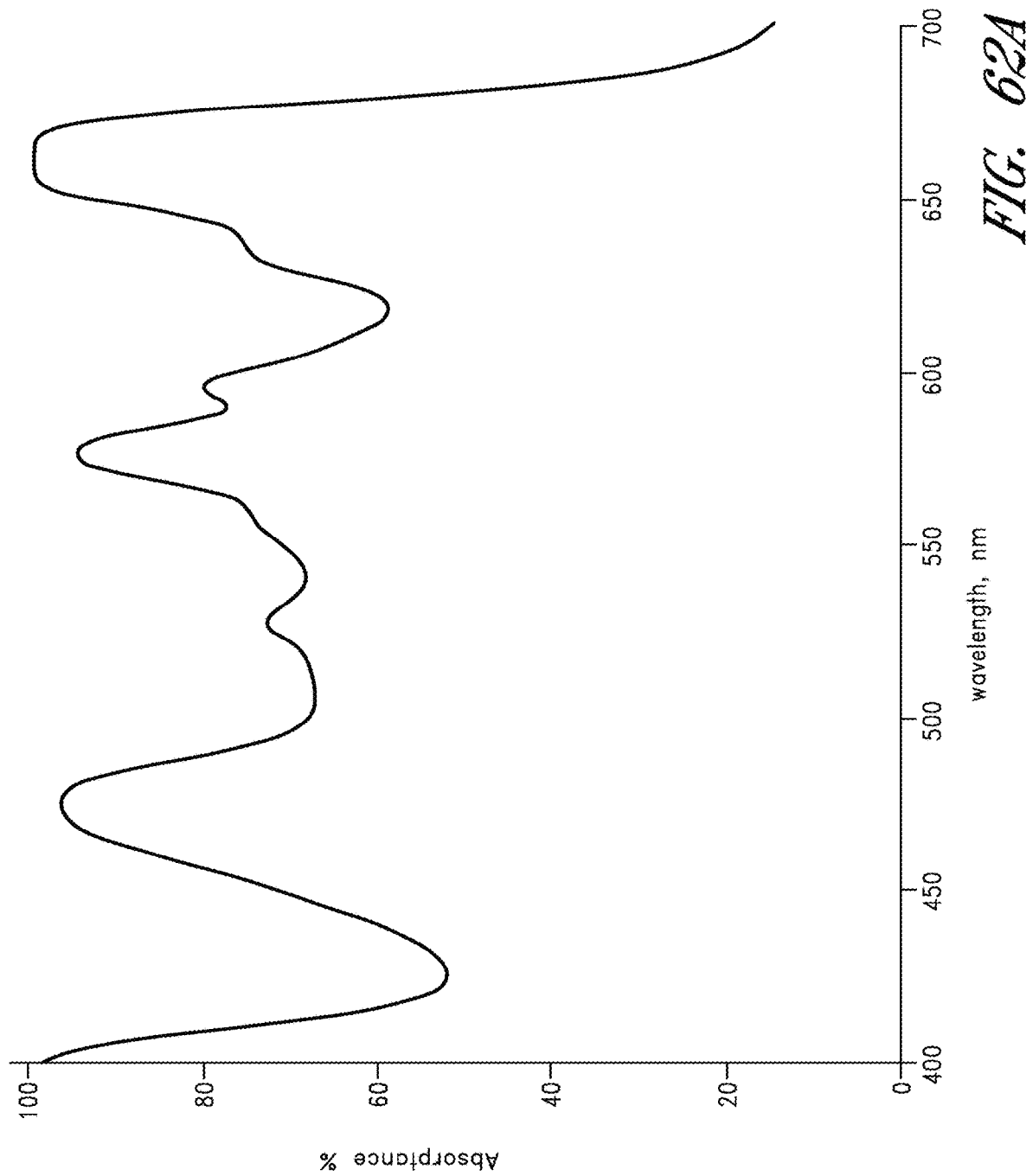
FIG. 62A is a graph showing the spectral absorptance profile of a chroma enhancement filter.
Figure 62B:
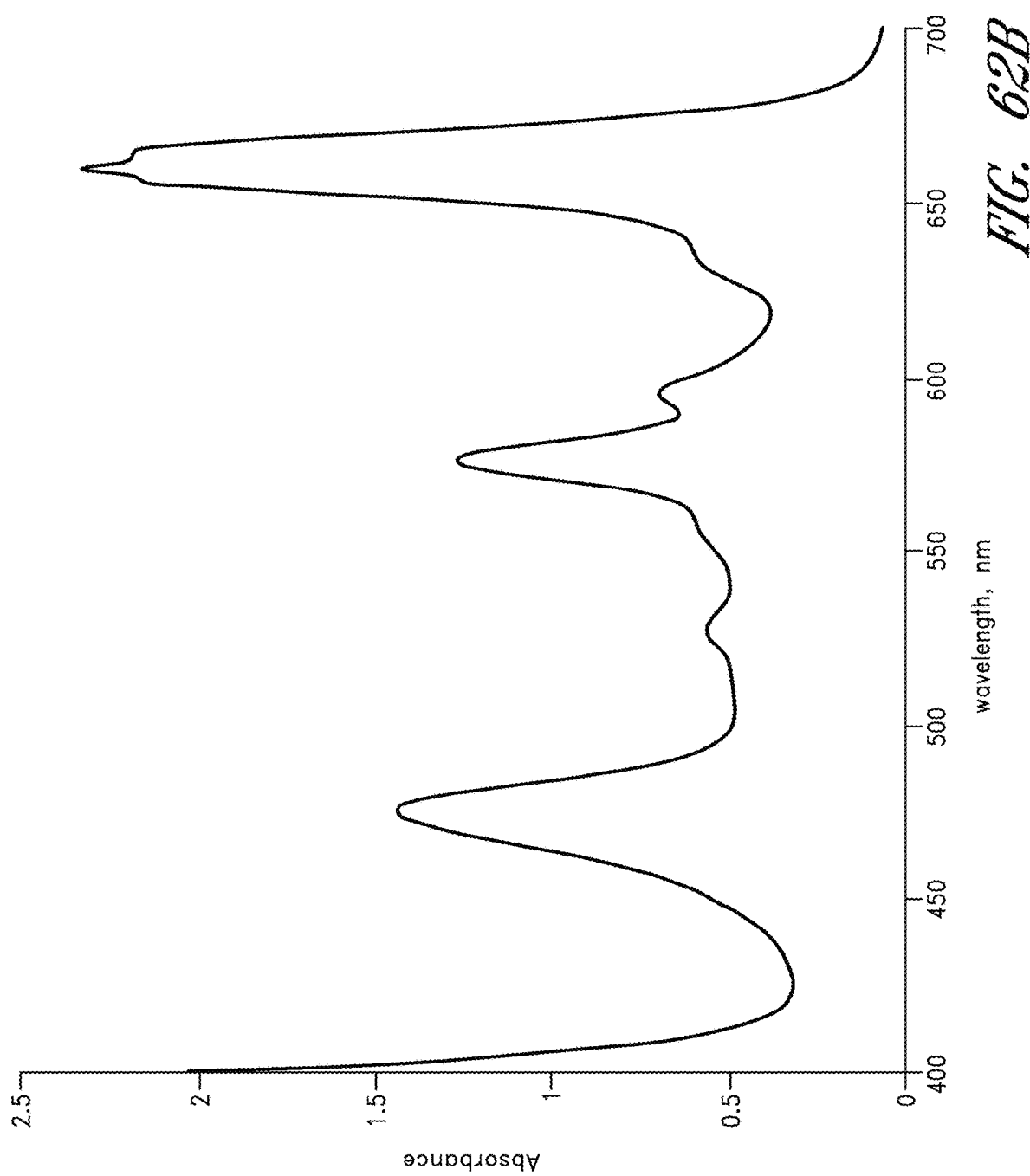
FIG. 62B is a graph showing an absorbance profile corresponding to the absorptance profile of FIG. 62A.
Figure 63A:
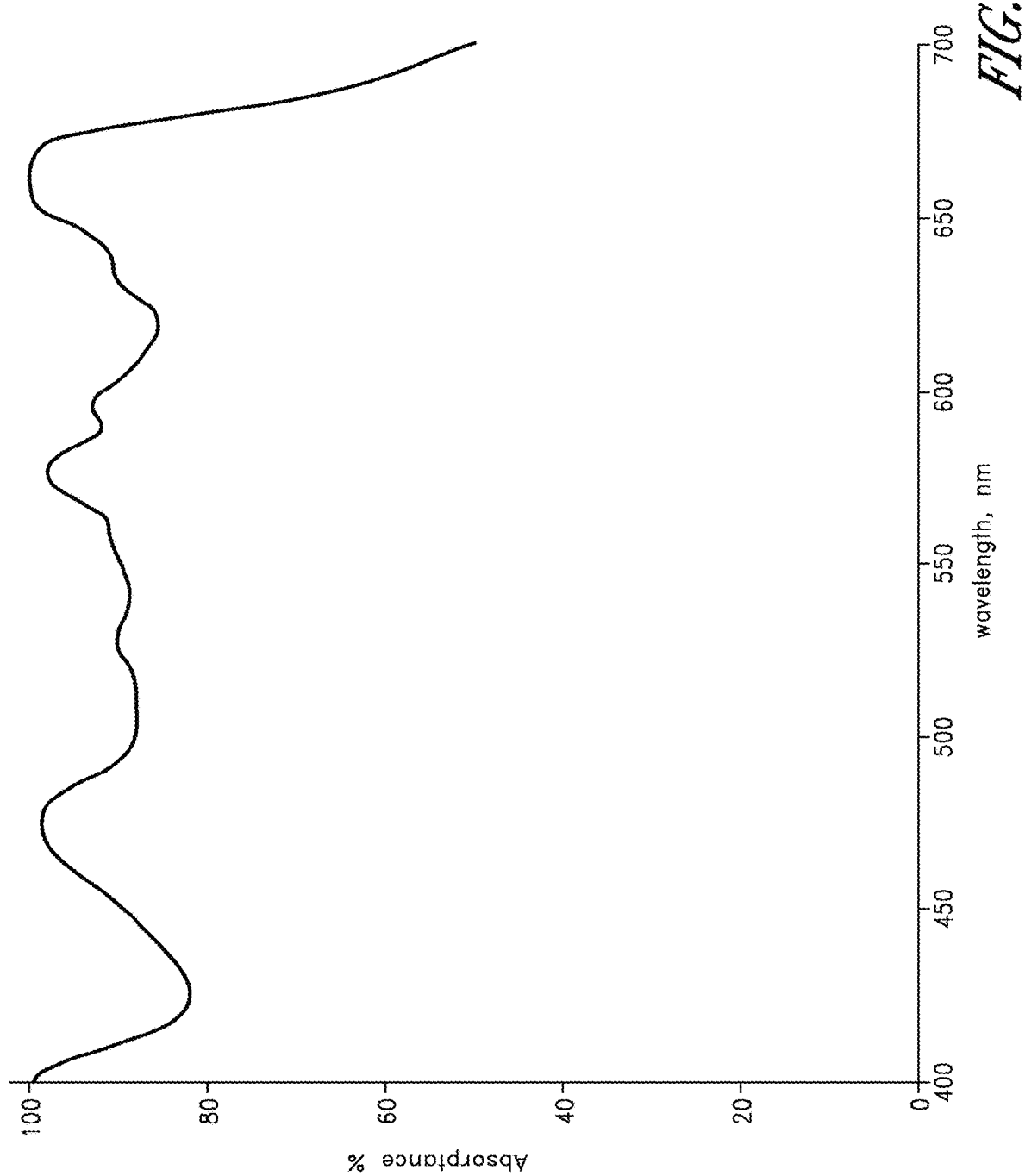
FIG. 63A is a graph showing the spectral absorptance profile of a lens incorporating the chroma enhancing chroma enhancement filter of FIG. 62A and a polarizer.
Figure 63B:
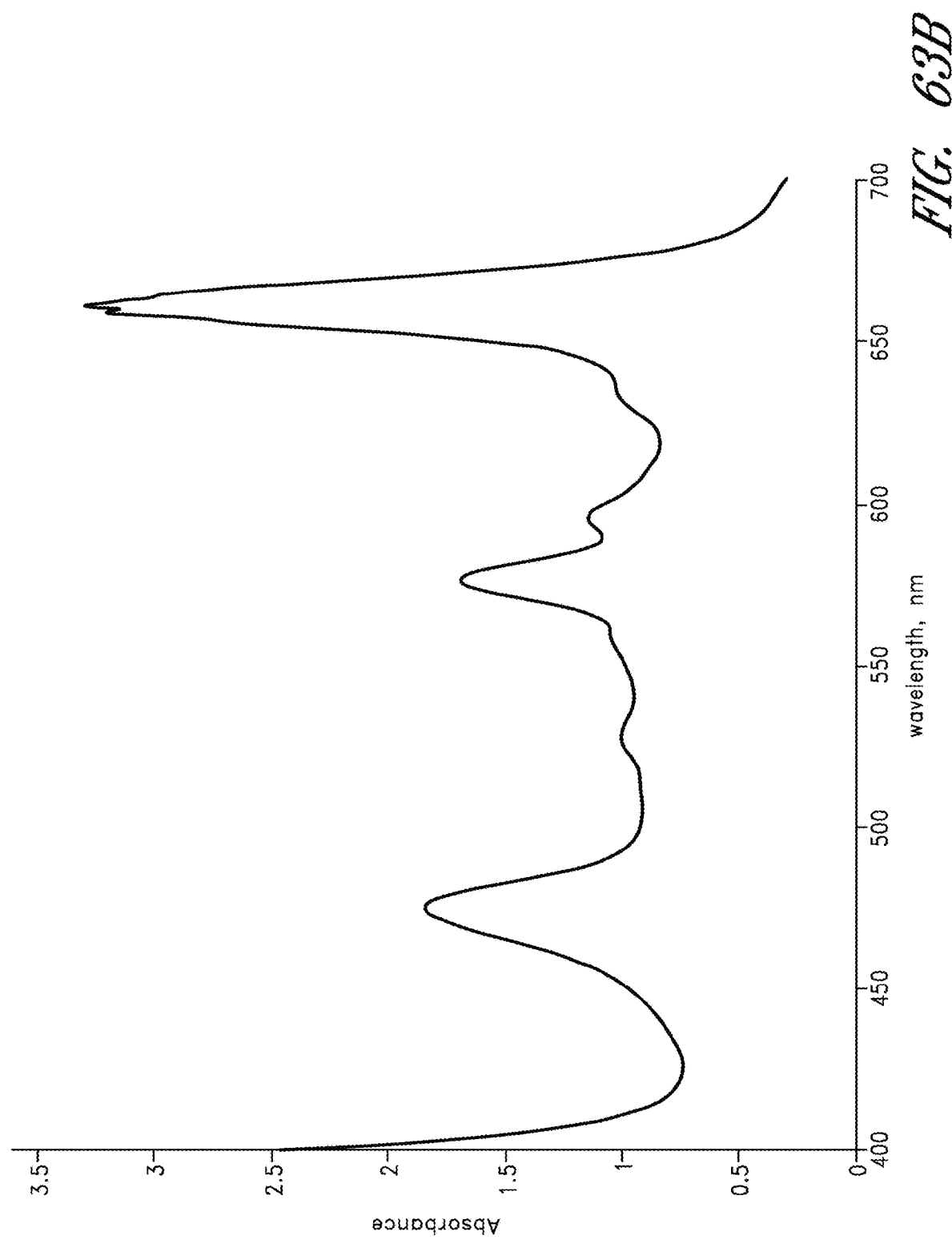
FIG. 63B is a graph showing an absorbance profile corresponding to the absorptance profile of FIG. 63A.

If chroma enhancing eyewear incorporates a polarizer in the finished lens, the optical filter can be selected to account for the additional light attenuation and spectral profile of a polarizing filter. In some embodiments, the additional attenuation produced by a polarizing filter can be accounted for by generally reducing the loading of dyes in a chroma enhancement filter. FIG. 62A is an absorptance profile of a neutral-color optical filter incorporating the same dyes as the filter shown in FIG. 60A at lower loadings. Like the filter shown in FIG. 60A, the filter illustrated in FIG. 62A provides chroma enhancement over a broad range of the visible spectrum. FIG. 62B is an absorbance profile corresponding to the absorptance profile shown in FIG. 62A. While the values of the absorbance are different from the values shown in FIG. 60B, the absorbance profile of FIG. 62B generally has the same contours as the absorbance profile of the darker filter of FIG. 60B. FIG. 63A is an absorptance profile of a lens incorporating the optical filter of FIG. 62A and a polarizer. A polarizer causes the luminous transmittance of the lens to be lower than the luminous transmittance of its chroma enhancing filter alone. FIG. 63B is an absorbance profile corresponding to the absorptance profile shown in FIG. 63A. The polarizer can change the contours of the absorbance profile when it is combined with the chroma enhancement filter. The chroma enhancement filter can be selected to account for the spectral features of a polarizing filter such that the complete lens has a desired lens color, chroma enhancement effect, and other desired spectral characteristics.

It is contemplated that the particular features, structures, or characteristics of any embodiments discussed herein can be combined in any suitable manner in one or more separate embodiments not expressly illustrated or described. For example, it is understood that an optical filter can include any suitable combination of light attenuation features and that a combination of light-attenuating lens elements can combine to control the chroma of an image viewed through a lens. In many cases, structures that are described or illustrated as unitary or contiguous can be separated while still performing the function(s) of the unitary structure. In many instances, structures that are described or illustrated as separate can be joined or combined while still performing the function(s) of the separated structures. It is further understood that the optical filters disclosed herein can be used in at least some lens configurations and/or optical systems besides those explicitly disclosed herein.

It should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Thus, it is intended that the scope of the inventions herein disclosed should not be limited by the particular embodiments described above, but should be determined by a fair reading of the claims that follow.

What is claimed is:

1. An eyewear comprising an optical filter configured to attenuate visible light in a plurality of spectral bands, the plurality of spectral bands comprising an absorbance peak having a maximum absorbance with a spectral bandwidth, and an absorptance peak having a maximum absorptance, wherein:

the maximum absorbance of the absorbance peak is located at a first spectral range from about 560 nm to about 600 nm;

the spectral bandwidth, equal to the full width of the absorbance peak at 80% of the maximum absorbance of the absorbance peak, associated with the first absorbance peak is less than or equal to 35 nm;

the maximum absorptance of the absorptance peak is located at a second spectral range from about 465 nm to about 535 nm; and the maximum absorptance of the absorptance peak is from about 90% to about 100%.

2. The eyewear of claim 1, wherein the spectral bandwidth of the absorbance peak is less than or equal to 30 nm.

3. The eyewear of claim 1, wherein the spectral bandwidth of the absorbance peak is less than or equal to 20 nm.

4. The eyewear of claim 1, wherein each of the plurality of spectral bands further comprises an attenuation factor obtained by dividing an integrated absorbance peak area within the spectral bandwidth by the spectral bandwidth of the absorbance peak, wherein the attenuation factor of the absorbance peak is greater than or equal to about 0.5 and less than about 1.

5. The eyewear of claim 1, wherein the optical filter further comprises an other absorbance peak associated with the absorptance peak, wherein the other absorbance peak is located at the second spectral range from about 465 nm to about 535 nm.

6. The eyewear of claim 1, wherein the optical filter is configured to increase an average chroma value of uniform intensity light stimuli having a bandwidth of 30 nm transmitted through the optical filter at least partially within the first spectral range from about 560 nm to about 600 nm as compared to a neutral filter that uniformly attenuates the same average percentage of light as the optical filter within the first spectral range.

7. The eyewear of claim 1, wherein the optical filter comprises a lens body and an optical interference stack disposed over the lens body.

8. The eyewear of claim 1, wherein the optical filter comprises a lens body and an anti-reflection layer disposed over the lens body.

9. The eyewear of claim 1, wherein the optical filter comprises one or more organic dyes.

10. The eyewear of claim 1, wherein the optical filter comprises one or more rare earth oxides.

11. An eyewear comprising an optical filter configured to attenuate visible light in a plurality of spectral bands, each of the plurality of spectral bands comprising an absorptance peak having a maximum absorptance, wherein:
  the optical filter comprises a first absorptance peak;
  the maximum absorptance of the first absorptance peak is located at a wavelength from about 465 nm to about 535 nm; and
  a luminous transmittance associated with the optical filter is from about 1% to about 20%.

12. The eyewear of claim 11, wherein the luminous transmittance associated with the optical filter is from about 5% to about 18%.

13. The eyewear of claim 11, wherein the first absorptance peak is associated with a spectral bandwidth equal to full width of the first absorptance peak at the maximum absorptance plus 2% absorptance, wherein the spectral bandwidth is greater than about 10 nm.

14. The eyewear of claim 11, wherein the optical filter further comprises a second absorptance peak located at a wavelength from about 560 nm to about 600 nm.

15. The eyewear of claim 11, wherein the optical filter further comprises a second absorptance peak located at a wavelength from about 630 nm to about 670 nm.

16. The eyewear of claim 11, wherein the optical filter comprises one or more organic dyes.

17. An eyewear comprising an optical filter, configured to attenuate visible light in a plurality of spectral bands, and a functional layer disposed over the optical filter, each of the plurality of spectral bands comprising an absorptance peak having a maximum absorptance, wherein:
  a spectral bandwidth is equal to the full width of the absorptance peak at 80% of the maximum absorptance of the absorptance peak;
  the optical filter comprises a first absorptance peak and a second absorptance peak;
  the maximum absorptance of the first absorptance peak is located at a wavelength from about 440 nm to about 510 nm;
  the spectral bandwidth of the first absorptance peak is less than or equal to about 50 nm;
  the maximum absorptance of the second absorptance peak is located at a wavelength from about 560 nm to about 600 nm; and
  an absolute difference between the maximum absorptance of the first absorptance peak and the maximum absorptance of the second absorptance peak is from about 0% to about 20%.

18. The eyewear of claim 17, wherein the functional layer comprises an anti-reflection coating layer, an index-matching layer, a hard coat layer, a polarizing layer, a photochromic layer, or an electrochromic layer.

19. The eyewear of claim 17, wherein the optical filter has a CIE chromaticity x value within a range from about 0.3 to about 0.38.

20. The eyewear of claim 17, wherein the optical filter has a CIE chromaticity y value within a range from about 0.31 to about 0.39.

* * * * *

UNITED STATES PATENT AND TRADEMARK OFFICE
CERTIFICATE OF CORRECTION

PATENT NO. : 11,474,382 B2  
APPLICATION NO. : 16/504143  
DATED : October 18, 2022  
INVENTOR(S) : McCabe et al.

Page 1 of 2

It is certified that error appears in the above-identified patent and that said Letters Patent is hereby corrected as shown below:

On the Title Page

Column 1, Item (72), in "Inventors:", Line 1, delete "Nigel," and insert -- Niguel, --, therefor.

Column 1, Item (73), in "Assignee", Line 1, delete "(CA)" and insert -- CA (US) --, therefor.

In the Specification

In Column 4, Line 46, after "630", insert -- nm --.

In Column 8, Line 4, after "17B", insert -- is a --.

In Column 43, Line 17, delete "522." and insert -- 520. --, therefor.

In Column 43, Line 31, delete "polyehtylene," and insert -- polyethylene, --, therefor.

In Column 44, Line 37, delete "506" and insert -- 502 --, therefor.

In Column 44, Line 53, delete "506," and insert -- 502, --, therefor.

In Column 48, Line 53, before "coating", insert -- lens --.

In Column 48, Line 54, after "second", insert -- lens --.

In Column 53, Line 67, delete "minor" and insert -- mirror --, therefor.

In Column 54, Line 24, delete "minor" and insert -- mirror --, therefor.

In Column 60, Line 31, delete "ear stems" and insert -- earstems --, therefor.

Signed and Sealed this  
Twenty-eighth Day of October, 2025

John A. Squires  
*Director of the United States Patent and Trademark Office*

CERTIFICATE OF CORRECTION (continued)
U.S. Pat. No. 11,474,382 B2

In Column 61, Line 21, delete "minor" and insert -- mirror --, therefor.

In Column 61, Line 46, delete "minor" and insert -- mirror --, therefor.

In Column 65, Line 31, delete "minor," and insert -- mirror, --, therefor.

In Column 65, Line 34, delete "an" and insert -- a --, therefor.

In Column 65, Line 48, delete "minor" and insert -- mirror --, therefor.

In Column 67, Line 21, delete "poly(theylene" and insert -- poly(ethylene --, therefor.

In the Claims

In Column 70, Claim 1, Line 40, after "with the", delete "first".